United States Patent
Nishitani et al.

(10) Patent No.: US 8,998,474 B2
(45) Date of Patent: Apr. 7, 2015

(54) SURFACE LIGHT SOURCE DEVICE AND LIQUID CRYSTAL DISPLAY APPARATUS

(75) Inventors: Rena Nishitani, Tokyo (JP); Nami Nakano, Tokyo (JP); Shuichi Kagawa, Tokyo (JP); Muneharu Kuwata, Tokyo (JP); Kuniko Kojima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 31 days.

(21) Appl. No.: 13/980,615

(22) PCT Filed: Jan. 17, 2012

(86) PCT No.: PCT/JP2012/050802
§ 371 (c)(1),
(2), (4) Date: Jul. 19, 2013

(87) PCT Pub. No.: WO2012/099099
PCT Pub. Date: Jul. 26, 2012

(65) Prior Publication Data
US 2013/0322114 A1    Dec. 5, 2013

(30) Foreign Application Priority Data

| Jan. 21, 2011 | (JP) | 2011-011108 |
| Feb. 8, 2011 | (JP) | 2011-025059 |
| Oct. 7, 2011 | (WO) | PCT/JP2011/073170 |

(51) Int. Cl.
*F21V 8/00* (2006.01)
*G02F 1/1335* (2006.01)

(52) U.S. Cl.
CPC ........ *G02B 6/0075* (2013.01); *G02F 1/133615* (2013.01); *G02B 6/0051* (2013.01);
(Continued)

(58) Field of Classification Search
USPC .......... 362/611, 612, 613, 608, 609, 610, 259
See application file for complete search history.

(56) References Cited

U.S. PATENT DOCUMENTS

| 6,951,401 B2 | 10/2005 | Van Hees et al. |
| 7,101,063 B2 | 9/2006 | Long et al. |

(Continued)

FOREIGN PATENT DOCUMENTS

| CN | 201599655 U | 10/2010 |
| CN | 101939691 A | 1/2011 |

(Continued)

OTHER PUBLICATIONS

Notice of Reason for Rejection for JP 2012-552967 mailed on May 14, 2013.

*Primary Examiner* — Laura Tso
(74) *Attorney, Agent, or Firm* — Birch, Stewart, Kolasch & Birch, LLP

(57) ABSTRACT

A surface light source device includes a surface light-emitting light-guiding unit; an LED light source disposed at an outside position on a side of a direction of the light incident surface; a plurality of laser light sources disposed at an outside position on a side of a direction of a rear surface of the surface light-emitting light-guiding unit; and a laser-light-ray guiding unit arranged on a side of a rear surface of the surface light-emitting light-guiding unit. The laser-light-ray guiding unit guides the laser light rays emitted from the laser light sources so that the laser light rays enter through a light incident end surface, travel in a direction opposite to a direction in which the LED light source emits the LED light ray, and thereafter are reflected by a light bending part to enter through the light incident surface of the surface light-emitting light-guiding unit.

10 Claims, 50 Drawing Sheets

(52) U.S. Cl.
CPC ............ G02B6/0028 (2013.01); G02B 6/0018 (2013.01); *G02B 6/0025* (2013.01); G02B 6/0031 (2013.01); *G02B 6/0036* (2013.01); *G02B 6/0061* (2013.01); G02B 6/0068 (2013.01)

(56) References Cited

U.S. PATENT DOCUMENTS

| | | | |
|---|---|---|---|
| 7,344,291 | B2 | 3/2008 | Hatanaka et al. |
| 7,476,015 | B2 | 1/2009 | Arai et al. |
| 8,128,266 | B2 * | 3/2012 | Shen .................... 362/524 |
| 8,297,825 | B2 | 10/2012 | Onishi |
| 2003/0137821 | A1 | 7/2003 | Gotoh et al. |
| 2008/0068819 | A1 | 3/2008 | Ming-Kuen et al. |
| 2008/0192173 | A1 * | 8/2008 | Itoh et al. ............... 349/61 |
| 2009/0290328 | A1 | 11/2009 | Ueyama |
| 2009/0316431 | A1 * | 12/2009 | Nagata et al. ............ 362/609 |
| 2010/0164919 | A1 | 7/2010 | Yamamoto et al. |
| 2010/0309107 | A1 | 12/2010 | Muroi et al. |
| 2011/0026270 | A1 | 2/2011 | Onishi |
| 2011/0058122 | A1 * | 3/2011 | Shikii et al. ............. 349/62 |
| 2013/0033901 | A1 | 2/2013 | Nishitani et al. |

FOREIGN PATENT DOCUMENTS

| | | |
|---|---|---|
| CN | 102844608 A | 12/2012 |
| JP | 11-305225 A | 11/1999 |
| JP | 2001-345008 A | 12/2001 |
| JP | 2003-59326 A | 2/2003 |
| JP | 2003-187623 A | 7/2003 |
| JP | 2003-215349 A | 7/2003 |
| JP | 2004-053783 A | 2/2004 |
| JP | 2004-158336 A | 6/2004 |
| JP | 2005-64163 A | 3/2005 |
| JP | 2005-183005 A | 7/2005 |
| JP | 2005-250020 A | 9/2005 |
| JP | 2005-332681 A | 12/2005 |
| JP | 2006-66121 A | 3/2006 |
| JP | 2007-188695 A | 7/2007 |
| JP | 2007-520758 A | 7/2007 |
| JP | 4040027 B2 | 1/2008 |
| JP | 4049267 B2 | 2/2008 |
| JP | 2008-226829 A | 9/2008 |
| JP | 2009-229746 A | 10/2009 |
| JP | 2010-101989 A | 5/2010 |
| TW | 2007-43853 A | 12/2006 |
| TW | 2008-23497 A | 6/2008 |
| WO | WO 02/097324 A1 | 12/2002 |
| WO | WO 2005/078505 A1 | 8/2005 |
| WO | WO 2007/091611 A1 | 8/2007 |
| WO | WO 2007/122758 A1 | 11/2007 |
| WO | WO 2009/116224 A1 | 9/2009 |
| WO | WO 2011/129117 A1 | 10/2011 |
| WO | WO 2012/098739 A1 | 7/2012 |

* cited by examiner

SURFACE LIGHT SOURCE DEVICE AND LIQUID CRYSTAL DISPLAY APPARATUS

TECHNICAL FIELD

The present invention relates to a surface light source device having a planar light-emitting surface and a liquid crystal display apparatus having the surface light source device and a liquid crystal panel.

BACKGROUND ART

In recent years, sidelight-type surface light source devices have been widely used as backlight units for liquid crystal display apparatuses, and such a sidelight-type surface light source device makes light from a light source enter through a side surface (a light incident surface) of a thin plate-shaped surface light-emitting light-guiding plate, and emits diffused light through a front surface (a light-exiting surface) of the surface light-emitting light-guiding plate toward the whole area of a rear surface of a liquid crystal display element (a liquid crystal panel). However, because it is difficult to dispose a large number of light sources (e.g., LEDs) for a large amount of light so as to face the side surface of the thin plate-shaped surface light-emitting light-guiding plate which is a narrow surface, the sidelight-type surface light source device has a problem that it is difficult to improve luminance sufficiently.

To cope with this problem, there is a proposition of a surface light source device that includes a plurality of light sources (a plurality of light-emitting element arrays) arranged in a thickness direction of the surface light source device, a surface light-emitting light-guiding plate, and an optical-path changing member (e.g., a light-reflecting mirror and so on) for guiding light from the plurality of light sources to a side surface (a light incident surface) of the surface light-emitting light-guiding plate (see Patent Document 1, for example).

PRIOR ART DOCUMENT

Patent Document

Patent Document 1: Japanese Patent Application Publication No. 2005-250020 (paragraphs 0010 to 0023, FIG. 1 to FIG. 8)

SUMMARY OF THE INVENTION

Problem to be Solved by the Invention

However, in the surface light source device of Patent Document 1, because the plurality of light sources faces the side surface of the surface light-emitting light-guiding plate and is arranged in a thickness direction of the surface light-emitting light-guiding plate, it is necessary to increase a thickness of the surface light-emitting light-guiding plate and accordingly there is a problem that a thickness of the surface light source device increases.

Moreover, in a liquid crystal display apparatus that uses the surface light source device with the increased thickness, luminance of a display surface of a liquid crystal panel can be improved. However, there is a problem that a thickness of the liquid crystal display apparatus increases.

Therefore, the present invention is made to solve the problems of the above-mentioned conventional art, and an object of the present invention is to provide a surface light source device capable of realizing both of improvement of luminance of a light-exiting surface and thin structure and to provide a liquid crystal display apparatus capable of realizing both of improvement of brightness of a display surface and thin structure.

Means for Solving the Problem

A surface light source device according to an embodiment of the present invention includes a surface light-emitting light-guiding plate including a light-exiting surface, a rear surface on a side opposite to the light-exiting surface, and a plurality of side surfaces each joining a side of the light-exiting surface and a side of the rear surface so that a light ray entering through a light incident surface which is any side surface of the plurality of side surfaces is emitted through the light-exiting surface; a first light source for emitting a first light ray toward the light incident surface, the first light source being disposed to face the light incident surface; a second light source for emitting a second light ray; and an optical-path changing member for guiding the second light ray which is emitted from the second light source to the light incident surface. Both of the first light ray emitted from the first light source and the second light ray emitted from the second light source enter the surface light-emitting light-guiding plate through the light incident surface which is the same side surface out of the plurality of side surfaces.

A liquid crystal display apparatus according to an embodiment of the present invention includes a liquid crystal panel and the surface light source device that illuminates a rear surface of the liquid crystal panel with planar light.

Effect of the Invention

In the surface light source device according to the present invention, both of improvement of luminance of the light-exiting surface and thin structure can be realized. Moreover, in the liquid crystal display apparatus according to the present invention, both of improvement of brightness of a display surface and thin structure can be realized.

MODE FOR CARRYING OUT THE INVENTION

Figure 1:
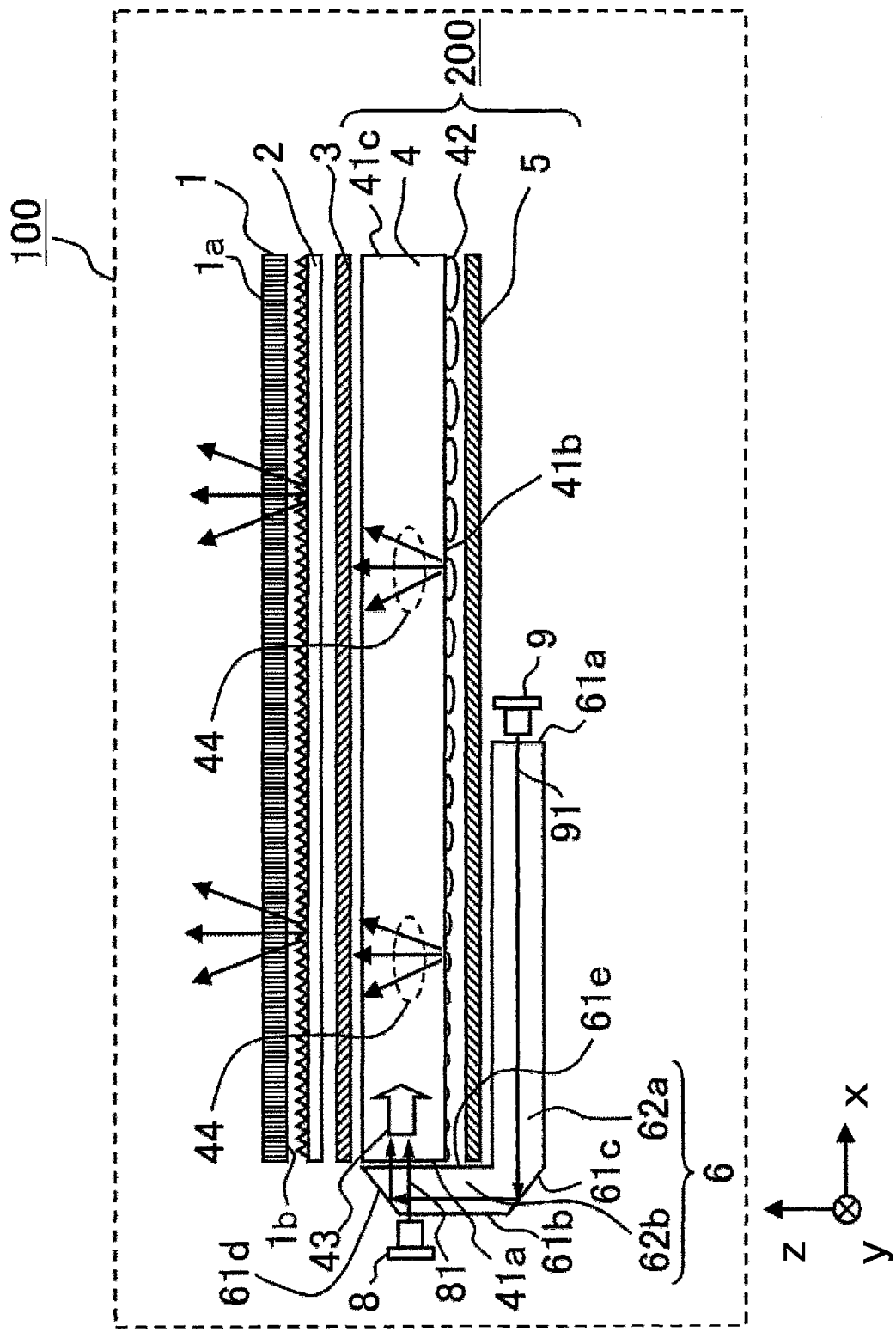
FIG. 1 is a cross-sectional view schematically illustrating an example of structure of a liquid crystal display apparatus (including a surface light source device) according to a first embodiment of the present invention.

Surface light source devices and liquid crystal display apparatuses according to first to eleventh embodiments of the present invention are described below in detail, by referring to the drawings. In the drawings, the same reference characters refer to like constitutional elements. Moreover, the present invention is not limited to the surface light source devices and the liquid crystal display apparatuses according to the first to eleventh embodiments described below.

(1) First Embodiment

FIG. 1 is a cross-sectional view schematically illustrating an example of structure of a liquid crystal display apparatus 100 (including a surface light source device 200) according to a first embodiment of the present invention. The surface light source device 200 includes a surface light-emitting light-guiding plate 4, a light-reflecting sheet 5, a light-guiding member 6, a first light source 8 and a second light source 9. Further, the surface light source device 200 includes constitutional elements 108, 106 and 107 having a function as the light-guiding member 6. For convenience of explanation, coordinate axes of an xyz orthogonal coordinate system are illustrated in each figures. In the following explanation, a short-side direction of a display surface 1a of a liquid crystal display element (liquid crystal panel) 1 is defined as a y-axis direction (a direction perpendicular to a sheet on which FIG. 1 is depicted), a long-side direction of the display surface 1a of the liquid crystal panel 1 is defined as an x-axis direction (right-and-left directions in FIG. 1), and a direction perpendicular to an xy-plane which is a plane including an x-axis and a y-axis is defined as a z-axis direction (up-and-down directions in FIG. 1). In FIG. 1, a direction from the left to the right is defined as a positive direction of the x-axis (a positive x-axis direction) and its opposite direction is defined as a negative direction of the x-axis (a negative x-axis direction). Moreover, a direction from a front of the sheet on which FIG. 1 is depicted to the sheet is defined as a positive direction of the y-axis (a positive y-axis direction) and its opposite direction is defined as a negative direction of the y-axis (a negative y-axis direction). Furthermore, in FIG. 1, a direction from the bottom to the top is defined as a positive direction of the z-axis (a positive z-axis direction) and its opposite direction is a negative direction of the z-axis (a negative z-axis direction).

As illustrated in FIG. 1, the liquid crystal display apparatus 100 includes the transmission-type liquid crystal panel 1 and the backlight unit 200 as the surface light source device. The backlight unit 200 includes a first optical sheet 2, a second optical sheet 3, the surface light-emitting light-guiding plate (light-guiding-diffusing plate) 4, the light-reflecting sheet 5, the light-guiding member 6 as an optical-path changing member, a first light source 8 and a second light source 9. These constitutional elements 1, 2, 3, 4 and 5 are arranged in the z-axis direction. In FIG. 1, the display surface 1a of the liquid crystal panel 1 is parallel to the xy-plane.

Figure 2:
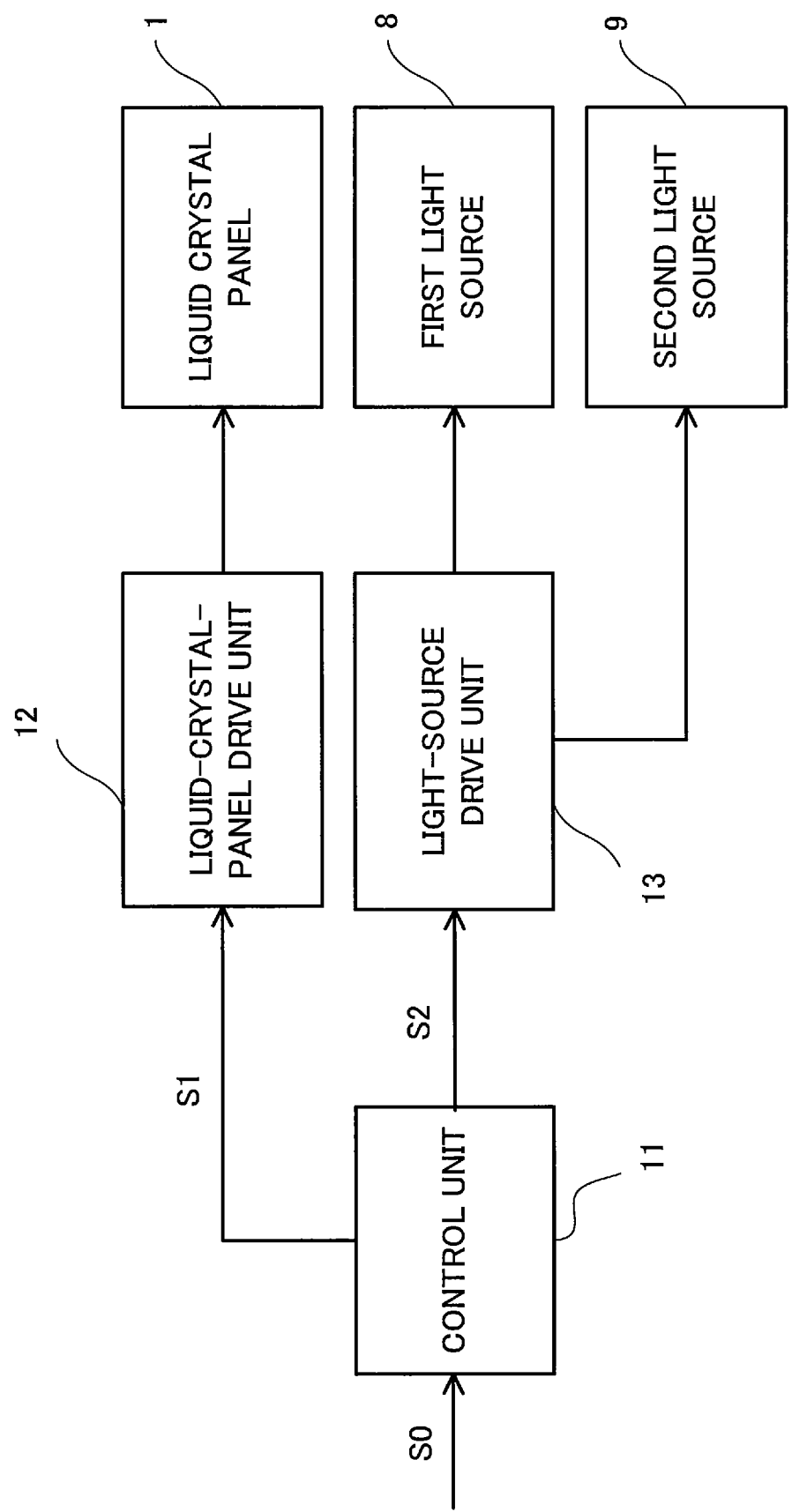
FIG. 2 is a block diagram schematically illustrating a configuration of a control system of the liquid crystal display apparatus according to the first embodiment.

FIG. 2 is a block diagram schematically illustrating a configuration of a control system of the liquid crystal display apparatus 100 in the first embodiment. As illustrated in FIG. 2, the liquid crystal display apparatus 100 includes a liquid-crystal-panel drive unit 12 and a light-source drive unit 13. The liquid-crystal-panel drive unit 12 drives the liquid crystal panel 1. The light-source drive unit 13 drives the first light source 8 and the second light source 9. Operations of the liquid-crystal-panel drive unit 12 and operations of the light-source drive unit 13 are controlled by a control unit 11.

The control unit 11 performs image processing on an input video signal S0, thereby generating a liquid-crystal-panel control signal S1 and a light-source control signal S2. The control unit 11 supplies the liquid-crystal-panel control signal S1 to the liquid-crystal-panel drive unit 12 and supplies the light-source control signal S2 to the light-source drive unit 13. The liquid-crystal-panel drive unit 12 drives the liquid crystal panel 1 on the basis of the liquid-crystal-panel control signal S1. The light-source drive unit 13 drives the first light source 8 and the second light source 9 on the basis of the light-source control signal S2.

The first light source 8 emits a white-color first light ray 81. The second light source 9 emits a white-color second light ray 91. The second light ray 91 travels in the negative x-axis direction inside the light-guiding member 6. Then, the second light ray 91 is reflected twice and its traveling direction is changed to the positive x-axis direction. The first light ray 81 travels in the positive x-axis direction and enters the light-guiding member 6. The first light ray 81 is mixed with the second light ray 91 in the light-guiding member 6, and the first light ray 81 and the second light ray 91 enter the surface light-emitting light-guiding plate 4 through a light incident surface 41a of the surface light-emitting light-guiding plate 4. The first light ray 81 and the second light ray 91 become a mixed light ray 43. The mixed light ray 43 is a white-color light ray that is a mixture of the first light ray 81 and the second light ray 91. In the first embodiment, the surface light source device is explained as a backlight unit for the liquid crystal display apparatus. So, the mixed light ray 43 is a white-color light ray. However, the mixed light ray 43 can be a light ray of any color other than white-color. It is possible to use a white-color light ray or a light ray of any color other than white-color as the mixed light ray 43 for a use of the device. The light-guiding member 6 as an optical-path changing member has a function of guiding the second light ray 91 emitted from the second light source 9 toward the light incident surface 41a. Moreover, it is possible that the light-guiding member 6 has a function of changing the size of a cross-section of the second light ray 91 in the light incident surface 41a, such as a function of ensuring an optical distance so as to bring the size of a cross-section of the second light ray 91 closer to the size of a cross section of the first light ray 81, for example. Both of the first light ray 81 emitted from the first light source 8 and the second light ray 91 emitted from the second light source 9 enter the surface light-emitting light-guiding plate 4 through the light incident surface 41a that is the same side surface out of a plurality of side surfaces. Furthermore, the meaning of "emit" is to send out light in a certain direction.

As illustrated in FIG. 1, a plurality of microscopic optical elements 42 is provided on a rear surface 41b of the surface light-emitting light-guiding plate 4. The microscopic optical elements 42 are hemispherical convex-lens-shaped elements which project from the rear surface 41b in the negative z-axis direction, for example. The microscopic optical elements 42 change the mixed light ray 43 to illumination light 44. The illumination light 44 travels in the positive z-axis direction. The illumination light 44 exits toward the back surface 1b of the liquid crystal panel 1. The illumination light 44 passes through the second optical sheet 3 and the first optical sheet 2, and the back surface of the liquid crystal panel 1 is illuminated with the illumination light 44. The first optical sheet 2 has a function of directing the light emitted from the surface light-emitting light-guiding plate 4 toward the rear surface 1b of the liquid crystal panel 1. The second optical sheet 3 has a function of suppressing optical effects such as minute illumination unevenness to reduce luminance unevenness.

The light-reflecting sheet 5 is disposed on a side of the rear surface 41b of the surface light-emitting light-guiding plate 4 (a side of the negative z-axis direction). The light-reflecting sheet 5 is disposed on a side of the surface light-emitting light-guiding plate 4 of the light-guiding member 6 (a side of the positive z-axis direction). Light emitted from the surface light-emitting light-guiding plate 4 in the negative z-axis direction is reflected by the light-reflecting sheet 5. Light reflected by the light-reflecting sheet 5 is used as the illumination light 44 with which the back surface 1b of the liquid crystal panel 1 is illuminated after the light passes through the surface light-emitting light-guiding plate 4. The light-reflecting sheet 5 is a light-reflecting sheet having a base material made of a resin such as a polyethylene terephthalate or a light-reflecting sheet having a base plate, a surface of which is metal-evaporated, for example.

A liquid crystal layer of the liquid crystal panel 1 is disposed to be parallel to the xy-plane. The display surface 1a of the liquid crystal panel 1 has a rectangular shape. Two adjacent sides of the display surface 1a are orthogonal to each other. In FIG. 1, a short side of the liquid crystal panel 1 is parallel to the y-axis and a long side is parallel to the x-axis.

The liquid-crystal-panel drive unit 12 changes a light transmissivity of the liquid crystal layer in units of pixels on the basis of the liquid-crystal-panel control signal S1 received from the control unit 11. Each pixel is comprised of three sub-pixels, for example. A first sub-pixel has a color filter which passes only red-color light. A second sub-pixel has a color filter which passes only green-color light. A third sub-pixel has a color filter which passes only blue-color light. The control unit 11 controls transmissivity of each sub-pixel, and accordingly the liquid crystal panel 1 produces a color image. In other words, the liquid crystal panel 1 produces image light by spatially modulating the illumination light 44 received from the surface light-emitting light-guiding plate 4, and the image light is emitted through the display surface 1a. Furthermore, the "image light" means light having image information.

According to the first embodiment, the control unit 11 controls the light-source drive unit 13 to adjust luminance of the second light ray 91 and luminance of the first light ray 81. The control unit 11 adjusts a light-emitting amount of each of the first light source 8 and the second light source 9 on the basis of the video signal S0. This enables the liquid crystal display apparatus 100 to reduce power consumption.

The first light source 8 is disposed to face the end surface (light incident surface) 41a of the surface light-emitting light-guiding plate 4 on a side of the negative x-axis direction. The second light source 9 is disposed in a position shifted from a position of the first light source 8 in the z-axis direction. In the first embodiment, the second light source 9 is disposed on a side of the rear surface 41b of the surface light-emitting light-guiding plate 4 (in the negative z-axis direction). The first light source 8 includes a plurality of light-emitting diode (LED) elements arranged in the y-axis direction at predetermined intervals (usually, at regular intervals), for example. The second light source 9 includes a plurality of LED elements arranged in the y-axis direction at predetermined intervals (usually at regular intervals).

As a comparative example, it is conceivable that both of the first light source 8 having an array of LED elements and the second light source having an array of LED elements are disposed so as to face the incident end surface 41a of the surface light-emitting light-guiding plate 4. However, in this comparative example, because the first light source 8 and the second light source are disposed to be adjacent to each other and the light sources are concentrated in one place, there is a possibility that a temperature of an area around the first light source 8 and the second light source becomes too high due to a heat generated by the LED elements. Such a rise in the temperature decreases a luminous efficiency. The luminous efficiency indicates an efficiency of the light source and expressed as entire light flux per unit electrical power. Furthermore, the rise in the peripheral temperature shortens the lives of the LED elements. Therefore, when two lines of light sources are arranged, it is desirable that the light sources be arranged so as to be away from each other. This makes it possible to suppress a local rise in the temperature (uneven temperature distribution) due to light emission of the light sources.

The second light source 9 is disposed to face an end surface 61a of the light-guiding member 6. The end surface 61a is an end surface of the light-guiding member 6 on a side of the positive x-axis direction. The end surface 61a is a light incident end surface. The light-guiding member 6 includes a first light-guiding part 62a and a second light-guiding part 62b. The first light-guiding part 62a is a rectangular parallelepiped plate-shaped part disposed to be parallel to the xy-plane. The second light-guiding part 62b is a trapezoidal-prism plate-shaped part disposed to be parallel to the yz-plane. As illustrated in FIG. 1, the first light-guiding part 62a is disposed adjacent to the light-reflecting sheet 5 on a side of the negative z-axis direction. The second light-guiding part 62b is disposed adjacent to the surface light-emitting light-guiding plate 4 on a side of the negative z-axis direction. The light-guiding parts 62a and 62b are plate-shaped members of 2 mm in thickness, for example. The light-guiding parts 62a and 62b are made of a transparent material such as an acrylic resin (e.g., PMMA) or other materials.

The second light ray 91 enters the light-guiding member 6 through the end surface 61a of the light-guiding member 6. The second light ray 91 is totally reflected at an interface between the light-guiding member 6 and an air layer. The total reflection is a phenomenon in which no light rays pass through a boundary surface and all light rays are reflected at the boundary surface. Then, the second light ray 91 travels inside the light-guiding member 6 while repeatedly reflected. The second light ray 91 is repeatedly reflected and reaches an end surface 61c. The end surface 61c is an end surface of the light-guiding part 62a on a side of the negative x-axis direction.

Figure 3:
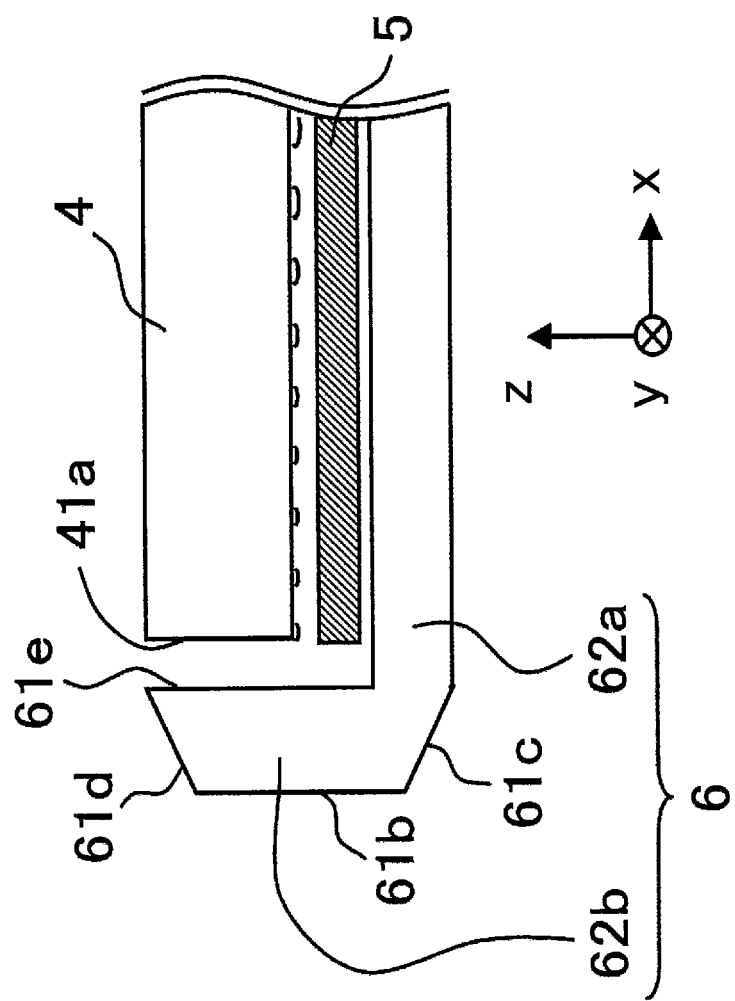
FIG. 3 is a cross-sectional view schematically illustrating an example of a surface light-emitting light-guiding plate (light-guiding-diffusing plate) and its surrounding structure in a surface light source device according to the first embodiment.

FIG. 3 is a cross-sectional view schematically illustrating an example of the surface light-emitting light-guiding plate (light-guiding-diffusing plate) and its surrounding structure in the surface light source device 200 according to the first embodiment. As illustrated in FIG. 3, two end surfaces 61b and 61e of the light-guiding part 62b are formed to be parallel to the yz-plane. The end surface 61e faces the end surface 41a of the surface light-emitting light-guiding plate 4 on a side of the negative x-axis direction. The two end surfaces 61c and 61d are inclined with reference to the xy-plane at an angle of approximately 45 degrees. The end surface 61c of the light-guiding member 6 is inclined so as to reflect the second light ray 91 and to change a traveling direction of the second light ray 91 from the negative x-axis direction to the positive z-axis direction. The end surface 61d of the light-guiding member 6 is inclined so as to reflect the second light ray 91 and to change the traveling direction of the second light ray 91 from the positive z-axis direction to the positive x-axis direction.

The second light ray 91 enters through the end surface 61a. Then, the second light ray 91 is repeatedly totally reflected and reaches the end surface 61c. The second light ray 91 is reflected at the end surface 61c and travels in the positive z-axis direction. Then, the second light ray 91 is reflected at the end surface 61d and its traveling direction is changed from the positive z-axis direction to the positive x-axis direction. Then, the second light ray 91 is emitted through the end surface 61e toward the light incident surface 41a of the surface light-emitting light-guiding plate 4. On the other hand, the first light ray 81 emitted from the first light source 8 enters the light-guiding member 6 through the end surface 61b. Then, the first light ray 81 passes through the light-guiding part 62b of the light-guiding member and is emitted through the end surface 61e toward the light incident surface 41a of the surface light-emitting light-guiding plate 4. The first light source 8 is disposed within a range of a length of the end surface 41a in the z-axis direction. In other words, the first light source 8 is disposed to face the end surface 41a.

The first light source 8 has an LED element for emitting a light ray having a comparatively large divergence angle. The divergence angle means an angle at which a light ray spreads out. For this reason, even when the first light sources 8 are arranged in the y-axis direction at equal intervals, the first light rays 81 overlap with each other at an area between the end surface 61b and the end surface 61e to become a line-shaped light. A plurality of light rays are emitted from the closely disposed light sources. When the plurality of light rays overlap spatially each other, a luminance distribution of these light rays is equalized and then the luminance distribution that is even in a direction of arrangement of the light sources is obtained.

A light ray of the first light source 8, which is composed of a single light source, does not have a uniform luminance distribution. However, when a plurality of light rays overlaps each other, a luminance distribution is equalized. The equalized light rays produce a uniform luminance distribution in the direction of arrangement of the light sources to produce the line-shaped light. The first light source 8 is disposed to face the end surface 61b of the light-guiding member 6. The first light ray 81 is emitted from the first light source 8 toward the end surface 61b.

The end surface 61e of the light-guiding member 6 is disposed to face the end surface 41a of the surface light-emitting light-guiding plate 4 on a side of the negative x-axis direction. The first light ray 81 and the second light ray 91 that are white-color light emitted from the first light source 8 and the second light source 9 are mixed inside the light-guiding member 6 and are emitted toward the surface light-emitting light-guiding plate 4. The first light ray 81 and the second light ray 91 are mixed to produce white-color line-shaped light. The white-color line-shaped light is the mixed light ray 43. Furthermore, the control unit 11 can control the light-source drive unit 13 to adjust a ratio between luminance of the first light ray 81 and luminance of the second light ray 91.

Although the light-guiding member 6 is explained as a transparent member, it is not limited to the transparent member. It is necessary for the light-guiding member 6 to have two functions. The first function is a function that the light-guiding member 6 guides the first light ray 81 and the second light ray 91 to the surface light-emitting light-guiding plate 4. The first light ray 81 is a light ray emitted from the first light source 8. The second light ray 91 is a light ray emitted from the second light source. The second function is a function that the light-guiding member 6 mixes the first light ray 81 and the second light ray 91. The light-guiding member 6 may have a different configuration as long as it has the above-described two functions. For example, like effects can be obtained by putting reflection films on the end surfaces 61c and 61d. The reflection films can be realized by depositing a metal with high reflectivity, such as aluminum, silver or gold, on the end surfaces.

Figure 4:
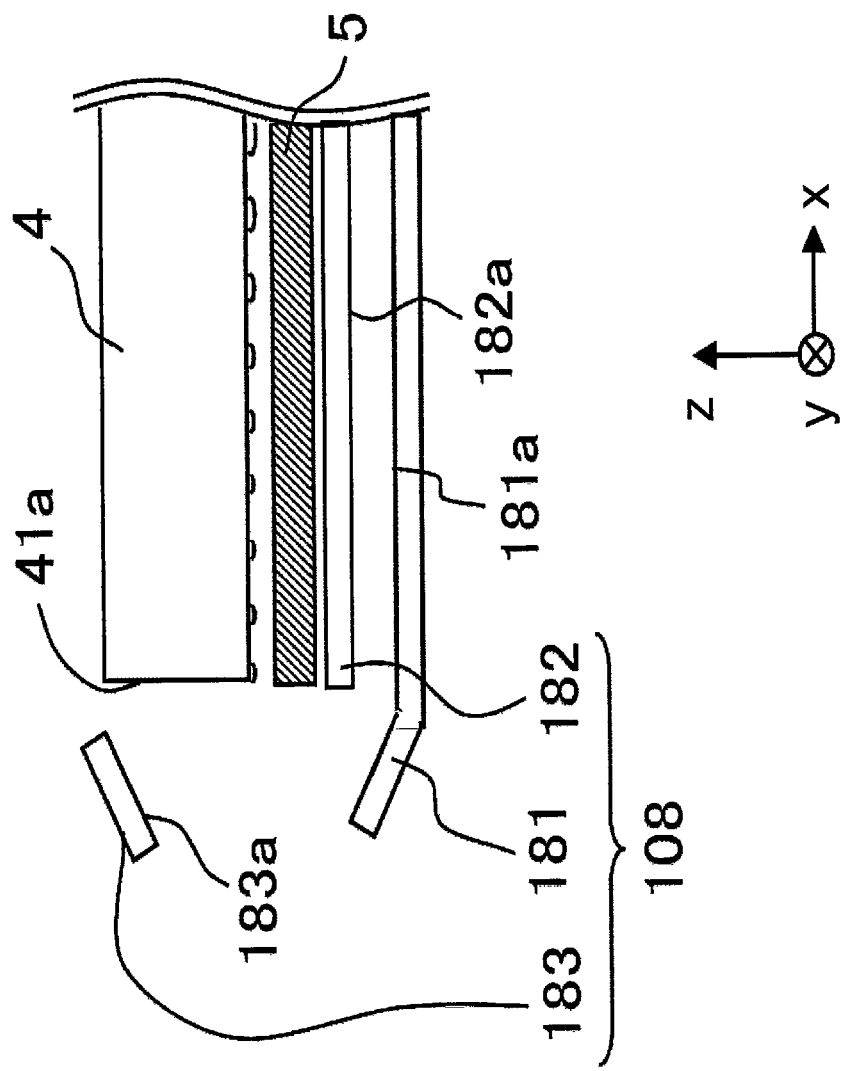
FIG. 4 is a cross-sectional view schematically illustrating another example of the surface light-emitting light-guiding plate and its surrounding structure in the surface light source device according to the first embodiment.

FIG. 4 is a cross-sectional view schematically illustrating another example of the surface light-emitting light-guiding plate 4 and its surrounding structure in the surface light source device 200 according to the first embodiment. As illustrated in FIG. 4, the light-guiding member 108 is formed by three parts, i.e., reflecting members 181, 182 and 183. Reflecting surfaces 181a, 182a and 183a of the reflecting members 181, 182 and 183 are mirror surfaces. Although the reflecting member 181 and the reflecting member 182 are illustrated as separate parts, they can be composed of a single hollow member which is formed by connecting both of the reflecting members each other at their ends. Furthermore, it is possible to form the reflecting member 183 by forming a mirror surface as a part of a structural member.

The surface light-emitting light-guiding plate 4 is disposed to be parallel to the display surface 1a of the liquid crystal panel 1. The surface light-emitting light-guiding plate 4 has the microscopic optical elements 42 on its rear surface. The rear surface indicates a surface which is positioned on a side opposite to the liquid crystal panel 1 and a surface of the surface light-emitting light-guiding plate 4 which is positioned on a side of the negative z-axis direction. The microscopic optical elements 42 change the mixed light ray 43 to the illumination light 44. The mixed light ray 43 is light that propagates inside the surface light-emitting light-guiding plate 4. The illumination light 44 is light emitted in the positive z-axis direction. The illumination light 44 exits toward the rear surface 1b of the liquid crystal panel 1 from the surface light-emitting light-guiding plate 4.

Figure 5:
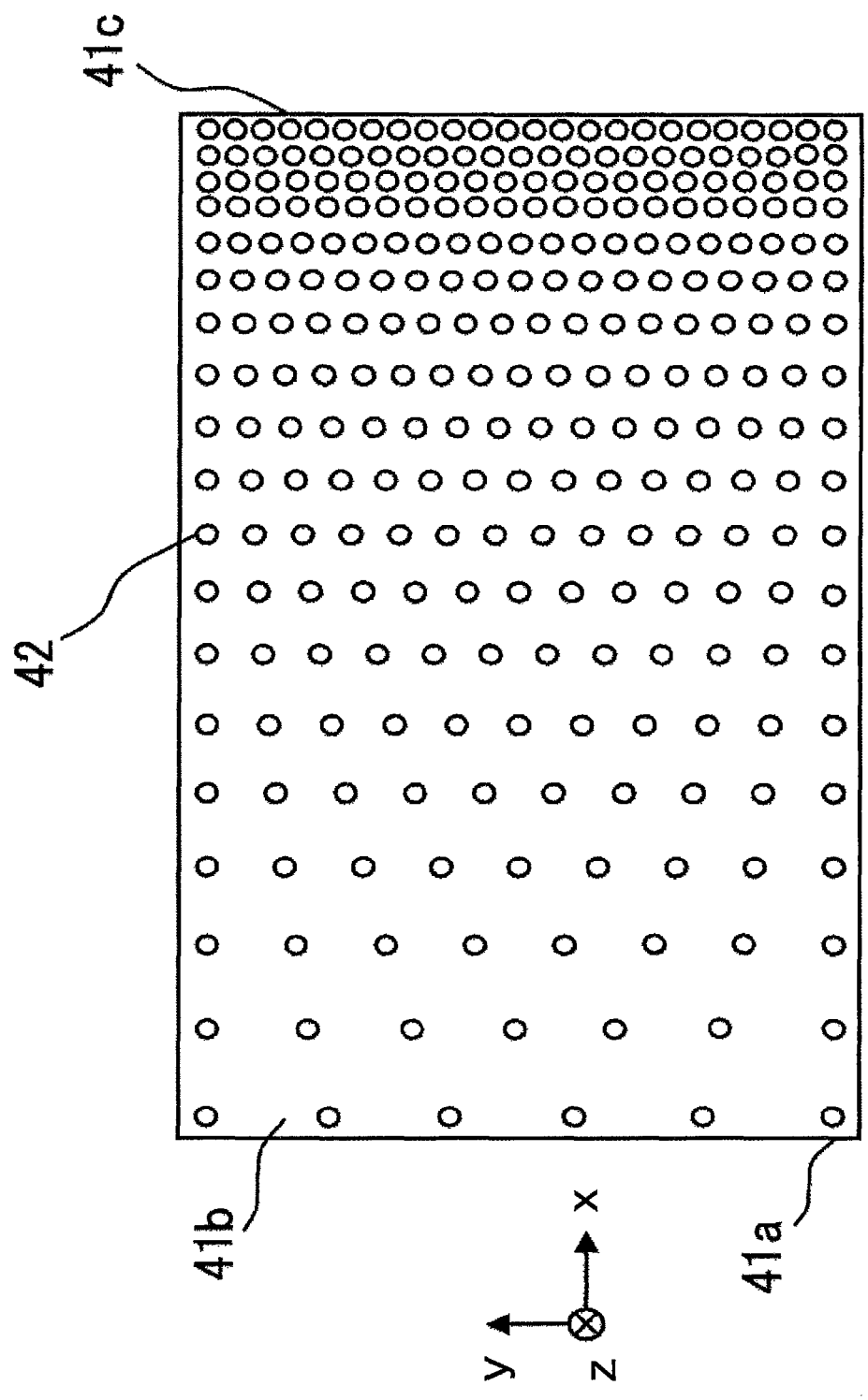
FIG. 5 is a diagram schematically illustrating an example of an arrangement of microscopic optical elements disposed on the surface light-emitting light-guiding plate in the surface light source device according to the first embodiment.

FIG. 5 is a diagram schematically illustrating an example of an arrangement of the microscopic optical elements 42 disposed on the surface light-emitting light-guiding plate 4 in the surface light source device 200 according to the first embodiment. The surface light-emitting light-guiding plate 4 is a member made of a transparent material such as an acrylic resin (e.g., PMMA) or other materials, for example. The surface light-emitting light-guiding plate 4 is a plate-shaped member of 4 mm in thickness, for example. As illustrated in FIG. 5, the surface light-emitting light-guiding plate 4 has the microscopic optical elements 42 on the rear surface 41b. The microscopic optical element 42 has a semispherical convex shape projecting in the negative z-axis direction. The semi-spherical convex shape is hereinafter referred to as a convex-lens shape.

The mixed light ray 43 enters through the end surface 41a of the surface light-emitting light-guiding plate 4. The mixed light ray 43 is totally reflected at the interface between the surface light-emitting light-guiding plate 4 and the air layer. Then, the mixed light ray 43 propagates inside the light-guiding plate 4. The mixed light ray 43 travels in the positive x-axis direction while repeatedly reflected. However, when the mixed light ray 43 enters the microscopic optical element 42, it is reflected at a curved surface of the microscopic optical element 42 to change its traveling direction. When the traveling direction of the mixed light ray 43 is changed, some light rays out of the mixed light rays 43 cannot satisfy a totally reflecting condition at the interface between a front surface of the surface light-emitting light-guiding plate 4 and the air layer. When the light ray does not satisfy the totally reflecting condition, the light ray is emitted through the front surface of the surface light-emitting light-guiding plate 4 to the back surface 1b of the liquid crystal panel 1. The front surface of the surface light-emitting light-guiding plate 4 is a surface disposed on a side of the liquid crystal panel 1.

An arrangement density of the microscopic optical elements 42 varies according to a position in the xy-plane on the surface light-emitting light-guiding plate 4. The arrangement density means the number of the microscopic optical elements 42 per unit area or the size of the microscopic optical elements 42 or other values. An in-plane luminance distribution of the illumination light 44 can be controlled by changing the arrangement density of the microscopic optical elements 42. The illumination light 44 is light emitted from the surface light-emitting light-guiding plate 4. Furthermore, the in-plane luminance distribution means a distribution that indicates a level of luminance at a position two-dimensionally expressed on an arbitrary plane. Here, the "in-plane" indicates a display surface.

As illustrated in FIG. 5, the arrangement density of the microscopic optical elements 42 varies according to a position in a traveling direction of the mixed light ray 43. The traveling direction of the mixed light ray 43 is the positive x-axis direction in FIG. 5. More specifically, the surface light-emitting light-guiding plate 4 has the microscopic optical elements 42 within a region from a vicinity of the end surface 41a to the end surface 41c. The end surface 41c is an end surface which is opposed to the end surface 41a. The arrangement density of them varies continuously from sparse to dense in a direction from the vicinity of the end surface 41a to the end surface 41c.

The microscopic optical element 42 has a convex lens shape, for example. A curvature of its surface is approximately 0.15 mm. A maximum height of the microscopic optical element 42 is approximately 0.005 mm. Furthermore, a refractive index of the microscopic optical element 42 is approximately 1.49. Moreover, materials of the surface light-emitting light-guiding plate 4 and the microscopic optical element 42 may be an acrylic resin. However, the materials of the surface light-emitting light-guiding plate 4 and the microscopic optical element 42 are not limited to the acrylic resin and may be other resin materials (e.g., a polycarbonate resin and so on) or glass materials, which have a high light transmissivity and have excellent formability and processability. Furthermore, the thickness of the surface light-emitting light-guiding plate 4 is not limited to 4 mm. From the viewpoint of thinning and lightweighting of the liquid crystal display apparatus 100, it is desirable that the surface light-emitting light-guiding plate 4 that is thin in thickness be used.

In the first embodiment, the microscopic optical element 42 has the convex-lens shape. However, the shape of the microscopic optical element 42 is not limited to the convex-lens shape. A necessary function for the microscopic optical elements 42 is to reflect the mixed light ray 43 to direct it in the positive z-axis direction so that the mixed light ray 43 is emitted toward the back surface 1b of the liquid crystal panel 1. The mixed light ray 43 is light that travels in the x-axis direction inside the surface light-emitting light-guiding plate 4. The microscopic optical element 42 may have other shapes as long as they have such function. For example, even if a prism-shape or a random pits and projections pattern or the like is used, like functions can be obtained.

The illumination light 44 is light emitted from the surface light-emitting light-guiding plate 4 toward the liquid crystal panel 1. However, in some cases, the illumination light 44 is reflected by the first optical sheet 2, the second optical sheet 3 and the like and travels in the negative z-axis direction. In order to achieve high brightness and low electrical power consumption, it is necessary to use these reflected light rays as the illumination light for the liquid crystal panel 1 again. The liquid crystal display apparatus 100 in the first embodiment includes the light-reflecting sheet 5 on a side of the negative z-axis direction from the surface light-emitting light-guiding plate 4. The light-reflecting sheet 5 directs the reflected light traveling in the negative z-axis direction to the positive z-axis direction again. This enables the liquid crystal display apparatus 100 to use light efficiently.

As described above, the liquid crystal display apparatus 100 in the first embodiment includes the light sources that use the white-color LED elements in two places. The two places are the side surface of the surface light-emitting light-guiding plate 4 and the back surface of the surface light-emitting light-guiding plate 4. By virtue of this, the liquid crystal display apparatus 100 can increase the number of light sources while suppressing increase of the thickness (size in the z-axis direction). Furthermore, since the size of the backlight unit 200 is suppressed as compared with a display region of the liquid crystal display apparatus 100, the liquid crystal display apparatus 100 can achieve high brightness and a thin type. The display region indicates a region where an effective image is displayed. The display region is a region extending in the x-axis direction and the y-axis direction in the coordinate representation.

Moreover, since the light sources are arranged at the side surface and the back surface of the surface light-emitting light-guiding plate 4 respectively, a rise in a peripheral temperature resulting from heat generated by the respective light sources can be relieved. By virtue of this, a decrease in luminous efficiency of the light sources due to the rise in the peripheral temperature can be suppressed. Furthermore, long lives of the first light source 8 and the second light source 9 can be achieved.

Conventionally, in a sidelight-type backlight adopting LED elements as point light sources that have directivity, there is a problem of brightness unevenness in a plane of display surface. Since light rays of the LED elements diverge at their own divergence angles, a light ray of the LED element spatially overlaps a light ray of neighboring another LED element and therefore the light rays of the LED elements forms a line-shaped light. The surface light source device 200 as a backlight unit can have a sufficient propagation distance of the light rays. For this reason, the backlight unit 200 can generate the illumination light 44 having a uniform luminance distribution. The luminance distribution of the illumination light 44 is even in a plane of the display surface. Therefore, the liquid crystal display apparatus 100 capable of displaying an excellent image with reduced brightness unevenness can be provided. The propagation distance means a distance through which a light ray travels. Furthermore, the propagation of a light ray means that a light ray advances and travels.

The liquid crystal display apparatus 100 in the first embodiment includes the single light-guiding member 6. The first light ray 81 emitted from the first light source 8 and the second light ray 91 emitted from the second light source 9 enter the light-guiding member 6 through the different end surfaces 61a and 61b. However, it is not necessary to form the light-guiding member 6 by a single member. The light-guiding member 6 may be formed as illustrated in FIG. 6 and FIG. 7, for example.

Figure 6:
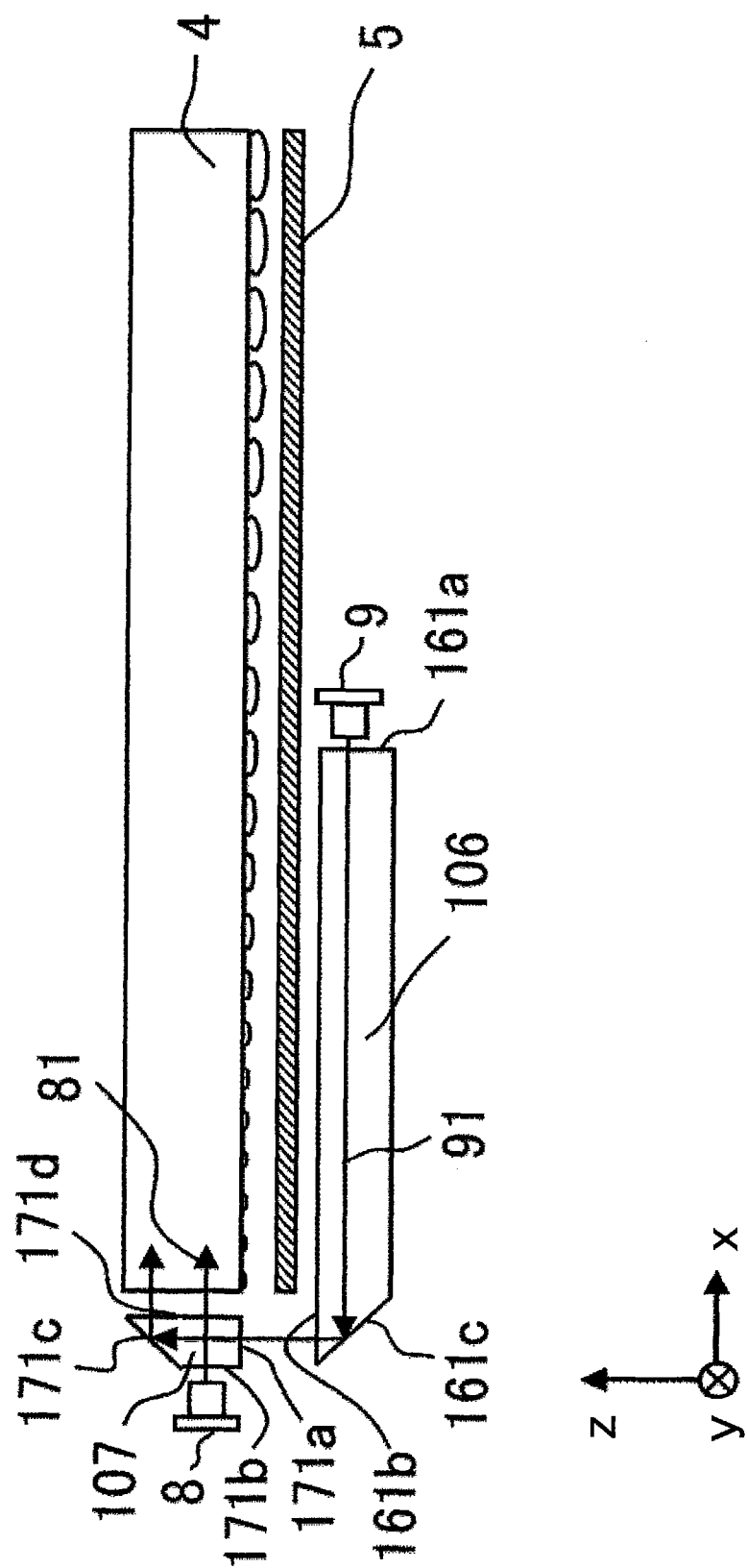
FIG. 6 is a cross-sectional view schematically illustrating another example of the surface light-emitting light-guiding plate and its surrounding structure in the surface light source device according to the first embodiment.

FIG. 6 is a cross-sectional view schematically illustrating another example of the surface light-emitting light-guiding plate and its surrounding structure in the surface light source device 200 according to the first embodiment. FIG. 6 illustrates the light-guiding member formed by two parts. The backlight unit 200 includes a first light-guiding member 106 and a second light-guiding member 107. The second light ray 91 enters the light-guiding member 106 through an end surface 161a. The second light ray 91 travels in the negative x-axis direction inside the first light-guiding member 106. The second light ray 91 is reflected at an end surface 161c and travels in the positive z-axis direction. The second light ray 91 is emitted through an end surface 161b. Then, the second light ray 91 enters the second light-guiding member 107 through an end surface 171a of the second light-guiding member 107. The second light ray 91 travels in the positive z-axis direction inside the second light-guiding member 107. The second light ray 91 is reflected at an end surface 171c and travels in the positive x-axis direction.

On the other hand, the first light ray 81 enters through an end surface 171b of the second light-guiding member 107. The first light ray 81 travels in the positive x-axis direction inside the second light-guiding member 107. The first light ray 81 is emitted through an end surface 171d. The second light-guiding member 107 has the end surface 171a near an incident position of the first light ray 81. After the first light ray 81 enters the second light-guiding member 107, the first light ray 81 is totally reflected at an interface between an air layer and the end surface 171a. Accordingly, the first light ray 81 can efficiently travels toward the surface light-emitting light-guiding plate 4.

Figure 7:
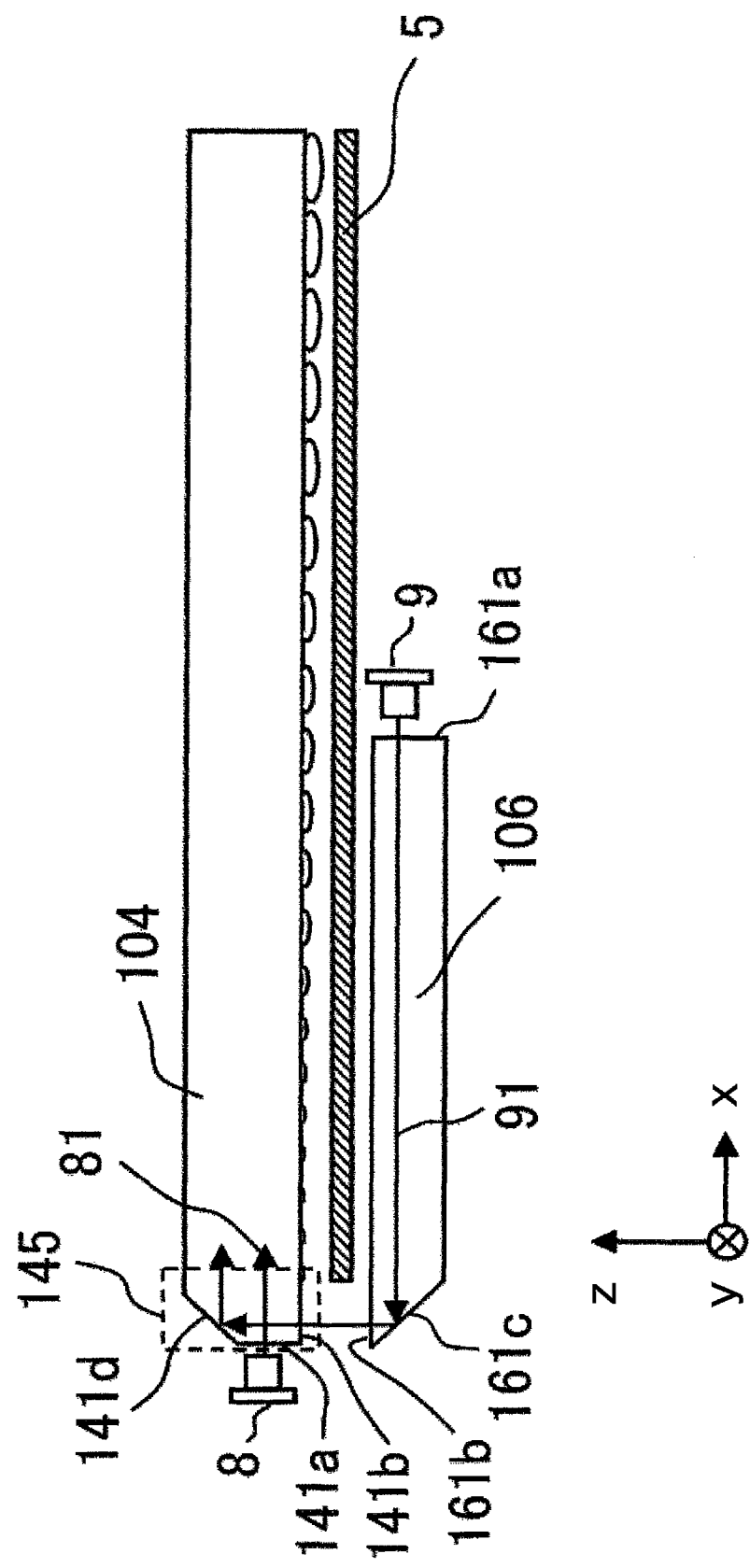
FIG. 7 is a cross-sectional view schematically illustrating further another example of the surface light-emitting light-guiding plate and its surrounding structure in the surface light source device according to the first embodiment.

FIG. 7 is a cross-sectional view schematically illustrating further another example of the surface light-emitting light-guiding plate and its surrounding structure in the surface light source device 200 according to the first embodiment. FIG. 7 illustrates structure where the surface light-emitting light-guiding plate 400 has a part of the functions of the light-guiding member 6. An end part of the light-guiding member 106 on a side of the negative x-axis direction protrudes along the negative x-axis direction from an end part of the reflection sheet 5 on a side of the negative x-axis direction. An end part of the surface light-emitting light-guiding plate 400 on a side of the negative x-axis direction protrudes along the negative x-axis direction from an end part of the reflection sheet 5 on a side of the negative x-axis direction.

The second light ray 91 enters the light-guiding member 106 through the end surface 161a. The second light ray 91 travels in the negative x-axis direction inside the first light-guiding member 106. The second light ray 91 is reflected at the end surface 161c and travels in the positive z-axis direction. The second light ray 91 is emitted through the end surface 161b. Then, the second light ray 91 enters the surface light-emitting light-guiding plate 400 through the back surface of the surface light-emitting light-guiding plate 400. The second light ray 91 travels in the positive z-axis direction inside the surface light-emitting light-guiding plate 400. The second light ray 91 is reflected at the end surface 141d and travels in the positive x-axis direction. On the other hand, the first light ray 81 enters through an end surface 141a of the surface light-emitting light-guiding plate 400. The first light ray 81 travels in the positive x-axis direction inside the surface light-emitting light-guiding plate 400. The second light ray 91 enters the surface light-emitting light-guiding plate 400 through a back surface 141b placed near the end surface 141a through which the first light ray 81 enters. An end part 145 is a range including the end surface 141a and the back surface 141b placed near the end surface 141a.

In the structure illustrated in FIG. 7, the number of the end surfaces through which the light rays enter and the number of the end surfaces through which the first light ray 81 and the second light ray 91 are emitted can be reduced in comparison with the structure illustrated in FIG. 6. For this reason, loss of light occurring at the incident surface and the exit surface can be reduced. Therefore, a high light-usage efficiency can be obtained. The light-usage efficiency is a ratio of the amount of light used for image display to the amount of light emitted from the light sources.

As described above, the liquid crystal display apparatus 100 in the first embodiment is configured so that the first light ray 81 and the second light ray 91 emitted from the first light source 8 and the second light source 9 which are the two light sources disposed in different positions enter through the short end surface 41a of the surface light-emitting light-guiding plate 4. However, by designing an arrangement of the light sources, a position of the light-guiding member 6; an arrangement of the microscopic optical elements 42 and the like, it is possible to use a long end surface of the surface light-emitting light-guiding plate 4 as the incident surface. The long surface is an end surface parallel to the xz-plane in FIG. 1, FIG. 6 and FIG. 7.

(2) Second Embodiment

Figure 8:
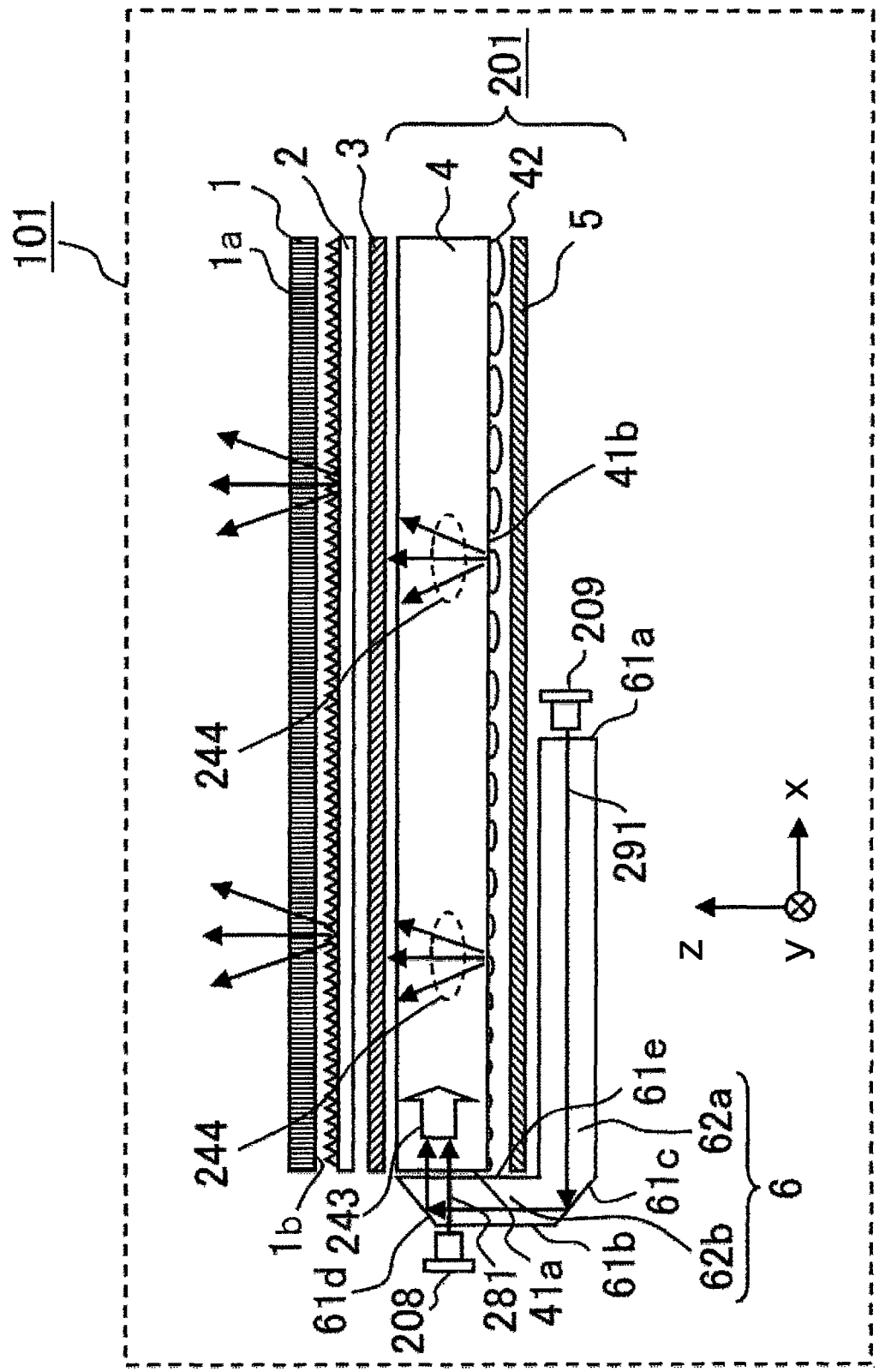
FIG. 8 is a cross-sectional view schematically illustrating an example of structure of a liquid crystal display apparatus (including a surface light source device) according to a second embodiment of the present invention.

FIG. 8 is a cross-sectional view schematically illustrating an example of structure of a liquid crystal display apparatus 101 (including a surface light source device 201) according to a second embodiment. The surface light source device 201 includes a surface light-emitting light-guiding plate 4, a light-reflecting sheet 5, a light-guiding member 6, a first light source 208 and a second light source 209. The surface light source device 201 also includes a constitutional element which has a function of the light-guiding member 6. Reference characters in FIG. 8 that are the same as those in FIG. 1 (the first embodiment) indicate the same or corresponding constitutional elements. The liquid crystal display apparatus 101 is a transmission-type display apparatus. The liquid crystal display apparatus 101 includes the first light source 208 and the second light source 209 of different colors, as a substitute for the first light source 8 and the second light source 9 of white-color in the liquid crystal display apparatus 100 in the first embodiment. The liquid crystal display apparatus 101 is the same as that in the first embodiment except for the difference. Furthermore, the configurations in FIG. 4, FIG. 6 and FIG. 7 other than the configurations in FIG. 1 can be used for the second embodiment.

If the color purity of a displayed color in the liquid crystal display apparatus need be improved in order to extend a color reproduction range, a width of a transmission wavelength band of a color filter of the liquid crystal display panel should be set to a narrow one. However, if the width of the transmission wavelength band is set to the narrow one, a transmitted light amount of the transmitted light ray decreases. For this reason, when the color purity of the displayed color is intended to be improved, a problem occurs that the brightness decreases due to the decrease of the transmitted light amount. Furthermore, in fluorescent lamps that are conventionally used, a peak of an emission spectrum of a red-color region is within an orange-color wavelength region. Likewise, in white-color LED elements using a yellow-color fluorescent substance, a peak of an emission spectrum of a red-color region is within the orange-color wavelength region. In other words, a peak of wavelengths of a red-color region is deviated from the red-color region and is located within an orange-color region. Especially, if the color purity of red-color is intended to be improved, the transmitted light amount of the color filter is extremely reduced and therefore the brightness decreases excessively.

The liquid crystal display apparatus 101 in the second embodiment includes an LED element for emitting a first light ray 281 which is bluish-green-color light in the first light source 208. The first light ray 281 which is bluish-green-color light is a mixed light ray of blue-color light and green-color light. The liquid crystal display apparatus 101 uses a single-color LED element for emitting a second light ray 291 which is red-color light in the second light source 209. Light of the single-color LED element has a narrow wavelength width. That is, the light of the single-color LED element has high color purity. For this reason, by using a red-color LED element, the color purity of red-color can be improved. That is, the liquid crystal display apparatus 101 can extend a color reproduction range of displayed color. The single-color means a light having only a certain wavelength. The color purity indicates a level of single-color property.

Figure 9:
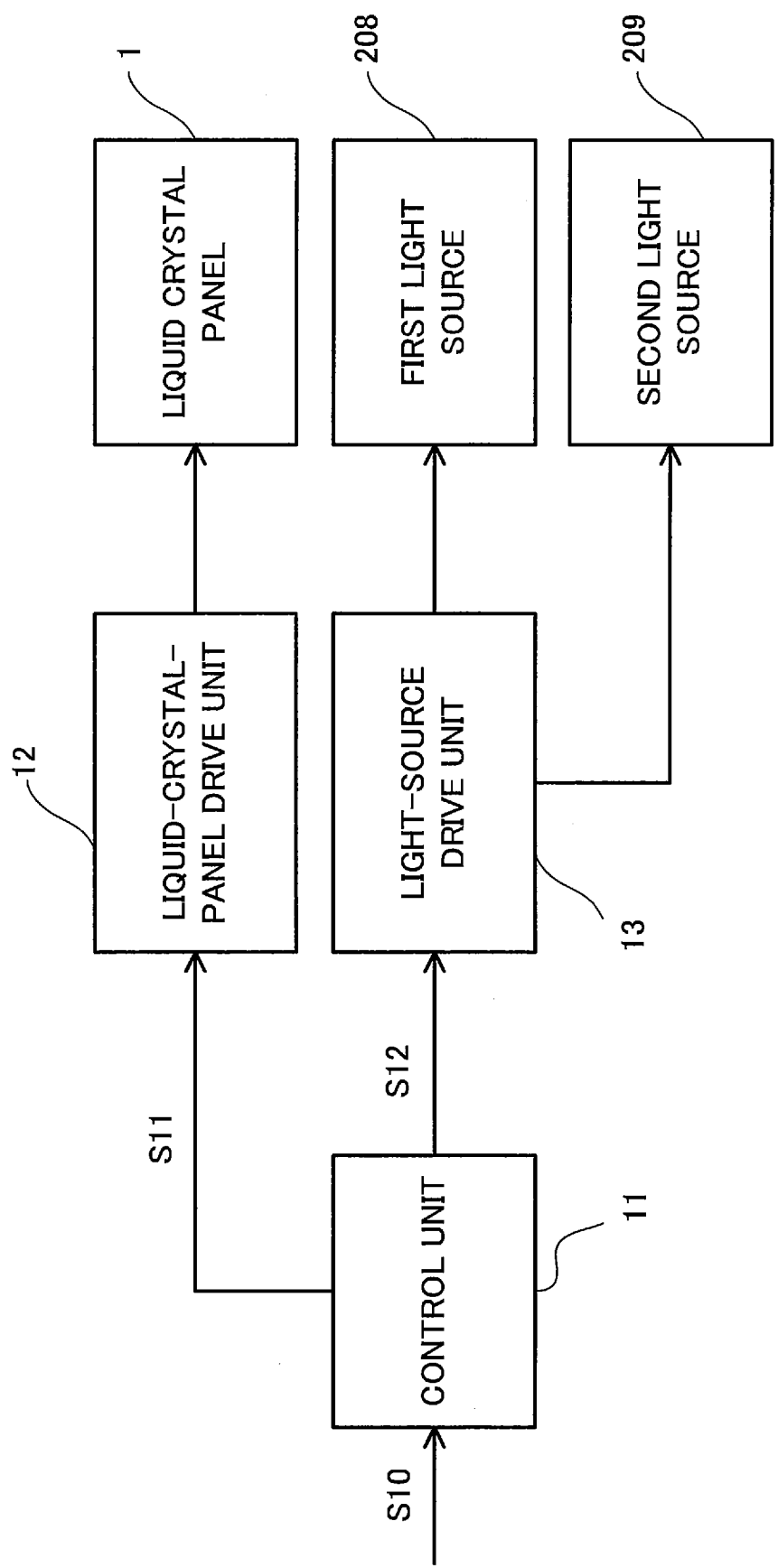
FIG. 9 is a block diagram schematically illustrating a configuration of a control system of the liquid crystal display apparatus according to the second embodiment.

FIG. 9 is a block diagram schematically illustrating structure of a control system of the liquid crystal display apparatus 101 according to the second embodiment. The liquid crystal display apparatus 101 includes the same structure as the liquid crystal display apparatus 100 as illustrated in FIG. 2. As illustrated in FIG. 9, the liquid crystal display apparatus 101 includes a liquid-crystal-panel drive unit 12 and a light-source drive unit 13. The liquid-crystal-panel drive unit 12 drives a liquid crystal panel 1. The light-source drive unit 13 drives the first light source and the second light source. The first light source is the first light source 208 and the second light source is the second light source 209. A control unit 11 controls operations of the liquid-crystal-panel drive unit 12 and controls operations of the light-source drive unit 13. The control unit 11 performs image processing on an inputted video signal S10 and generates a liquid-crystal-panel control signal S11 and a light-source control signal S12. The control unit 11 supplies the liquid-crystal-panel control signal S11 to the liquid-crystal-panel drive unit 12. The control unit 11 supplies the light-source control signal S12 to the light-source drive unit 13. The liquid-crystal-panel drive unit 12 drives the liquid crystal panel 1 on the basis of the liquid-crystal-panel control signal. The light-source drive unit 13 drives the first light source 208 and the second light source 209 on the basis of the light-source control signal S12.

The second light source 209 emits the second light ray 291 which is red-color light. The second light ray 291 travels in a negative x-axis direction inside the light-guiding member 6. Then, the second light ray 291 is reflected twice and its traveling direction is changed to a positive x-axis direction. The second light ray 291 is reflected at end surfaces 61c and 61d. The first light source 208 emits the first light ray 281 which is bluish-green-color light. The first light ray 281 travels in the positive x-axis direction. Then, the first light ray 281 enters the light-guiding member 6. The first light ray 281 is mixed with the second light ray 291 inside the light-guiding member 6. Then, the first light ray 281 enters the surface light-emitting light-guiding plate 4. The first light ray 281 and the second light ray 291 are mixed to form a light ray 243. The bluish-green-color is a color having a peak brightness of blue-color and another peak brightness of green-color.

The surface light-emitting light-guiding plate 4 has microscopic optical elements 42 on a surface on a side of the negative z-axis direction (a lower side in FIG. 8). The microscopic optical elements 42 change the light ray 243 to illumination light 244. The illumination light 244 travels in the positive z-axis direction. The illumination light 244 is emitted toward a back surface 1b of the liquid crystal panel 1. The illumination light 244 passes through a second optical sheet 3 and a first optical sheet 2. Then, the illumination light 244 is applied to the back surface 1b of the liquid crystal panel 1.

According to the second embodiment, the control unit 11 can control the light-source drive unit 13 to adjust luminance of the second light ray 291 and luminance of the first light ray 281. In other words, a ratio between the luminance of the second light ray 291 and the luminance of the first light ray 281 can be adjusted. The second light ray 291 is red-color light emitted from the second light source 209. The first light ray 281 is bluish-green-color light emitted from the first light source 208. The control unit 11 adjusts a light-emitting amount of each of the light sources on the basis of the video signal, i.e., the control unit 11 adjusts a ratio between luminance of the light sources on the basis of the video signal. This enables the liquid crystal display apparatus 101 to reduce power consumption.

The second light source 209 is disposed to face an end surface 61a of the light-guiding member 6. The end surface 61a is an end surface of the light-guiding member 6 on a side of the positive x-axis direction. The end surface 61a is a light incident surface. The light-guiding member 6 is disposed to be parallel to the display surface 1a of the liquid crystal panel 1. The second light source 209 includes a plurality of LED elements arranged at regular intervals in the y-axis direction, for example.

The second light source 209 emits a red-color light ray. A spectrum of the red-color light ray has a peak at approximately 640 nm. Furthermore, the second light source 209 is a directional point light source. The second light ray 291 emitted from the second light source 209 enters the light-guiding member 6. The second light ray 291 is totally reflected at an interface between the light-guiding member 6 and an air layer. Then, the second light ray 291 travels inside the light-guiding member 6 while repeatedly reflected. A distance traveled by the second light ray 291 is a predetermined optical distance. The second light ray 291 is repeatedly reflected and reaches the end surface 61c. The second light ray 291 diverges by its own divergence angle. For this reason, the second light ray 291 and a light ray emitted from another adjacent LED element overlap with each other while they travel at the predetermined optical distance. The light rays overlap with each other to become a line-shaped light having a uniform luminance distribution in the y-axis direction.

In order to cause the light rays from the adjacent LED elements to be overlapped each other, it is necessary for the second light rays 291 to travel at the predetermined optical distance. The predetermined optical distance is determined by an divergence angle of each LED element and an arrangement interval of the LED elements. The second light rays 291 diverge by their own divergence angle in an arrangement direction of the LED elements inside the light-guiding member 6. A certain distance is needed for obtaining a sufficient expanse of the second light rays 291 and forming the line-shaped light. This distance is the predetermined optical distance. The arrangement direction of the LED elements is the y-axis direction in FIG. 8. A distance from the end surface 61a to the end surface 61c of the light-guiding member 6 is set to be no less than a length of the predetermined optical distance. The plurality of the second light rays 291 emitted from the second light source 209 forms line-shaped light source with a uniform luminance distribution.

The second light rays 291 enter through the end surface 61a. Then, the second light rays 291 are repeatedly totally reflected and reach the end surface 61c. The second light rays 291 are reflected at the end surface 61c and travel in the positive z-axis direction. Then, the second light rays 291 are reflected at the end surface 61d and their traveling direction are changed from the positive z-axis direction to the positive x-axis direction. Thereafter, the second light rays 291 are emitted through an end surface 61e toward the surface light-emitting light-guiding plate 4. On the other hand, the first light rays 281 emitted from the first light source 208 enter the light-guiding member 6 through the end surface 61b. Then, the first light rays 281 pass through a light-guiding part 62b of the light-guiding member 6 and are emitted through the end surface 61e toward the surface light-emitting light-guiding plate 4. The first light source 208 is disposed within a range of a length of the end surface 41a in the z-axis direction.

The first light sources 208 are LED elements having a comparatively large divergence angle. For this reason, if the first light sources 208 are arranged at regular intervals in the y-axis direction, the first light rays 281 overlap with each other between the end surface 61b and the end surface 61e to form the line-shaped light. A plurality of light rays is emitted from the closely disposed light sources. If the plurality of light rays spatially overlap with each other, a luminance distribution of these light rays is equalized to form a uniform luminance distribution in an arrangement direction of the light sources. Furthermore, the first light sources 208 are disposed to face the end surface 61b of the light-guiding member 6. The first light rays 281 are emitted from the first light sources 208. Then, the first light rays 281 travel toward the end surface 61b.

The first light rays 281 which are bluish-green-color light rays are emitted from the first light sources 208. The first light rays 281 are mixed with the second light rays 291 which are red-color light rays emitted from the second light sources 209, thereby forming the white-color light rays 243. The first light rays 281 have a peak of approximately 450 nm and a peak of approximately 530 nm, for example. In addition, the first light rays 281 are bluish-green-color light rays having a continuous spectrum of a band from 420 nm to 580 nm. The first light sources 208 may be light sources that emit blue-color light and green-color light, for example. The light source has a structure of a combination of an excitation light source and a fluorescent substance. Furthermore, the first light source 208 may be a light source having a fluorescent substance that emits blue-color light and green-color light when irradiated with ultraviolet light. In this light source, the ultraviolet light excites the fluorescent substance, thereby emitting blue-color light and green-color light. Alternatively, the first light source 208 may be a light source having a green-color fluorescent substance excited by blue-color light, thereby emitting blue-color light and green-color light.

As a method of arranging two lines of the first light sources 208 and the second light sources 209, it is conceivable that two lines of the first light sources 208 and the second light sources 209 are arranged along the incident end surface 41a of the surface light-emitting light-guiding plate 4, for example. However, by arranging two lines of the adjacent light sources, the light sources are concentrated in a single area. If two lines of the adjacent light sources are arranged to concentrate them in the single area, a temperature around the light sources increases due to heat generated by each LED element. This increase in a peripheral temperature leads to decrease of a luminous efficiency of the LED elements. Furthermore, this increase in the peripheral temperature leads to shortening of lives of the LED elements. For these reasons, if two lines of light sources are arranged, it is desirable that each of the light sources be separately arranged each other. This makes it possible to suppress a rise in the peripheral temperature due to light emitting of the light sources and also to elongate the lives of the first light sources 208 and the second light sources 209.

The end surface 61e of the light-guiding member 6 faces the end surface 41a of the surface light-emitting light-guiding plate 4 on a side of the negative x-axis direction. The first light rays 281 that are bluish-green-color light rays are emitted from the first light sources 208. The second light rays 291 that are red-color light rays are emitted from the second light sources 209. The first light rays 281 that are bluish-green-color light rays and the second light rays 291 that are red-color light rays are mixed with each other inside the light-guiding member 6. The first light rays 281 and the second light rays 291 form white-color line-shaped light. Then, the first light rays 281 and the second light rays 291 are emitted through the end surface 61e toward the surface light-emitting light-guiding plate 4. The light ray 243 is the white-color line-shaped light. The control unit 11 controls the light-source drive unit 13 to adjust a ratio between luminance of the first light rays 281 and luminance of the second light rays 291 so that the white-color line-shaped light can be produced.

Although the light-guiding member 6 is described to be a transparent member of 2 mm in thickness, it is not limited to the transparent member of 2 mm in thickness. It is necessary for the light-guiding member 6 to have two functions. The first function is that the light-guiding member 6 guides the first light rays 281 and the second light rays 291 to the surface light-emitting light-guiding plate 4. The first light rays 281 are light rays emitted from the first light sources 208. The second light rays 291 are light rays emitted from the second light sources 209. The second function is that the light-guiding member 6 mixes the first light rays 281 and the second light rays 291. A long as the light-guiding member 6 has structure for realizing these two functions, it may have other structure. For example, by providing reflection films on the end surfaces 61c and 61d, similar effects can be obtained.

Furthermore, the light-guiding member 6 may have similar structure to that of FIG. 4 in the first embodiment. The light-guiding member 108 illustrated in FIG. 4 is formed by three parts, i.e., the reflecting members 181, 182 and 183. The reflecting surfaces 181a, 182a and 183a of the reflecting members 181, 182 and 183 are mirror surfaces. Although the reflecting member 181 and the reflecting member 182 are separate parts in the illustrated example, they may be formed as a single hollow part by connecting both ends in the y-axis direction. Moreover, it is possible to form the light-reflecting member 183 so as to include a mirror surface as a part of a structural member.

Thin-sizing of the liquid crystal display apparatus 101 is considered. Weight reduction of the liquid crystal display apparatus 101 is also considered. For these reasons, it is desirable to use a light-guiding member which is thin in thickness. However, if the light-guiding member 6 is reduced in thickness, its rigidity decreases. For this reason, problems such as the reduction of rigidity of the light-guiding member 6 should be taken into consideration.

The surface light-emitting light-guiding plate 4 is disposed to be parallel to the display surface 1a of the liquid crystal panel 1. The surface light-emitting light-guiding plate 4 has the microscopic optical elements 42 on its back surface. The back surface is a surface on a side opposite to the liquid crystal panel 1 and a surface on a side of a negative z-axis direction. The light ray 243 is light travelling inside the surface light-emitting light-guiding plate 4. The illumination light 244 is light emitted in the positive z-axis direction. The microscopic optical element 42 changes the light ray 243 to the illumination light 244. The illumination light 244 is emitted toward the back surface 1b of the liquid crystal panel 1 from the surface light-emitting light-guiding plate 4.

The light ray 243 enters through the end surface 41a of the surface light-emitting light-guiding plate 4. The light ray 243 is totally reflected at an interface between the surface light-emitting light-guiding plate 4 and an air layer. Then, the light ray 243 propagates inside the light-guiding plate 4 while repeatedly reflected. The light ray 243 travels in the positive x-axis direction while repeatedly reflected. However, the light ray 243 that has entered the microscopic optical element 42 is reflected at a curved surface of the microscopic optical element 42, thereby changing its traveling direction. If the traveling directions of the light rays 243 are changed, some light rays among the light rays 243 do not satisfy a condition of totally reflection at the interface between the surface of the surface light-emitting light-guiding plate 4 and the air layer. If the light ray does not satisfy the condition of totally reflection, the light ray is emitted through the front surface of the surface light-emitting light-guiding plate 4 toward the back surface 1b of the liquid crystal panel 1. The front surface of the surface light-emitting light-guiding plate 4 is a surface disposed on a side of the liquid crystal panel 1.

An arrangement density of the microscopic optical elements 42 varies according to a position in the xy-plane on the surface light-emitting light-guiding plate 4. The arrangement density means the number of the microscopic optical elements 42 per unit area or the size of the microscopic optical elements 42 or other values. An in-plane luminance distribution of the illumination light 244 can be controlled by changing the arrangement density of the microscopic optical elements 42. The illumination light 244 is light emitted from the surface light-emitting light-guiding plate 4. Furthermore, the in-plane luminance distribution means a distribution that indicates a level of luminance at a position two-dimensionally expressed on an arbitrary plane. Here, the "in-plane" indicates a display surface.

As illustrated in FIG. 5, the arrangement density of the microscopic optical elements 42 varies according to a position in a traveling direction of the light ray 243. The traveling direction of the light ray 243 is the positive x-axis direction in FIG. 5. More specifically, the surface light-emitting light-guiding plate 4 has the microscopic optical elements 42 within a region from a vicinity of the end surface 41a to the end surface 41c. The end surface 41c is an end surface which is opposed to the end surface 41a. The arrangement density of them varies continuously from sparse to dense in a direction from the vicinity of the end surface 41a to the end surface 41c.

In the second embodiment, the microscopic optical element 42 has a convex-lens shape. However, the shape of the microscopic optical element 42 is not limited to the convex-lens shape. A necessary function of the microscopic optical elements 42 is that the microscopic optical element 42 reflects the light ray 243 to direct it in the positive z-axis direction so that the light ray 243 exits toward the back surface 1b of the liquid crystal panel 1. The light ray 243 is light that travels in the x-axis direction inside the surface light-emitting light-guiding plate 4. As long as the microscopic optical element 42 has such functions, it may have other shapes. For example, if a prism-shape or a random pits and projections pattern or the like is used, like functions can be obtained.

The illumination light 244 is light emitted from the surface light-emitting light-guiding plate 4 toward the liquid crystal panel 1. However, in some cases, the illumination light 44 is reflected by the first optical sheet 2, the second optical sheet 3 and the like and travels in the negative z-axis direction. In order to achieve high brightness and low electrical power consumption, it is necessary to use these reflected light rays as the illumination light for the liquid crystal panel 1 again. The liquid crystal display apparatus 101 in the second embodiment includes the light-reflecting sheet 5 on a side of the negative z-axis direction from the surface light-emitting light-guiding plate 4. The light-reflecting sheet 5 directs the reflected light traveling in the negative z-axis direction to the positive z-axis direction again. This enables the liquid crystal display apparatus 101 to use light efficiently.

As described above, the liquid crystal display apparatus 101 in the second embodiment includes the light sources that use the white-color LED elements in two places. The two places are the side surface of the surface light-emitting light-guiding plate 4 and the back surface of the surface light-emitting light-guiding plate 4. By virtue of this, the liquid crystal display apparatus 101 can increase the number of light sources while suppressing increase of the thickness (size in the z-axis direction). Furthermore, since the size of the backlight unit 201 is suppressed as compared with a display region of the liquid crystal display apparatus 101, the liquid crystal display apparatus 101 can achieve high brightness and a thin type. The display region indicates a region where an effective image is displayed. The display region is a region extending in the x-axis direction and the y-axis direction in the coordinate representation.

Moreover, since the light sources are arranged at the side surface and the back surface of the surface light-emitting light-guiding plate 4 respectively, a rise in a peripheral temperature resulting from heat generated by the respective light sources can be relieved. By virtue of this, a decrease in luminous efficiency of the light sources due to the rise in the peripheral temperature can be suppressed. Furthermore, long lives of the first light source 208 and the second light source 209 can be achieved.

Conventionally, in a sidelight-type backlight that adopts LED elements as point light sources having directivity, there is a problem of brightness unevenness on a plane of a display surface. Since the light rays of the LED elements diverge at their own divergence angles, a light ray of the LED element and a light ray of neighboring another LED element spatially overlap with each other and therefore the light rays of the LED elements become a line-shaped light. The backlight unit 201 can have a sufficient propagation distance of the light ray. For this reason, the backlight unit 201 can generate the illumination light 244 having a uniform luminance distribution. The luminance distribution of the illumination light 244 is uniform on the plane of the display surface. Therefore, the liquid crystal display apparatus 101 capable of displaying an excellent image with reduced brightness unevenness can be provided.

The second light source 209 in the liquid crystal display apparatus 101 emits red-color light. The first light source 208 in the liquid crystal display apparatus 101 emits bluish-green-color light. Bluish-green-color is a mixed color of blue-color and green-color. As described above, in fluorescent lamps that are conventionally used, a peak of an emission spectrum of a red-color region is within an orange-color wavelength region. Likewise, in white-color LED elements using a yellow-color fluorescent substance, a peak of an emission spectrum of a red-color region is within the orange-color wavelength region. In other words, a peak of wavelengths of a red-color region is deviated from the red-color region and is located within an orange-color region. Especially, if the color purity of red-color is intended to be improved, the transmitted light amount of the color filter is extremely reduced and therefore the brightness decreases excessively. By replacing a fluorescent lamp and a white-color LED element with a red-color LED element, a transmitted light amount of the color filter can be suppressed and an effect of improvement of the color purity can be obtained.

In the second embodiment, the red-color LED elements having a peak wavelength of 640 nm are adopted in the second light source 209. However, the present invention is not limited to this. For example, red-color LED elements having a different peak wavelength from 640 nm can be used. Furthermore, LED elements that emit blue-color or green-color light can be used. Moreover, white-color light should be generated by mixing the light emitted from the first light source 208 and the light emitted from the second light source 209. In other words, the light from the first light source 208 is a complementary color of the light from the second light source 309.

In the second embodiment, since the light source uses the LED element of different colors, in some cases, the number of the LED elements constituting the first light source 208 is different from that of the LED elements constituting the first light source 209. In the light source having a great number of LED elements, an arrangement interval of the LED elements is narrow. Furthermore, in the light source having a small number of LED elements, an arrangement interval is wide. For this reason, the light source having a small number of LED elements needs a longer optical distance. This is because light rays emitted from the LED elements need to overlap with each other. Furthermore, in some cases, a divergence angle of the LED elements constituting the first light source 208 is different from that of the LED elements constituting the second light source 209. The light source having a small number of LED elements needs a longer optical distance. This is because light rays emitted from the LED elements need to overlap with each other.

Like this, if the first light source 208 and the second light source 209 have different numbers of LED elements or different divergence angles of the LED elements, their optical distances required for superimposing light rays are different from each other. The liquid crystal display apparatus 101 can obtain a sufficient optical distance through which light propagates. So, the liquid crystal display apparatus 101 can obtain a line-shaped light which has a uniform luminance distribution. Moreover, a light source having a small number of LED elements should be chosen as the second light source 209. Furthermore, a light source having LED elements of a narrow divergence angle should be chosen as the second light source 209.

In general, white-color fluorescent lamps or white-color LED elements are used in a light source. On the other hand, if the color purity need be improved, a transmission wavelength band of a color filter in the liquid crystal panel 1 should be set to a narrow one. In this case, if loss of the light due to the color filter increases, brightness of an image decreases. The liquid crystal display apparatus 101 according to the second embodiment uses single-color LED elements. The single-color light has high color purity. By using the single-color LED elements, the color purity of red-color is improved. So, the liquid crystal display apparatus 101 can extend a color reproduction range of displayed color. Furthermore, by improving the color purity of red-color, the liquid crystal display apparatus 101 can reduce the loss of light due to the color filter. For this reason, the liquid crystal display apparatus 101 can suppress reduction in brightness. In spite of low electrical power consumption, the liquid crystal display apparatus 101 can achieve high brightness and wide color gamut.

The liquid crystal display apparatus 101 in the second embodiment includes the single light-guiding member 6. The first light ray 281 and the second light ray 291 emitted from the first light source 208 and the second light source 209 enter the light-guiding member 6 through the different end surfaces 61*a* and 61*b* respectively. However, it is not necessary to form the light-guiding member 6 by a single member. The light-guiding member 6 may be formed as illustrated in FIG. 6 or FIG. 7, for example.

As described above, the liquid crystal display apparatus 101 in the second embodiment is configured so that light rays emitted from the two light sources that are disposed in different positions from each other enter through a short end surface of the surface light-emitting light-guiding plate 4. However, by designing an arrangement of the light sources, a position of the light-guiding member 6, an arrangement of the microscopic optical elements 42 and the like, it is possible to use a long end surface of the surface light-emitting light-guiding plate 4 as the incident surface. The long end surface indicates an end surface parallel to the xz-plane in FIG. 8.

The light-source drive unit in the second embodiment can reduce power consumption by controlling the outputs from the first light source 208 and the second light source 209 independently on the basis of the image signal, and can increase a contrast by reducing stray light. This is because unnecessary light in a display can be switched off by controlling the first light source 208 and the second light source 209 independently. Furthermore, the outputs of the unnecessary light in the display can be reduced. In this way, by reducing the unnecessary light, stray light can be reduced. The stray light means light that follows an optical path other than a normal optical path in optical equipment and light harmful to image formation.

(3) Third Embodiment

Figure 10:
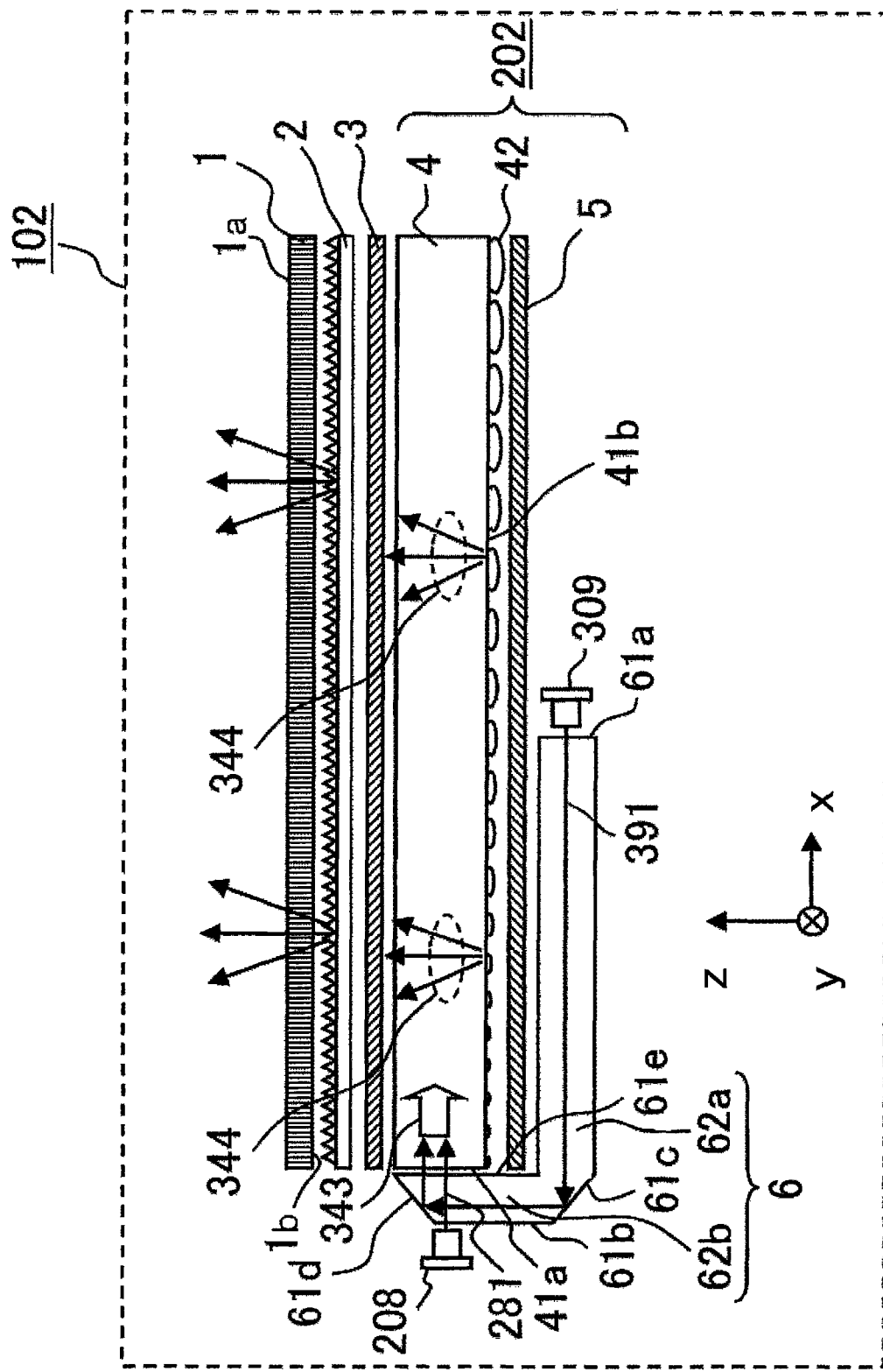
FIG. 10 is a cross-sectional view schematically illustrating an example of structure of a liquid crystal display apparatus (including a surface light source device) according to a third embodiment of the present invention.

FIG. 10 is a cross-sectional view schematically illustrating an example of structure of a liquid crystal display apparatus 102 (including a surface light source device 202) in a third embodiment. The surface light source device 202 includes a surface light-emitting light-guiding plate 4, a light-reflecting sheet 5, a light-guiding member 6, a first light source 208 and a second light source 309. The surface light source device 202 also includes a constitutional element that has a function of the light-guiding member 6. Reference characters in FIG. 10 that are the same as those in FIG. 8 (the second embodiment) indicate the same or corresponding elements. The liquid crystal display apparatus 102 is a transmission type display apparatus. Although the second light source 209 in the second embodiment includes the LED elements, the second light source 309 in the third embodiment includes laser light-emitting elements. The liquid crystal display apparatus 102 is the same as that in the second embodiment, except for the difference. The third embodiment differs from the first embodiment regarding the following components, i.e., the first light source 208 and the second light source 309, and the other components are the same in these embodiments. Furthermore, the configurations in FIG. 4, FIG. 6 and FIG. 7 other than the configurations in FIG. 1 can be used for the third embodiment.

As described above, if the color purity of a displayed color in the liquid crystal display apparatus need be improved in order to extend a color reproduction range, a width of a transmission wavelength band of a color filter should be set to a narrow one. However, if the width of the transmission wavelength band is set to the narrow one, a transmitted light amount of the transmitted light ray decreases. For this reason, when the color purity of the displayed color is intended to be improved, a problem occurs that the brightness decreases due to the decrease of the transmitted light amount of the color filter.

In the third embodiment, the color purity is improved by using laser light-emitting elements having a narrow wavelength region, instead of LED elements. This is because a wavelength region of the laser light-emitting element is narrower than that of a single-color LED element. So, the surface light source device 202 which is a backlight unit can reduce loss of light. Furthermore, the backlight unit 202 can suppress reduction of luminous intensity. For this reason, the backlight unit 202 can achieve low electrical power consumption and high color purity. Moreover, since the laser light-emitting element has high directivity, a coupling efficiency between the light-guiding member 6 and the surface light-emitting light-guiding plate 4 can be improved.

The first light source 208 uses an LED element that emits the first light ray 281 which is bluish-green-color light. Bluish-green-color light is a mixture of blue-color light and green-color light. The second light source 309 uses a laser light-emitting element that emits the second light ray 391 which is red-color light. A wavelength width of laser light is narrow, i.e., laser light has high color purity. For this reason, by using a red-color-laser light-emitting element, the color purity of red-color is improved. In other words, a color reproduction range of a displayed color is extended.

Figure 11:
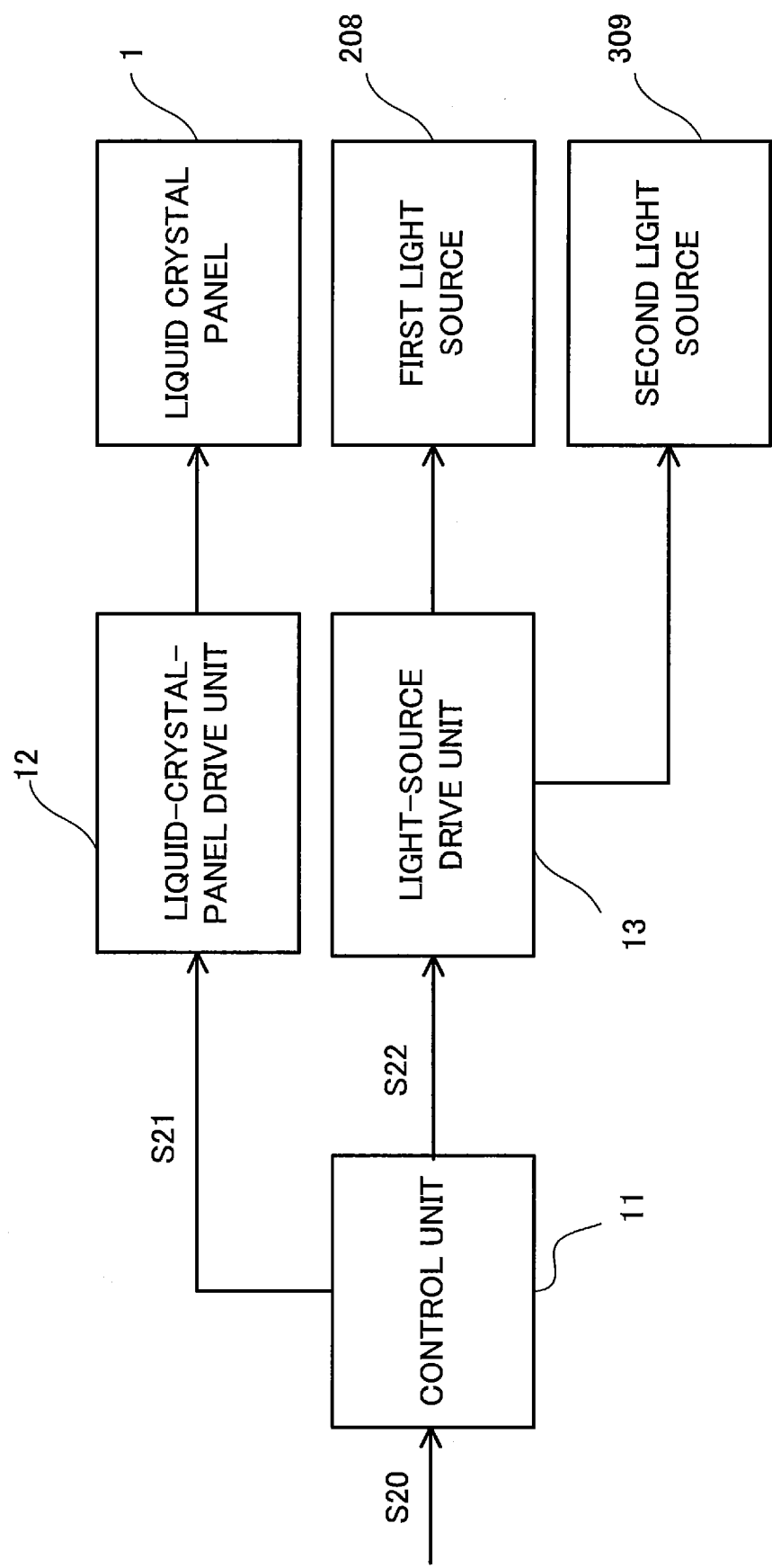
FIG. 11 is a block diagram schematically illustrating a configuration of a control system of the liquid crystal display apparatus according to the third embodiment.

FIG. 11 is a block diagram schematically illustrating structure of a control system of the liquid crystal display apparatus 102 in the third embodiment. Like the liquid crystal display apparatus 100, the liquid crystal display apparatus 102 includes a liquid-crystal-panel drive unit 12 and a light-source drive unit 13. As illustrated in FIG. 11, the liquid-crystal-panel drive unit 12 drives a liquid crystal panel 1. The light-source drive unit 13 drives the first light source and the second light source. The first light source is the first light source 208. The second light source is the laser light source 309. The control unit 11 controls operations of the liquid-crystal-panel drive unit 12 and operations of the light-source drive unit 13. The control unit 11 performs image processing on an input video signal S20 and generates a liquid-crystal-panel control signal S21 and a light-source control signal S22. The control unit 11 supplies the liquid-crystal-panel control signal S21 to the liquid-crystal-panel drive unit 12. The control unit 11 supplies the light-source control signal S22 to the light-source drive unit 13. The liquid-crystal-panel drive unit 12 drives the liquid crystal panel 1 on the basis of the liquid-crystal-panel control signal S21. The light-source drive unit 13 drives the first light source 208 and the second light source 309 on the basis of the light-source control signal S22.

The second light source 309 emits the second light ray 391 which is red-color light. The second light ray 391 enters through an end surface 61a of the light-guiding member 6. The second light ray 391 travels in a negative x-axis direction inside the light-guiding member 6. Then, the second light ray 391 is reflected twice and its traveling direction is changed to a positive x-axis direction. The second light ray 391 is reflected at end surfaces 61c and 61d. The first light source 208 emits the first light ray 281 which is bluish-green-color light. The bluish-green-color is a color having a peak brightness of blue-color and another peak brightness of green-color. The first light ray 281 travels in the positive x-axis direction. Then, the first light ray 281 enters a light-guiding part 62b of the light-guiding member 6. The first light ray 281 is mixed with the second light ray 391 in the light-guiding part 62b of the light-guiding member 6. Then, the first light ray 281 enters the surface light-emitting light-guiding plate 4. The first light ray 281 and the second light ray 391 are mixed to form a light ray 343.

The surface light-emitting light-guiding plate 4 has microscopic optical elements 42 on a surface on a side of a negative z-axis direction (a lower side in FIG. 11). The microscopic optical element 42 changes the light ray 343 to illumination light 344. The illumination light 344 travels in a positive z-axis direction. The illumination light 344 is emitted toward a back surface 1b of the liquid crystal panel 1. The illumination light 344 passes through a second optical sheet 3 and a first optical sheet 2. Then, the illumination light 344 is emitted toward the back surface 1b of the liquid crystal panel 1. The optical sheet has a function of directing a traveling direction of light emitted from the surface light-emitting light-guiding plate 4 toward the rear surface 1b of the liquid crystal panel. The second optical sheet 3 has a function of reducing optical effects such as minute illumination unevenness.

The light-reflecting sheet 5 is disposed on a side of the negative z-axis direction from the surface light-emitting light-guiding plate 4. The light-reflecting sheet 5 is disposed on a side of the positive z-axis direction from the light-guiding member 6. Light emitted in the negative z-axis direction from the surface light-emitting light-guiding plate 4 is reflected by the light-reflecting sheet 5. Light reflected at the light-reflecting sheet 5 is used as the illumination light 344 with which the back surface 1b of the liquid crystal panel 1 is illuminated. As the light-reflecting sheet 5, a light-reflecting sheet whose base material is a resin such as a polyethylene terephthalate can be used, for example. As the light-reflecting sheet 5, a light-reflecting sheet that is obtained by depositing a metal on a surface of a substrate can be also used.

A liquid crystal layer of the liquid crystal panel 1 is disposed to be parallel to the xy-plane. A display surface 1a of the liquid crystal panel has a rectangular shape. Two adjacent sides of the display surface 1a are orthogonal to each other. The short side is parallel to the y-axis. The long side is parallel to the x-axis.

The liquid-crystal-panel drive unit 12 changes a light transmissivity of the liquid crystal layer in units of pixels on the basis of the liquid-crystal-panel control signal received from the control unit 11. Each pixel has three sub-pixels. A first sub-pixel has a color filter which passes only red-color light. A second sub-pixel has a color filter which passes only green-color light. A third sub-pixel has a color filter which passes only blue-color light. The control unit 11 controls transmissivity of each sub-pixel and the liquid crystal panel 1 accordingly produces a color image. In other words, the liquid crystal panel 1 produces image light by spatially modulating the illumination light 344 that enters from the surface light-emitting light-guiding plate 4. The image light is emitted through the display surface 1a. The image light indicates light having image information.

According to the third embodiment, the control unit 11 can control the light-source drive unit 13 to adjust luminance of the second light ray 391 and luminance of the first light ray 281. In other words, a ratio between the luminance of the second light ray 391 and the luminance of the first light ray 281 can be adjusted. The second light ray 391 is red-color light emitted from the laser light source 309. The first light ray 281 is bluish-green-color light emitted from the first light source 208. The control unit 11 adjusts a light-emitting amount from each of the light sources on the basis of the video signal, i.e., the control unit 11 adjusts a ratio between the luminance of the light sources on the basis of the video signal. This enables the liquid crystal display apparatus 102 to reduce power consumption.

The second light source 309 is disposed to face the end surface 61a of the light-guiding member 6. The end surface 61a is an end surface of the light-guiding member 6 on a side of the positive x-axis direction. The end surface 61a is a light incident end surface. The light-guiding member 6 is disposed to be parallel to the display surface 1a of the liquid crystal panel 1. The second light source 309 includes a plurality of laser light-emitting elements arranged in the y-axis direction at regular intervals.

The second light source 309 emits the red-color second light ray 391. A spectrum of this red-color second light ray 391 has a peak at approximately 640 nm. Furthermore, a wavelength width of the second light ray 391 is 1 nm at full width at half maximum, and the second light ray 391 has a spectrum of an extremely narrow width. Moreover, a divergence angle of the second light ray 391 in a fast-axis direction (a direction in which a divergence angle is large) is 40 degrees at full angle at half maximum. The fast-axis direction indicates a direction in which a divergence angle is large. The divergence angle of the second light ray 391 in a slow-axis direction (a direction in which a divergence angle is small) is 10 degrees at full angle at half maximum. The slow-axis direction indicates a direction in which a divergence angle is small. Furthermore, the full width at half maximum is a wavelength width at which a light intensity is 50% of a maximum intensity at a wavelength. Furthermore, the full angle at half maximum is an angle (full angle) at which a light intensity is 50% of a maximum intensity at a wavelength. The laser light-emitting elements of the second light source 309 are disposed so that the slow-axis direction (a direction in which a divergence angle is small) is parallel to a direction of a short side of the end surface 61a of the light-guiding member 6. The direction of the short side of the end surface 61a of the light-guiding member 6 is a direction where a distance of the light-guiding member 6 between opposite surfaces is the shortest (z-axis direction in FIG. 10). The arrangement direction of the laser light-emitting elements is not limited to this. However, by arranging the laser light-emitting elements so that the slow-axis direction (a direction in which a divergence angle is small) is parallel to the direction of the short side of the end surface 61a, reflections at the end surface 61c and the end surface 61d of the light-guiding member 406 are achieved efficiently. This is because when a divergence angle in the direction of the short side of the end surface 61a, an incident angle of part of the second light ray 91 to the end surfaces 61c and 61d is smaller than a critical angle and therefore they cannot reflect at the end surfaces 61c and 61d. However, by forming mirror surfaces on the end surfaces 461c and 461b, such problem can be resolved. The critical angle is a minimum incident angle at which total reflection takes place. In other words, the critical angle is a minimum incident angle at which total reflection takes place when light travels from an area having a high refractive index to another area having a low refractive index.

The second light ray 391 is totally reflected at an interface between the light-guiding member 6 and an air layer. Then, the second light ray 391 travels inside the light-guiding member 6 while repeatedly reflected. A distance traveled by the second light ray 391 is a predetermined optical distance. Then, the second light ray 391 is repeatedly reflected and reaches the end surface 61c. According to the third embodiment, a light diameter of the laser light ray 391 emitted from the laser light-emitting element in the second light source 309 is extremely small as compared with a size of the end surface 61a of the light-guiding member 6 in the y-axis direction. In other words, the laser light source 309 is a point light source. However, the second light ray 291 diverges by its own divergence angle. For this reason, the second light ray 31 and a light ray emitted from another adjacent laser light-emitting element overlap with each other while they travel at the predetermined optical distance. The light rays overlap with each other to become a line-shaped light having a uniform luminance distribution in the y-axis direction.

It is necessary for the second light ray 391 to travel at the predetermined optical distance in order to cause light rays emitted from adjacent laser light-emitting elements to overlap with each other. The predetermined optical distance is determined by a divergence angle of the laser light-emitting element and an arrangement interval of the laser light-emitting elements. The second light ray 391 diverges in the arrangement direction of the laser light-emitting elements by its own divergence angle inside the light-guiding member 6. A certain distance is needed for obtaining a sufficient expanse of the second light rays 391 to produce the line-shaped light. This distance is a predetermined optical distance. The arrangement direction of the laser light-emitting elements is the y-axis direction in FIG. 10. A distance from the end surface 61a to the end surface 61c of the light-guiding member 6 is set to be longer than the predetermined optical distance. A plurality of the second light rays 391 emitted from the second light source 309 become the line-shaped light having a uniform luminance distribution.

The light-guiding member 6 includes the first light-guiding part 62a and the second light-guiding part 62b. The light-guiding member 6 has a shape of a combination of a rectangular parallelepiped plate-shaped part and a trapezoidal-prism plate-shaped part. The first light-guiding part 62a is the rectangular parallelepiped plate-shaped unit disposed to be parallel to the xy-plane. The second light-guiding part 62b is the trapezoidal-prism plate-shaped unit disposed to be parallel to the yz-plane. As illustrated in FIG. 1, the first light-guiding part 62a is disposed adjacent to the light-reflecting sheet 5 on a side of the negative z-axis direction. The second light-guiding part 62b is disposed adjacent to the surface light-emitting light-guiding plate 4 on a side of the negative x-axis direction. The light-guiding parts 62a and 62b are made of a transparent material such as an acrylic resin (e.g., PMMA) or other materials of 2 mm in thickness, for example. Furthermore, the end surfaces 61b and 61e among the end surfaces of the trapezoidal-prism part of the light-guiding member 6 are formed to be parallel to the yz-plane. Two end surfaces 61c and 61d are inclined with reference to the xy-plane at an angle of approximately 45 degrees. The end surface 61c of the light-guiding member 6 is inclined so that the second light ray 391 is reflected from the negative x-axis direction to the positive z-axis direction. The end surface 61d of the light-guiding member 6 is inclined so that the second light ray 391 is reflected from the positive z-axis direction to the positive x-axis direction.

The second light ray 391 enters through the end surface 61a. Then, the second light ray 391 is repeatedly totally reflected and reaches the end surface 61c. The second light ray 391 is reflected at the end surface 61c and travels in the positive z-axis direction. Then, the second light ray 391 is reflected at the end surface 61d and its traveling direction is changed from the positive z-axis direction to the positive x-axis direction. Then, the second light ray 391 is emitted through the end surface 61e toward the surface light-emitting light-guiding plate 4. On the other hand, the first light ray 281 emitted from the first light source 208 enters the light-guiding member 6 through the end surface 61b. Then, the first light ray 281 passes through the light-guiding part 62b of the light-guiding member 6 and is emitted through the end surface 61e toward the surface light-emitting light-guiding plate 4. The first light source 208 is disposed within a range of a length of the end surface 41a in the z-axis direction.

The first light sources 208 are LED elements having a comparatively large divergence angle. For this reason, if the first light sources 208 are arranged at regular intervals in the y-axis direction, the first light rays 281 overlap with each other between the end surface 61b and the end surface 61e to form the line-shaped light. A plurality of light rays is emitted from the closely disposed light sources. If the plurality of light rays spatially overlap with each other, a luminance distribution of these light rays is equalized to form a uniform luminance distribution in an arrangement direction of the light sources. Furthermore, the first light sources 208 are disposed to face the end surface 61b of the light-guiding member 6. The first light rays 281 are emitted from the first light sources 208. Then, the first light rays 281 travel toward the end surface 61b.

The first light rays 281 which are bluish-green-color light rays are emitted from the first light sources 208. The first light rays 281 are mixed with the second light rays 391 which are red-color light rays emitted from the second light sources 309, thereby forming the white-color light rays 343. The first light rays 281 have a peak of approximately 450 nm and a peak of approximately 530 nm, for example. In addition, the first light rays 281 are bluish-green-color light rays having a continuous spectrum of a band from 420 nm to 580 nm. The first light sources 208 may be light sources that emit blue-color light and green-color light, for example. The light source has a structure of a combination of an excitation light source and a fluorescent substance. Furthermore, the first light source 208 may be a light source having a fluorescent substance that emits blue-color light and green-color light when irradiated with ultraviolet light. In this light source, the ultraviolet light excites the fluorescent substance, thereby emitting blue-color light and green-color light. Alternatively, the first light source 208 may be a light source having a green-color fluorescent substance excited by blue-color light, thereby emitting blue-color light and green-color light.

As a method of arranging two lines of the first light sources 208 and the second light sources 209, it is conceivable that two lines of the first light sources 208 and the second light sources 209 are arranged along the incident end surface 41a of the surface light-emitting light-guiding plate 4, for example. However, by arranging two lines of the adjacent light sources, the light sources are concentrated in a single area. If two lines of the adjacent light sources are arranged to concentrate them in the single area, a temperature around the light sources increases due to heat generated by LED elements and laser light-emitting elements. This increase in a peripheral temperature leads to decrease of luminous efficiencies of the LED elements and the laser light-emitting elements. Furthermore, this increase in the peripheral temperature leads to shortening of lives of the LED elements and the laser light-emitting elements. For these reasons, if two lines of light sources are arranged, it is desirable that each of the light sources be separately arranged each other. This makes it possible to suppress a rise in the peripheral temperature due to light emitting of the light sources and also to elongate the lives of the first light sources 208 and the second light sources 309.

Furthermore, temperature characteristics of an LED element is different from temperature characteristics of a laser light-emitting element. As compared with the LED element, the amount of emitted light of the laser light-emitting element is more likely to change according to the temperature and the wavelength of the laser light-emitting element is also likely to change according to the temperature. For this reason, the temperature of the laser light-emitting element need be kept an adequate temperature. In order to keep the temperature of the laser light-emitting element the adequate temperature, it is desirable that no heat source is disposed around the laser light source. The light source using the LED element emits heat when it is switched on. The laser light source emits heat when it is switched on. In other words, it is important that the light source using the LED element should be disposed so as to be away from the laser light source.

The end surface 61e of the light-guiding member 6 faces the end surface 41a of the surface light-emitting light-guiding plate 4 on a side of the negative x-axis direction. The first light ray 281 is bluish-green-color light and is emitted from the first light source 208. The second light ray 391 is red-color light and is emitted from the second light source 309. The first light ray 281 which is bluish-green-color light and the second light ray 391 which is red-color light are mixed inside the light-guiding part 62b of the light-guiding member 6. The first light ray 281 and the second light ray 391 become white-color line-shaped light. Then, the first light ray 281 and the second light ray 391 are emitted through the end surface 61e toward the surface light-emitting light-guiding plate 4. The light ray 343 is the white-color line-shaped light. The control unit controls the light-source drive unit to adjust a ratio between the luminance of the first light ray 281 and the luminance of the second light ray 391, and thus the white-color line-shaped light can be produced.

Although the light-guiding member 6 is described to be a transparent member of 2 mm in thickness, it is not limited to the transparent member of 2 mm in thickness. It is necessary for the light-guiding member 6 to have two functions. The first function is that the light-guiding member 6 guides the first light rays 281 and the second light rays 391 to the surface light-emitting light-guiding plate 4. The first light rays 281 are light rays emitted from the first light sources 208. The second light rays 391 are light rays emitted from the second light sources 309. The second function is that the light-guiding member 6 mixes the first light rays 281 and the second light rays 391. A long as the light-guiding member 6 has structure for realizing these two functions, it may have other structure. For example, by providing reflection films on the end surfaces 61c and 61d, similar effects can be obtained.

Furthermore, the light-guiding member 6 may have a similar shape to that in FIG. 4 in the first embodiment. The light-guiding member 108 illustrated in FIG. 4 is formed by three parts, i.e., the reflecting members 181, 182 and 183. The reflecting surfaces 181a, 182a, 183a of the reflecting members 181, 182 and 183 are mirror surfaces. Although the reflecting member 181 and the reflecting member 182 are illustrated as separate parts, they can be composed of a single hollow member which is formed by connecting both of the reflecting members each other at their ends in the y-axis direction. It is possible to form the light-reflecting member 183 so as to include a mirror surface as a part of the member.

Thin-sizing of the liquid crystal display apparatus 102 is considered. Weight reduction of the liquid crystal display apparatus 102 is also considered. For these reasons, it is desirable to use the surface light-emitting light-guiding plate 4 which is thin in thickness. However, if the light-guiding member 6 is reduced in thickness, its rigidity decreases. For this reason, problems such as the reduction of rigidity of the light-guiding member 6 should be taken into consideration.

The surface light-emitting light-guiding plate 4 is disposed to be parallel to the display surface 1a of the liquid crystal panel 1. The surface light-emitting light-guiding plate 4 has the microscopic optical elements 42 on its back surface. The back surface is a surface on a side opposite to the liquid crystal panel 1 and a surface on a side of the negative z-axis direction. The light ray 343 is light travelling inside the surface light-emitting light-guiding plate 4. The illumination light 344 is light emitted in the positive z-axis direction. The microscopic optical element 42 changes the light ray 343 to the illumination light 344. The illumination light 344 is emitted toward the back surface 1b of the liquid crystal panel 1 from the surface light-emitting light-guiding plate 4.

The surface light-emitting light-guiding plate 4 is a member made of a transparent material such as an acrylic resin (e.g., PMMA) or other materials, for example. The surface light-emitting light-guiding plate 4 is a plate-shaped member of 4 mm in thickness. As in FIG. 5 in the first embodiment, the surface light-emitting light-guiding plate 4 has the microscopic optical elements 42 on the back surface 41b. The microscopic optical element 42 has a semispherical convex shape projecting in the negative z-axis direction.

The light ray 343 enters through the end surface 41a of the surface light-emitting light-guiding plate 4. The light ray 343 is totally reflected at the interface between the surface light-emitting light-guiding plate 4 and the air layer. Then, the light ray 343 propagates inside the light-guiding plate 4. The light ray 343 travels in the positive x-axis direction while repeatedly reflected. However, when the light ray 343 enters the microscopic optical element 42, it is reflected at a curved surface of the microscopic optical element 42 to change its traveling direction. When the traveling direction of the light ray 343 is changed, some light rays out of the light rays 43 cannot satisfy a totally reflecting condition at the interface between a front surface of the surface light-emitting light-guiding plate 4 and the air layer. When the light ray does not satisfy the totally reflecting condition, the light ray is emitted through the front surface of the surface light-emitting light-guiding plate 4 to the back surface 1b of the liquid crystal panel 1. The front surface of the surface light-emitting light-guiding plate 4 is a surface disposed on a side of the liquid crystal panel 1.

An arrangement density of the microscopic optical elements 42 varies according to a position in the xy-plane on the surface light-emitting light-guiding plate 4. The arrangement density means the number of the microscopic optical elements 42 per unit area or the size of the microscopic optical elements 42 or other values. An in-plane luminance distribution of the illumination light 344 can be controlled by changing the arrangement density of the microscopic optical elements 42. The illumination light 344 is light emitted from the surface light-emitting light-guiding plate 4. Furthermore, the in-plane luminance distribution means a distribution that indicates a level of luminance at a position two-dimensionally expressed on an arbitrary plane. Here, the "in-plane" indicates a display surface.

As in a similar way to FIG. 5 in the first embodiment, the arrangement density of the microscopic optical elements 42 varies according to a position in a traveling direction of the light ray 343. The traveling direction of the light ray 343 is the positive x-axis direction in FIG. 5. More specifically, the surface light-emitting light-guiding plate 4 has the micro-scopic optical elements 42 within a region from a vicinity of the end surface 41a to the end surface 41c. The end surface 41c is an end surface which is opposed to the end surface 41a. The arrangement density of them varies continuously from sparse to dense in a direction from the vicinity of the end surface 41a to the end surface 41c.

In the third embodiment, the microscopic optical element 42 has a convex-lens shape. However, the shape of the microscopic optical element 42 is not limited to the convex-lens shape. A necessary function of the microscopic optical elements 42 is that the microscopic optical element 42 reflects the light ray 343 to direct it in the positive z-axis direction so that the light ray 343 exits toward the back surface 1b of the liquid crystal panel 1. The light ray 343 is light that travels in the x-axis direction inside the surface light-emitting light-guiding plate 4. As long as the microscopic optical element 42 has such function, it may have other shapes. For example, if a prism-shape or a random pits and projections pattern or the like is used, like functions can be obtained.

The illumination light 344 is light emitted from the surface light-emitting light-guiding plate 4 toward the liquid crystal panel 1. However, in some cases, the illumination light 344 is reflected by the first optical sheet 2, the second optical sheet 3 and the like and travels in the negative z-axis direction. In order to achieve high brightness and low electrical power consumption, it is necessary to use these reflected light rays as the illumination light for the liquid crystal panel 1 again. The liquid crystal display apparatus 102 in the second embodiment includes the light-reflecting sheet 5 on a side of the negative z-axis direction from the surface light-emitting light-guiding plate 4. The light-reflecting sheet 5 directs the reflected light traveling in the negative z-axis direction to the positive z-axis direction again. This enables the liquid crystal display apparatus 102 to use light efficiently.

As described above, the liquid crystal display apparatus 102 in the third embodiment includes the light source 208 and the second light source 309 in two places. The first light source 208 using the LED elements is disposed at the side surface of the surface light-emitting light-guiding plate 4. The second light source 309 using the laser light-emitting elements is disposed at the back surface of the surface light-emitting light-guiding plate 4. By virtue of this, the liquid crystal display apparatus 102 can increase the number of the light sources while suppressing increase of the thickness (size in the z-axis direction). Furthermore, the size of the backlight unit 201 is suppressed as compared with a display region of the liquid crystal display apparatus 102, and the liquid crystal display apparatus 102 can achieve high brightness and thin structure in thickness. The display region indicates a region where an effective image is displayed. The display region is a region extending in the x-axis direction and the y-axis direction in the coordinate representation.

Moreover, since the light sources are arranged at the side surface and the back surface of the surface light-emitting light-guiding plate 4 respectively, a rise in a peripheral temperature resulting from heat generated by the respective light sources can be relieved. By virtue of this, the decrease of the luminous efficiency of the light sources due to the rise in the peripheral temperature can be suppressed. Furthermore, long lives of the first light source 208 and the second light source 209 can be achieved.

Furthermore, conventionally, in a sidelight-type backlight that adopts laser light-emitting elements as point light sources having directivity, there is a problem of brightness unevenness on a plane of a display surface. Since the light rays of the laser light-emitting elements diverge at their own divergence angles, a light ray of the laser light-emitting element and a light ray of neighboring another laser light-emitting element spatially overlap with each other and therefore the light rays of the laser light-emitting elements become line-shaped light. The backlight unit 202 can have a sufficient propagation distance of the light ray. For this reason, the backlight unit 203 can generate the illumination light 344 having a uniform luminance distribution. The luminance distribution of the illumination light 344 is uniform on the plane of the display surface. Therefore, the liquid crystal display apparatus 102 capable of displaying an excellent image with reduced brightness unevenness can be provided.

The light source of the backlight of the liquid crystal display apparatus 102 in the third embodiment is a laser light source having a narrow wavelength width. By adopting the laser light source, the color purity of the displayed color can be increased. A fluorescent lamp and an LED element are widely used. The laser light source can achieve brighter color expression than the fluorescent lamp and the LED element.

The laser light source 309 in the liquid crystal display apparatus 102 emits red-color light. The first light source 208 in the liquid crystal display apparatus 101 emits bluish-green-color light. Bluish-green-color is a mixed color of blue-color and green-color. As described above, in fluorescent lamps that are conventionally used, a peak of an emission spectrum of a red-color region is within an orange-color wavelength region. Likewise, in white-color LED elements using a yellow-color fluorescent substance, a peak of an emission spectrum of a red-color region is within the orange-color wavelength region. In other words, a peak of wavelengths of a red-color region is deviated from the red-color region and is located within an orange-color region. Especially, if the color purity of red-color is intended to be improved, the transmitted light amount of the color filter is extremely reduced and therefore the brightness decreases excessively. By replacing a fluorescent lamp with a red-color laser light-emitting element, a transmitted light amount of the color filter can be suppressed and an effect of improvement of the color purity can be obtained.

In the third embodiment, the red-color laser light-emitting elements having a peak wavelength of 640 nm are adopted in the second light source 209. However, the present invention is not limited to this. For example, red-color laser light-emitting elements having a peak wavelength different from 640 nm can be used. Furthermore, laser light-emitting elements that emit blue-color or green-color light can be used. Moreover, white-color light should be produced by mixing the light emitted from the first light source 208 and the light emitted from the second light source 309. In other words, the light from the first light source 208 is a complementary color of the light from the second light source 309.

In general, white-color fluorescent lamps or white-color LED elements are used in a light source. On the other hand, if the color purity need be improved, a transmission wavelength band of a color filter in the liquid crystal panel 1 should be set to a narrow one. In this case, if loss of the light due to the color filter increases, brightness of an image decreases. The liquid crystal display apparatus 102 in the third embodiment uses single-color laser light-emitting elements. The single-color light has high color purity. By using the single-color laser light-emitting elements, the color purity of red-color is improved. So, the liquid crystal display apparatus 102 can extend a color reproduction range of displayed color. Furthermore, by improving the color purity of red-color, the liquid crystal display apparatus 102 can reduce the loss of light due to the color filter. For this reason, the liquid crystal display apparatus 102 can suppress reduction in brightness. In spite of low electrical power consumption, the liquid crystal display apparatus 102 can achieve high brightness and wide color gamut.

The liquid crystal display apparatus 102 in the third embodiment includes the single light-guiding member 6. The first light ray 281 and the second light ray 391 emitted from the first light source 208 and the second light source 309 enter the light-guiding member through the different end surfaces 61a and 61b. However, it is not necessary to form the light-guiding member 6 by a single member. The light-guiding member 6 may be formed as illustrated in FIG. 6 and FIG. 7 in the first embodiment, for example.

As described above, the liquid crystal display apparatus in the third embodiment is configured so that light rays emitted from the two light sources disposed in different positions from each other enter through a short end surface of the surface light-emitting light-guiding plate 4. However, by designing an arrangement of the light sources, a position of the light-guiding member 6, an arrangement of the microscopic optical element 42 and the like, it is possible to use a long end surface of the surface light-emitting light-guiding plate 4 as the incident surface. The long end surface is an end surface parallel to the xz-plane in FIG. 10.

The light-source drive unit in the third embodiment can reduce power consumption by controlling the outputs from the first light source 208 and the second light source 309 independently on the bases of the image signal, and can increase a contrast by reducing stray light. This is because unnecessary light in a display can be switched off by controlling the first light source 208 and the second light source 309 independently. Furthermore, the outputs of the unnecessary light in the display can be reduced. In this way, by reducing the unnecessary light, stray light can be reduced. The stray light means light that follows an optical path other than a normal optical path in optical equipment and light harmful to image formation.

(4) Fourth Embodiment

Figure 12:
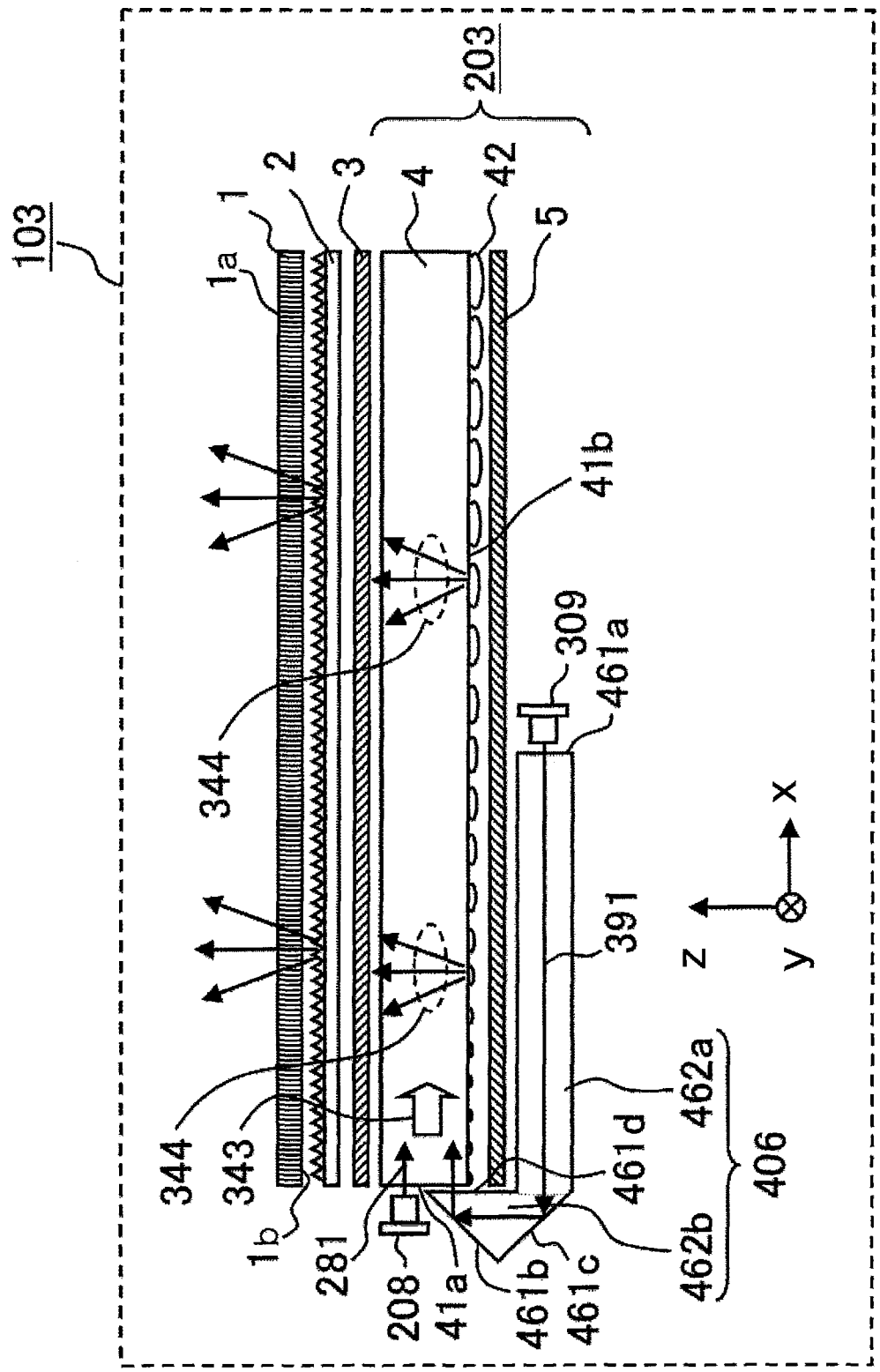
FIG. 12 is a cross-sectional view schematically illustrating an example of structure of a liquid crystal display apparatus (including a surface light source device) according to a fourth embodiment of the present invention.

FIG. 12 is a cross-sectional view schematically illustrating an example of structure of a liquid crystal display apparatus 103 (including a surface light source device 203) in a fourth embodiment. The surface light source device 203 includes a surface light-emitting light-guiding plate 4, a light-reflecting sheet 5, a light-guiding member 406, a first light source 208 and a second light source 309. The surface light source device 203 also includes a constitutional element that has a function of the light-guiding member 406. Reference characters in FIG. 12 that are the same as those in FIG. 10 (the third embodiment) indicate the same or corresponding elements. The liquid crystal display apparatus 103 is a transmission type display apparatus. In the first to third embodiments, light emitted from the light sources in two places are mixed in the light-guiding member 6. Then, the mixed light enters an inside of the surface light-emitting light-guiding plate 4. In the liquid crystal display apparatus 103 in the fourth embodiment, light emitted from the two light sources separately enter the surface light-emitting light-guiding plate 4. The two light sources are disposed in two different places. The light sources disposed in two places are the first light source 208 that uses LED elements and the second light source 309 that uses laser light-emitting elements. The liquid crystal display apparatus 103 newly includes the light-guiding member 406, as a substitute for the light-guiding member 6 in the third embodiment. The liquid crystal display apparatus 103 is the same as that in the third embodiment except for the difference. The fourth embodiment differs from the first and second embodiments regarding the following components, i.e., the first light source 208, the second light source 309 and the light-guiding member 406, and the other components are the same in these embodiments. The embodiments illustrated in FIG. 4, FIG. 6 and FIG. 7 that are different from the embodiment illustrated in FIG. 1 in the first embodiment can be applied to the fourth embodiment.

The liquid crystal display apparatus 103 in the fourth embodiment includes the LED elements that emit a first light ray 281 which is bluish-green-color light, as the first light source 208. The liquid crystal display apparatus 103 also includes the laser light-emitting elements that emit a second light ray 391, as the second light source 309 which is red-color light. The first light ray 281 which is bluish-green-color light is a mixture of blue-color light and green-color light. The first light ray 281 emitted from the first light source 208 directly enters the surface light-emitting light-guiding plate 4. For this reason, the loss of light produced at an interface between the light-guiding member 6 and an air layer in the first to third embodiments can be suppressed. The liquid crystal display apparatus 103 can obtain higher light use efficiency.

The fourth embodiment includes the structure which is the same as that in FIG. 11 in the third embodiment. So, the fourth embodiment will be explained by referring to FIG. 11. The liquid crystal display apparatus 103 includes a liquid-crystal-panel drive unit 12 and a light-source drive unit 13. The liquid-crystal-panel drive unit 12 drives a liquid crystal panel 1. The light-source drive unit 13 drives the first light source and the second light source. The first light source is the first light source 208. The second light source is the laser light source 309. A control unit 11 controls operations of the liquid-crystal-panel drive unit 12 and operations of the light-source drive unit 13.

The control unit 11 performs image processing on an input video signal and generates a liquid-crystal-panel control signal and a light-source control signal. The control unit 11 supplies the liquid-crystal-panel control signal to the liquid-crystal-panel drive unit 12 and supplies the light-source control signal to the light-source drive unit 13. The liquid-crystal-panel drive unit 12 drives the liquid crystal display apparatus on the basis of the liquid-crystal-panel control signal. The light-source drive unit 13 drives the first light source 208 and the second light source 309 on the basis of the light-source control signal The second light ray 391 which is red-color light is emitted from the laser light source 309. The second light ray 391 enters through an end surface 461a inside the light-guiding member 406. The second light ray 391 travels in the negative x-axis direction inside the light-guiding member 406. Then, the second light ray 391 is reflected twice and its traveling direction is changed to the positive x-axis direction. The second light ray 391 enters the inside of the surface light-emitting light-guiding plate 4 through an end surface 41a.

The first light ray 281 which is bluish-green-color light is emitted from the first light source 208. The first light ray 281 enters the inside of the surface light-emitting light-guiding plate 4 through the end surface 41a, like the second light ray 391. The bluish-green-color has peaks of brightness in blue-color and green-color. After entering through the end surface 41a of the surface light-emitting light-guiding plate 4, the first light ray 281 travels in the positive x-axis direction while mixed with the second light ray 391.

The surface light-emitting light-guiding plate 4 has microscopic optical elements 42 on a surface on a side of the negative z-axis direction. The microscopic optical element 42 changes a mixed light ray of the first light ray 281 and the second light ray 391 to the illumination light 344. The illumination light 344 travels in a positive z-axis direction. The illumination light 344 exits toward a back surface 1b of the liquid crystal panel 1. The illumination light 344 passes through a second optical sheet 3 and a first optical sheet 2 and is applied to the back surface 1b of the liquid crystal panel 1. The first optical sheet 2 has a function of directing the light emitted from the surface light-emitting light-guiding plate 4 to the rear surface 1b of the liquid crystal panel 1. The second optical sheet 3 has a function of reducing optical effects such as minute illumination unevenness.

The light-reflecting sheet 5 is disposed on a side of the negative z-axis direction from the surface light-emitting light-guiding plate 4. The light-reflecting sheet 5 is disposed on a side of the positive z-axis direction from the light-guiding member 406. The light emitted from the surface light-emitting light-guiding plate 4 in the negative z-axis direction is reflected at the light-reflecting sheet 5. The light reflected at the light-reflecting sheet 5 is used as the illumination light 344 with which the back surface 1b of the liquid crystal panel 1 is illuminated. As the light-reflecting sheet 5, a light-reflecting sheet whose base material is a resin such as a polyethylene terephthalate or other materials can be used, for example. As the light-reflecting sheet 5, a light-reflecting sheet that is obtained by depositing a metal on a surface of a substrate can be also used.

A liquid crystal layer of the liquid crystal panel 1 is disposed to be parallel to the xy-plane. The display surface 1a of the liquid crystal panel 1 has a rectangular shape. Adjacent two sides of the display surface 1a are orthogonal to each other. A short side is parallel to the y-axis. A long side is parallel to the x-axis. The rectangular shape indicates a shape of a rectangle, which includes a shape of a square.

The liquid-crystal-panel drive unit 12 changes a light transmissivity of the liquid crystal layer in units of pixels on the basis of the liquid-crystal-panel control signal received from the control unit 11. Each pixel has three sub-pixels. A first sub-pixel has a color filter that passes only red-color light. A second sub-pixel has a color filter that passes only green-color light. A third sub-pixel has a color filter that passes only blue-color light. The control unit 11 controls transmissivity of each pixel and the liquid crystal panel 1 accordingly produces a color image. In other words, the liquid crystal panel 1 produces image light by spatially modulating the illumination light 344 entered from the surface light-emitting light-guiding plate 4. The image light is emitted through the display surface 1a. The image light is light having image information.

According to the fourth embodiment, the control unit 11 can control the light-source drive unit 13 to adjust luminance of the second light ray 391 and luminance of the first light ray 281. The control unit 11 adjusts a light-emitting amount from each of the light sources on the basis of a video signal. This enables the liquid crystal display apparatus 103 to reduce power consumption. The second light ray 391 is red-color light emitted from the laser light source 309. The first light ray 281 is bluish-green-color light emitted from the first light source 208.

The second light source 309 using the laser light-emitting elements faces the end surface 461a of the light-guiding member 406. The end surface 461a is an end surface of the light-guiding member 406 on a side of the positive x-axis direction. The second light ray 391 enters an inside of the light-guiding member 406 through the end surface 461a. The light-guiding member 406 is disposed to be parallel to the display surface 1a of the liquid crystal panel 1.

The second light source 309 includes the plurality of laser light-emitting elements. The plurality of laser light-emitting elements are arranged at regular intervals in the y-axis direction. The second light source 309 emits the second light ray 391 which is red-color light. A spectrum of the second light ray 391 which is red-color light has a peak around 640 nm. Furthermore, a wavelength width of the second light ray 391 is 1 nm at full width at half maximum, and the second light ray 391 has a spectrum of an extremely narrow width. Furthermore, a divergence angle of the second light ray 391 in a fast-axis direction (a direction in which a divergence angle is large) is 40 degrees at full angle at half maximum. The divergence angle of the second light ray 391 in a slow-axis direction (a direction in which a divergence angle is small) is 10 degrees at full angle at half maximum.

The laser light-emitting elements in the second light source 309 are disposed so that the slow-axis direction (a direction in which a divergence angle is small) is parallel to a short side direction of the end surface 461a of the light-guiding member 406. A direction of the short side of the end surface 461a of the light-guiding member 406 is disposed at a direction where a distance of the light-guiding member 406 between opposite surfaces is the shortest (z-axis direction in FIG. 12). The arrangement direction of the laser light-emitting elements is not limited to this. However, by arranging the laser light-emitting element so that the slow-axis direction (a direction in which a divergence angle is small) is parallel to a direction of the short side of the end surface 461a, reflections at the end surface 461c and the end surface 461b of the light-guiding member 406 are achieved efficiently. This is because when a divergence angle in a direction of the short side of the end surface 461a, an incident angle of part of the second light ray 391 to the end surfaces 461c and 461b is smaller than a critical angle and therefore they cannot reflect light at the end surfaces 461c and 461b. However, by forming mirror surfaces on the end surfaces 461c and 461b, such problem can be resolved.

According to the fourth embodiment, the second light ray 391 is totally reflected at the interface between the light-guiding member 406 and the air layer. Then, the second light ray 391 travels inside the light-guiding member 406. A distance traveled by the second light ray 391 is a predetermined optical distance. The second light ray 391 is repeatedly reflected and reaches the end surface 461c. A light diameter of the laser light ray 391 as the second light ray emitted by the second light source 309 using the laser light-emitting elements is much smaller than a size of the end surface 461a of the the light-guiding member 406 in the y-axis direction. In other words, the second light source 309 using the laser light-emitting elements is a point light source. However, the second light ray 391 diverges at its own divergence angle. For this reason, the second light ray 391 and another light ray from the another adjacent laser light-emitting element overlap with each other while they travel at a predetermined optical distance. Such light rays overlap with each other and form line-shaped light having a uniform luminance distribution in the y-axis direction.

It is necessary for the second light ray 391 to travel at the predetermined optical distance in order to cause the light rays emitted from adjacent laser light-emitting elements to overlap with each other. The predetermined optical distance is determined by a divergence angle of the laser light-emitting element and an arrangement interval of the laser light-emitting elements. The second light ray 391 diverges in the arrangement direction of the laser light-emitting elements by its own divergence angle inside the light-guiding member 406. A certain distance is needed for obtaining a sufficient expanse of the second light rays 391 and forming the line-shaped light. This distance is a predetermined optical distance. The arrangement direction of the laser light-emitting elements is the y-axis direction in FIG. 12. A distance from the end surface 461a to the end surface 461c of the light-guiding member 46 is set to be longer than the predetermined optical distance. A plurality of the second light rays 391 emitted from the second light source 309 becomes line-shaped light having a uniform luminance distribution.

The light-guiding member 406 has a shape of a combination of a rectangular parallelepiped plate-shaped light-guiding part 462a and a trapezoidal-prism light-guiding part 462b. The two light-guiding parts 462a and 462b are made of a transparent material such as an acrylic resin (e.g., PMMA) or other materials of 2 mm in thickness, for example.

Furthermore, an end surface 461d out of the end surfaces of the trapezoidal-prism part of the light-guiding member 406 is formed to be parallel to the yz-plane. The end surface 461d faces the end surface 41a which is a surface of the surface light-emitting light-guiding plate 4 on a side of the negative x-axis direction. Two end surfaces 461b and 461c are inclined with reference to the xy-plane at an angle of approximately 45 degrees. The end surface 461c of the light-guiding member 406 is inclined so that the second light ray 391 is reflected from the negative x-axis direction to the positive z-axis direction. The end surface 461b of the light-guiding member 406 is inclined so that the second light ray 391 is reflected from the positive z-axis direction to the positive x-axis direction.

The second light ray 391 enters through the end surface 461a. Then, the second light ray 391 is repeatedly totally reflected and reaches the end surface 461c. The second light ray 391 is reflected at the end surface 461c and travels in the positive z-axis direction. Then, the second light ray 391 is reflected at the end surface 461b and its traveling direction is changed from the positive z-axis direction to the positive x-axis direction. Then, the second light ray 391 is emitted through the end surface 461d toward the surface light-emitting light-guiding plate 4.

The first light sources 208 are LED elements having a comparatively large divergence angle. For this reason, if the LED elements of the first light sources 208 are arranged at regular intervals in the y-axis direction, the first light rays 281 overlap with each other to form the line-shaped light. In other words, a luminance distribution of the first light ray 281 is equalized, the first light ray 281 has a uniform luminance distribution in an arrangement direction of the first light source 208. A plurality of light rays is emitted from the closely disposed light sources. If the plurality of light rays spatially overlap with each other, a luminance distribution of these light rays is equalized to form a uniform luminance distribution in an arrangement direction of the light sources. Furthermore, the first light source 208 is disposed to face the end surface 41a of the surface light-emitting light-guiding plate 4. The first light ray 281 is emitted from the first light source 208. Then, the first light rays 281 travel toward the end surface 41a.

The first light rays 281 which are bluish-green-color light rays are emitted from the first light sources 208. The first light rays 281 are mixed with the second light rays 391 which are red-color light rays emitted from the second light sources 309, thereby forming the white-color light rays 343. The first light rays 281 have a peak of approximately 450 nm and a peak of approximately 530 nm, for example. In addition, the first light rays 281 are bluish-green-color light rays having a continuous spectrum of a band from 420 nm to 580 nm. The first light sources 208 may be light sources that emit blue-color light and green-color light, for example. The light source has a structure of a combination of an excitation light source and a fluorescent substance. The first light source 208 may be a light source having a fluorescent substance that emits blue-color light and green-color light when irradiated with ultraviolet light. In this light source, the ultraviolet light excites the fluorescent substance, thereby emitting blue-color light and green-color light. Alternatively, the first light source 208 may be a light source having a green-color fluorescent substance excited by blue-color light, thereby emitting blue-color light and green-color light.

As a method of arranging two lines of the first light sources 208 and the second light sources 309, it is conceivable that two lines of the first light sources 208 and the second light sources 309 are arranged along the incident end surface 41a of the surface light-emitting light-guiding plate 4, for example. However, by arranging two lines of the adjacent light sources, the light sources are concentrated in a single area. If two lines of the adjacent light sources are arranged to concentrate them in the single area, a temperature around the light sources increases due to heat generated by each LED element. This increase in a peripheral temperature leads to decrease of a luminous efficiency of the LED elements. Furthermore, this increase in the peripheral temperature leads to shortening of lives of the LED elements. For these reasons, if two lines of light sources are arranged, it is desirable that each of the light sources be separately arranged each other. This makes it possible to suppress a rise in the peripheral temperature due to light emitting of the light sources and also to elongate the lives of the first light sources 208 and the second light sources 309.

Furthermore, temperature characteristics of an LED element is different from temperature characteristics of a laser light-emitting element. As compared with the LED element, the amount of emitted light of the laser light-emitting element is more likely to change according to the temperature and the wavelength of the laser light-emitting element is also likely to change according to the temperature. For this reason, the temperature of the laser light-emitting element need be kept an adequate temperature. In order to keep the temperature of the laser light-emitting element the adequate temperature, it is desirable that no heat source be disposed around the laser light source. The light source using the LED element emits heat when it is switched on. The laser light source emits heat when it is switched on. In other words, it is important that the light source using the LED element should be disposed so as to be away from the laser light source.

Although the light-guiding member 406 is described to be a transparent member of 2 mm in thickness, it is not limited to the transparent member of 2 mm in thickness. It is necessary for the light-guiding member 406 to have a function that the light-guiding member 406 guides the second light rays 391 to the surface light-emitting light-guiding plate 4. The second light rays 391 are light rays emitted from the second light sources 309. A long as the light-guiding member 406 has structure for realizing this function, it may have other structure. For example, by providing reflection films on the end surfaces 461b and 461c, similar effects can be obtained.

Figure 13:
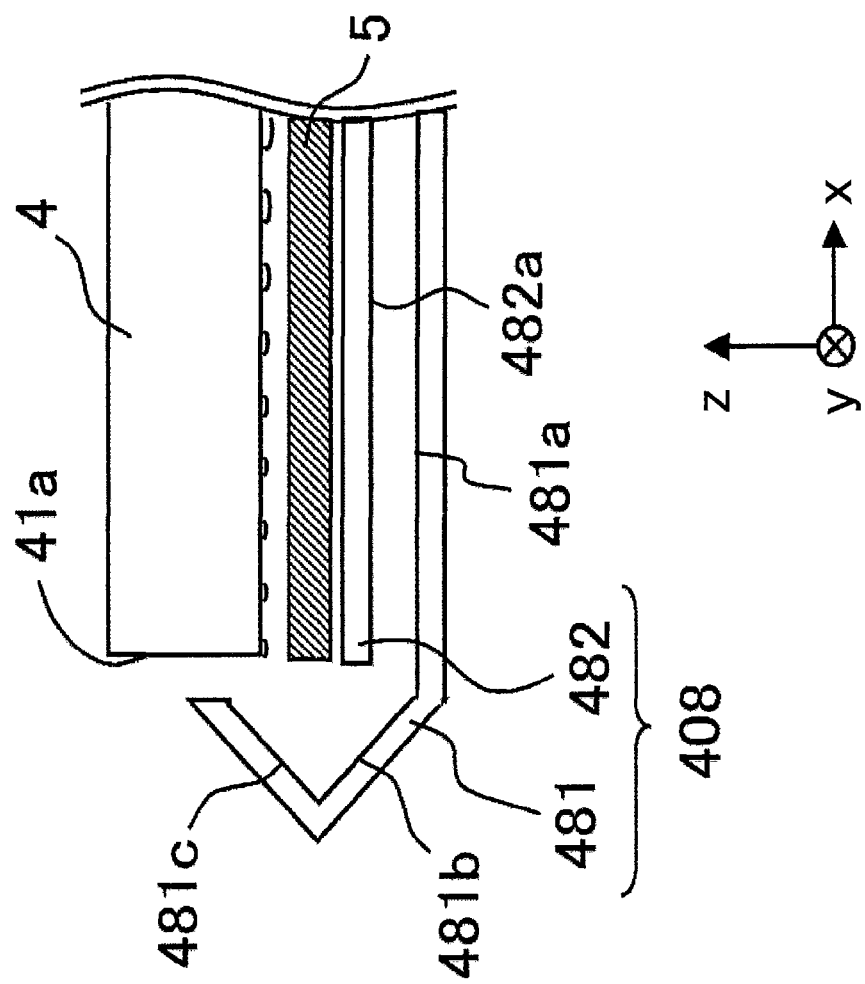
FIG. 13 is a cross-sectional view schematically illustrating an example of a surface light-emitting light-guiding plate and its surrounding structure in the surface light source device according to the fourth embodiment.

FIG. 13 is a cross-sectional view schematically illustrating an example of the surface light-emitting light-guiding plate and its surrounding structure in the surface light source device 203 according to the fourth embodiment. The light-guiding member 408 illustrated in FIG. 13 is formed by two parts, i.e., reflecting members 481 and 482. Reflecting surfaces 481a, 481b, 481c and 482a of the reflecting members 481 and 482 are mirror surfaces. Although the reflecting member 481 and the reflecting member 482 are illustrated as separate parts, they can be composed of a single hollow member which is formed by connecting both of the reflecting members each other at their ends in the y-axis direction.

Thin-sizing of the liquid crystal display apparatus 103 is considered. Weight reduction of the liquid crystal display apparatus 103 is also considered. For these reasons, it is desirable to use a surface light-emitting light-guiding plate 4 which is thin in thickness. However, if the light-guiding member 406 is reduced in thickness, its rigidity decreases. For this reason, problems such as the reduction of rigidity of the light-guiding member 406 should be taken into consideration.

The first light ray 281 is emitted from the first light source 208. The second light ray 391 is emitted from the second light source 309 that uses the laser light-emitting elements. The first light ray 281 which is bluish-green-color light is mixed with the second light ray 391 which is red-color light inside the surface light-emitting light-guiding plate 4. Then, the first light ray 281 and the second light ray 391 become white-color line-shaped light. The control unit 11 can control the light-source drive unit 13 to adjust a luminance ratio between the first light ray 281 and the second light ray 391. Thus, the control unit 11 can produce the white-color line-shaped light.

The surface light-emitting light-guiding plate 4 is disposed to be parallel to the display surface 1a of the liquid crystal panel 1. The surface light-emitting light-guiding plate 4 has the microscopic optical elements 42 on its back surface. The back surface is a surface on a side opposite to the liquid crystal panel 1 and is a surface on a side of the negative z-axis direction. The first light ray 281 and the second light ray 391 travel inside the surface light-emitting light-guiding plate 4. The microscopic optical element 42 changes the first light ray 281 and the second light ray 391 to the illumination light 344. The illumination light 344 is light emitted in the positive z-axis direction. Then, the illumination light 344 is emitted toward the back surface 1b of the liquid crystal panel 1.

The surface light-emitting light-guiding plate 4 is a part made of a transparent material such as an acrylic resin (e.g., PMMA) or other materials, for example. Moreover, the surface light-emitting light-guiding plate 4 is a plate-shaped member of 4 mm in thickness. As in FIG. 5 in the first embodiment, the surface light-emitting light-guiding plate 4 has the microscopic optical elements 42 on the back surface 41b. The microscopic optical element 42 has a semispherical convex shape projecting in the negative z-axis direction.

The first light ray 281 and the second light ray 391 enter through the end surface 41a of the surface light-emitting light-guiding plate 4. The first light ray 281 and the second light ray 391 are totally reflected at the interface between the surface light-emitting light-guiding plate 4 and the air layer. Then, the first light ray 281 and the second light ray 391 are repeatedly reflected and propagate inside the light-guiding plate 4. The light rays 281 and 391 travel in the positive x-axis direction while repeatedly reflected. However, when the first light ray 281 and the second light ray 391 enter the microscopic optical element 42, they are reflected at a curved surface of the microscopic optical element 42 to change their traveling direction. When the traveling directions of the first light ray 281 and the second light ray 391 are changed, some light rays out of the first light ray 281 and the second light ray 391 cannot satisfy a totally reflecting condition at the interface between a front surface of the surface light-emitting light-guiding plate 4 and the air layer. When the light rays do not satisfy the totally reflecting condition, the light rays are emitted through the front surface of the surface light-emitting light-guiding plate 4 to the back surface 1b of the liquid crystal panel 1. The front surface of the surface light-emitting light-guiding plate 4 is a surface disposed on a side of the liquid crystal panel 1.

An arrangement density of the microscopic optical elements 42 varies according to a position in the xy-plane on the surface light-emitting light-guiding plate 4. The arrangement density means the number of the microscopic optical elements 42 per unit area or the size of the microscopic optical elements 42 or other values. An in-plane luminance distribution of the illumination light 344 can be controlled by changing the arrangement density of the microscopic optical elements 42. The illumination light 344 is light emitted from the surface light-emitting light-guiding plate 4. Furthermore, the in-plane luminance distribution means a distribution that indicates a level of luminance at a position two-dimensionally expressed on an arbitrary plane. Here, the "in-plane" indicates a display surface.

As in a similar way to FIG. 5 in the first embodiment, the arrangement density of the microscopic optical elements 42 varies according to a position in traveling directions of the first light ray 281 and the second light ray 391. The traveling directions of the first light ray 281 and the second light ray 391 are the positive x-axis direction in FIG. 5. More specifically, the surface light-emitting light-guiding plate 4 has the microscopic optical elements 42 within a region from a vicinity of the end surface 41a to the end surface 41c. The end surface 41c is an end surface which is opposed to the end surface 41a. The arrangement density of them varies continuously from sparse to dense in a direction from the vicinity of the end surface 41a to the end surface 41c.

The microscopic optical element 42 has a convex lens shape, for example. A curvature of its surface is approximately 0.15 mm. A maximum height is approximately 0.005 mm. Further, a refractive index is approximately 1.49. The materials of the surface light-emitting light-guiding plate 4 and the microscopic optical elements 42 may be an acrylic resin. However, the materials of the surface light-emitting light-guiding plate 4 and the microscopic optical element 42 are not limited to the acrylic resin. They may be other materials that have a high light transmissivity and have excellent formability and processability. Another resin material such as a polycarbonate resin or a glass material can be used as a substitute for the acrylic resin.

In the fourth embodiment, the microscopic optical element 42 has a convex lens shape. However, the shape of the microscopic optical element 42 is not limited to the convex lens shape. Necessary functions of the microscopic optical element 42 are that the microscopic optical element 42 reflects the first light ray 281 and the second light ray 391 in the positive z-axis direction, thereby causing the first light ray 281 and the second light ray 391 to exit toward the back surface 1b of the liquid crystal panel 1. The first light ray 281 and the second light ray 391 are light traveling in the x-axis direction inside the surface-emitting light guiding plate 4. As long as the microscopic optical element 42 has such functions, it may have other shapes. For example, even if a prism-shape or a random pits and projections pattern or the like may be used, like functions can be obtained. Furthermore, the thickness of the surface light-emitting light-guiding plate 4 is not limited to 4 mm. From the viewpoint of thinning and lightweighting of the liquid crystal display apparatus 103, it is desirable that the surface light-emitting light-guiding plate 4 that is thin in thickness be used.

The illumination light 344 is light emitted from the surface light-emitting light-guiding plate 4 toward the liquid crystal panel 1. However, in some cases, the illumination light 344 is reflected by the first optical sheet 2, the second optical sheet 3 and the like and travels in the negative z-axis direction. In order to achieve high brightness and low electrical power consumption, it is necessary to use these reflected light rays as the illumination light for the liquid crystal panel 1 again. The liquid crystal display apparatus 103 in the fourth embodiment includes the light-reflecting sheet 5 on a side of the negative z-axis direction from the surface light-emitting light-guiding plate 4. The light-reflecting sheet 5 directs the reflected light traveling in the negative z-axis direction to the positive z-axis direction again. This enables the liquid crystal display apparatus 103 to use light efficiently.

As described above, the liquid crystal display apparatus 103 in the fourth embodiment includes the first light source 208 and the second light source 309 in two places. The first light source 208 using the LED elements is disposed at the side surface of the surface light-emitting light-guiding plate 4. The laser light source 309 as the second light source is disposed at the back surface of the surface light-emitting light-guiding plate 4. By virtue of this, the liquid crystal display apparatus 103 can increase the number of the light sources while suppressing increase of the thickness (size in the z-axis direction). Furthermore, the size of the backlight unit 203 is suppressed as compared with a display region of the liquid crystal display apparatus 103, and the liquid crystal display apparatus 103 can achieve high brightness and thin structure in thickness. The display region indicates a region where an effective image is displayed. The display region is a region extending in the x-axis direction and the y-axis direction in the coordinate representation.

Moreover, since the light sources are arranged at the side surface and the back surface of the surface light-emitting light-guiding plate 4 respectively, a rise in a peripheral temperature resulting from heat generated by the respective light sources can be relieved. By virtue of this, a decrease in luminous efficiency of the light sources due to the rise in the peripheral temperature can be suppressed. Furthermore, long lives of the first light source 208 and the second light source 309 can be achieved.

Furthermore, conventionally, in a sidelight-type backlight that adopts laser light-emitting elements as point light sources having directivity, there is a problem of brightness unevenness on a plane of a display surface. Since the light rays of the laser light-emitting elements diverge at their own divergence angles, a light ray of the laser light-emitting element and a light ray of neighboring another laser light-emitting element spatially overlap with each other and therefore the light rays of the laser light-emitting elements become line-shaped light. The backlight unit 203 can have a sufficient propagation distance of the light ray. For this reason, the backlight unit 203 can generate the illumination light 344 having a uniform luminance distribution. The luminance distribution of the illumination light 344 is uniform on the plane of the display surface. Therefore, the liquid crystal display apparatus 103 capable of displaying an excellent image with reduced brightness unevenness can be provided.

The light source of the backlight of the liquid crystal display apparatus 103 in the fourth embodiment is a laser light source having a narrow wavelength width. By adopting the laser light source, the color purity of the displayed color can be increased. The laser light source can achieve brighter color expression than a fluorescent lamp and an LED element that are widely used.

The second light source 309 in the liquid crystal display apparatus 103 emits red-color light. The first light source 208 in the liquid crystal display apparatus 103 emits bluish-green-color light. Bluish-green-color is a mixed color of blue-color and green-color. As described above, in fluorescent lamps that are conventionally used, a peak of an emission spectrum of a red-color region is within an orange-color wavelength region. Likewise, in white-color LED elements using a yellow-color fluorescent substance, a peak of an emission spectrum of a red-color region is within the orange-color wavelength region. In other words, a peak of wavelengths of a red-color region is deviated from the red-color region and is located within an orange-color region. Especially, if the color purity of red-color is intended to be improved, the transmitted light amount of the color filter is extremely reduced and therefore the brightness decreases excessively. By replacing a fluorescent lamp and a white-color LED element with a red-color LED element, a transmitted light amount of the color filter can be suppressed and an effect of improvement of the color purity can be obtained.

In the fourth embodiment, the red-color laser light-emitting elements having a peak wavelength of 640 nm are adopted in the second light source 309. However, the present invention is not limited to this. For example, red-color laser light-emitting elements having a different peak wavelength from 640 nm can be used. Furthermore, laser light-emitting elements that emit blue-color or green-color light can be used. Moreover, white-color light should be produced by mixing the light emitted from the first light source 208 and the light emitted from the second light source 309. In other words, the light from the first light source 208 is a complementary color of the light from the second light source 309.

In general, white-color fluorescent lamps or white-color LED elements are used in a light source. On the other hand, if the color purity need be improved, a transmission wavelength band of a color filter in the liquid crystal panel 1 should be set to a narrow one. In this case, if loss of the light due to the color filter increases, brightness of an image decreases. The liquid crystal display apparatus 103 in the fourth embodiment uses single-color laser light-emitting elements. The single-color light has high color purity. By using the single-color laser light-emitting elements, the color purity of red-color is improved. So, the liquid crystal display apparatus 103 can extend a color reproduction range of displayed color. Furthermore, by improving the color purity of red-color, the liquid crystal display apparatus 103 can reduce the loss of light due to the color filter. For this reason, the liquid crystal display apparatus 103 can suppress reduction in brightness. In spite of low electrical power consumption, the liquid crystal display apparatus 103 can achieve high brightness and wide color gamut.

The laser light-emitting element has higher level of single-color property than the LED element. By setting the wavelength of the laser light-emitting element and a transmission wavelength of the color filter in the liquid crystal panel so as to correspond to each other, the transmission wavelength of the color filter can be set to narrower one. For this reason, the laser light source can achieve higher color purity than the light source using the single-color LED element.

Furthermore, an electricity-light conversion efficiency of a light source using laser light-emitting elements is higher than that of a light source using single-color LED elements. For this reason, the light source using the laser light-emitting elements can be driven with lower electrical power consumption than the light source using the single-color LED elements. Moreover, the light source using the laser light-emitting elements has higher directivity than the light source using the single-color LED elements. For this reason, the laser light source can increase a coupling efficiency with the light-guiding member 406. The coupling efficiency means a ratio of the amount of light that enters a succeeding optical system to the amount of light that is emitted from the light source.

As described above, the liquid crystal display apparatus in the fourth embodiment is configured so that the light rays emitted from the two light sources disposed in different positions enter through a short surface of the surface light-emitting light-guiding plate 4. However, by designing an arrangement of the light sources, a position of the light-guiding member 406, an arrangement of the microscopic optical elements 42 and the like, it is possible to use a long surface of the surface light-emitting light-guiding plate 4 as the incident surface. The long surface is an end surface parallel to the xz-plane in FIG. 1, FIG. 6 and FIG. 7.

The light-source drive unit in the fourth embodiment can individually control outputs from the first light source 208 and the second light source 309 on the basis of an image signal. This can reduce power consumption and reduce stray light to improve contrast. This is because unnecessary light can be switched off by individually controlling the first light source 208 and the second light source 309. Alternatively, unnecessary light may be reduced. The stray light means light that follows an optical path other than a normal optical path in optical equipment and light harmful to a desired use.

(5) Fifth Embodiment

Figure 14:
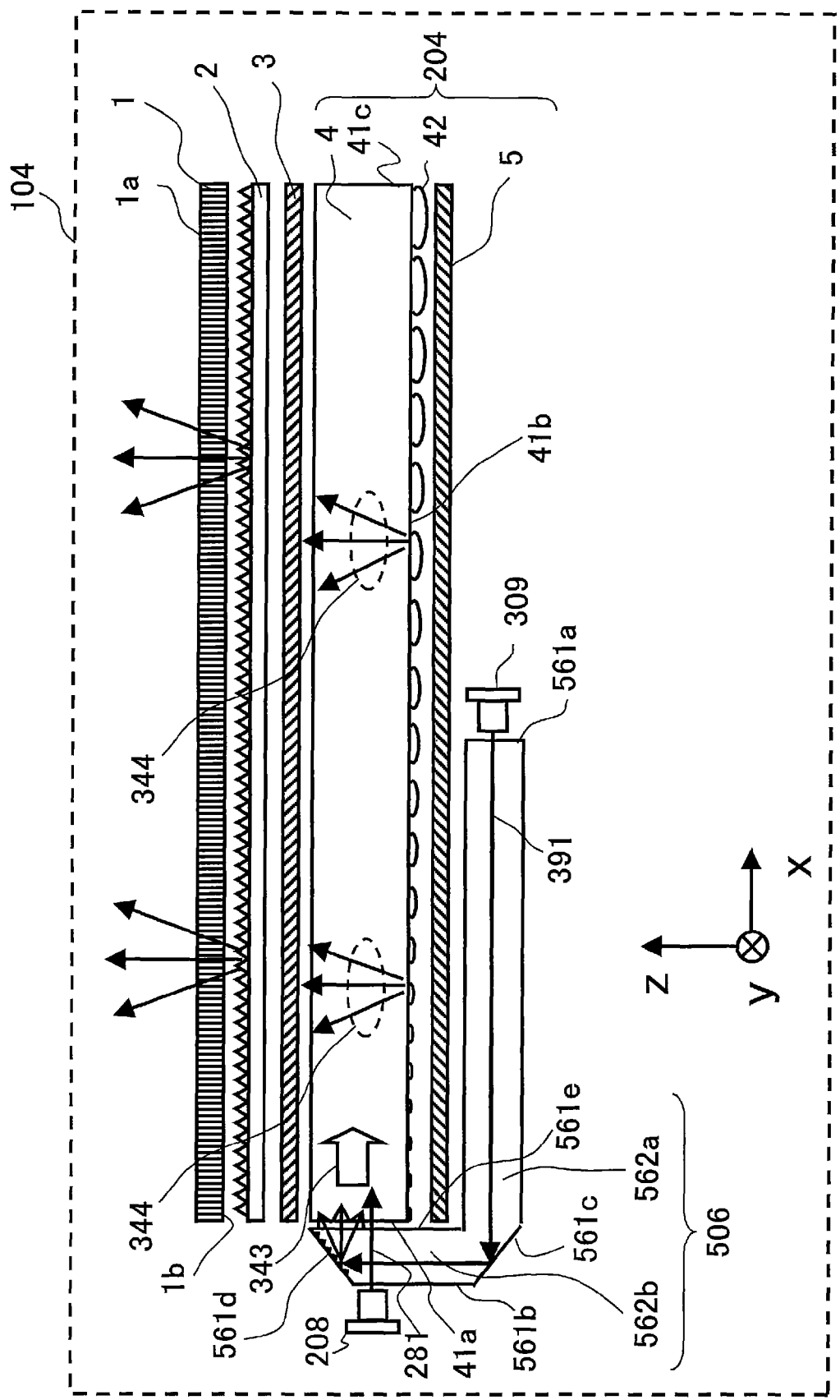
FIG. 14 is a cross-sectional view schematically illustrating an example of structure of a liquid crystal display apparatus (including a surface light source device) according to a fifth embodiment of the present invention.

FIG. 14 is a cross-sectional view schematically illustrating an example of structure of a liquid crystal display apparatus 104 (including a surface light source device 204) in a fifth embodiment. The surface light source device 204 includes a surface light-emitting light-guiding plate 4, a light-reflecting sheet 5, a light-guiding member 506, a first light source 208 and a second light source 309. The surface light source device 204 also includes a constitutional element that has a function of the light-guiding member 506. Reference characters in FIG. 14 that are the same as those in FIG. 10 (the third embodiment) indicate the same or corresponding elements. The liquid crystal display apparatus 104 is a transmission type display apparatus. In the liquid crystal display apparatus 104 in the fifth embodiment, an end surface 561d of the light-guiding member 506 is formed by a diffusing-reflecting surface. The liquid crystal display apparatus 104 is the same as that in the third embodiment, except for the difference. The fifth embodiment differs from the first and second embodiments in a point that the light-guiding member has the diffusing-reflecting surface and regarding the following components, i.e., the light source 208 and the second light source 309. The other components in the fifth embodiment are the same as those in the first and second embodiments. The embodiments illustrated in FIG. 4, FIG. 6 and FIG. 7 that are different from the embodiment illustrated in FIG. 1 in the first embodiment can be applied to the fifth embodiment. Furthermore, the embodiment illustrated in FIG. 13 that is different from the embodiment illustrated in FIG. 12 in the fourth embodiment can be applied to the fifth embodiment. The diffusing-reflecting surface, which is disposed on the end surface 561d in the fifth embodiment, can be provided on the end surface 61d in FIG. 1 or provided on the reflecting surface 183a in FIG. 4 or provided on the end surface 171c in FIG. 6 or provided on the end surface 141d in FIG. 7 or provided on the end surface 61d in FIG. 8 or provided on the end surface 61d in FIG. 10 or provided on the end surface 461d in FIG. 12 or provided on the reflecting surface 481c in FIG. 13.

The first light source 208 uses an LED element that emits a first light ray 281 which is bluish-green-color light. Bluish-green-color light is a mixture of blue-color light and green-color light. The second light source 309 uses a laser light-emitting element that emits a second light ray 391 which is red-color light. A wavelength width of laser light is narrow, i.e., laser light has high color purity. For this reason, by using a red-color-laser light-emitting element, the color purity of red-color is improved. In other words, a color reproduction range of a displayed color is extended.

Like the liquid crystal display apparatus 100, the liquid crystal display apparatus 102 includes a liquid-crystal-panel drive unit 12 and a light-source drive unit 13. As illustrated in FIG. 11, the liquid-crystal-panel drive unit 12 drives a liquid crystal panel 1. The light-source drive unit 13 drives the first light source and the second light source. The first light source is the first light source 208. The second light source is the laser light source 309. A control unit 11 controls operations of the liquid-crystal-panel drive unit 12 and operations of the light-source drive unit 13. The control unit 11 performs image processing on an input video signal and generates a liquid-crystal-panel control signal and a light-source control signal. The control unit 11 supplies the liquid-crystal-panel control signal to the liquid-crystal-panel drive unit 12. The control unit 11 supplies the light-source control signal to the light-source drive unit 13. The liquid-crystal-panel drive unit 12 drives the liquid crystal panel 1 on the basis of the liquid-crystal-panel control signal. The light-source drive unit 13 drives the first light source 208 and the second light source 309 on the basis of the light-source control signal.

The second light source 309 is disposed to face an end surface 561*a* of the light-guiding member 506. The end surface 561*a* is an end surface of the light-guiding member 506 on a side of the positive x-axis direction. The end surface 561*a* is a light incident end surface. The light-guiding member 506 is disposed to be parallel to the display surface 1*a* of the liquid crystal panel 1. The second light source 309 includes a plurality of laser light-emitting elements arranged at regular intervals in the y-axis direction.

The first light source 208 emits the first light ray 281 (e.g., bluish-green-color). The second light source 309 emits the second light ray 391 (e.g., red-color). The first light ray 281 emitted from the first light source 208 and having a wide angular intensity distribution travels in a substantially positive x-axis direction toward a light incident surface 41*a* of the surface light-emitting light-guiding plate 4. The angular intensity distribution represents a relationship between an angle and an intensity with reference to an emitting direction. The second light ray 391 emitted from the second light source 309 enters at the light incident end 561*a* of the light-guiding member 506, is repeatedly totally reflected at an interface between the light-guiding member 506 and an air layer, travels in the negative x-axis direction inside the light-guiding member 506 and propagates in the positive z-axis direction at an end surface 561*c*. At the time, an angular intensity distribution of the second light ray 391 is maintained. Accordingly, an angular intensity distribution of the second light ray 391 when the second light ray 391 reaches the diffusing-reflecting surface 561*d* is equal to an angular intensity distribution of the second light ray 391 when the second light ray 391 is emitted from the second light source 309, and full angles at half maximum of the angular intensity distributions are the same. The full angle at half maximum of the angular intensity distribution is 5 degrees, for example. The second light ray 391 changes its traveling direction from the negative x-axis direction to the positive z-axis direction at the end surface 561*c* of the light-guiding member 506. Then, the second light ray 391 is reflected at the diffusing-reflecting surface 561*d* and its traveling direction is changed to a direction toward the light incident surface 41*a* of the surface light-emitting light-guiding plate 4 (the substantially positive x-axis direction). At the time of the reflection at the diffusing-reflecting surface 561*d*, the full angle at half maximum of the angular intensity distribution of the second light ray 391 becomes larger.

In the fifth embodiment, the same effects as the third embodiment can be obtained. In the fifth embodiment, different types of light sources having different angular intensity distributions from each other are used. The first light source 208 uses the LED elements and the second light source 309 uses the laser light-emitting elements. Even in such a case, it is possible for the light-guiding member 506 to change an angular intensity distribution of a light source having a narrow angular intensity distribution so as to agree with an angular intensity distribution of the other light source. For this reason, the light-guiding member 506 can reduce a difference between an in-plane luminance distribution of the surface light-emitting light-guiding plate 4 generated by the first light ray 281 and an in-plane luminance distribution of the surface light-emitting light-guiding plate 4 generated by the second light ray 391. Even in a case where the first light source 208 has a different spectrum from the second light source 309, the liquid crystal display apparatus 104 can reduce color unevenness. Ordinarily, by using at least one kind of a light source with high monochromaticity to generate white-color light, a color reproduction range can be enlarged. In such a case, the liquid crystal display apparatus uses different kinds of light sources having different angular intensity distributions. In addition, a laser light-emitting element with high monochromaticity has high directivity. Therefore, the fifth embodiment is effective as structure for enlarging a color reproduction range.

An object of the fifth embodiment is to match angle intensity distributions of different kinds of light sources having the different angle intensity distributions from each other. So, in the fifth embodiment, a similar effect can be achieved by providing the diffusing structure, which was disposed on the end surface 561*d* of the light-guiding member 506, on another reflecting surface on an optical path of the second light ray 391. However, the angular intensity distribution of the second light ray 391 is extended by the diffusing structure. For this reason, if the diffusing structure is disposed near the light incident surface 41*a* of the surface light-emitting light-guiding plate 4, a decrease in a light amount of the second light ray 391 that enters the surface light-emitting light-guiding plate 4 can be suppressed. Also for this reason, it is preferable that the diffusing structure be disposed near the light incident surface 41*a* of the surface light-emitting light-guiding plate 4. Here, the diffusing structure is a structure that changes a traveling direction of each light ray at random. In other words, the diffusing structure is one that changes a light ray to another light ray having lower directivity.

Figure 15:
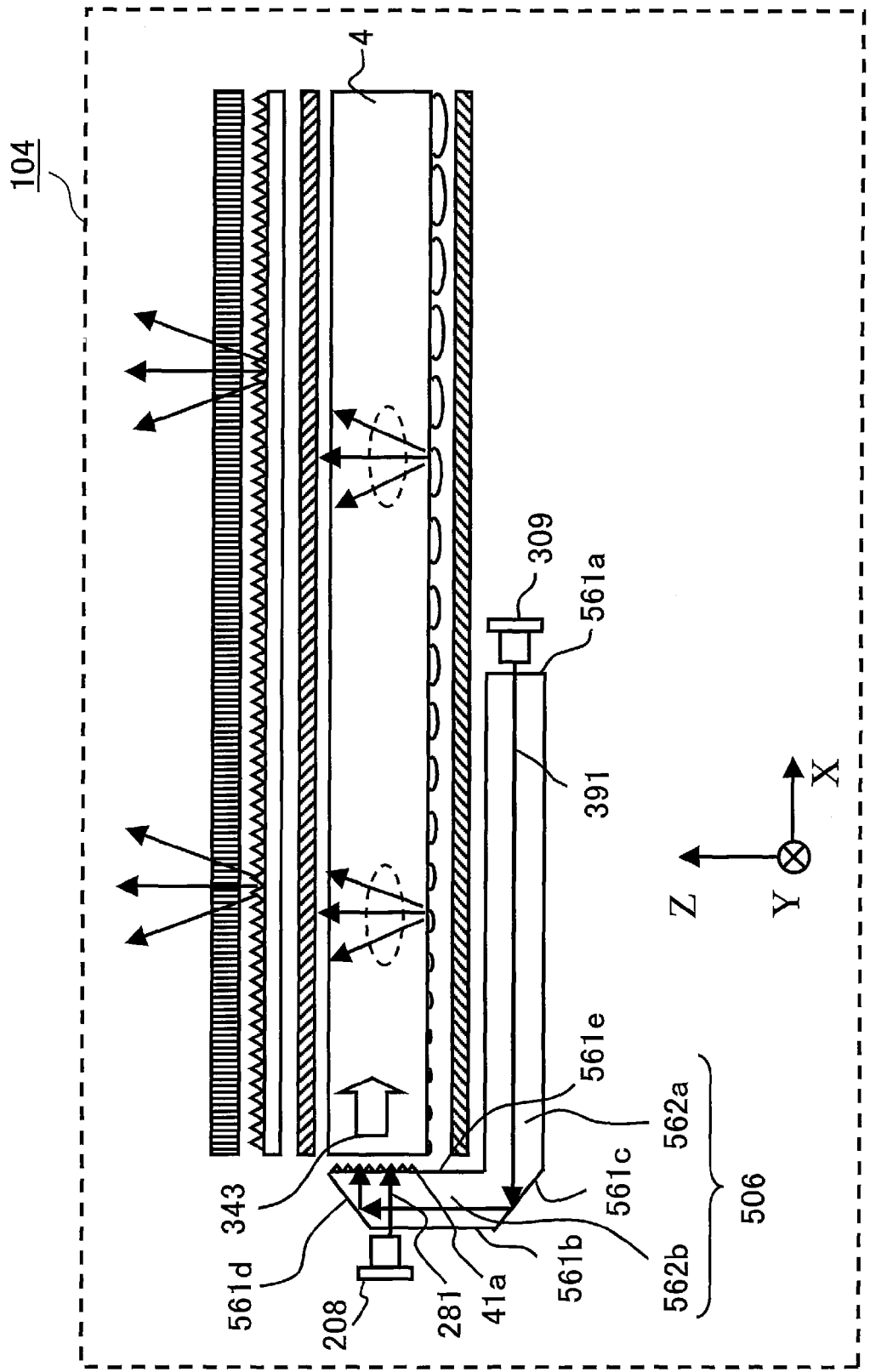
FIG. 15 is a cross-sectional view schematically illustrating another example of diffusing structure in the fifth embodiment.
Figure 16:
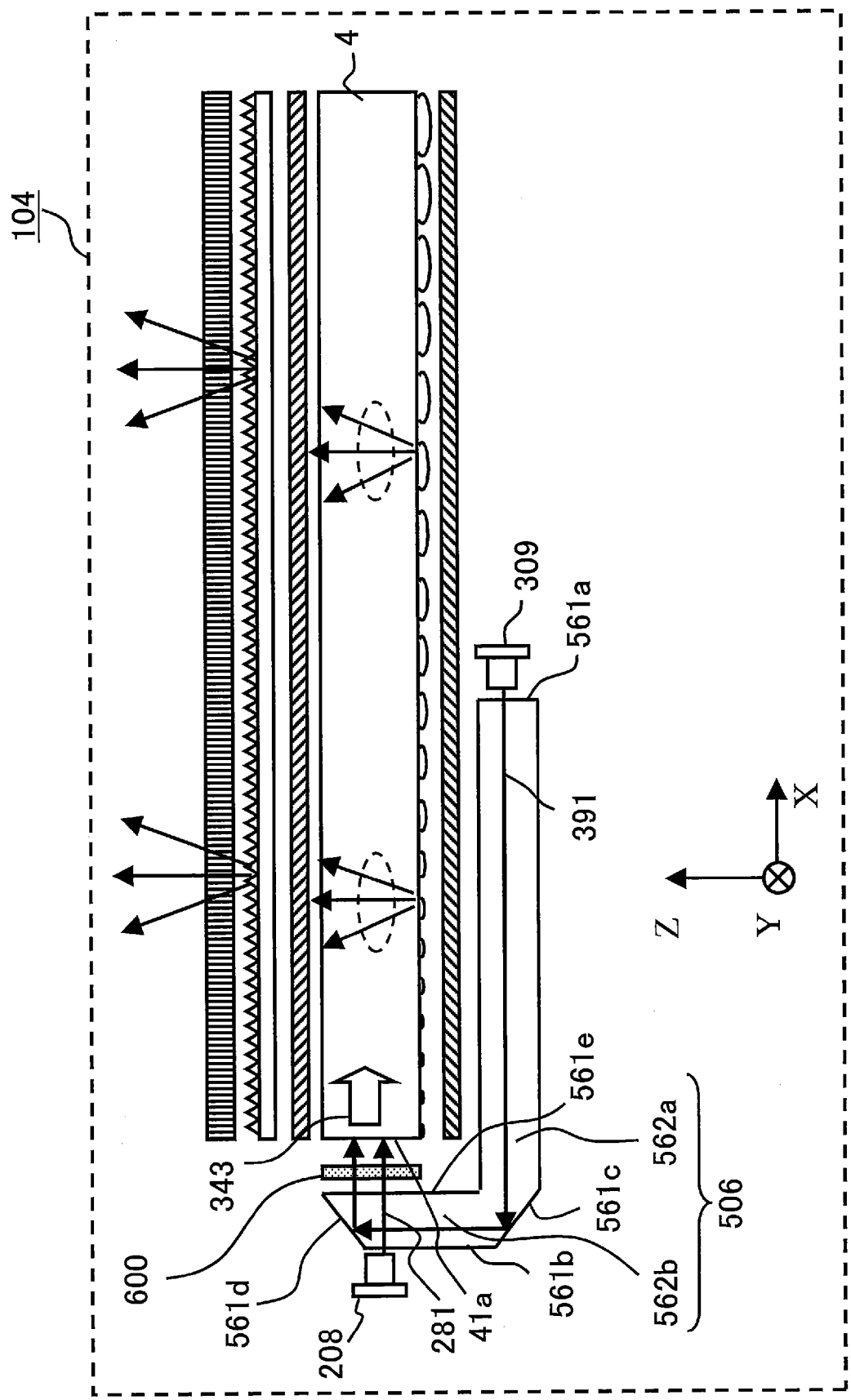
FIG. 16 is a cross-sectional view schematically illustrating further another example of the diffusing structure in the fifth embodiment.

For example, the diffusing structure may be disposed on an end surface 561*e* in a region where the second light ray 391 is emitted from the light-guiding member 506, as illustrated in FIG. 15. As illustrated in FIG. 16, a diffusing element 600 may be disposed between the light-guiding member 506 and the surface light-emitting light-guiding plate 4, for example. The light-guiding member 506 may have the diffusing element 600 on a front surface of the emission surface. The light-guiding member 506 may have the diffusing element 600 near the emission surface inside the light-guiding member 506. The surface light-emitting light-guiding plate 4 may have the diffusing element 600 on a front surface of the light incident surface 41*a*. The surface light-emitting light-guiding plate 4 may have the diffusing element 600 near the light incident surface 41*a* inside the surface light-emitting light-guiding plate 4.

Figure 17:
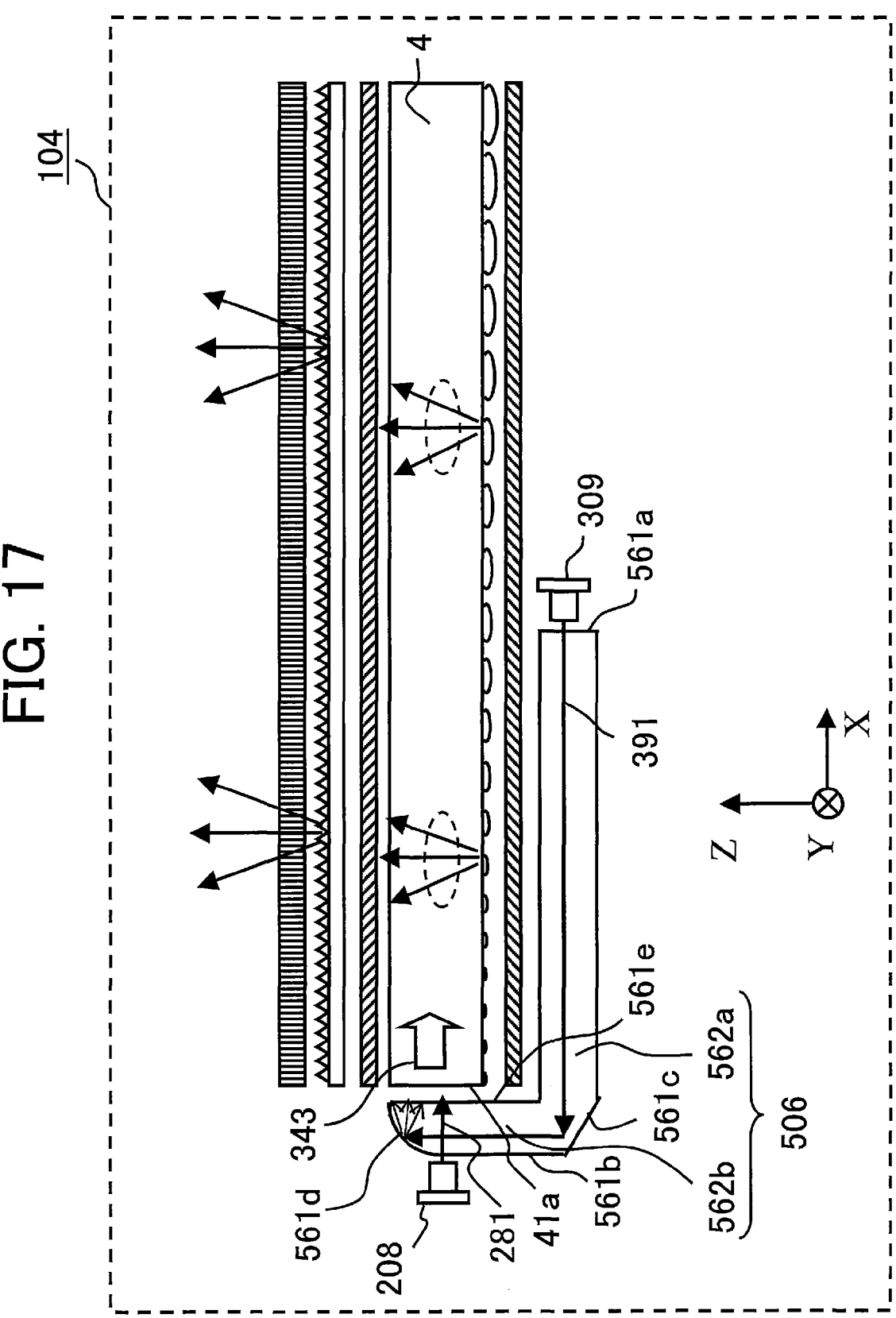
FIG. 17 is a cross-sectional view schematically illustrating another example of a light-guiding member for light-source use in the fifth embodiment.

As illustrated in FIG. 17, the end surface 561*d* may be configured by a circular-arc-shaped mirror. The end surface 561*d* can be made to be similar in shape to a cylindrical mirror 1202 illustrated in FIG. 24, a light-reflecting member 1302 illustrated in FIG. 26 or a light-reflecting mirror 1402 illustrated in FIG. 28 that will be described in a seventh embodiment. The light-reflecting member 1302 has a light-reflecting surface including alternatively and successively arranged projections and pits. The light-reflecting mirror 1402 includes light-reflecting surfaces on which cross-sectional polygonal shapes are continued.

The diffusion structure is formed on the surface of the end surface 561e. For example, the diffusion structure may be a structure where a plurality of small concave lenses are formed. Alternatively, the diffusion structure may be a structure where a plurality of small convex lenses are formed. Alternatively, the diffusion structure may be a structure where a plurality of small pyramid shapes are formed. Alternatively, it may be a structure where small and random recess-projection shapes are formed by blasting. Alternatively, particles having a diffractive index different from that of a surrounding material may be attached by coating. Alternatively, the diffusion element 600 may be an element which includes particles having a diffractive index different from that of a surrounding material in its inside.

(6) Six Embodiment (6-1) Structure of Six Embodiment

Figure 18:
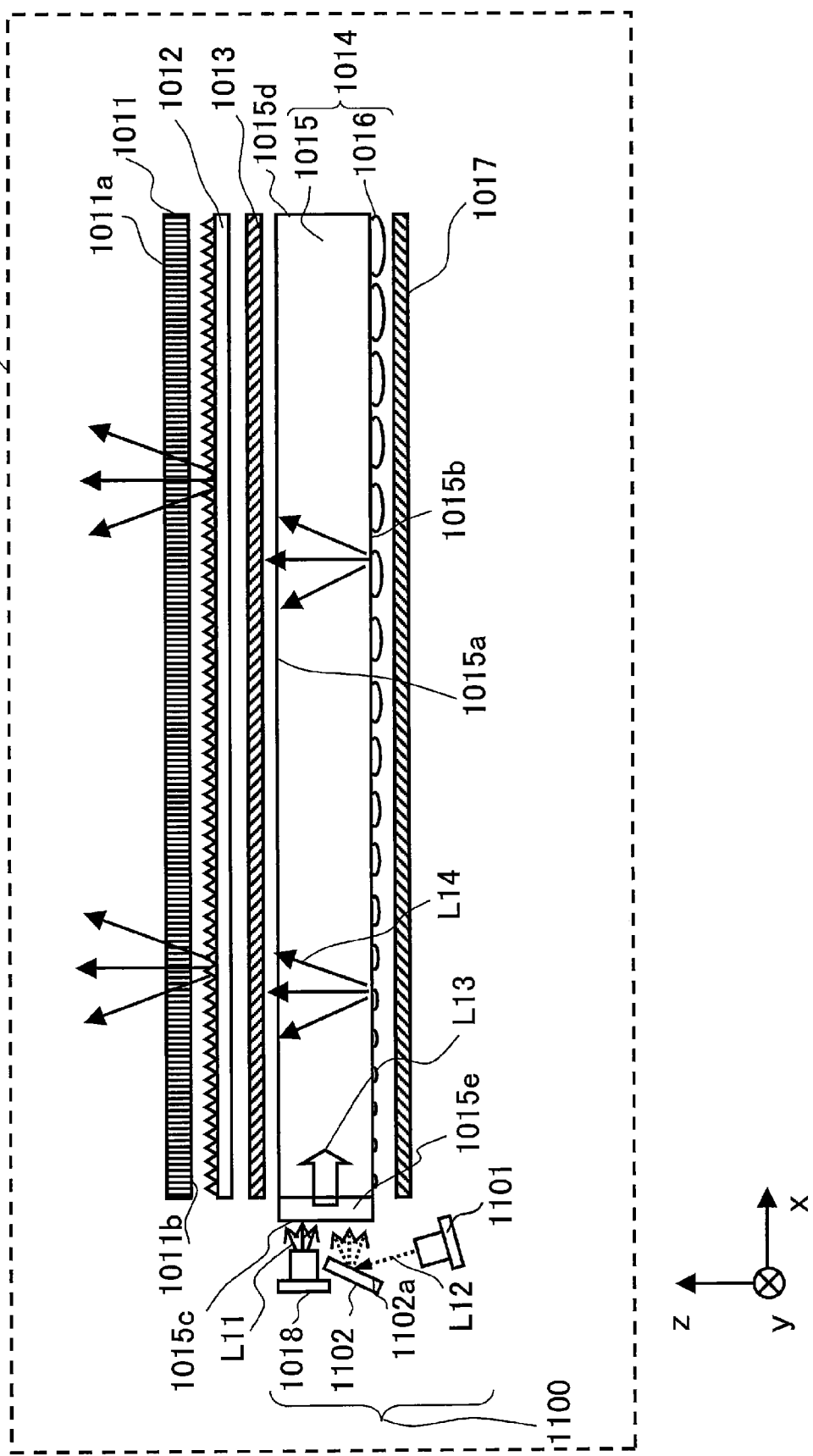
FIG. 18 is a cross-sectional view schematically illustrating an example of structure of a liquid crystal display apparatus (including a surface light source device) according to a sixth embodiment of the present invention.
Figure 19:
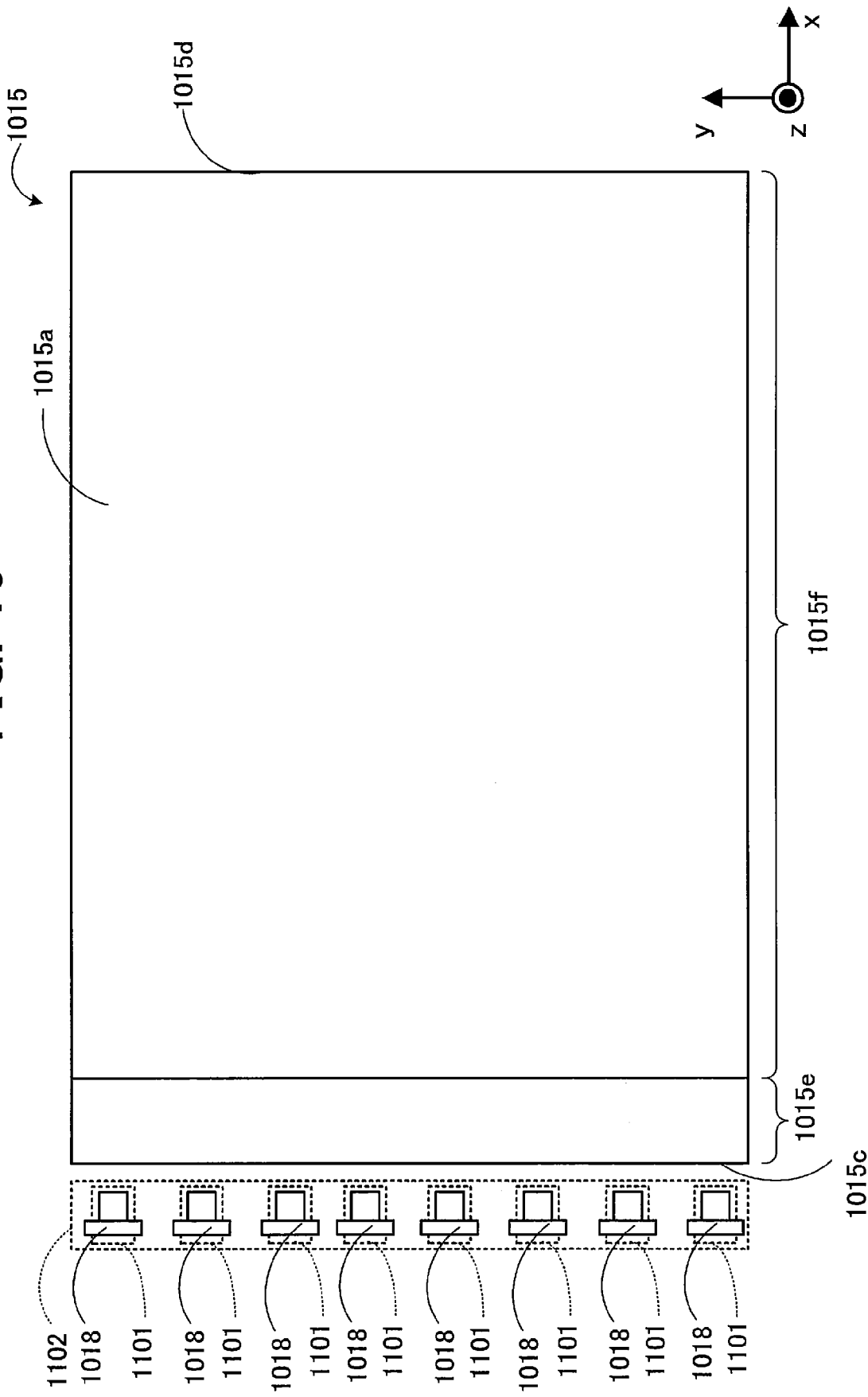
FIG. 19 is a schematic plan view of the surface light source device illustrated in FIG. 18 when viewed from a side of a liquid crystal panel.
Figure 20:
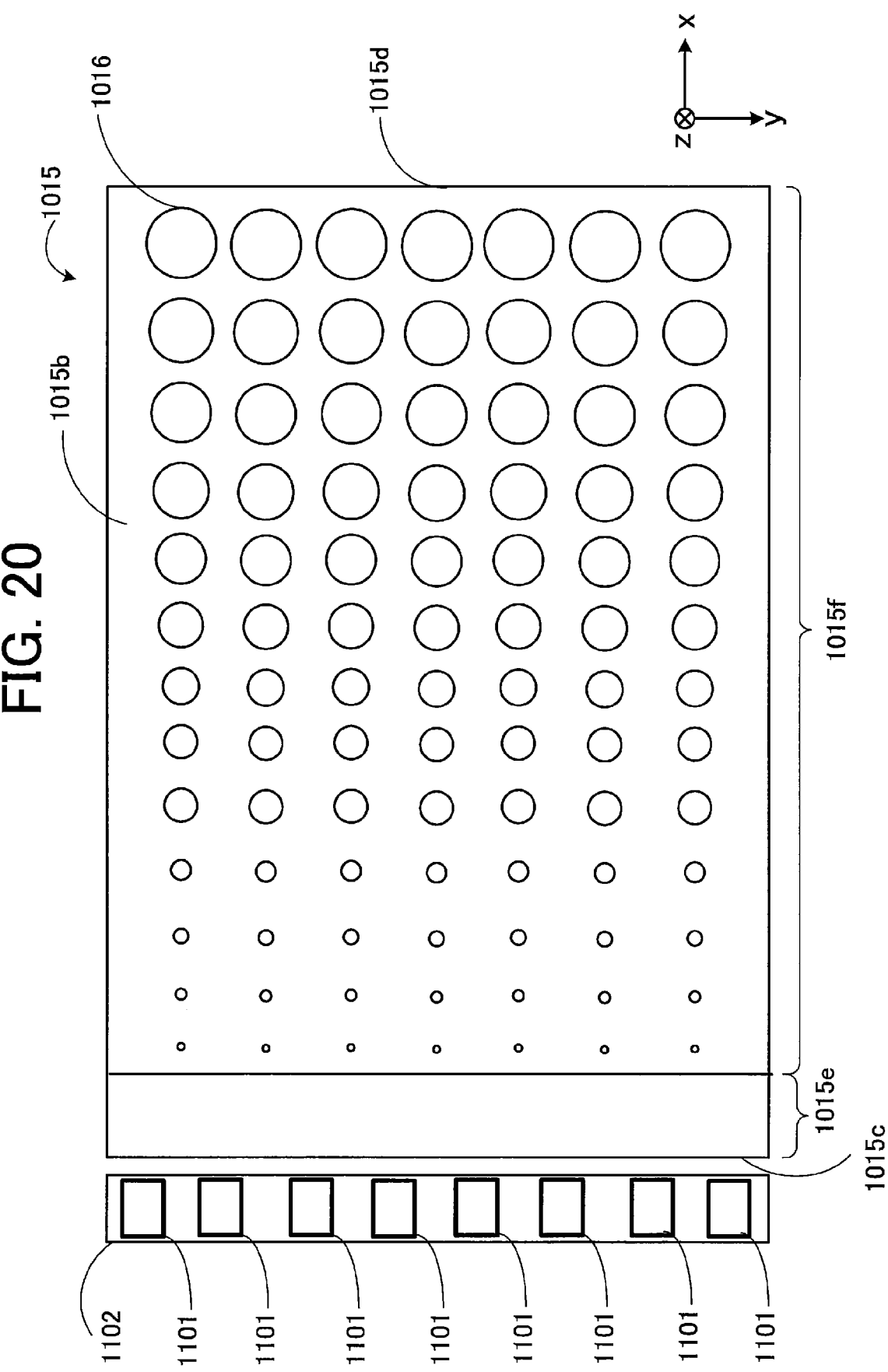
FIG. 20 is a schematic rear view of the surface light source device illustrated in FIG. 18 when viewed from a side of a rear surface of the liquid crystal display apparatus.

FIG. 18 is a cross-sectional view schematically illustrating structure of a liquid crystal display apparatus 3001 (including a surface light source device 1100) in a sixth embodiment. The surface light source device 1100 includes a surface light-emitting light-guiding plate 1015, a light-reflecting sheet 1017, a diffusing-reflecting member 1102, a first light source 1018 and a second light source 1101. A surface light source device 1110 includes the surface light-emitting light-guiding plate 1015, the light-reflecting sheet 1017, a diffusing-reflecting member 1112, the first light source 1018 and a second light source 1111. FIG. 19 is a schematic plan view of the surface light source device 1100 illustrated in FIG. 18 when viewed from a side of a liquid crystal panel 1011 (a positive z-axis direction); and FIG. 20 is a schematic rear view of the surface light source device 1100 illustrated in FIG. 15 when viewed from a rear surface of the liquid crystal display apparatus 3001 (a negative z-axis direction).

The liquid crystal display apparatus 3001 is a transmission type liquid crystal display apparatus that includes the liquid crystal display element (liquid crystal panel) 1011. The liquid crystal display element (liquid crystal panel) 1011 has a rectangular-shaped display surface 1011a and a rear surface 1011b on its opposite side. For convenience of explanation, coordinate axes of an xyz orthogonal coordinate system are illustrated in each figures. In the following explanation, a short-side direction of the display surface 1011a of the liquid crystal panel 1011 is defined as a y-axis direction (a direction perpendicular to a sheet on which FIG. 18 is depicted), a long-side direction of the display surface 1011a of the liquid crystal panel 1011 is defined as an x-axis direction (right-and-left directions in FIG. 18), and a direction perpendicular to an xy-plane is defined as a z-axis direction (up-and-down directions in FIG. 18). Furthermore, in FIG. 18, a direction from the left to the right is defined as a positive direction of an x-axis (a positive x-axis direction) and its opposite direction is defined as a negative direction of the x-axis (a negative x-axis direction). A direction from a front in a sheet on which FIG. 18 is depicted to the sheet is defined as a positive direction of a y-axis (a positive y-axis direction) and its opposite direction is defined as a negative direction of the y-axis (a negative y-axis direction). Moreover, in FIG. 18, a direction from the bottom to the top is defined as a positive direction of a z-axis (a positive z-axis direction) and its opposite direction is defined as a negative direction of the z-axis (a negative z-axis direction).

As illustrated in FIG. 18, the liquid crystal display apparatus 3001 in the sixth embodiment includes the transmission type liquid crystal panel 1011, a first optical sheet 1012, a second optical sheet, and the surface light source device 1100 as a backlight unit for illuminating the rear surface 1011b of the liquid crystal panel 1011 with light through the second optical sheet 1013 and the first optical sheet 1012. These elements 1011, 1012, 1013 and 1100 are arranged in the negative z-axis direction in this order.

The liquid crystal display element 1 in the first to fifth embodiments is the same as the liquid crystal display element 1011 in the sixth embodiment. The first optical sheet 2 in the first to fifth embodiments is the same as a first optical sheet 1012 in the sixth embodiment. The second optical sheet 3 in the first to fifth embodiments is the same as a second optical sheet 1013 in the sixth embodiment. The surface light-emitting light-guiding plate 4 in the first to fifth embodiments is the same as the surface light-emitting light-guiding plate in the sixth embodiment regarding their components, except for a mixing region 1015e of the surface light-emitting light-guiding plate out of the components of the surface light-emitting light-guiding plate 1015 in the sixth embodiment. The light-reflecting sheet 5 in the first to fifth embodiments is the same as the light-reflecting sheet 1017 in the sixth embodiment.

The display surface 1011a of the liquid crystal panel 1011 is a surface parallel to the xy-plane. A liquid crystal layer of the liquid crystal panel 1011 has planar structure extending in a direction parallel to the xy-plane. The display surface 1011a of the liquid crystal panel 1011 usually has a rectangular shape and two adjacent sides of the display surface 1011a (in the sixth embodiment, a short side of the y-axis direction and a long side in the x-axis direction) are orthogonal to each other. However, the display surface 1011a may have another shape.

As illustrated in FIG. 18, the surface light source device 1100 includes the thin-plate-shaped surface light-emitting light-guiding plate 1015, the first light source 1018, the second light source 1101 and the diffusing-reflecting member 1102. The diffusing-reflecting member 1102 has a function as an optical-path changing member.

The first light source 1018 emits a first light ray L11 from a light-emitting part. The light-emitting part of the first light source 1018 is disposed to face a light incident surface (a side surface) 1015c of the surface light-emitting light-guiding plate 1015. The first light source 1018 is a light source device that includes a plurality of light-emitting diode (LED) elements arranged at regular intervals in the y-axis direction, for example. It is desirable that the first light source 1018 be arranged within a range of a length of the light incident surface 1015c in the z-axis direction. The range of the length of the light incident surface 1015c in the z-axis direction indicates a range of a thickness of the surface light-emitting light-guiding plate 1015. FIG. 18 illustrates a case where the first light ray L11 emitted from the first light source 1018 directly enters the light incident surface 1015c of the surface light-emitting light-guiding plate 1015. However, the first light ray L11 may enter the light incident surface 1015c through another optical element such as a lens.

The second light source 1101 is disposed on a side of a rear surface 1015b of the surface light-emitting light-guiding plate 1015 (the negative z-axis direction). The side of the rear surface 1015b is a position opposed to a light-exiting surface 1015a of the surface light-emitting light-guiding plate 1015. The light-exiting surface 1015a is a light-exiting surface of the surface light-emitting light-guiding plate 1015. The second light source 1101 is a light source that includes a plurality of laser light-emitting elements arranged at regular intervals in the y-axis direction, for example. A light-emitting part of the second light source 1101 that emits a second light ray L12 is disposed to face a diffusing light-reflecting surface 1102a of the diffusing-reflecting member 1102.

The diffusing light-reflecting surface 1102a of the diffusing-reflecting member 1102 is disposed to face the light incident surface 1015c of the surface light-emitting light-guiding plate 1015. The diffusing light-reflecting surface 1102a of the diffusing-reflecting member 1102 has a plurality of random fine minute rise-and-fall shapes (pits and projections). For this reason, the light ray impinging on the diffusing light-reflecting surface 1102a of the diffusing-reflecting member 1102 changes its traveling direction (propagation direction) to a direction toward the light incident surface 1015c of the surface light-emitting light-guiding plate 1015. Furthermore, the light ray impinging on the diffusing light-reflecting surface 1102a changes its traveling direction at random. In other words, the light ray impinging on the diffusing light-reflecting surface 1102a is diffused and reflected at the diffusing light-reflecting surface 1102a. The diffusing light-reflecting surface 1102a of the diffusing-reflecting member 1102 is formed by forming random pits and projections on a surface of an acrylic resin (e.g., PMMA (polymethyl methacrylate)) by blasting and then depositing aluminum on its surface. However, the structure of the diffusing light-reflecting surface 1102a of the diffusing-reflecting member 1102 is not limited to this. As base materials of the cylindrical mirror 1502 and the light-reflecting mirror 1503, a resin or a metal with high processability such as an acrylic resin (e.g., PMMA) and a polycarbonate resin can be used. The light-reflecting surface can be formed by a layer of aluminum, gold or silver, for example. The diffusing light-reflecting surface 1102a may use a resin with high processability such as a polycarbonate resin or a metal as a base material of the diffusing-reflecting member 1102. As the metal film deposited on the diffusing light-reflecting surface 1102a of the diffusing-reflecting member 1102, another metal with high reflectivity, such as silver and gold, may be used. Furthermore, as the diffusing light-reflecting surface 1102a of the diffusing-reflecting member 1102, for example, structure in which a plurality of beads that have different sizes are coated on a surface of the base material and then disposed a metal film such as silver on its surface. Moreover, the diffusing-reflecting member 1102 may be a reflecting film including a polyester base material, in which a form structure is formed. In this case, by optimizing the surface pits and projections structure or the form structure inside the base material, high diffusing-reflecting performance can be obtained. In addition, these diffusing-reflecting members 1102 are simple and inexpensive members, and high image quality improvement effects can be obtained by simple structure at a low cost.

Figure 21:
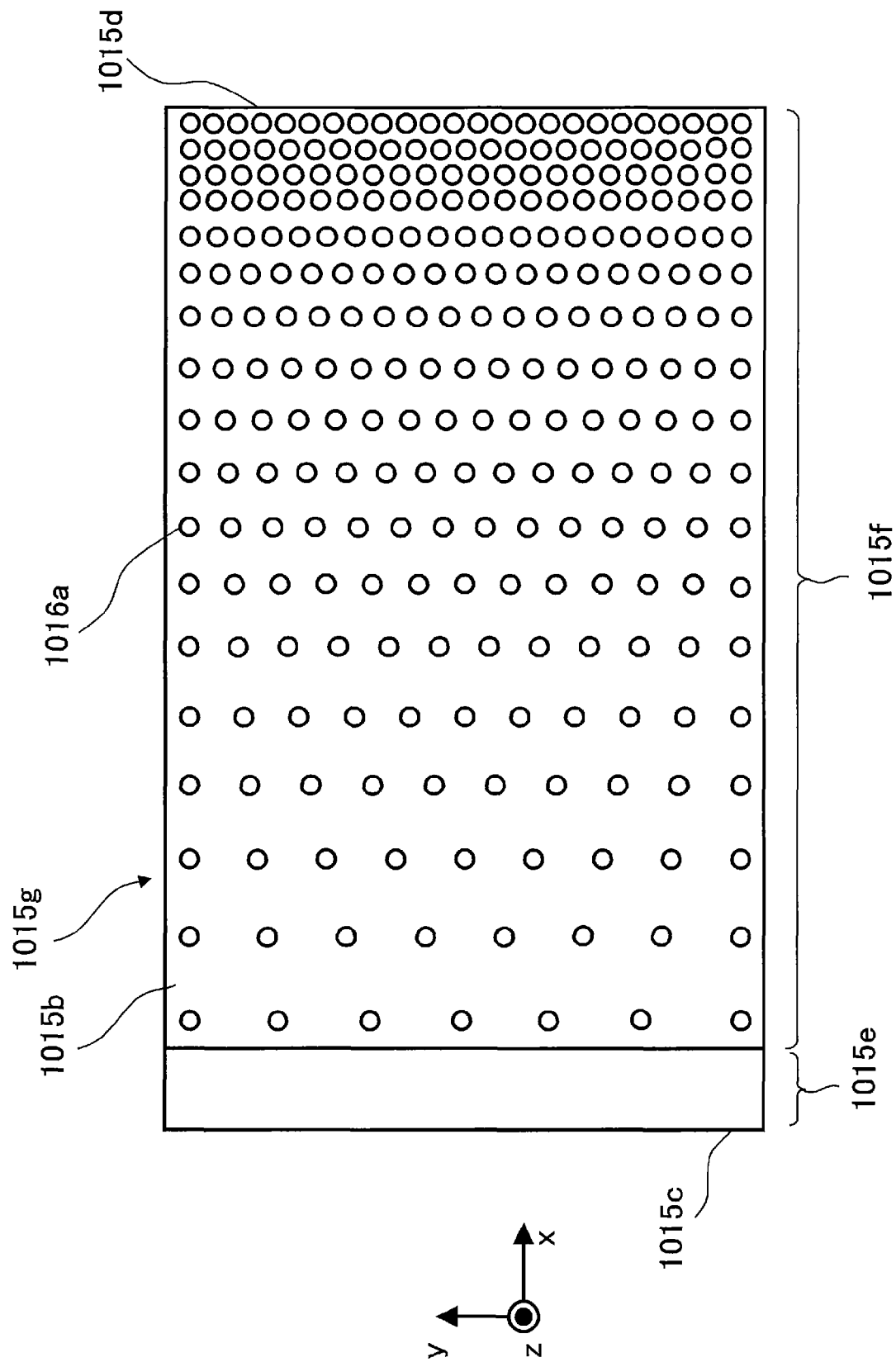
FIG. 21 is a plan view schematically illustrating another example of microscopic optical elements of a surface light-emitting light-guiding plate of the surface light source device illustrated in FIG. 18.

The surface light-emitting light-guiding plate 1015 includes the light-exiting surface 1015a, the rear surface 1015b on a side opposite to the light-exiting surface 1015a and a plurality of side surfaces (such as 1015c and 1015d, for example). The side surface is a long and narrow surface which joins a side of the light-exiting surface 1015a and a side of the rear surface 1015b. The surface light-emitting light-guiding plate 1015 is a transparent optical member. The surface light-emitting light-guiding plate 1015 has a plurality of microscopic optical elements 1016 arranged on the rear surface 1015b. The surface light source device 1100 includes the light-reflecting sheet 1017. The light-reflecting sheet 1017 is disposed to face the rear surface 1015b of the surface light-emitting light-guiding plate 1015. The microscopic optical element 1016 has a function of directing a light ray that enters through the light incident surface 1015c to the light-exiting surface 1015a of the surface light-emitting light-guiding plate 1015. The light incident surface 1015c is a side surface of the surface light-emitting light-guiding plate 1015. In a region where an area occupied by the microscopic optical elements 1016 is large, the amount of illumination light L14 that travels toward the light-exiting surface 1015a of the surface light-emitting light-guiding plate 1015 increases. The region where an area occupied by the microscopic optical elements 1016 is large is a region where the microscopic optical element 1016 has a large diameter or a region where an arrangement density of the microscopic optical elements 1016 is high, for example. Therefore, it is desirable that an arrangement, the number and shapes of the microscopic optical elements 1016 be determined so that an area occupied by the microscopic optical elements 1016 on the rear surface 1015b of the surface light-emitting light-guiding plate 1015 is larger as a distance from the light incident surface 1015c of the surface light-emitting light-guiding plate 1015 increases. The arrangement, the number and the shapes of the microscopic optical elements 1016 illustrated in FIG. 18 and FIG. 20 are only an example. For example, as shown as microscopic optical elements 1016a in FIG. 21, other arrangement, other number and other shapes may be adopted so that an arrangement density of the microscopic optical elements 1016 is higher as a distance from the light incident surface 1015c of the surface light-emitting light-guiding plate 1015 increases.

The surface light-emitting light-guiding plate 1015 is disposed so that the light-exiting surface 1015a is parallel to the display surface 1011a of the liquid crystal panel 1011. The surface light-emitting light-guiding plate 1015 includes the mixing region 1015e. The mixing region 1015e is a region having a predetermined length (e.g., 10 mm) from the light incident surface 1015c toward a center of the surface light-emitting light-guiding plate 1015. The center of the surface light-emitting light-guiding plate 1015 from the light incident surface 1015c is at the positive x-axis direction in FIG. 18. In the mixing region 1015e, the front surface and the rear surface of the surface light-emitting light-guiding plate 1015 have no optical structure and border an air layer. Light that enters the mixing region (also referred to as a 'color mixing region') 1015e through the light incident surface 1015c travels (propagates) in the positive x-axis direction while totally reflected at an interface with the air layer. The interface with the air layer indicates a surface of the mixing region on a side of the light-exiting surface 1015a and a surface of the mixing region on a side of the rear surface 1015b.

The surface light-emitting light-guiding plate 1015 has the microscopic optical elements 1016 on the rear surface 1015b and in a region 1015f excluding the mixing region 1015e. The region 1015f excluding the mixing region 1015e is a light-guiding region. The rear surface 1015b is a surface on a side opposite to the liquid crystal panel 1011. The microscopic optical element 1016 has a function of changing a mixed light ray L13 into the illumination light L14. The mixed light ray L13 is light that propagates inside the surface light-emitting light-guiding plate 1015. The illumination light L14 is light emitted in a substantially positive z-axis direction. The illumination light L14 is emitted from the surface light-emitting light-guiding plate 1015 toward the rear surface 1011b of the liquid crystal panel 1011.

The surface light-emitting light-guiding plate 1015 is a part made of a transparent material such as an acrylic resin (e.g., PMMA) or other materials, for example. The surface light-emitting light-guiding plate 1015 is a thin-plate-shaped member of 4 mm in thickness in the z-axis direction, for example. As illustrated in FIG. 20, on the rear surface 1015*b* of the surface light-emitting light-guiding plate 1015, the plurality of microscopic optical elements 1016 are provided. The microscopic optical element 1016 is a semispherical convex-lens-shaped element projecting in the negative z-axis direction.

The mixed light ray L13 is totally reflected at the interface between the surface light-emitting light-guiding plate 1015 and the air layer. Then, the mixed light ray L13 propagates inside the surface light-emitting light-guiding plate 1015. The mixed light ray L13 travels in the positive x-axis direction while repeatedly reflected. However, if the mixed light ray L13 enters the microscopic optical element 1016, it is reflected on a curved surface of the microscopic optical element 1016 to change its traveling direction. When the traveling direction of the mixed light ray L13 is changed, some part of the mixed light ray L13 cannot satisfy a totally reflecting condition at the interface between a front surface of the surface light-emitting light-guiding plate 1015 and the air layer. When the light ray does not satisfy the totally reflecting condition, the light ray exits through the front surface of the surface light-emitting light-guiding plate 4 toward the back surface 1011*b* of the liquid crystal panel 1011.

The first light ray L11 and the second light ray L12 enter at the light incident surface 1015*c* of the surface light-emitting light-guiding plate 1015. The first light ray L11 is emission light from the first light source 1018. The second light ray L12 is emission light from the second light source 1101. The first light source 1018 emits the first light ray L11 toward the light incident surface 1015*c*. The second light source 1101 is disposed on a side of the rear surface 1015*b* as compared with the first light source 1018. The second light source 1101 emits the second light ray L12 having a narrower angular intensity distribution than that of the first light ray L11. The diffusing-reflecting member 1102 has a function of guiding the second light ray L12 emitted from the second light source 1101 toward the light incident surface 1015*c*. The diffusing-reflecting member 1102 has a function as an optical-path changing member. Furthermore, the diffusing-reflecting member 1102 may be configured to have a function of bringing a size in a cross section of the second light ray L12 at the light incident surface 1015*c* closer to a size in a cross section of the first light ray L11 at the light incident surface 1015*c*. The size in a cross section indicates a length of the light incident surface 1015*c* in the z-axis direction, i.e., a thickness of the surface light-emitting light-guiding plate 1015. Furthermore, both of the first light ray L11 emitted from the first light source 1018 and the second light ray L12 emitted from the second light source 1101 enter an inside of the surface light-emitting light-guiding plate 1015 through the light incident surface 1015*c*. In other words, the first light ray L11 and the second light ray L12 enter through the light incident surface 1015*c* which is the same side surface out of the plurality of side surfaces. More specifically, the diffusing-reflecting member 1102 has a function of changing an angular intensity distribution of the second light ray L12 so as to make an angular intensity distribution of the second light ray L12 immediately before entering the light incident surface 1015*c* closer to an angular intensity distribution of the first light ray L11 immediately before entering the light incident surface 1015*c*. The diffusing-reflecting member 1102 has a function of changing an angular intensity distribution of the second light ray L12 and a function of changing a traveling direction of the second light ray L12. The diffusing-reflecting member 1102 as the optical-path changing member guides the second light ray L12 emitted from the second light source 1101 toward the light incident surface 1015*c*.

The first light ray L11 emitted from the first light source 1018 is a bluish-green-color light ray, for example. The second light ray L12 emitted from the second light source 1101 is a red-color light ray, for example. The first light ray L11 is emitted from the first light source 1018 in a substantially positive x-axis direction (a right direction in FIG. 18) toward the light incident surface 1015*c* of the surface light-emitting light-guiding plate 1015. The second light ray L12 is emitted from the second light source 1101 in the substantially positive z-axis direction, is diffused and reflected by the light-reflecting surface 1102*a* of the diffusing-reflecting member 1102, and then travels in the substantially positive x-axis direction toward the light incident surface 1015*c* of the surface light-emitting light-guiding plate 1015. Both of the first light ray L11 and the second light ray L12 enter the light incident surface 1015*c* of the surface light-emitting light-guiding plate 1015. The first light ray L11 and the second light ray L12 are mixed in the mixing region 1015*e* and become the mixed light ray L13. The mixing region 1015*e* is disposed near the light incident surface 1015*c* in the surface light-emitting light-guiding plate 1015. The mixed light ray L13 is a white-color light ray, for example.

The microscopic optical element 1016 has a function of changing the mixed light ray L13 into the illumination light L14. The microscopic optical elements 1016 are provided on the rear surface 1015*b* of the surface light-emitting light-guiding plate 1015. The illumination light L14 travels in the substantially positive z-axis direction and travels toward the 1011*b* of the liquid crystal panel 1011. The illumination light L14 passes through a second optical sheet 1013 and a first optical sheet 1012 and the rear surface 1011*b* of the liquid crystal panel 1011 is illuminated with the illumination light L14. The first optical sheet 1012 has a function of directing the illumination light L14 to the rear surface 1011*b* of the liquid crystal panel 1011. The second optical sheet 1013 has a function of reducing optical effects such as minute illumination unevenness by the illumination light L14. The illumination light L14 is illumination light emitted through the light-exiting surface 1015*a* of the surface light-emitting light-guiding plate 1015.

As illustrated in FIG. 18, in the sixth embodiment, the diffusing-reflecting member 1102 is inclined with reference to a direction parallel to the light incident surface 1015*c* of the surface light-emitting light-guiding plate 1015 (z-axis direction in FIG. 18). The diffusing-reflecting member 1102 is disposed to be inclined so that the diffusing light-reflecting surface 1102*a* faces in the negative z-axis direction. The reasons of inclined arrangement are the following two reasons. The first reason is that when the second light source 1101 is disposed on a side of the negative z-axis direction from the surface light-emitting light-guiding plate 1015, the light L12 emitted from the second light source 1101 is applied to the diffusing light-reflecting surface 1102*a* with high efficiency. The second reason is that the light emitted from the diffusing light-reflecting surface 1102*a* enters through the light incident surface 1015*c* of the surface light-emitting light-guiding plate 1015 with high efficiency. The inclination of the diffusing-reflecting member 1102 is adopted to achieve both conditions described in the above two reasons. A positional relationship and an arrangement angle between the second light source 1101 and the diffusing light-reflecting surface 1102*a* of the diffusing-reflecting member 1102 and a positional relationship and an arrangement angle between the diffusing-reflecting member 1102 and the surface light-emitting light-guiding plate 1015 are set according to an angular intensity distribution of the second light ray L12 emitted from the second light source 1101, a size (diameter) of the second light ray L12, diffusion characteristics of the diffusing-reflecting member 1102, a thickness of the surface light-emitting light-guiding plate 1015 and so on. Accordingly, if each conditions is different, it is necessary to optimize the positional relationship and the arrangement angle of each members. The arrangement angle means a rotation angle about a center which is the y-axis when each members is arranged.

An arrangement density of the microscopic optical elements 1016 varies according to a position in the xy-plane on the surface light-emitting light-guiding plate 1015. The arrangement density means the number of the microscopic optical elements 1016 per unit area or the area (size) occupied by the microscopic optical elements 42 per unit area. An in-plane luminance distribution of the illumination light L14 can be controlled by changing the arrangement density of the microscopic optical elements 1016. The illumination light L14 is light emitted from the surface light-emitting light-guiding plate 1015. Furthermore, the in-plane luminance distribution means a distribution that indicates a level of luminance at a position two-dimensionally expressed on an arbitrary plane. Here, the "in-plane" indicates a display surface.

A radius of curvature of a convex surface of the microscopic optical element 1016 is approximately 0.15 mm, and a maximum height of the microscopic optical element 1016 is approximately 0.005 mm. Furthermore, a refractive index of the microscopic optical element 1016 is approximately 1.49. Moreover, materials of the surface light-emitting light-guiding plate 1015 and the microscopic optical element 1016 may be an acrylic resin. However, the materials of the surface light-emitting light-guiding plate 1015 and the microscopic optical element 1016 are not limited to the acrylic resin. The materials of the surface light-emitting light-guiding plate 1015 and the microscopic optical element 1016 may be other resin materials that have a high light transmissivity and have excellent formability and processability. For example, other resin materials such as a polycarbonate resin may be used instead of the acrylic resin. Alternatively, glass materials may be used as the materials of the surface light-emitting light-guiding plate 1015 and the microscopic optical element 1016. Furthermore, the thickness of the surface light-emitting light-guiding plate 4 is not limited to 4 mm. From the viewpoint of thinning and lightweighting of the liquid crystal display apparatus 3001, it is desirable that the surface light-emitting light-guiding plate 1015 that is thin in thickness be used.

Furthermore, the shape of the microscopic optical element 1016 is not limited to the convex-lens shape. The shape of the microscopic optical element 1016 may be a member having a function of reflecting the mixed light ray L13 to direct it in the positive z-axis direction so that the mixed light ray L13 exits toward the back surface 1011b of the liquid crystal panel 1011. The mixed light ray L13 is light that travels in the x-axis direction inside the surface light-emitting light-guiding plate 1015. As long as the microscopic optical element 1016 has such function, it may have other shapes. For example, the surface light-emitting light-guiding plate 1016 may have a prism-shape or a random pits and projections pattern or the like.

In the sixth embodiment, a width of the diffusing-reflecting member 1102 in the zx-plane is 1.5 mm. The second light ray L12 emitted from the laser light-emitting element in the second light source 1101 has an angular intensity distribution of 5 degrees at full angle at half maximum. Since the second light ray L12 has high directivity, even if it freely propagates a distance between the second light source 1101 and the diffusing-reflecting member 1102, a width of the second light ray L12 in the zx-plane is not extended. The "freely propagates" means that light does not enter a material such as an optical element but propagates through air. Therefore, if a width of the diffusing-reflecting member 1102 in the zx-plane is set to be small, light loss of the second light ray L12 can be suppressed. Furthermore, if the diffusing-reflecting member 1102 is downsized, the thickness of the surface light-emitting light-guiding plate 1015 can be thinned in thickness and a depth of the liquid crystal display apparatus can be reduced.

In a case where the LED elements are used as the first light source 1018, the first light ray L11 generally has a wide divergence angle. An angular intensity distribution of the first light ray L11 is 60 degrees at full angle at half maximum. The first light ray L11 emitted from the first light source 1018 enters through the light incident surface 1015c of the surface light-emitting light-guiding plate 1015 without changing its angular intensity distribution.

In a case where laser light-emitting elements are used as the second light source 1101, the second light ray L12 generally has high directivity. An angular intensity distribution of the second light ray L12 is 5 degrees at full angle at half maximum. The second light ray L12 emitted from the second light source 1101 is diffused by the diffusing-reflecting member 1102. An angle of the angular intensity distribution of the second light ray L12 is extended to a substantially equal angle to the angular intensity distribution of the first light ray L11 emitted from the first light source 1018, and thereafter the second light ray L12 enters through the light incident surface 1015c of the surface light-emitting light-guiding plate 1015.

The microscopic optical elements 1016 are disposed in the region 1015f on the rear surface of the surface light-emitting light-guiding plate 1015. The region 1015f is a region from a position away from the light incident surface 1015c at an arbitrary distance to the side surface 1015d. The arbitrary length is a length of the mixing region 1015e in the x-axis direction. The microscopic optical elements 1016 are provided on the rear surface 1015b of the surface light-emitting light-guiding plate 1015. The region 1015f where the microscopic optical elements 1016 are arranged on the rear surface 1015b of the surface light-emitting light-guiding plate 1015 is substantially the same as an effective image display region of the liquid crystal panel 1011. However, it may be a little larger than the effective image display region of the liquid crystal panel 1011. It is desirable that a center position of the region 1015f where the microscopic optical elements 1016 on the rear surface 1015b of the surface light-emitting light-guiding plate 1015 be the same position as a center position of the effective image display region (a region parallel to the xy-plane) of the liquid crystal panel 1011 or a position near the center position of the effective image display region of the liquid crystal panel 1011. By such structure, the illumination light L14 emitted through the light-exiting surface 1015a of the surface light-emitting light-guiding plate 1015 is applied to the whole region of the effective image display region of the liquid crystal panel 1011. Therefore, a viewer that views the display surface 1011a of the liquid crystal panel 1011 can see an image without image loss within the display surface 1011a. The effective image display region means a region on which a real image is displayed. Furthermore, the image loss described above indicates a state in which the whole of the effective image display region of the liquid crystal panel 1011 is not illuminated with the uniform light and is not displayed when the center position of the effective image region of the liquid crystal panel 1011 and the center position of the region 1015*f* of the surface light-emitting light-guiding plate 1015 are different from each other. Especially, if the effective image display region of the liquid crystal panel 1011 is arranged so as to cover an upper position of the mixing region 1015*e* of the surface light-emitting light-guiding plate 1015, no light exits from this region (the mixing region 1015*e*) toward the liquid crystal panel direction and an image cannot be displayed.

The light-reflecting sheet 1017 is disposed to face the rear surface 1015*b* of the surface light-emitting light-guiding plate 1015. Light emitted through the rear surface 1015*b* of the surface light-emitting light-guiding plate 1015 is reflected at the light-reflecting sheet 1017, enters the surface light-emitting light-guiding plate 1015 through the rear surface 1015*b*, is emitted through the light-exiting surface 1015*a* of the surface light-emitting light-guiding plate 1015, and is used as the illumination light L14 with which the rear surface 1011*b* of the liquid crystal panel 1011 is illuminated. As the light-reflecting sheet 1017, a light-reflecting sheet whose base material is a resin such as a polyethylene terephthalate may be used, for example. As the light-reflecting sheet 1017, a light-reflecting sheet that is obtained by depositing a metal on a surface of a substrate can be also used.

Figure 22:
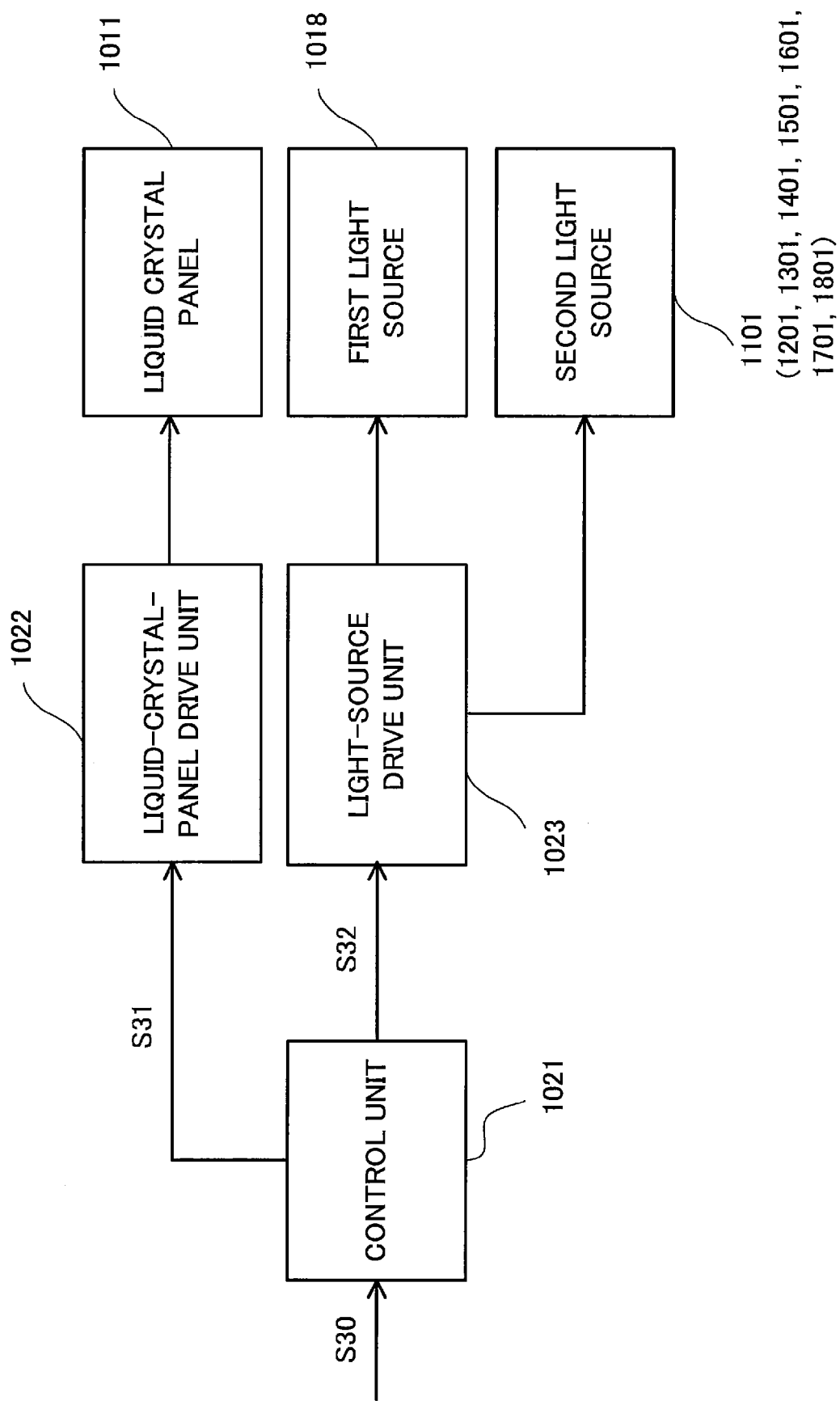
FIG. 22 is a block diagram schematically illustrating a configuration of a control system of the liquid crystal display apparatus according to the sixth embodiment.

FIG. 22 is a block diagram illustrating a configuration of a control system of the liquid crystal display apparatus 3001 in the sixth embodiment. As illustrated in FIG. 22, the liquid crystal display apparatus 3001 includes the liquid crystal panel 1011, a liquid-crystal-panel drive unit 1022, the first light source 1018, the second light source 1101, a light-source drive unit 1023 and a control unit 1021. The liquid-crystal-panel drive unit 1022 drives the liquid crystal panel 1011. The light-source drive unit 1023 drives the first light source 1018 and the second light source 1101. The control unit 1021 controls operations of the liquid-crystal-panel drive unit 1022 and operations of the light-source drive unit 1023. The control unit 1021 performs image processing on an input video signal S30. The control unit 1021 generates a liquid-crystal-panel control signal S31 on the basis of the input video signal S30. The control unit 1021 supplies the liquid-crystal-panel control signal S31 to the liquid-crystal-panel drive unit 1022. The control unit 1021 generates a light-source control signal S32 on the basis of the input video signal S30. The control unit 1021 supplies the light-source control signal S32 to the light-source drive unit 1023. The liquid-crystal-panel drive unit 1022 drives the liquid crystal panel 1011 on the basis of the liquid-crystal-panel control signal S31 to display a video on the liquid crystal panel 1011.

The liquid-crystal-panel drive unit 1022 changes a light transmissivity of the liquid crystal layer of the liquid crystal panel 1011 in units of pixels on the basis of the liquid-crystal-panel control signal S31 received from the control unit 1021. Each pixel of the liquid crystal panel 1011 has three sub-pixels (first to third sub-pixels) in red (R), green (G) and blue (B), for example. The red sub-pixel is used as the first sub-pixel, the green sub-pixel is used as the second sub-pixel, and the blue sub-pixel is used as the third sub-pixel, for example. The first sub-pixel has a color filter which passes only red-color light, the second sub-pixel has a color filter which passes only green-color light and the third sub-pixel has a color filter which passes only blue-color light. The control unit 1021 makes the liquid-crystal-panel drive unit 1022 control the light transmissivity of each pixel in the liquid crystal panel 1011, thereby making the liquid crystal panel 1011 display a color image. In other words, the liquid crystal panel 1011 produces image light by spatially modulating the illumination light L14 from the surface light-emitting light-guiding plate 1015 and the image light is emitted through the display surface 1011*a*. The image light indicates light having image information. The light-source drive unit 1023 drives the first light source 1018 and the second light source 1101 on the basis of the light-source control signal S32 to adjust luminance of a video displayed on the liquid crystal panel 1011.

If the first light ray L11 and the second light ray L12 having different angular intensity distributions enter the same the surface light-emitting light-guiding plate 1015 and exit from the light-exiting surface 1015*a*, color unevenness appears on the display surface 1011*a* due to a difference between in-plane luminance distributions. This is because the angular intensity distributions of the first light ray L11 and the second light ray L12 are different and the first light source 1018 and the second light source 1101 emit light of different colors from each other. In other words, light rays of different colors (the first light ray L11 and the second light ray L12) have different angular intensity distributions from each other. However, in the sixth embodiment, an extremely narrow angular intensity distribution of the second light ray L12 is extended by the diffusing-reflecting member 1102 and is made to be closer to an angular intensity distribution of the first light ray L11. Therefore, occurrence of color unevenness on the display surface 1011*a* is suppressed. The second light ray L12 is a light ray emitted from the second light source 1101 that uses the laser light-emitting elements. The first light ray L11 is a light ray emitted from the first light source 1018 that uses the LED elements.

After entering the light incident surface 1015*c* of the surface light-emitting light-guiding plate 1015, both of the first light ray L21 and the second light ray L22 propagate the mixing region 1015*e*, thereby being mixed with each other to become the white-color light L13. Then, the white-color light L13 is emitted from the surface light-emitting light-guiding plate 1015 toward the liquid crystal panel 1011 by the microscopic optical elements 1016. The first light ray L11 is a cyan-color light ray. The second light ray L12 is a red-color light ray. The mixing region 1015*e* is provided near the light incident surface 1015*c* of the surface light-emitting light-guiding plate 1015. In the sixth embodiment, light rays of each color (i.e., the first light ray L11 and the second light ray L12) with similar angular intensity distributions enter the surface light-emitting light-guiding plate 1015. Thus, the illumination light L14 emitted from the surface light-emitting light-guiding plate 1015 can emit white-color planar light without color unevenness in the xy-plane. The control unit 1021 can control the light-source drive unit 1023 to adjust a ratio between luminance of the first light ray L11 and luminance of the second light ray L12.

If the color purity of a displayed color in the liquid crystal display apparatus 3001 need be improved in order to extend a color reproduction range, a width of a transmission wavelength band of a color filter of the liquid crystal display panel 1011 should be set to a narrow one. However, if the width of the transmission wavelength band is set to the narrow one, a transmitted light amount of the transmitted light ray decreases. For this reason, when the color purity of the displayed color is intended to be improved, a problem occurs that the brightness decreases due to the decrease of the transmitted light amount. Furthermore, in fluorescent lamps that are conventionally used, a peak of an emission spectrum of a red-color region is within an orange-color wavelength region. Likewise, in white-color LED elements using a yellow-color fluorescent substance, a peak of an emission spectrum of a red-color region is within the orange-color wavelength region. In other words, a peak of wavelengths of a red-color region is deviated from the red-color region and is located within an orange-color region. Especially, if the color purity of red-color is intended to be improved, the transmitted light amount of the color filter is extremely reduced and therefore the brightness decreases excessively.

In the liquid crystal display apparatus 3001 in the sixth embodiment, the first light source 1018 has the LED element that emits the bluish-green-color first light ray L11. The bluish-green-color first light ray L11 is a mixture of blue-color light and green-color light. Furthermore, the second light source 1101 has the single-color-laser light-emitting element that emits the red-color second light ray L12. A spectrum of the second light ray L12 has a peak of approximately 640 nm, for example. Moreover, a wavelength width of the second light ray L12 is 1 nm at full width at half maximum and very narrow and has high color purity. Thus, by using the red-color laser light-emitting element, the second light source 1101 can improve the color purity of red-color. In other words, the liquid crystal display apparatus 3001 can extend a color reproduction range of the displayed color.

Although in the sixth embodiment, a case where the second light source 1101 has the laser light-emitting element having a peak of approximately 640 nm was described, the present invention is not limited to this. If the second light source 1101 uses a red-color laser light-emitting element having shorter wavelength, visibility with respect to the wavelength increases. For this reason, a ratio of brightness to input electrical power can be increased and therefore an effect of reducing the electrical power consumption can be obtained. Furthermore, if the red-color laser light-emitting element having a longer wavelength is used, the color reproduction range can be extended and a bright image can be presented. The laser light-emitting element that has an extremely narrow spectral width and can improve the color purity has an extremely narrow angle intensity distribution. In the surface light source device that configures the white-color surface light source from the laser light-emitting element and the LED element having a wide angle intensity distribution, there is a problem of color unevenness due to the narrow angular intensity distribution of the laser light. However, in the surface light source device 1100 of the liquid crystal display apparatus 3001 in the sixth embodiment, since the second light ray L12 passes the diffusing-reflection plate 1102, an angular intensity distribution of the second light ray L12 is extended to the same level of an angular intensity distribution of the first light ray L11. Therefore, a surface light source without color unevenness can be obtained. The second light ray L12 is a laser light ray emitted from the second light source 1101 formed by the laser elements. The first light ray L11 is an LED light ray emitted from the first light source 1018 formed by the LED elements.

In some cases, the illumination light L14 is reflected by the first optical sheet 1012, the second optical sheet 1013 and the like and travels in the negative z-axis direction. The illumination light L14 is light emitted from the surface light-emitting light-guiding plate 1015 toward the liquid crystal panel 1011. In order to achieve high brightness and low electrical power consumption, it is necessary to use these reflected light rays as the illumination light for the liquid crystal panel 1011 again. The liquid crystal display apparatus 3001 in the sixth embodiment includes the light-reflecting sheet 1017 on a side of the negative z-axis direction from the surface light-emitting light-guiding plate 1015. The light-reflecting sheet 1017 directs the reflected light traveling in the negative z-axis direction to the positive z-axis direction again. This enables the liquid crystal display apparatus 3001 to use light efficiently.

(6-2) Operations of Sixth Embodiment

While the surface light source device 1100 is turned on, a light ray is emitted from each of the first light source 1018 and the second light source 1101.

The first light ray L11 emitted from the first light source 1018 (e.g., cyan-color) travels in a direction toward the light incident surface 1015c of the surface light-emitting light-guiding plate 1015 (the substantially positive x-axis direction).

The second light ray L12 (e.g., red-color) emitted from the second light source 1101 is applied to the diffusing light-reflecting surface 1102a of the diffusing-reflecting member 1102, an angular intensity distribution of the second light ray L12 at full angle at half maximum is increased, and a traveling direction is changed to a direction toward the light incident surface 1015c of the surface light-emitting light-guiding plate 1015 (the substantially positive x-axis direction).

The first light ray L11 and the second light ray L12 that enter through the light incident surface 1015c of the surface light-emitting light-guiding plate 1015 propagates inside the mixing region 1015e, thereby being mixed to produce white-color light. Then, the first light ray L11 and the second light ray L12 are reflected at the microscopic optical elements 1016, reflected at the light-reflecting sheet 1017 and the like, and thereafter exits from the light-exiting surface 1015a of the surface light-emitting light-guiding plate 1015 as the planar illumination light L14 toward the liquid crystal panel 1011. The mixing region 1015e is provided near the light incident surface 1015c of the surface light-emitting light-guiding plate 1015. In the sixth embodiment, light rays of each color (i.e., the first light ray L11 and the second light ray L12) with the similar angular intensity distributions propagates inside the surface light-emitting light-guiding plate 1015. Thus, the illumination light L14 emitted from the surface light-emitting light-guiding plate 1015 becomes substantially uniform white-color planar light without color unevenness in a plane parallel to the xy-plane. Furthermore, the control unit 1021 can adjust luminance and color of the light-exiting surface 1015a by controlling the light-source drive unit 1023 to adjust a ratio between luminance of the first light ray L11 and luminance of the second light ray L12.

(6-3) Effects of Sixth Embodiment

As described above, the surface light source device 1100 in the sixth embodiment includes the first light source 1018, the second light source 1101 and the diffusing-reflecting member 1102. The first light source 1018 is disposed in a position which faces the light incident surface (the side surface) 1015c of the surface light-emitting light-guiding plate 1015. The second light source 1101 is disposed at a position on a side of the rear surface 1015b with reference to the light incident surface 1015c of the surface light-emitting light-guiding plate 1015. The diffusing-reflecting member 1102 has a function as the optical-path changing member that guides the second light ray L12 to the light incident surface 1015c. Thus, according to the surface light source device 1100 in the sixth embodiment, by using the diffusing-reflecting member 1102 as the optical-path changing member, a traveling direction of the second light ray L12 is changed to a direction toward the light incident surface 1015c of the surface light-emitting light-guiding plate 1015. Therefore, in comparison with a conventional structure where two kinds of the light sources arranged in a thickness direction of the surface light-emitting light-guiding plate are disposed to face the light incident surface of the surface light-emitting light-guiding plate, thickness of the surface light-emitting light-guiding plate 1015 can be reduced.

Figure 23:
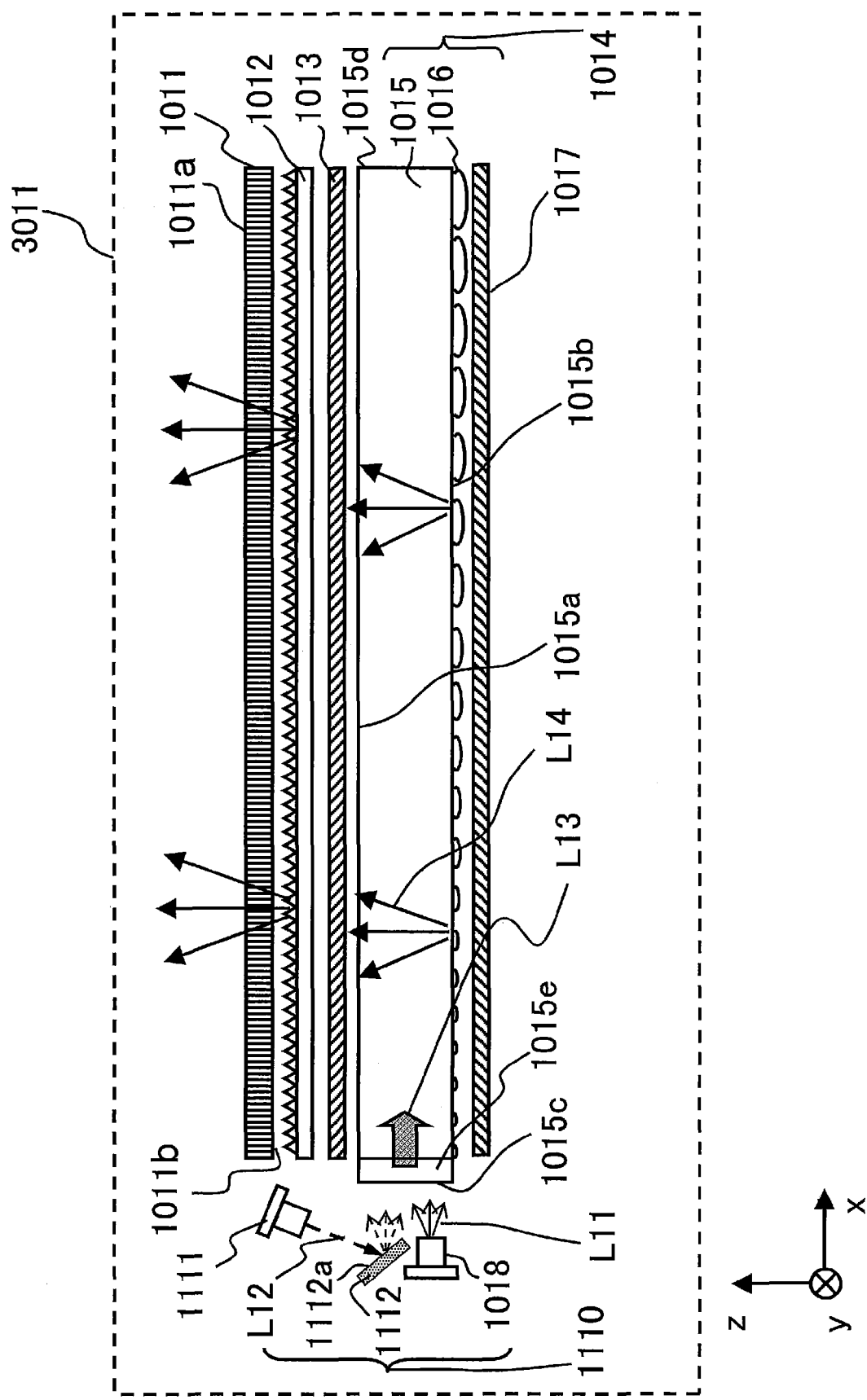
FIG. 23 is a cross-sectional view schematically illustrating an example of structure of a liquid crystal display apparatus (including a surface light source device) according to a modified example of the sixth embodiment of the present invention.
Figure 50:
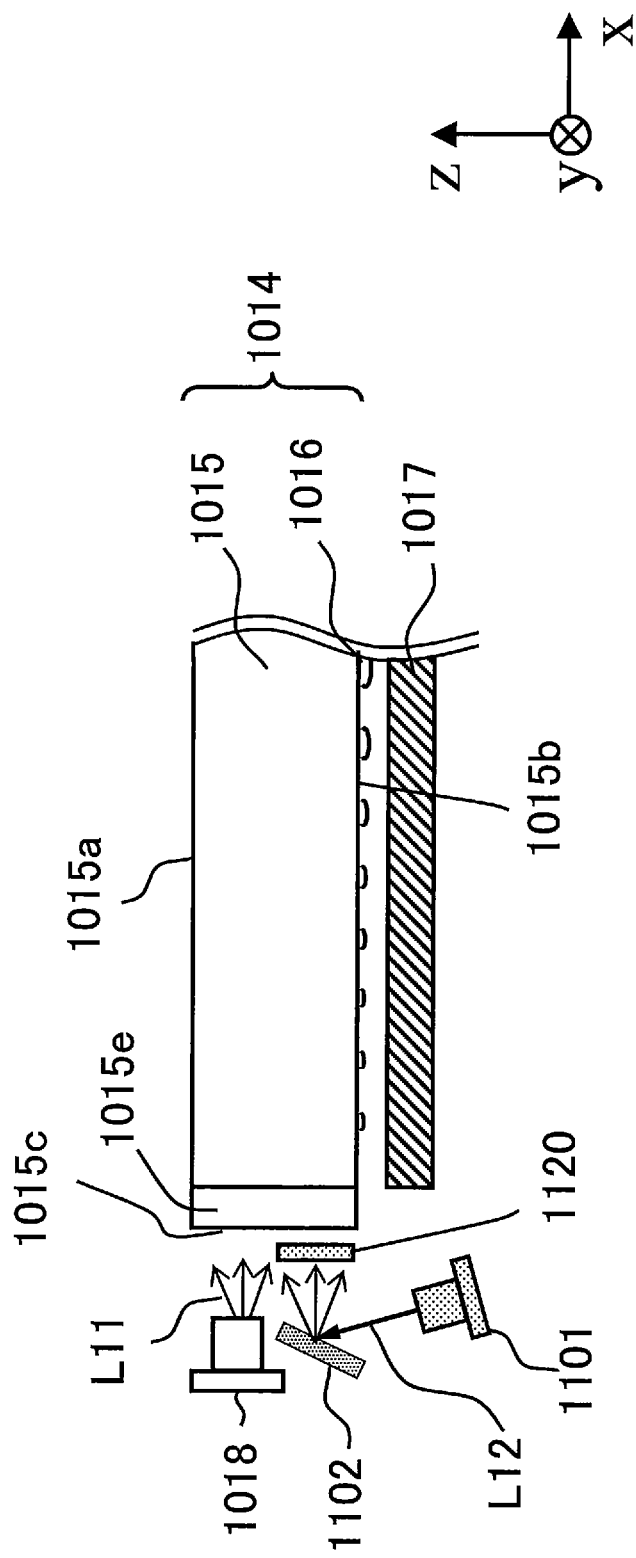
FIG. 50 is a cross-sectional view schematically illustrating another example of structure of a liquid crystal display apparatus (including a surface light source device) in a modified example of the sixth embodiment.

In FIG. 18, a structure in which the second light source 1101 is disposed on a side of the rear surface 1015b (a side of the negative z-axis direction) of the surface light-emitting light-guiding plate 1015 as compared with the first light source 1018 is illustrated. However, the present invention is not limited to this. As illustrated in FIG. 23, in the surface light source device 1110, the second light source 1111 is disposed on a side of the positive z-axis direction as compared with the first light source 1018. In other words, in the surface light source device 1110, the second light source 1111 is disposed on a side of the front surface 1015a of the surface light-emitting light-guiding plate 1015. Furthermore, in the surface light source device 1110, the diffusing-reflecting member 1112 is disposed at an adequate position on a side of the positive z-axis direction as compared with the first light source 1018. In other words, in the surface light source device 1110, the diffusing-reflecting member 1112 is disposed at an adequate position on a side of the front surface of the light incident surface 1015c as compared with the first light source 1018. Furthermore, a diffusing element 1120 may be disposed between the diffusing-reflecting member 1102 and the surface light-emitting light-guiding plate 1015 as illustrated in FIG. 50.

Moreover, the surface light source device 1100 in the sixth embodiment makes an angular intensity distribution of the second light ray L12 immediately before entering the light incident surface 1015c of the surface light-emitting light-guiding plate 1015 closer to an angular intensity distribution of the first light ray L11 immediately before entering the light incident surface 1015c. For this purpose, the surface light source device 1100 includes the cylindrical mirror 1102. The cylindrical mirror 1102 has a function of changing a traveling direction and an angular intensity distribution of the second light ray L12. Thus, the surface light source device 1100 in the sixth embodiment increases the angular intensity distribution of the second light ray L12 so as to be closer to the angular intensity distribution of the first light ray L11, by using the cylindrical mirror 1102. This suppresses a difference between an in-plane luminance distribution of plane-shaped illumination light which is emitted through the light-exiting surface 1015a after the first light ray L11 passes through the surface light-emitting light-guiding plate 1015 and an in-plane luminance distribution of plane-shaped illumination light which is emitted through the light-exiting surface 1015a after the second light ray L12 likewise passes through the surface light-emitting light-guiding plate 1015. This enables the surface light source device 1100 to reduce color unevenness.

Furthermore, the liquid crystal display apparatus 3001 that includes the surface light source device 1100 in the sixth embodiment can be thinned because the thickness of the surface light-emitting light-guiding plate 1015 is reduced. Moreover, the liquid crystal display apparatus 3001 that includes the surface light source device 1100 in the sixth embodiment can reduce color unevenness in the surface light source device 1100. Therefore, it can reduce color unevenness on the display surface 1011a of the liquid crystal panel 1011 and achieve image quality improvement.

According to the sixth embodiment, the control unit 1021 controls the light-source drive unit 1023 to adjust luminance of the second light ray L12 and luminance of the first light ray L11. The control unit 1021 adjusts a light-emitting amount from each of the light sources on the basis of the video signal S30. This enables the liquid crystal display apparatus 3001 to reduce power consumption.

Moreover, by using at least one kind of laser light-emitting elements for the light source in the liquid crystal display apparatus, it is possible to provide an image with an extended color reproduction region, in bright colors and without color unevenness.

Furthermore, the first light source 1018 is disposed on the side surface of the surface light-emitting light-guiding plate 1015 and the second light source 1901 is disposed on a side of the rear surface 1015b of the surface light-emitting light-guiding plate 1015 and therefore, a local temperature rise at the periphery due to heat emitted by the respective light sources can be relieved. This can suppress a decrease in light emission efficiency of the light sources due to the ambient temperature rise.

In the above explanation, the liquid crystal display apparatus 3001 and the surface light source device 1100 in the sixth embodiment uses a configuration where light emitted from the two light sources which are disposed in different positions enters through a short-side end surface of the surface light-emitting light-guiding plate 1015 (the light incident surface 1015c). However, by appropriately changing an arrangement of the first light source 1018 and the second light source 1101, a position of the diffusing-reflecting member 1102, an arrangement of the microscopic optical elements 1016, a shape of the microscopic optical element 1016 and the like, it is possible to use a long-side end surface the surface light-emitting light-guiding plate 1015 as the light incident surface.

Moreover, in the liquid crystal display apparatus 3001 and the surface light source device 1100 in the sixth embodiment, the first light source 1018 and the second light source 1101 are separate components. Thus, the light-source drive unit 1023 can individually control outputs from the first light source 1018 and the second light source 1101 on the basis of an image signal. This enables to reduce power consumption. Moreover, the liquid crystal display apparatus 3001 can reduce stray light and improve contrast. The stray light means light that follows an optical path other than a normal optical path in optical equipment and light harmful to a desired use.

(6-4) Modified Example of Sixth Embodiment

The liquid crystal display apparatus 3001 in the sixth embodiment is configured to include bluish-green-color LED elements as the first light source 1018 and red-color laser light-emitting elements as the red-color light source 1101. However, the present invention is not limited to this. For example, the present invention can be applied to a liquid crystal display apparatus including a plurality of different light sources, that is, an apparatus including at least one type of light source having a wide angle intensity distribution and at least another one type of light source having a narrow angle intensity distribution.

For example, a configuration in which the first light source 1018 includes a fluorescent lamp for emitting bluish-green-color light and the second light source 1101 includes red-color laser light-emitting elements to generate white-color can be adopted. Furthermore, a configuration in which the first light source 1018 includes blue-color and red-color LED elements and the second light source 1101 includes green-color laser light-emitting elements to generate white-color can be adopted.

Moreover, it is possible to use green-color LED elements for the first light source 1018 and use blue-color laser light-emitting elements and red-color laser light-emitting elements for the second light source 1101.

Although a case where the surface light source device 1100 is used as the backlight unit in the liquid crystal display apparatus 3001 is explained above, the surface light source device may be used for another use such as for illumination.

(7) Seventh Embodiment (7-1) Structure of Seventh Embodiment

Figure 24:
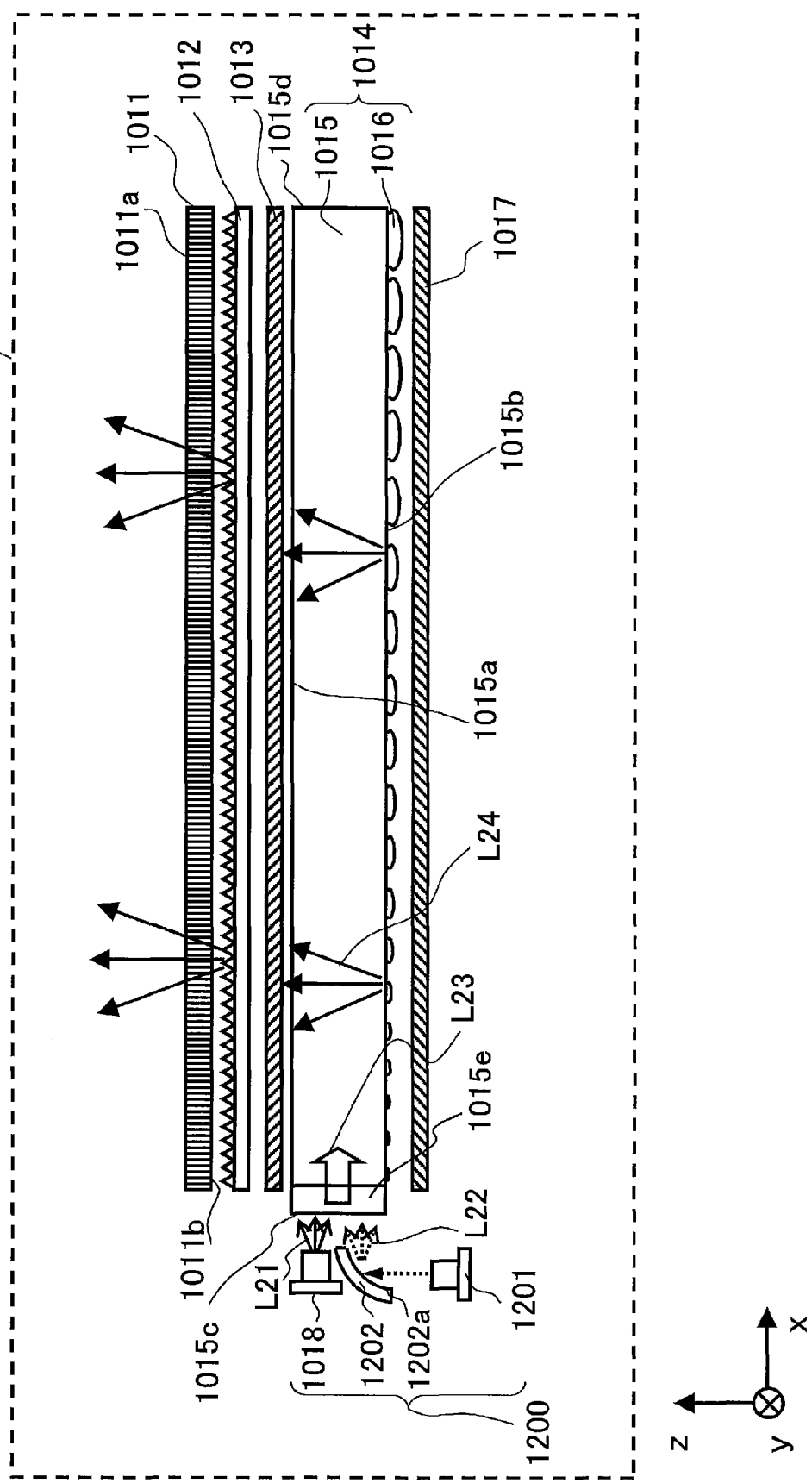
FIG. 24 is a cross-sectional view schematically illustrating an example of structure of a liquid crystal display apparatus (including a surface light source device) according to a seventh embodiment of the present invention.
Figure 25:
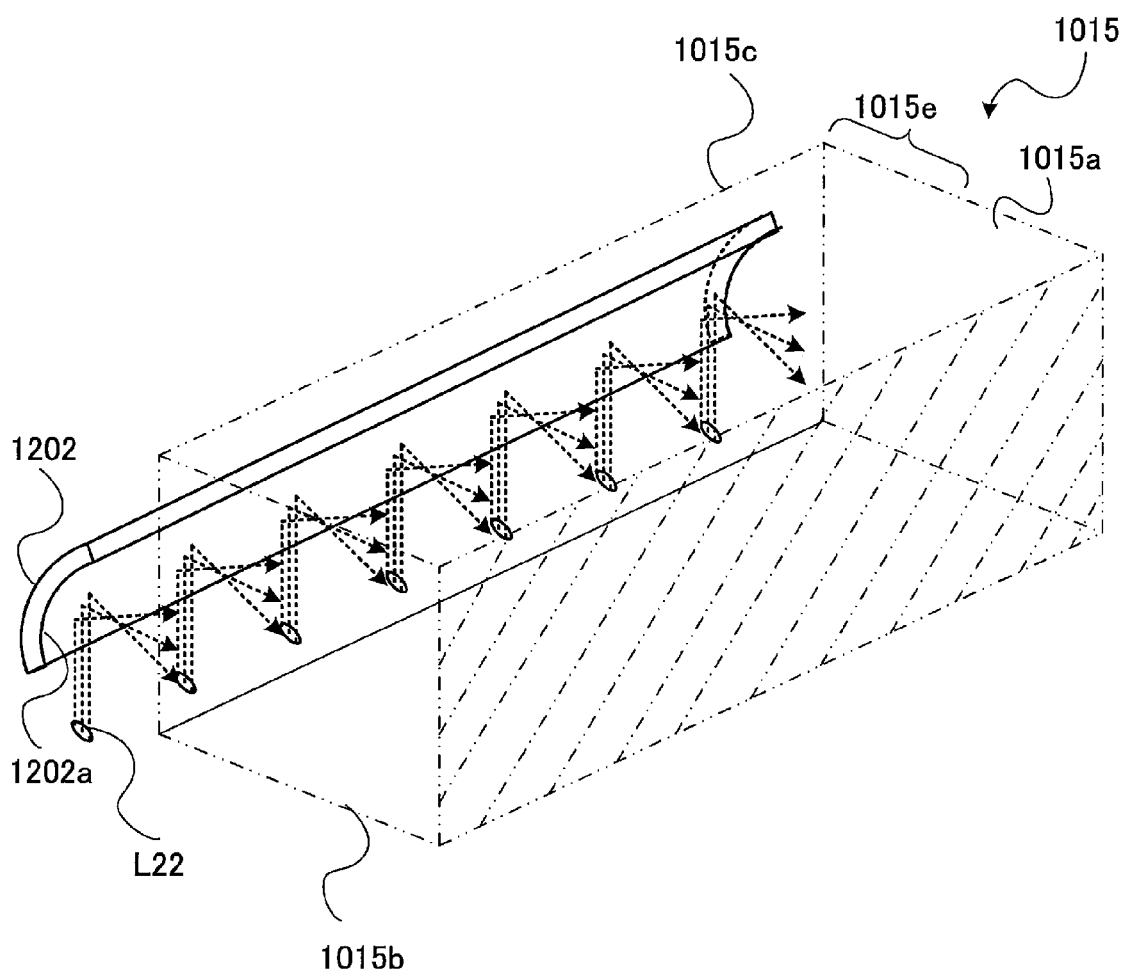
FIG. 25 is a perspective view schematically illustrating an example of structure of a light-reflecting member in the surface light source device illustrated in FIG. 24.

FIG. 24 is a cross-sectional view schematically illustrating structure of a liquid crystal display apparatus 3002 (including a surface light source device 1200) in a seventh embodiment. The surface light source device 1200 includes a surface light-emitting light-guiding plate 1015, a light-reflecting sheet 1017, a cylindrical mirror 1202, a first light source 1018 and a second light source 1201. A surface light source device 1300 includes the surface light-emitting light-guiding plate 1015, the light-reflecting sheet 1017, a light-reflecting member 1302, the first light source 1018 and a second light source 1301. A surface light source device 1400 includes the surface light-emitting light-guiding plate 1015, the light-reflecting sheet 1017, a light-reflecting mirror 1402, the first light source 1018 and a second light source 1401. A surface light source device 1500 includes the surface light-emitting light-guiding plate 1015, the light-reflecting sheet 1017, a cylindrical mirror 1502, a light-reflecting mirror 1503, the first light source 1018 and a second light source 1501. FIG. 25 is a perspective view schematically illustrating structure of the cylindrical mirror 1202 as a light-reflecting member in the surface light source device 1200 illustrated in FIG. 24. Reference characters in FIG. 24 and FIG. 25 that are the same as those in FIG. 18 indicate the same or corresponding elements. The liquid crystal display apparatus 3002 and the surface light source device 1200 in the seventh embodiment differ from the liquid crystal display apparatus 3001 and the surface light source device 1100 in the sixth embodiment in a point that the second light source 1201 and the cylindrical mirror 1202 are included as a substitute for the second light source 1101 and the diffusion-reflection member 1102 in the sixth embodiment. Except for a point that the second light source 1201 and the cylindrical mirror 1202 are changed, the liquid crystal display apparatus 3002 and the surface light source device 1200 in the seventh embodiment are the same as the liquid crystal display apparatus 3001 and the surface light source device 1100 in the sixth embodiment. In addition, although an arrangement of the second light source 1201 differs from that of the second light source 1101, there is no difference between them as the light sources and they are the same.

The first light source 1018 emits a first light ray L21. The first light ray L21 is bluish-green-color, for example. The second light source 1201 has the same structure as the second light source 1101 in the sixth embodiment. The second light source 1201 emits a second light ray L22. The second light ray L22 is red-color, for example. The first light ray L21 travels in a substantially positive x-axis direction from the first light source 1018 to a light incident surface 1015*c*. The second light ray L22 travels in a substantially positive z-axis direction from the second light source 1201. Then, the second light ray L22 is reflected by the cylindrical mirror 1202 and its traveling direction changes to the substantially positive x-axis direction. The cylindrical mirror 1202 can be configured to have a function of making a size of a cross section of the second light ray L22 on the light incident surface 1015*c* closer to a size of a cross section of the first light ray L21 on the light incident surface 1015*c*. The size of the cross section is defined as a length of the light incident surface 1015*c* in the z-axis direction, i.e., a thickness of the surface light-emitting light-guiding plate 1015. Both of the first light ray L21 and the second light ray L22 enter through the light incident surface 1015*c* of the surface light-emitting light-guiding plate 1015. The first light ray L21 and the second light ray L22 are mixed in a mixing region 1015*e* to become white-color mixed light ray L23. The mixing region 1015*e* is a region near the light incident surface 1015*c* in the surface light-emitting light-guiding plate 1015.

As illustrated in FIG. 24 and FIG. 25, a light-reflecting surface 1202*a* of the cylindrical mirror 1202 has a cross section taken along a plane parallel to the zx-plane and the cross section has a shape like a circular arc with the light-reflecting surface 1202*a* shaped like a concave. The shape like a circular arc with the light-reflecting surface 1202*a* shaped like a concave means a shape like a circular arc whose inside is directed toward the light incident surface 1015*c* of the surface light-emitting light-guiding plate 1015. The cylindrical mirror 1202 is a first light-reflecting member. The plane parallel to the zx-plane denotes a plane orthogonal to a longitudinal direction of the light incident surface 1015*c* of the surface light-emitting light-guiding plate 1015 (the y-axis direction). Moreover, the light-reflecting surface 1202*a* has a cross section taken along a plane parallel to the xy-plane and the cross section has a shape like a line extending in a longitudinal direction (the y-axis direction). The plane parallel to the xy-plane is a plane parallel to a light-exiting surface 1015*a* of the surface light-emitting light-guiding plate 1015. The light-reflecting surface 1202*a* has a cross section taken along a plane parallel to the zx-plane and the cross section has a shape of a concave-shaped surface. The light-reflecting surface 1202*a* faces the light incident surface 1015*c* of the surface light-emitting light-guiding plate 1015. In the example illustrated in FIG. 24 and FIG. 25, the light-reflecting surface 1202*a* of the cylindrical mirror 1202 includes the light-reflecting surface 1202*a* shaped like a 1/n cylinder which is a divided part of a cylinder when divided by n at a plane parallel to an axis direction (y-axis direction), where n is a value larger than 1. Here, the cylinder also includes a shape of a tube whose cross section is an ellipse. On the light-reflecting surface 1202*a* which is the concave-shaped inside surface of the cylindrical mirror 1202, a metal-film layer which reflects light is disposed. Tangential directions at the respective positions on the light-reflecting surface 1202*a* are different according to positions. For this reason, when parallel light having a certain size enters through the light-reflecting surface 1202*a* of the cylindrical mirror 1202, it is reflected by the light-reflecting surface 1202*a* of the cylindrical mirror 1202 at an emission angle which varies according to an incident position. The parallel light having a certain size denotes a light flux. In addition, although the light-reflecting surface 1202*a* of the cylindrical mirror 1202 is illustrated as the concave-shaped reflection surface in FIG. 24, it can be configured as a convex-shaped reflection surface. Even if it is the convex-shaped reflection surface, a light-ray diffusing effect can be obtained.

In the seventh embodiment, the second light source 1201 is disposed to face the light-reflecting surface 1202*a* of the cylindrical mirror 1202. Moreover, the light-reflecting surface 1202*a* of the cylindrical mirror 1202 is disposed to face the light incident surface 1015*c* of the surface light-emitting light-guiding plate 1015. The cylindrical mirror 1202 in the seventh embodiment has a shape like a ¼ ellipsoidal cylinder and its concave-shaped surface is the light-reflecting surface 1202*a*. The ellipse is defined as a set of points whose distances from two fixed points add to the same constant. A base material of the cylindrical mirror 1202 is an acrylic resin (e.g., PMMA) and the light-reflecting surface 1202*a* of the cylindrical mirror 1202 is a surface on which aluminum is deposited. However, the base material and the shape of the cylindrical mirror 1202 are not limited to this example. Another resin or metal with outstanding processability may be used for the base material, for example. Moreover, another metal with high reflectivity, such as silver and gold, may be used for the metal film deposited on the light-reflecting surface 1202*a*.

The liquid crystal display apparatus 3002 in the seventh embodiment is configured so that light emitted from the two light sources disposed in different positions enters through a short side surface (the light incident surface 1015*c*) of the surface light-emitting light-guiding plate 1015. However, by appropriately designing an arrangement of the light sources, a position of the cylindrical mirror 1102, an arrangement of microscopic optical elements 1016, and the like, it is possible to use a long surface of the surface light-emitting light-guiding plate 1015 as the light incident surface.

(7-2) Operations of Seventh Embodiment

While the surface light source device 1200 is turned on, a light ray is emitted from each of the first light source 1018 and the second light source 1201.

The first light ray L21 emitted from the first light source 1018 and having a wide angular intensity distribution directly enters the light incident surface 1015*c* of the surface light-emitting light-guiding plate 1015.

The second light ray L22 emitted from the second light source 1201 in the substantially positive z-axis direction enters through the light-reflecting surface 1202*a* of the cylindrical mirror 1202. The second light ray L22 emitted from the second light source 1201 has a narrow angular intensity distribution. A full angle of the second light ray L22 is 5 degrees, for example. In addition, the second light ray L22 has a certain size in the zx-plane. That the second light ray L22 has a certain size denotes that the second light ray L22 has a light flux diameter of a certain degree of thickness in the x-axis direction in FIG. 24. The second light ray L22 enters through the light-reflecting surface 1202*a* of the cylindrical mirror 1202 which has a curvature in the zx-plane. For this reason, the second light ray L22 is emitted from the cylindrical mirror 1202 at different angles, according to incident positions on the light-reflecting surface 1202*a*. In other words, when emitted from the second light source 1201, the second light ray L22 has an angular intensity distribution with a narrow full angle. The second light ray L22 passes through the cylindrical mirror 1202, thereby being converted to a light ray having an angular intensity distribution with a full angle which is as wide as that of the first light ray L21. The first light ray L21 is a light ray emitted from the first light source 1018. The second light ray L22 emitted from the cylindrical mirror 1202 enters through the light incident surface 1015*c* of the surface light-emitting light-guiding plate 1015.

After entering the light incident surface 1015*c* of the surface light-emitting light-guiding plate 1015, the first light ray L21 (e.g., bluish-green-color) and the second light ray L22 (e.g., red-color) propagate the mixing region 1015*e*, thereby being mixed with each other to become the white-color light (the mixed light ray) L23. The mixing region 1015*e* is a region disposed near the light incident surface 1015*c* of the surface light-emitting light-guiding plate 1015. Then, after reflection at the microscopic optical element 1016, reflection at the light-reflecting sheet 1017 and the like, the first light ray L21 and the second light ray L22 is emitted as planar illumination light L24 through the light-exiting surface 1015*a* of the surface light-emitting light-guiding plate 1015 toward the liquid crystal panel 1011. In the seventh embodiment, light rays in each color (i.e., the first light ray L21 and the second light ray L22) with the similar angular intensity distributions propagate inside the surface light-emitting light-guiding plate 1015. Thus, the illumination light L24 emitted from the surface light-emitting light-guiding plate 1015 becomes substantially uniformed white-color planar light without color unevenness in a plane parallel to the xy-plane. In addition, the control unit 1021 controls the light-source drive unit 1023 to adjust a ratio between luminance of the first light ray L21 and luminance of the second light ray L22 and thus luminance and color on the light-exiting surface 1015*a* can be adjusted.

(7-3) Effects of Seventh Embodiment

As described above, the surface light source device 1200 in the seventh embodiment includes the first light source 1018, the second light source 1201 and the cylindrical mirror 1202. The first light source 1018 is disposed in a position to face the light incident surface (side surface) 1015*c* of the surface light-emitting light-guiding plate 1015. The second light source 1201 is disposed in a position on a side of rear surface 1015*b* from the light incident surface 1015*c* of the surface light-emitting light-guiding plate 1015. The cylindrical mirror 1202 is a light-reflecting member that has a function as an optical-path changing member to guide the second light ray L22 to the light incident surface 1015*c*. Thus, according to the surface light source device 1200 in the seventh embodiment, a traveling direction of the second light ray L22 is changed by the cylindrical mirror 1202 to a direction toward the light incident surface 1015*c* of the surface light-emitting light-guiding plate 1015. Therefore, in comparison with a conventional structure where two kinds of the light sources arranged in a thickness direction of the surface light-emitting light-guiding plate are disposed to face the light incident surface of the surface light-emitting light-guiding plate, the thickness of the surface light-emitting light-guiding plate 1015 can be reduced.

Moreover, the surface light source device 1200 in the seventh embodiment makes an angular intensity distribution of the second light ray L22 immediately before entering the light incident surface 1015*c* of the surface light-emitting light-guiding plate 1015 closer to an angular intensity distribution of the first light ray L21 immediately before entering the light incident surface 1015*c*. For this purpose, the surface light source device 1200 includes the cylindrical mirror 1202. The cylindrical mirror 1202 has a function of changing the traveling direction and the angular intensity distribution of the second light ray L22. Thus, the surface light source device 1200 in the seventh embodiment increases the angular intensity distribution of the second light ray L22 so as to be closer to the angular intensity distribution of the first light ray L21, by using the cylindrical mirror 1202. This suppresses a difference between an in-plane luminance distribution of plane-shaped illumination light which is emitted through the light-exiting surface 1015*a* after the first light ray L21 passes through the surface light-emitting light-guiding plate 1015 and an in-plane luminance distribution of plane-shaped illumination light which is emitted through the light-exiting surface 1015*a* after the second light ray L22 likewise passes through the surface light-emitting light-guiding plate 1015. This enables the surface light source device 1200 to reduce color unevenness.

Moreover, because the thickness of the surface light-emitting light-guiding plate 1015 is reduced, the liquid crystal display apparatus 3002 in the seventh embodiment that includes the surface light source device 1200 can be thinned. Moreover, the liquid crystal display apparatus 3002 that has the surface light source device 1200 of the seventh embodiment can reduce color unevenness in the surface light source device 1200. Therefore, the liquid crystal display apparatus 3002 can reduce color unevenness on the display surface 1011*a* of the liquid crystal panel 1011 and can achieve image quality improvement.

In the seventh embodiment, by appropriately determining a curvature of the cylindrical mirror 1202, it is possible to control the angular intensity distribution of the second light ray L22 closely. Thus, equality of an angular intensity distribution of the first light source 1018 and an angular intensity distribution of the second light source 1201 can be improved. This makes it possible to provide high quality images on which color unevenness is further suppressed. Moreover, by appropriately determining the curvature of the cylindrical mirror 1202, it is possible to improve a ratio of a light amount of light entering the light incident surface 1015*c* of the surface light-emitting light-guiding plate 1015 to a light amount of emission light. Thus, power consumption reduction effect can be obtained.

The liquid crystal display apparatus 3002 in the seventh embodiment includes the light sources in two places, i.e., the side surface of the surface light-emitting light-guiding plate 1015 and the rear surface of the surface light-emitting light-guiding plate 1015. This enables the liquid crystal display apparatus 3002 to increase the number of light sources while an increase in thickness (size in the z-axis direction) is suppressed.

In the liquid crystal display apparatus 3002 in the seventh embodiment, the first light source 1018 and the second light source 1201 are separately disposed. Thus, it is easy for light-source drive unit 1023 to control the first light source 1018 and the second light source 1201 separately. The light-source drive unit 1023 can individually control outputs from the first light source 1018 and the second light source 1201 on the basis of an image signal. This can reduce power consumption. Moreover, stray light can be reduced and contrast can be improved. The 'stray light' means light that follows an optical path other than a normal optical path in optical equipment and light harmful to image formation.

(7-4) Another Example of Seventh Embodiment

Figure 26:
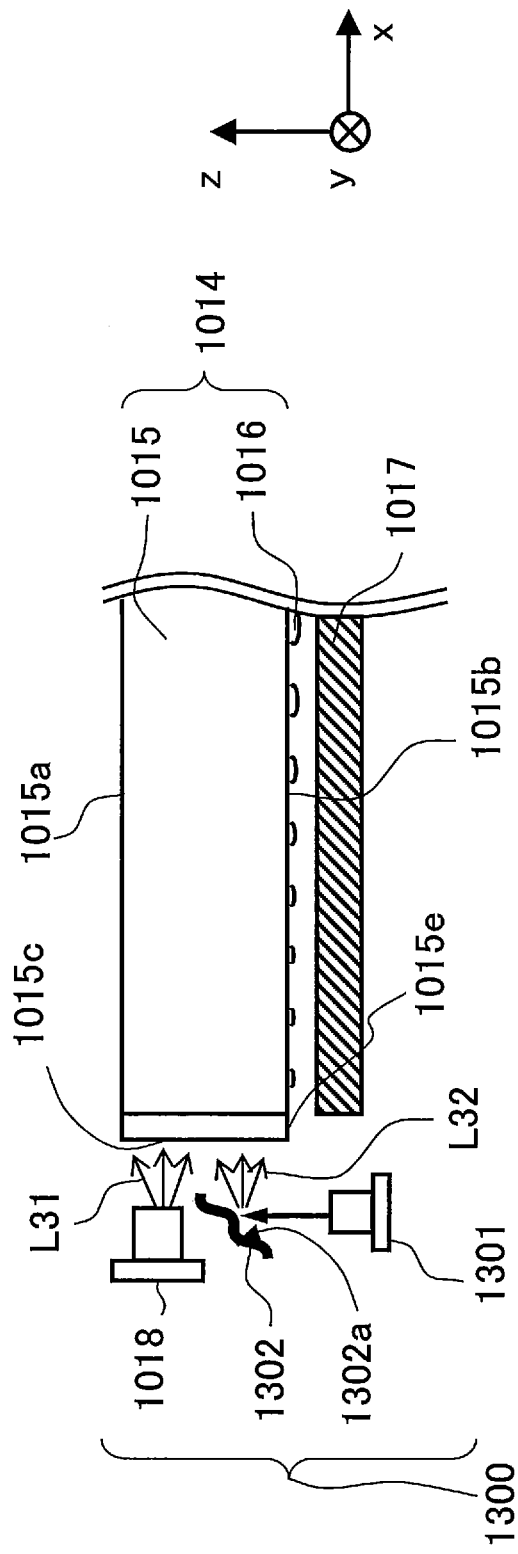
FIG. 26 is a cross-sectional view schematically illustrating another example of the light-reflecting member in the surface light source device in the liquid crystal display apparatus according to the seventh embodiment.
Figure 27:
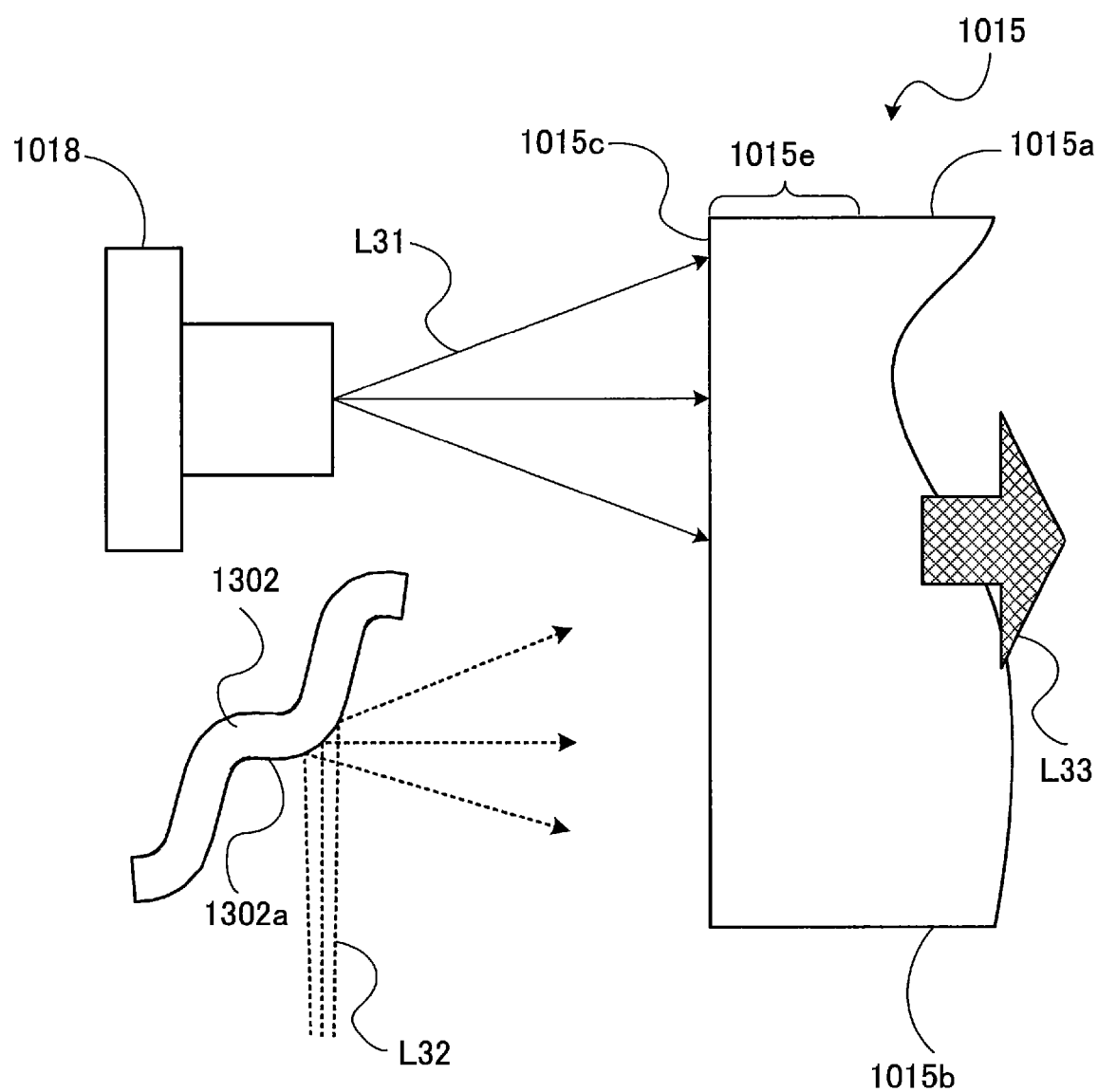
FIG. 27 is a cross-sectional view illustrating enlarged structure of the light-reflecting member in the surface light source device illustrated in FIG. 26.

FIG. 26 is a cross-sectional view schematically illustrating another example of the light-reflecting member 1302 in the surface light source device 1300 in the liquid crystal display apparatus in the seventh embodiment. FIG. 27 is a cross-sectional view illustrating enlarged structure of the light-reflecting member 1302 of the surface light source device 1300 illustrated in FIG. 26. Reference characters in FIG. 26 and FIG. 27 that are the same as those in FIG. 24 indicate the same or corresponding elements. The surface light source device 1300 illustrated in FIG. 26 and FIG. 27 differs from the surface light source device 1200 illustrated in FIG. 24 in a point that the second light source 1301 and the cross-sectional wave shaped light-reflecting mirror 1302 are included instead of the second light source 1201 and the cylindrical mirror 1202 illustrated in FIG. 24. The cross-sectional wave shape means a shape in which convex-shaped parts and concave-shaped parts are alternately continued. In other words, the light-reflecting member 1302 has a light-reflecting surface on which convex-shaped parts and concave-shaped parts are alternately continued. Except for the point that there is a difference in the second light source 1301 and the light-reflecting mirror 1302, the surface light source device 1300 illustrated in FIG. 26 and FIG. 27 is the same as the surface light source device 1200 illustrated in FIG. 24. In addition, although the second light source 1301 differs from the second light source 1201 in reference character, they are the same light sources.

In the surface light source device 1300 illustrated in FIG. 26 and FIG. 27, the second light source 1301 has the same structure as the second light source 1201 in FIG. 24. A second light ray L32 emitted from the second light source 1301 in the substantially positive z-axis direction enters through a light-reflecting surface 1302*a* of the light-reflecting mirror 1302. The second light ray L32 emitted from the second light source 1301 has a narrow angular intensity distribution. The angular intensity distribution of the second light ray L32 has a full angle half maximum of 5 degrees, for example. Moreover, the second light ray L32 has a certain size in the zx-plane. The size of the second light ray L32 denotes to have a light-flux diameter of a certain degree of thickness in the x-axis direction in FIG. 26. The second light ray L32 enters the light-reflecting surface 1302*a* of the light-reflecting mirror 1302 which has a curvature in the zx-plane. For this reason, the second light ray L32 is emitted from the light-reflecting mirror 1302 at different angles, according to its incident positions on the light-reflecting surface 1302*a*. In other words, the second light ray L32 having a narrow angular intensity distribution travels through the light-reflecting surface 1302*a* of the light-reflecting mirror 1302, thereby being converted to light having an angular intensity distribution as wide as that of a first light ray L31. The second light ray L32 is a light ray emitted from the second light source 1301. The first light ray L31 is a light ray emitted from the first light source 1018. The second light ray L32 emitted through the light-reflecting surface 1302*a* of the light-reflecting mirror 1302 enters through the light incident surface 1015*c* of the surface light-emitting light-guiding plate 1015.

According to the surface light source device 1300 as described above, a traveling direction of the second light ray L32 is changed by the cross-sectional wave-shaped light-reflecting mirror to a direction toward the light incident surface 1015*c* of the surface light-emitting light-guiding plate 1015. Therefore, in comparison with a conventional structure where two kinds of the light sources arranged in a thickness direction of the surface light-emitting light-guiding plate are disposed to face the light incident surface of the surface light-emitting light-guiding plate, the thickness of the surface light-emitting light-guiding plate 1015 can be reduced.

According to the surface light source device 1300, the angular intensity distribution of the second light ray L32 is increased so as to be closer to the angular intensity distribution of the first light ray L31. This suppresses a difference between an in-plane luminance distribution of plane-shaped illumination light which is emitted through the light-exiting surface 1015*a* after the first light ray L31 passes through the surface light-emitting light-guiding plate 1015 and an in-plane luminance distribution of plane-shaped illumination light which is emitted through the light-exiting surface 1015*a* after the second light ray L32 likewise passes through the surface light-emitting light-guiding plate 1015. This enables the surface light source device 1300 to reduce color unevenness.

Moreover, because the thickness of the surface light-emitting light-guiding plate 1015 is reduced, the liquid crystal display apparatus that includes the surface light source device 1300 in the seventh embodiment can be thinned. The liquid crystal display apparatus 3002 that includes the surface light source device 1300 can reduce color unevenness in the surface light source device 1300. Therefore, color unevenness on the display surface 1011*a* of the liquid crystal panel 1011 can be reduced and image quality improvement can be achieved.

(7-5) Further Another Example of Seventh Embodiment

Figure 28:
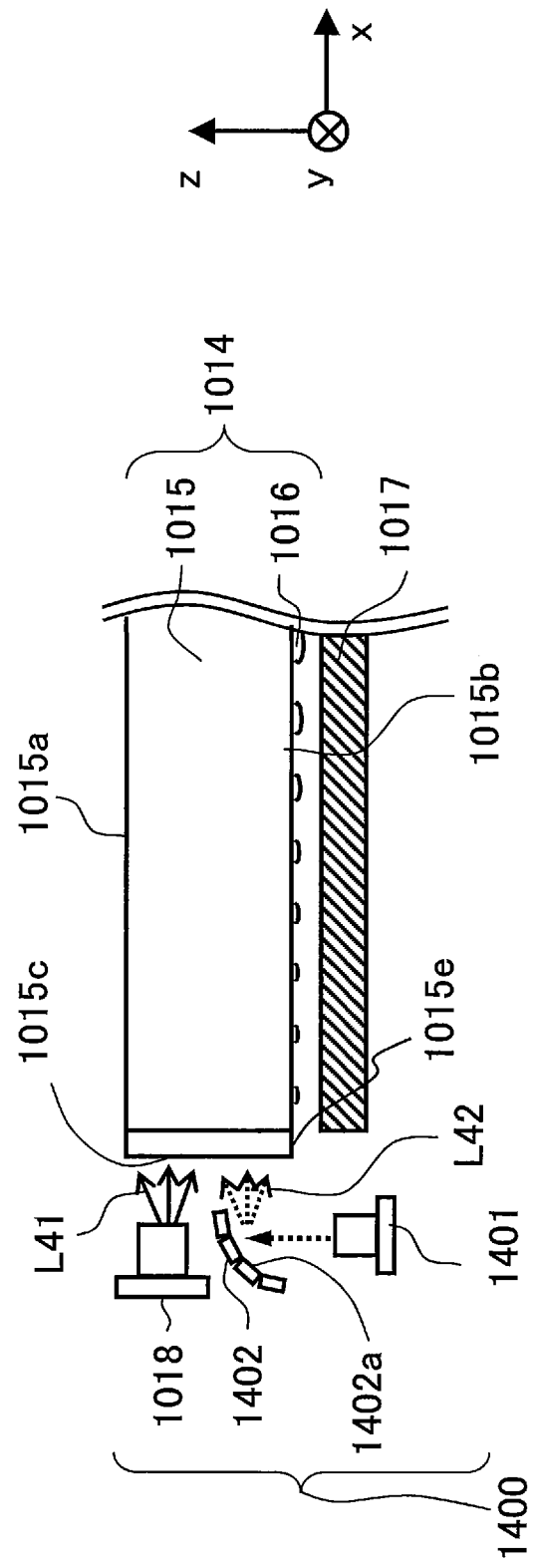
FIG. 28 is a cross-sectional view schematically illustrating another example of the light-reflecting member of the surface light source device in the liquid crystal display apparatus according to the seventh embodiment.

FIG. 28 is a cross-sectional view schematically illustrating the light-reflecting member in the surface light source device 1400 in the liquid crystal display apparatus in the seventh embodiment. Reference characters in FIG. 28 that are the same as those in FIG. 24 indicate the same or corresponding elements. The surface light source device 1400 illustrated in FIG. 28 differs from the surface light source device 1200 illustrated in FIG. 24 in a point that the second light source 1401 and the light-reflecting mirror 1402 having a light-reflecting surface on which cross-sectional polygonal shapes are continued are included instead of the second light source 1201 and the cylindrical mirror 1202 illustrated in FIG. 24. The cross-sectional polygonal shape is defined as a shape of a polygon which is formed of a plurality of lines and whose cross section is not a curved surface like that of the cylindrical mirror. Except for the point that there is a difference in the second light source 1401 and the light-reflecting mirror 1402, the surface light source device 1400 illustrated in FIG. 28 is the same as the surface light source device 1200 illustrated in FIG. 24. In addition, although the second light source 1401 differs from the second light source 1201 in reference character, they are the same light sources. In FIG. 28, a reference character L41 denotes a first light ray from the first light source 1018 that is a light ray of the same kind as the first light ray L11; and a reference character L42 denotes a second light ray from the second light source 1401 that is a light ray of the same kind as the second light ray L12.

In the surface light source device 1400, the light-reflecting surface 1402a has a cross section taken along a plane parallel to the zx-plane and the cross section has a shape in which a plurality of line segments forming a part of a polygon are arranged and combined like a circular arc. The zx-plane is a plane orthogonal to a longitudinal direction (y-axis direction) of a light incident surface 1015c of the surface light-emitting light-guiding plate 1015. The light-reflecting mirror 1402 is a first light-reflecting member. The light-reflecting surface 1402a is a first light-reflecting surface. A cross section of the light-reflecting surface 1402a taken along a plane parallel to the xy-plane has a shape like a line. The xy-plane is a plane parallel to the light-exiting surface 1015a. The light-reflecting surface 1402a has a concave shaped light-reflecting surface. The concave shaped light-reflecting surface indicates that a surface facing the light incident surface 1015c has a concave shape because the light-reflecting surface 1402a faces the light incident surface 1015c. According to the example in FIG. 28, similar effects to those in the case in FIG. 24 can be obtained.

(7-6) Further Another Example of Seventh Embodiment

Figure 29:
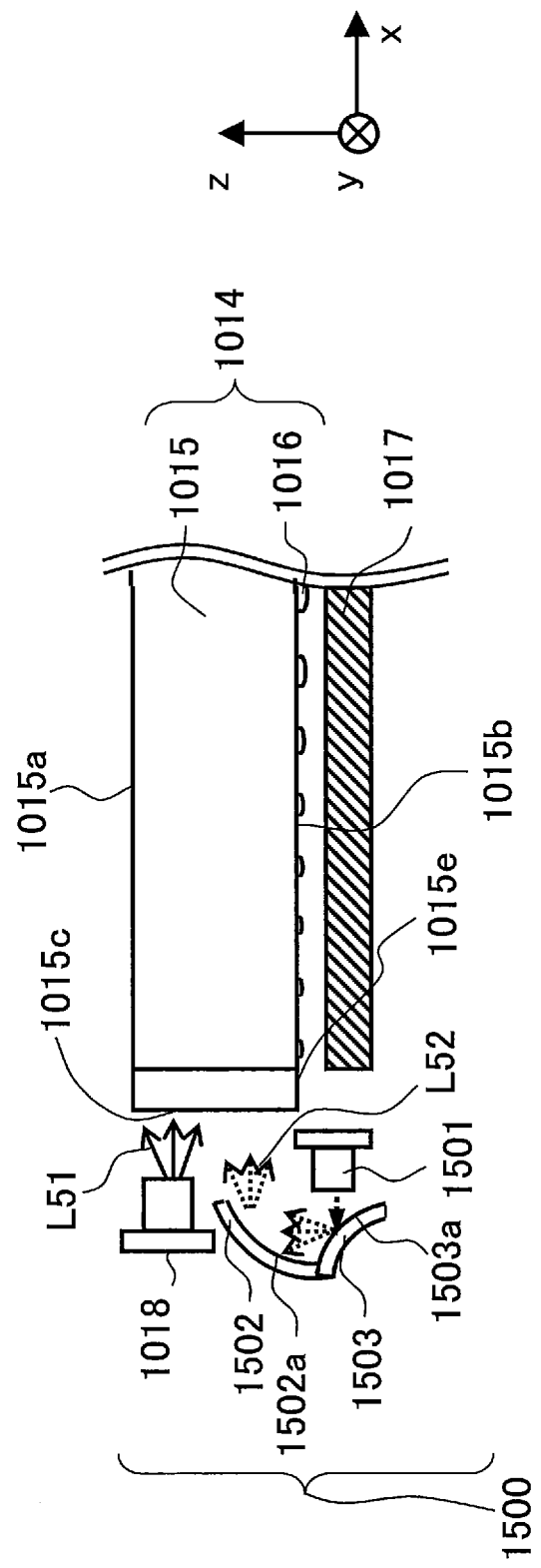
FIG. 29 is a cross-sectional view schematically illustrating another example of the light-reflecting member of the surface light source device in the liquid crystal display apparatus according to the seventh embodiment.

FIG. 29 is a cross-sectional view schematically illustrating the light-reflecting member in the surface light source device 1500 in the liquid crystal display apparatus in the seventh embodiment. Reference characters in FIG. 29 that are the same as those in FIG. 24 indicate the same or corresponding elements. The surface light source device 1500 illustrated in FIG. 29 differs from the surface light source device 1200 illustrated in FIG. 24 in a point that the light-reflecting mirror 1503 having a light-reflecting surface 1503a which is a cylindrical convex-shaped surface is included in addition to the second light source 1501 and the cylindrical mirror 1502. The cylindrical mirror 1502 has a light-reflecting surface 1502a which is a cylindrical concave-shaped surface. Except for the point that the light-reflecting mirror 1503 is included, the surface light source device 1500 illustrated in FIG. 29 is the same as the surface light source device 1200 illustrated in FIG. 24. In addition, although the second light source 1501 differs from the second light source 1201 in reference character, they are the same light sources. In addition, although the cylindrical mirror 1502 differs from the cylindrical mirror 1202 in reference character, it is the same as the cylindrical mirror 1202 except for the point that the cylindrical mirror 1502 has a curved surface in different shape. In FIG. 29, L51 denotes a first light ray from the first light source 1018 that is a light ray of the same kind as the first light ray L11; and L52 denotes a second light ray from the second light source 1501 that is a light ray of the same kind of the second light ray L12. Moreover, the cylindrical mirror 1502 has a shape similar to that of the cylindrical mirror in FIG. 24.

In the surface light source device 1500, the light-reflecting surface 1503a of the light-reflecting mirror 1503 has a cross section taken along a plane parallel to a zx-plane and the cross section has a shape of a circular arc. The zx-plane is a plane orthogonal to a longitudinal direction (y-axis direction) of a light incident surface 1015c of the surface light-emitting light-guiding plate 1015. The light-reflecting surface 1503a has a cross section taken along a plane parallel to the xy-plane and the cross section has a shape like a line. The xy-plane is a plane parallel to the light-exiting surface 1015a. The light-reflecting surface 1503a has the convex-shaped light-reflecting surface 1503a. The light-reflecting surface 1503a faces the light incident surface 1015c. According to the example of FIG. 29, an effect similar to that in the case in FIG. 24 can be obtained.

In the case in FIG. 29, after the second light ray L52 is reflected at the light-reflecting surface 1503a, the second light ray L52 is reflected at the light-reflecting surface 1502a and emitted toward the surface light-emitting light-guiding plate 1015. However, it may be configured so that reflections at the light-reflecting surface which is the cylindrical concave-shaped surface and the light-reflecting surface which is the cylindrical convex-shaped surface are more frequently repeated. Like a cylindrical mirror, after reflected at the light-reflecting surface which is the cylindrical concave-shaped surface or the light-reflecting surface which is the cylindrical convex-shaped surface, the second light ray L52 having a narrow angular intensity distribution becomes light having a wider and irregular angular intensity distribution. However, it is necessary to set the number of reflection appropriately, considering that loss of light due to absorption at the reflection film increases as reflections are more frequently performed in the light-reflecting surface.

Both of the cylindrical mirror 1502 and the light-reflecting mirror 1503 are designed, taking an angular intensity distribution and a light diameter in the zx-plane of the second light ray L52 emitted from the second light source 1501, a thickness of the surface light-emitting light-guiding plate 1015 and the like into consideration. Such a design of the mirror makes it possible to control an angular intensity distribution of the second light source 1501 more precisely. Thus, according to the example in FIG. 29, equality of an angular intensity distribution of the first light ray L51 and an angular intensity distribution of the second light ray L52 can be improved. The first light ray L51 is a light ray emitted from the first light source 1018. The second light ray L52 is a light ray emitted from the second light source 1501. This makes it possible to provide high quality images on which color unevenness is further suppressed. Moreover, according to the example in FIG. 29, it is possible to improve a ratio of a light amount of light entering the surface light-emitting light-guiding plate 1015 through the light incident surface 1015c to a light amount of light emitted from the cylindrical mirror. This can reduce power consumption.

As base materials of the cylindrical mirror 1502 and the light-reflecting mirror 1503, a resin or a metal with high processability such as an acrylic resin (e.g., PMMA) and a polycarbonate resin can be used. The light-reflecting surface can be formed by a layer of aluminum, gold or silver, for example.

(8) Eighth Embodiment (8-1) Structure of Eighth Embodiment

Figure 30:
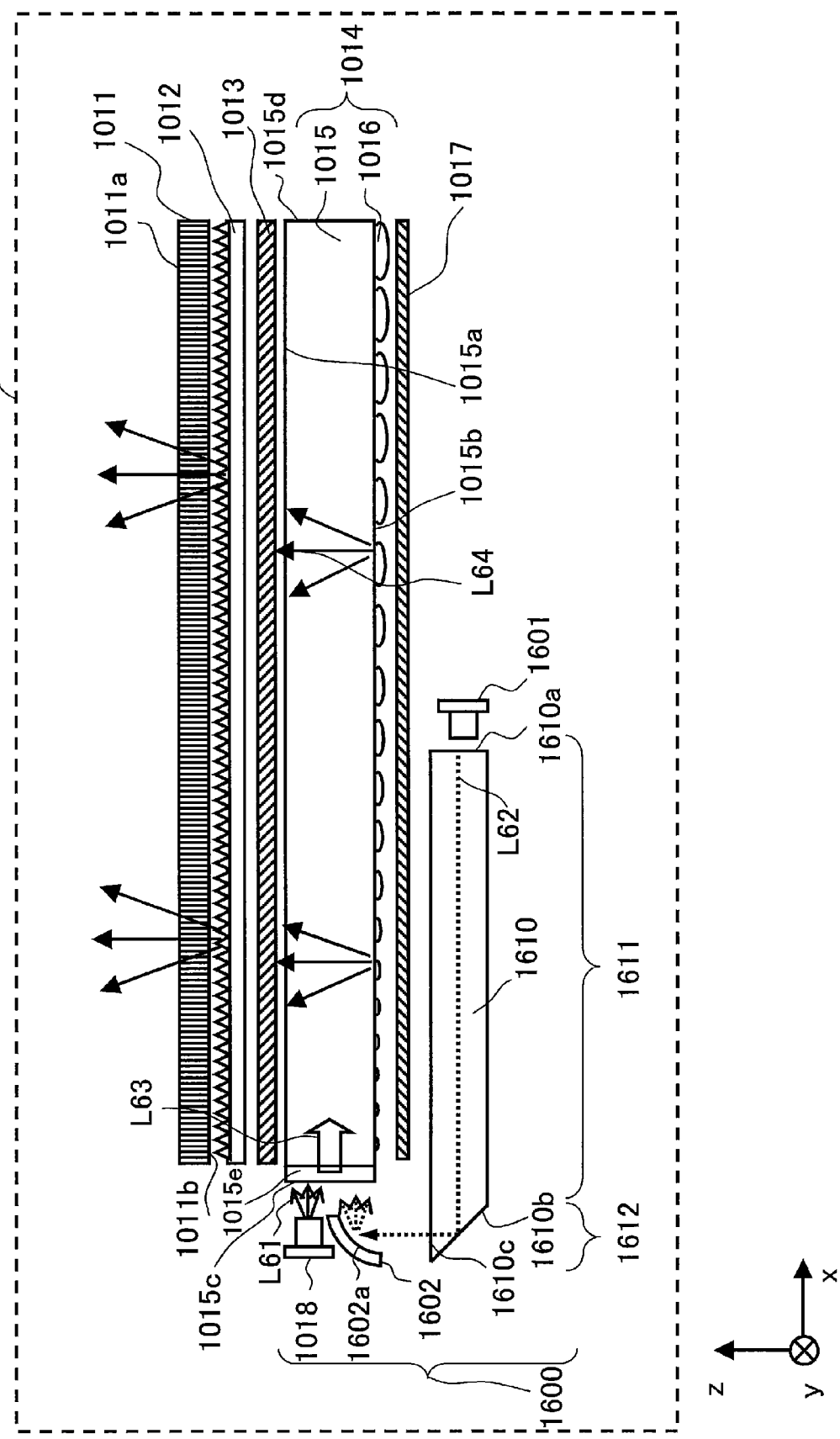
FIG. 30 is a cross-sectional view schematically illustrating an example of structure of the liquid crystal display apparatus (including a surface light source device) according to an eighth embodiment of the present invention.
Figure 31:
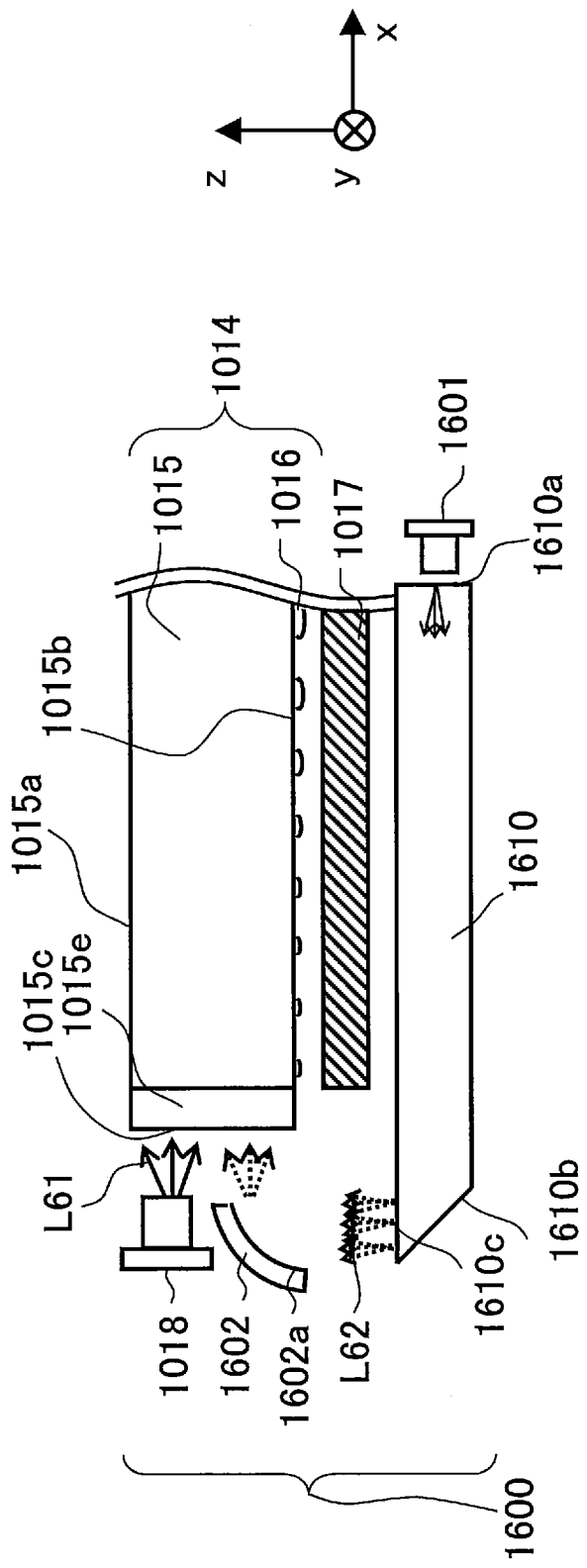
FIG. 31 is a diagram illustrating structure of a surface light-emitting light-guiding plate of the surface light source device illustrated in FIG. 30 near a light incident surface.

FIG. 30 is a cross-sectional view schematically illustrating structure of a liquid crystal display apparatus 3006 (including a surface light source device 1600) in an eighth embodiment. The surface light source device 1600 includes a surface light-emitting light-guiding plate 1015, a light-reflecting sheet 1017, a light-guiding member 1610, a cylindrical mirror 1602, a first light source 1018 and a second light source 1601. A surface light source device 1700 includes the surface light-emitting light-guiding plate 1015, the light-reflecting sheet 1017, a light-guiding member 1710, a cylindrical mirror 1702, the first light source 1018 and the second light source 1601. A surface light source device 1800 includes the surface light-emitting light-guiding plate 1015, the light-reflecting sheet 1017, a light-guiding member 1810, a cylindrical mirror 1802, a light-reflecting mirror 1803, the first light source 1018 and the second light source 1801. FIG. 31 is a diagram illustrating structure near a light incident surface 1015c of the surface light-emitting light-guiding plate 1015 in the surface light source device (backlight unit) 1600 illustrated in FIG. 30. Reference characters in FIG. 30 and FIG. 31 that are the same as those in FIG. 18 indicate the same or corresponding elements. The liquid crystal display apparatus 3006 and the surface light source device 1600 in the eighth embodiment differ from the liquid crystal display apparatus 3001 or 3011 (or 3002) and the surface light source device 1100 or 1112 (or 1200, 1300, 1400 or 1500) in the sixth embodiment (or the seventh embodiment) in a point that the second light source 1601, the light-guiding member 1610 for light-source use and the cylindrical mirror 1602 are included instead of the second light source 1101 or 1111 (or the element 1201, 1301, 1401 or 1501) and the diffusion-reflection member 1102 or 1112 (or element 1202, 1302, 1402, 1502 or 1503) in the sixth embodiment (or the seventh embodiment). Each of the diffusion-reflection members 1102 and 1112 has a function as an optical-path changing member. The cylindrical mirror 1602 has a function as a light-reflecting member. Except for the point that the second light source 1601, the light-guiding member 1610 for light-source use and the cylindrical mirror 1602 are different, the liquid crystal display apparatus 3006 and the surface light source device 1600 in the eighth embodiment are the same as the liquid crystal display apparatus 3001 (or 3002) and the surface light source device 1100 (or 1200, 1300, 1400, 1500) in the sixth embodiment (or the seventh embodiment). In addition, although the second light source 1601 differs from the second light sources 1101 and 1111 in reference character, they are the same light sources.

As illustrated in FIG. 30 and FIG. 31, the liquid crystal display apparatus 3006 in the eighth embodiment includes a liquid crystal panel 1011, a first optical sheet 1012, a second optical sheet 1013, the surface light-emitting light-guiding plate 1015, microscopic optical elements 1016, the light-reflecting sheet 1017, the first light source 1018, the second light source 1601, the light-guiding member 1610 for light-source use and the cylindrical mirror 1602. These components 1011, 1012, 1013, 1015, 1016, 1017 and 1610 are arranged in the order in a thickness direction of the liquid crystal display apparatus 3006 (a negative z-axis direction).

The first light source 1018 is disposed within a range of a length of the light incident surface (a side surface) 1015c of the surface light-emitting light-guiding plate 1015 in the z-axis direction. The length of the light incident surface 1015c in the z-axis direction indicates a thickness of the surface light-emitting light-guiding plate 1015. A first light ray L61 emitted from the first light source 1018 travels toward the light incident surface 1015c of the surface light-emitting light-guiding plate 1015 (in a substantially positive x-axis direction) and enters through the light incident surface 1015c of the surface light-emitting light-guiding plate 1015. The first light source 1018 is a light source device in which a plurality of LED elements are linearly arranged at regular intervals, for example. However, the configuration of the first light source 1018 is not limited to this configuration and it is possible to use a light source device with another configuration as the first light source 1018.

Like the second light source 1101 in the sixth embodiment, the second light source 1601 is a light source device in which a plurality of laser light-emitting elements are linearly arranged at regular intervals. However, the configuration of the second light source 1601 is not limited to this configuration and it is possible to use a light source device with another configuration. The second light source 1601 is disposed on a side of a back surface of the light-reflecting sheet 1017 (the negative z-axis direction). The second light source 1601 is disposed to face a light incident end 1610a of the light-guiding member 1610 for light-source use.

The light-guiding member 1610 for light-source use is formed by a light guide unit 1611 and a light return unit 1612. The light guide unit 1611 is a cuboidal plate-shaped unit disposed parallel to the xy-plane. The light return unit 1612 is a triangular-prism-shaped part disposed parallel to the xy-plane. The light-guiding member 1610 for light-source use is a plate-shaped member of 1 mm in thickness, for example. The light-guiding member 1610 for light-source use is made of a transparent material formed of an acrylic resin such as PMMA or other materials. However, the shape, the size and the arrangement of the light-guiding member 1610 for light-source use are not limited to the illustrated example.

A second light ray L62 has an angular intensity distribution of which a full angle at half maximum is 5 degrees, for example. An incident angle of the second light ray L62 with reference to the inclined end surface 1610b is adjusted so that the whole of the second light ray L62 is totally reflected at an inclined end surface 1610b of the light-guiding member 1610 for light-source use. This makes it possible to suppress loss of light. For example, provided that a light ray enters an air layer having a refractive index of 1.00 through an acrylic resin member having a refractive index of 1.49, a critical angle θt which satisfies the total reflection condition is given as follows, according to the Snell's law:

$$\theta t = \sin^{-1}(1.00/1.49) \approx 42.16 \text{ degrees}$$

Thus, when the second light ray L62 having the angular intensity distribution of which the full angle at half maximum is 5 degrees (a half angle is 2.5 degrees) enters through the inclined end surface 1610b, it is desirable that the incident angle of the second light ray L62 with reference to the inclined end surface 1610b should be 44.7 degrees or more so as to satisfy (θt+2.5) degrees.

As illustrated in FIG. 30 and FIG. 31, the light-guiding member 1610 for light-source use includes the light incident end 1610*a*, the inclined end surface 1610*b* and a light-exiting surface 1610*c*. The inclined end surface 1610*b* faces a light-reflecting surface 1602*a* of the cylindrical mirror 1602. The inclined end surface 1610*b* is inclined with reference to the xy-plane at an angle of approximately 45 degrees. The inclined end surface 1610*b* of the light-guiding member 1610 for light-source use changes a traveling direction of the second light ray L62 from a negative x-axis direction to a substantially positive z-axis direction. In other words, at the inclined end surface 1610*b*, the second light ray L62 is reflected at an interface between the light-guiding member 1610 for light-source use and an air layer due to a difference between their refractive indexes and its traveling direction is changed to the substantially positive z-axis direction.

The second light ray L62 emitted from the second light source 1601 enters the light-guiding member 1610 for light-source use through the light incident end 1610*a* of the light-guiding member 1610 for light-source use. Then, the second light ray L62 travels (propagates) in the negative x-axis direction inside the light-guiding member 1610 for light-source use while repeatedly totally reflected at the interface between the light-guiding member 1610 for light-source use and the air layer, and reaches the inclined end surface 1610*b*. Then, the second light ray L62 is reflected at the inclined end surface 1610*b* and its traveling direction changes to the substantially positive z-axis direction. After the traveling direction is changed, the second light ray L62 is emitted through the light-exiting surface 1610*c*. Then, the second light ray L62 is reflected at the cylindrical mirror 1602 and enters through the light incident surface 1015*c* of the surface light-emitting light-guiding plate 1015.

The light-reflecting surface 1602*a* of the cylindrical mirror 1602 has a similar shape and a similar function to the light-reflecting surface 1202*a* of the cylindrical mirror 1202 illustrated in FIG. 24. The second light ray L62 emitted through the light-exiting surface 1610*c* travels to the light-reflecting surface 1602*a* of the cylindrical mirror 1602. The second light ray L62 is reflected at the light-reflecting surface 1602*a* and its traveling direction is directed to the light incident surface 1015*c* of the surface light-emitting light-guiding plate 1015 (directed in the substantially positive x-axis direction). A full angle at half maximum of an angular intensity distribution of the second light ray L62 reflected at the light-reflecting surface 1602*a* of the cylindrical mirror 1602 increases and is equalized to a full angle at half maximum of the angular intensity distribution of the first light ray L61.

After entering through the light incident surface 1015*c* of the surface light-emitting light-guiding plate 1015, the first light ray L61 and the second light ray L62 are mixed in a mixing region 1015*e* to become a mixed light ray L63. The light-reflecting sheet 1017 is disposed to face a rear surface 1015*b* of the surface light-emitting light-guiding plate 1015. Light which is a part of the mixed light ray L63 and is emitted through the rear surface 1015*b* of the surface light-emitting light-guiding plate 1015 is reflected at the light-reflecting sheet 1017, returns to travel toward the rear surface 1015*b* of the surface light-emitting light-guiding plate 1015, passes through the surface light-emitting light-guiding plate 1015 and is emitted through the light-exiting surface 1015*a* toward a rear surface 1011*b* of the liquid crystal panel 1011 as illumination light L64. Moreover, a light ray which is another part of the mixed light ray L63 and enters the microscopic optical element 1016 is also emitted as the illumination light L64.

Although the inclined end surface 1610*b* of the light-guiding member 1610 for light-source use is inclined with reference to the xy-plane at an angle of approximately 45 degrees in the above explanation, the present invention is not limited to this. For producing an optimum optical path of the second light ray L62, an inclination angle of the inclined end surface 1610*b* to the xy-plane may be changed. The light optimum path of the second light ray L62 is determined by the incident angle of the second light ray L62 with reference to the inclined end surface 1610*b*, as well as a positional relationship and an arrangement angle relationship to the light-exiting surface 1610*c*, the cylindrical mirror 1602, and the surface light-emitting light-guiding plate 1015.

In addition, in order to optimize a relationship of an arrangement and an angle of the inclined end surface 1610*b* with reference to the second light ray L62, a relationship of an arrangement and an angle of the cylindrical mirror 1602 with reference to the second light ray L62, and a relationship of an arrangement and an angle of the light incident surface 1015*c* of the surface light-emitting light-guiding plate 1015 with reference to the second light ray L62, an arrangement and an angle of the cylindrical mirror 1602 may be adjusted instead of adjusting an inclination angle of the inclined end surface 1610*b*.

Moreover, thinning the light-guiding member 1610 for light-source use in the eighth embodiment results in downsizing the cylindrical mirror 1602 and further results in thinning the surface light-emitting light-guiding plate 1015. For this reason, it is desirable to use the light-guiding member 1610 for light-source use with a thin thickness. However, if the thickness is thinned, rigidity of the light-guiding member 1610 for light-source use decreases. So, it is desirable to be thinned within a range where rigidity of the light-guiding member 1610 for light-source use does not decrease too much.

Moreover, the second light ray L62 which emitted from the light-guiding member 1610 for light-source use toward the cylindrical mirror 1602 has a certain size as much as the thickness of the light-guiding member 1610 for light-source use, in the zx-plane. Moreover, as illustrated in FIG. 31, the second light ray L62 travels in the light-guiding member 1610 for light-source use and is emitted through the light-emitting end 1610*c* of the light-guiding member 1610 for light-source use. The light emitted through the light-emitting end 1610*c* emits a light ray with an angular intensity distribution which is the same as an angular intensity distribution immediately after an emission from the second light source 1601. Furthermore, light emitted through the light-emitting end 1610*c* is emitted through an arbitrary region on the light-emitting end 1610*c* according to a reflection position on the inclined end surface 1610*b*. In other words, a light ray having an angular intensity distribution which is the same as an angular intensity distribution immediately after emission from the second light source 1601 is emitted through the arbitrary region on the light-emitting end 1610*c*. In this case, according to an emission position on the light-emitting end 1610*c*, a tangential direction of the second light ray L62 at the circular-arc-shaped cylindrical mirror 1602 varies in a position on the zx-plane. For this reason, even if light rays enter the cylindrical mirror 1602 at a same angle from the light-emitting end 1610*c*, because angles formed with tangential lines at the light-reflecting surface 1602*a* of the cylindrical mirror 1602 are different, the light rays are reflected at different emission angles by the light-reflecting surface 1602*a*. Thus, in this embodiment, an angular intensity distribution of the second light source 1601 can be further spread.

The light-guiding member 1610 for light-source use is not limited to a transparent member. A function of the light-guiding member 1610 for light-source use is to guide the second light ray L62 to the cylindrical mirror 1602. The first light ray L61 is a light ray emitted from the first light source 1018. The second light ray L62 is a light ray emitted from the second light source 1601. As long as it has this function, the light-guiding member 1610 for light-source use may be configured by another component. For example, the inclined end surface 1610*b* may be formed by a light-reflecting mirror which faces a side of the second light source 1601. The light-guiding member 1610 for light-source use may be formed by a plane mirror, as a substitute for the light guide unit 1611 and the light return unit 1612.

In the eighth embodiment, it is configured that the cylindrical mirror 1602 as the optical-path changing member is provided immediately after the light-guiding member 1610 for light-source use. However, the present invention is not limited to this example. A mirror that has another shape as described in the seventh embodiment (FIG. 26, FIG. 28 and FIG. 29) or the like may be used. Instead of the cylindrical mirror 1602, the diffusion-reflection member 1102 in the sixth embodiment may be used.

The liquid crystal display apparatus 3006 in the eighth embodiment is configured so that light rays emitted from the two light sources disposed in different positions enter through a short side surface of the surface light-emitting light-guiding plate 1015. However, by designing an arrangement of the first light source and the second light source, a position of the light-guiding member 1610 for light-source use, an arrangement of the microscopic optical elements 1016 and the like, it is possible to use a long side surface of the surface light-emitting light-guiding plate 1015 as the incident surface.

(8-2) Operations of Eighth Embodiment

While the surface light source device 1600 is turned on, a light ray is emitted from each of the first light source 1018 and the second light source 1601.

The first light ray L61 emitted from the first light source 1018 (e.g., bluish-green-color) travels in a direction toward the light incident surface 1015*c* of the surface light-emitting light-guiding plate 1015 (the substantially positive x-axis direction).

The second light ray L62 emitted from the second light source 1601 enters the light-guiding member 1610 for light-source use through the light incident end 1610*a*. The second light ray L62 is a red-color light ray, for example. The second light ray L62 is repeatedly totally reflected at the interface between the light-guiding member 1610 for light-source use and the air layer, and propagates in the negative x-axis direction as it remains to be confined in the light-guiding member 1610 for light-source use. At the time, an angular intensity distribution of the second light ray L62 is maintained. Accordingly, an angular intensity distribution of the second light ray L62 at an emission through the light-exiting surface 1610*c* is equal to an angular intensity distribution of the second light ray L62 at the time of emission from the second light source 1601, and full angles at half maximum of their angular intensity distributions are the same angle. The full angle at half maximum of the angular intensity distribution is 5 degrees, for example. Light emitted from the light-exiting surface 1610*c* of the light-guiding member 1610 for light-source use travels to the light-reflecting surface 1602*a* of the cylindrical mirror 1602 and its traveling direction is changed by the cylindrical mirror 1602 to a direction toward the light incident surface 1015*c* of the surface light-emitting light-guiding plate 1015 (the substantially positive x-axis direction). At the same time, the full angle at half maximum of its angular intensity distribution increases.

After entering the light incident surface 1015*c* of the surface light-emitting light-guiding plate 1015, the first light ray L61 and the second light ray L62 propagate the mixing region 1015*e* provided near the light incident surface 1015*c* of the surface light-emitting light-guiding plate 1015, thereby being mixed with each other to become white-color light (the mixed light ray L63). Then, after reflection at the microscopic optical element 1016, reflection at the light-reflecting sheet 1017 or the like, the mixed light ray L63 is emitted as the planar illumination light L64 through the light-exiting surface 1015*a* of the surface light-emitting light-guiding plate 1015 toward the liquid crystal panel 1011. In the eighth embodiment, light rays in each color (i.e., the first light ray L61 and the second light ray L62) with the similar angular intensity distributions propagate inside the surface light-emitting light-guiding plate 1015. Thus, the illumination light L64 emitted from the surface light-emitting light-guiding plate 1015 becomes substantially uniformed white-color planar light without color unevenness in a plane parallel to the xy-plane. In addition, the control unit 1021 controls the light-source drive unit 1023 to adjust a ratio between luminance of the first light ray L61 and luminance of the second light ray L62 and thus luminance and color on the light-exiting surface 1015*a* can be adjusted.

(8-3) Effects of Eighth Embodiment

As described above, the surface light source device 1600 in the eighth embodiment includes the first light source 1018, the second light source 1601, the light-guiding member 1610 for light-source use and the cylindrical mirror 1602. The first light source 1018 is disposed in a position to face the light incident surface (the side surface) 1015*c* of the surface light-emitting light-guiding plate 1015. The second light source 1601 is disposed in a position on a side of the rear surface 1015*b* from the light incident surface 1015*c* of the surface light-emitting light-guiding plate 1015. The light-guiding member 1610 for light-source use has a function as an optical-path changing member for guiding the second light ray L62 to the light incident surface 1015*c*. Thus, according to the surface light source device 1600 of the eighth embodiment, a traveling direction of the second light ray L62 is changed by the optical-path changing member to a direction toward the light incident surface 1015*c* of the surface light-emitting light-guiding plate 1015. Therefore, in comparison with a conventional structure where two kinds of the light sources arranged in a thickness direction of the surface light-emitting light-guiding plate are disposed to face the light incident surface of the surface light-emitting light-guiding plate, a thickness of the surface light-emitting light-guiding plate 1015 can be reduced.

The surface light source device 1600 in the eighth embodiment includes the cylindrical mirror 1602. The cylindrical mirror 1602 changes a traveling direction and an angular intensity distribution of the second light ray L62 so as to make an angular intensity distribution of the second light ray L62 immediately before entering the light incident surface 1015*c* of the surface light-emitting light-guiding plate 1015 closer to an angular intensity distribution of the first light ray L61 immediately before entering the light incident surface 1015*c*. Thus, according to the surface light source device 1600 of the eighth embodiment, by using the cylindrical mirror 1602, an angular intensity distribution of the second light ray L62 is increased so as to be closer to an angular intensity distribution of the first light ray L61. This suppresses a difference between an in-plane luminance distribution of plane-shaped illumination light which is emitted through the light-exiting surface 1015a after the first light ray L61 passes through the surface light-emitting light-guiding plate 1015 and an in-plane luminance distribution of plane-shaped illumination light which is emitted through the light-exiting surface 1015a after the second light ray L62 likewise passes through the surface light-emitting light-guiding plate 1015. This reduces color unevenness in the surface light source device 1600.

Moreover, because the thickness of the surface light-emitting light-guiding plate 1015 is reduced, the liquid crystal display apparatus 3006 that includes the surface light source device 1600 in the eighth embodiment can be thinned. Moreover, because the liquid crystal display apparatus 3006 that includes the surface light source device 1600 in the eighth embodiment can reduce color unevenness in the surface light source device 1600, color unevenness on the display surface 1011a of the liquid crystal panel 1011 can be reduced and image quality improvement can be achieved.

Moreover, according to the eighth embodiment, by providing the light-guiding member 1610 for light-source use, it is possible to dispose the first light source 1018 and the second light source 1601 apart from each other. The LED elements and the laser light-emitting elements used in the first light source 1018 and the second light source 1601 usually have electricity-light conversion efficiency of 10 to 50%. Energy which is not converted into light becomes heat. If the first light source 1018 and the second light source 1601 are disposed close to each other, these heat sources concentrate in a small region. Accordingly, heat radiation capability decreases and ambient temperature of the first light source 1018 and the second light source 1601 rises. Generally, as the ambient temperature rises, light emission efficiency of these light sources decreases. In order to improve the light emission efficiency, it is necessary to improve the heat radiation capability. In the liquid crystal display apparatus 3006 in the eighth embodiment, the first light source 1018 and the second light source 1601 are disposed apart from each other. Thus, the heat sources are separated and heat radiation capability is improved. In addition, especially in a laser light-emitting element, light emission efficiency greatly decreases and a spectrum shift amount is large when temperature changes. By arranging the laser light-emitting elements apart from another heat source in one place, a cooling system for the laser light-emitting elements or the like can be disposed in one place and thus it is also possible to provide a cooling system or the like efficiently.

Furthermore, in the eighth embodiment, the first light source 1018 and the second light source 1601 are separately disposed. So, it is easy for the light-source drive unit 1023 to control the two light sources, the first light source 1018 and the second light source 1601, separately. Thus, the light-source drive unit 1023 can individually control outputs from the first light source 1018 and the second light source 1601 on the basis of an image signal. The separate control of the different light sources can reduce power consumption. Moreover, this is because the separate control of the different light sources can reduce stray light, thereby improving contrast.

As described above, even in a case where a plurality of different kinds of light sources are included, it is possible for the liquid crystal display apparatus 3006 in the eighth embodiment to increase the number of light sources while an increase in thickness of the liquid crystal display apparatus 3006 is suppressed. Therefore, the liquid crystal display apparatus 3006 capable of achieving both of high luminance and thin structure can be achieved. Moreover, because the surface light-emitting light-guiding plate for making light from the plurality of kinds of light sources a planar light source is shared, increases in weight and cost can be suppressed.

Moreover, even in a case where different kinds of light sources having different angular intensity distributions from each other are used, it is possible to make an angular intensity distribution of one of the light sources having a narrower angular intensity distribution identical to an angular intensity distribution of the other light source. Therefore, a difference between in-plane luminance distributions of planar light sources generated by the respective light sources can be suppressed. In a case where these light sources have different spectrums, it is possible to suppress color unevenness. In a case where at least one kind of a light source with high monochromaticity is used to generate white-color light, in particular, a plurality of light sources having different angular intensity distributions are used in order to enlarge a color reproduction range. A laser light-emitting element with extremely outstanding monochromaticity also has high directivity. Therefore, the present embodiment is effective as structure for enlarging a color reproduction range.

(8-4) Another Example of Eighth Embodiment

Figure 32:
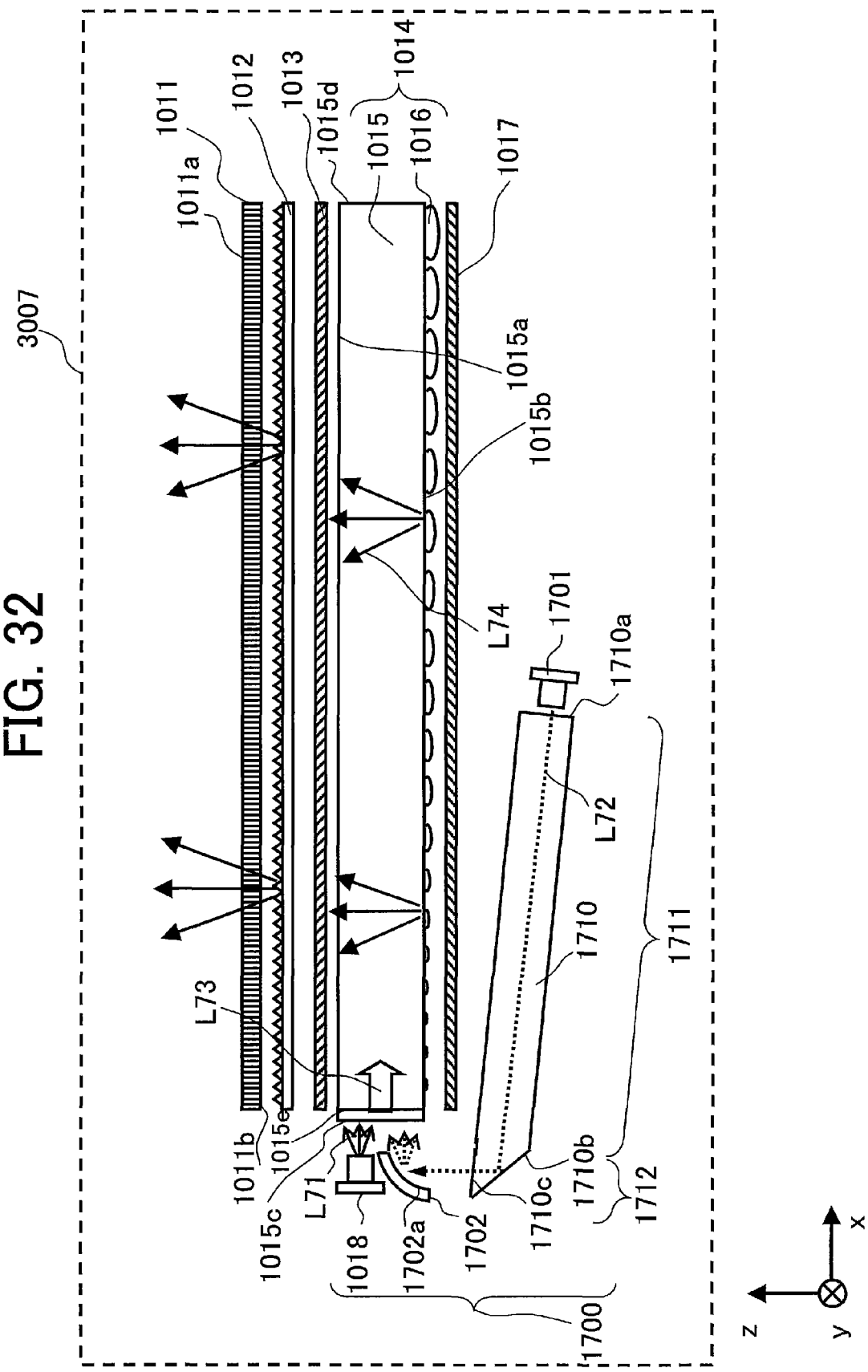
FIG. 32 is a cross-sectional view schematically illustrating another example of structure of the liquid crystal display apparatus (including the surface light source device) according to the eighth embodiment.

FIG. 32 is a cross-sectional view schematically illustrating structure of another example of a liquid crystal display apparatus 3007 (including the surface light source device 1700) in the eighth embodiment. Reference characters in FIG. 32 that are the same as those in FIG. 30 indicate the same or corresponding elements. The liquid crystal display apparatus 3007 and the surface light source device 1700 in FIG. 32 differ from the liquid crystal display apparatus 3006 and the surface light source device 1600 in FIG. 30 in a shape and an arrangement of the light-guiding member for light-source use 1710. The difference in arrangement is that the light-guiding member for light-source use 1710 is disposed to be inclined with reference to the surface light-emitting light-guiding plate 1015, i.e., the light-guiding member for light-source use 1710 is disposed to be inclined with reference to the xy-plane. The difference in shape is that an inclination angle of an inclined end surface 1710b is different. The light-guiding member for light-source use 1710 has a function as an optical-path changing member. Moreover, the liquid crystal display apparatus 3007 and the surface light source device 1700 differ from the liquid crystal display apparatus 3006 and the surface light source device 1600 in FIG. 30 in an arrangement of the second light source 1701. A shape of a light-reflecting surface 1702a of the cylindrical mirror 1702 in FIG. 32 is the same as a shape of the light-reflecting surface 1602a of the cylindrical mirror 1602 in FIG. 30. In other points, the liquid crystal display apparatus 3007 and the surface light source device 1700 illustrated in FIG. 32 are the same as the liquid crystal display apparatus 3006 and the surface light source device 1600 illustrated in FIG. 30. The other points are the points other than the point that the light-guiding member for light-source use 1710 has the different shape and is differently arranged and the point that the second light source is differently arranged.

As illustrated in FIG. 32, the light-guiding member for light-source use 1710 has a light incident end 1710a, an inclined end surface 1710b and a light-exiting surface 1710c. The inclined end surface 1710b faces the light-reflecting surface 1702a of the cylindrical mirror 1702. The inclined end surface 1710b is inclined with reference to the xy-plane. The inclined end surface 1710b of the light-guiding member for light-source use 1710 changes a traveling direction of a second light ray L72 from a substantially negative x-axis direction to a substantially positive z-axis direction. In other words, at the inclined end surface 1710b, the second light ray L72 is reflected at an interface between the light-guiding member for light-source use 1710 and an air layer due to a difference between their refractive indexes and its traveling direction is changed to the substantially positive z-axis direction. In the surface light source device 1700 illustrated in FIG. 32, the light-guiding member for light-source use 1710 is inclined with reference to the xy-plane so that the light incident end 1710a is further apart from the light-reflecting sheet 1017. The second light source 1701 is formed by laser light-emitting elements like the second light source 1601 in FIG. 30. The second light source 1701 is disposed on a side of a back surface of the light-reflecting sheet 1017 (the negative z-axis direction). The second light source 1701 is disposed to face the light incident end 1710a of the light-guiding member for light-source use 1710.

The light-guiding member for light-source use 1710 is formed of a similar material to the light-guiding member 1610 for light-source use in FIG. 30. The light-guiding member for light-source use 1710 is formed by a cuboidal plate-shaped unit 1711 which is disposed to be inclined with reference to the xy-plane and a triangular-prism-shaped light return unit 1712.

While the surface light source device 1700 is turned on, a light ray is emitted from each of the first light source 1018 and the second light source 1701. A first light ray L71 emitted from the first light source 1018 travels in a direction toward a light incident surface 1015c of the surface light-emitting light-guiding plate 1015 (the substantially positive x-axis direction). The second light ray L72 emitted from the second light source 1701 enters through the light incident end 1710a of the light-guiding member for light-source use 1710, is repeatedly totally reflected at the interface between the light-guiding member for light-source use 1710 and the air layer, and propagates as it remains to be confined in the light-guiding member for light-source use 1710. At the time, an angular intensity distribution of the second light ray L72 is maintained. Accordingly, an angular intensity distribution of the second light ray L72 at an emission through the light-exiting surface 1710c is equal to an angular intensity distribution of the second light ray L72 at the time of emission from the second light source 1701, and full angles at half maximum of their angular intensity distributions are the same angle. The full angle at half maximum of the angular intensity distributions is 5 degrees, for example. The second light ray L72 emitted through the light-exiting surface 1710c of the light-guiding member for light-source use 1710 travels to the light-reflecting surface 1702a of the cylindrical mirror 1702. A traveling direction of the second light ray L72 is changed by the cylindrical mirror 1702 to a direction toward the light incident surface 1015c of the surface light-emitting light-guiding plate 1015 (the substantially positive x-axis direction). At the time of reflection by the cylindrical mirror 1702, the full angle at half maximum of the angular intensity distribution of the second light ray L72 increases.

After entering through the light incident surface 1015c of the surface light-emitting light-guiding plate 1015, the first light ray L71 and the second light ray L72 propagate through a mixing region 1015e, thereby being mixed with each other to become white-color light (a mixed light ray L73). The mixing region 1015e is provided near the light incident surface 1015c of the surface light-emitting light-guiding plate 1015. The first light ray L71 and the second light ray L72 become the mixed light ray L73 and then, after reflection at a microscopic optical element 1016, reflection at the light-reflecting sheet 1017 or the like, the mixed light ray L73 is emitted through the light-exiting surface 1015a of the surface light-emitting light-guiding plate 1015 toward the liquid crystal panel 1011 as planar illumination light L74.

As described above, according to the surface light source device 1700 illustrated in FIG. 32, a traveling direction of the second light ray L72 is changed by the optical-path changing member to a direction toward the light incident surface 1015c of the surface light-emitting light-guiding plate 1015. Therefore, in comparison with a conventional structure where two kinds of the light sources arranged in a thickness direction of the surface light-emitting light-guiding plate are disposed to face the light incident surface of the surface light-emitting light-guiding plate, thickness of the surface light-emitting light-guiding plate 1015 can be reduced.

In the surface light source device 1700 illustrated in FIG. 32, by using the cylindrical mirror 1702, the angular intensity distribution of the second light ray L72 is increased so as to be closer to the angular intensity distribution of the first light ray L71. This suppresses a difference between an in-plane luminance distribution of plane-shaped illumination light which is emitted through the light-exiting surface 1015a after the first light ray L71 passes through the surface light-emitting light-guiding plate 1015 and an in-plane luminance distribution of plane-shaped illumination light which is emitted through the light-exiting surface 1015a after the second light ray L72 likewise passes through the surface light-emitting light-guiding plate 1015. This reduces color unevenness in the surface light source device 1700.

Moreover, because the thickness of the surface light-emitting light-guiding plate 1015 is reduced, the liquid crystal display apparatus 3007 that includes the surface light source device 1700 can be thinned. Moreover, because the liquid crystal display apparatus 3007 that includes the surface light source device 1700 can reduce color unevenness in the surface light source device 1700, color unevenness on the display surface 1011a of the liquid crystal panel 1011 can be reduced and image quality improvement can be achieved.

Figure 33:
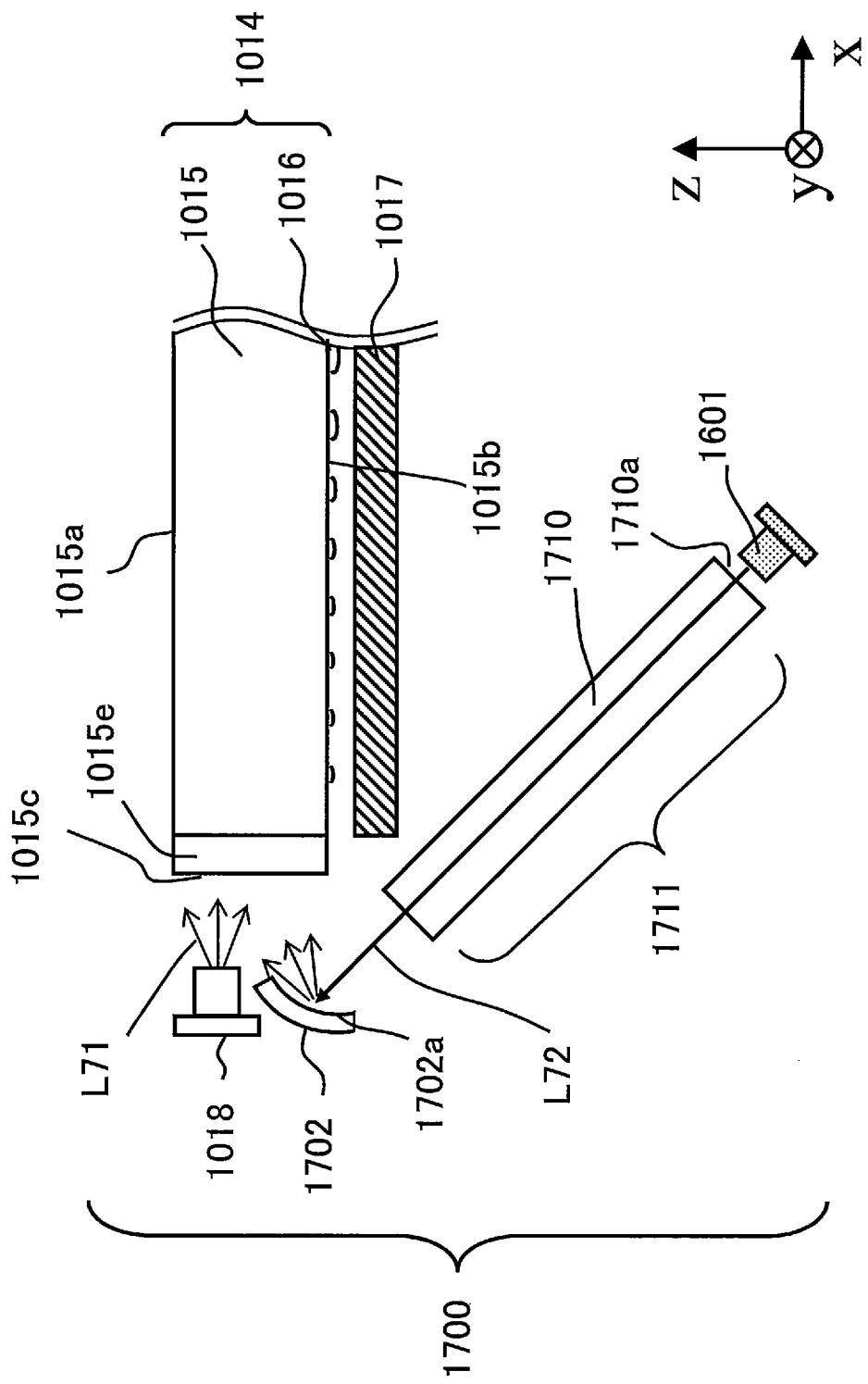
FIG. 33 is a cross-sectional view schematically illustrating another example of a light-guiding member for light-source use in the eighth embodiment.

The light-guiding member for light-source use 1710 is not limited to a transparent member. The function of the light-guiding member for light-source use 1710 is to guide the second light ray L72 to the cylindrical mirror 1702. As long as it has this function, the light-guiding member for light-source use 1710 may be differently configured. For example, as illustrated in FIG. 33, it may be configured that the light-guiding member for light-source use 1710 is formed of only the light guide unit 1711 and light emitted from the light guide unit 1710 directly enters the cylindrical mirror 1702.

(8-5) Another Example of Eight Embodiment

Figure 34:
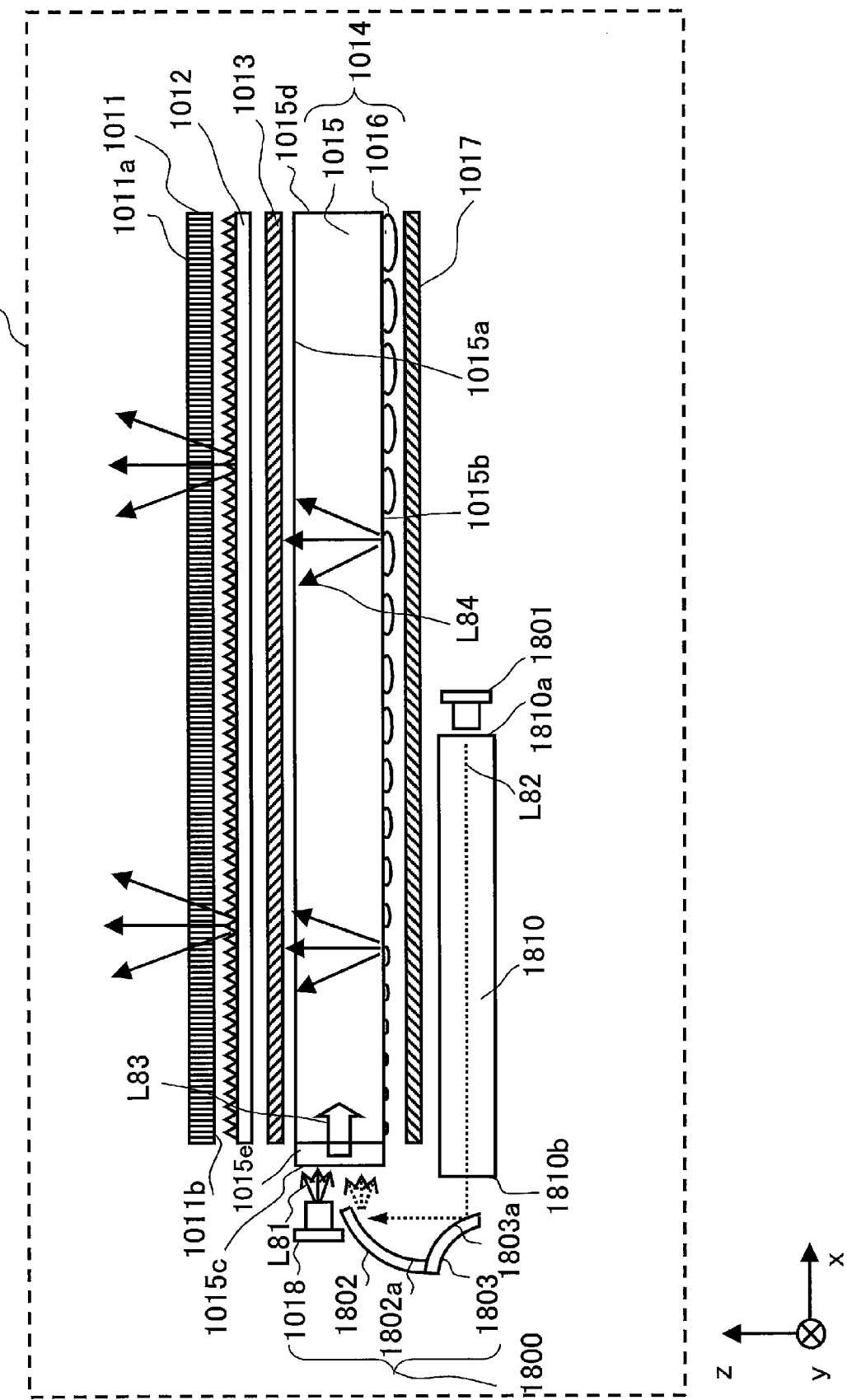
FIG. 34 is a cross-sectional view schematically illustrating another example of structure of the liquid crystal display apparatus (including the surface light source device) according to the eighth embodiment.

FIG. 34 is a cross-sectional view schematically illustrating structure of another example of a liquid crystal display apparatus 3008 (including the surface light source device 1800) of the eighth embodiment. Reference characters in FIG. 34 that are the same as those in FIG. 30 indicate the same or corresponding elements. The liquid crystal display apparatus 3008 and the surface light source device 1800 in FIG. 34 differ from the liquid crystal display apparatus 3006 and the surface light source device 1600 in FIG. 30 in the following points. A first difference is a shape of the light-guiding member for light-source use 1810 as an optical-path changing member. A second difference is that the light-reflecting mirror 1803 (having a convex-shaped second light-reflecting surface 1803a) is included. A third difference is that the cylindrical mirror 1802 (having a concave-shaped first light-reflecting surface 1802a) is included. The second light source 1801 is a same light source as the liquid crystal display apparatus 3006 and the surface light source device 1600 in FIG. 30 although their reference characters are different. A shape of the light-reflecting surface 1802*a* of the cylindrical mirror 1802 is similar to the shape of the light-reflecting surface 1602*a* of the cylindrical mirror 1602 in FIG. 30. In other points, the liquid crystal display apparatus 3008 and the surface light source device 1800 in FIG. 34 are the same as the liquid crystal display apparatus 3006 and the surface light source device 1600 in FIG. 30.

In the surface light source device 1800 illustrated in FIG. 34, the light-guiding member for light-source use 1810 is disposed parallel to the xy-plane. The second light source 1801 is a light source device that includes laser light-emitting elements, like the second light source 1601 in FIG. 30. The light source device here denotes a device in which a plurality of laser light-emitting elements are arranged in the y-axis direction at regular intervals, for example. The second light source 1801 is a light source device in which a plurality of laser light-emitting elements are arranged. The second light source 1801 is disposed on a side of a back surface of the light-reflecting sheet 1017 (the negative z-axis direction). The second light source 1801 is disposed to face a light incident end 1810*a* of the light-guiding member for light-source use 1810.

The light-guiding member for light-source use 1810 is formed of a similar material to the light-guiding member 1610 for light-source use in FIG. 30. The light-guiding member for light-source use 1810 is formed by a cuboidal plate-shaped unit disposed parallel to the xy-plane. As illustrated in FIG. 34, the light-guiding member for light-source use 1810 has the light incident end 1810*a* and a light-emitting end 1810*b*.

The light-reflecting mirror 1803 is a reflection member for directing a traveling direction of a second light ray L82 emitted from the light-guiding member for light-source use 1810 to the cylindrical mirror 1802. The second light ray L82 emitted from the second light source 1801 passes through an inside of the light-guiding member for light-source use 1810 and then is emitted toward the light-reflecting mirror 1803. The light-reflecting surface 1803*a* of the light-reflecting mirror 1803 has a cross section taken along a zx-plane and the cross section has a circular-arc shape which has a convex shape in a direction to a light incident surface 1015*c*. The zx-plane is a plane orthogonal to a longitudinal direction of the light incident surface 1015*c* (y-axis direction). Moreover, the light-reflecting surface 1803*a* of the light-reflecting mirror 1803 has a cross section taken along the xy-plane and the cross section has a shape like a line extending in the y-axis direction. The xy-plane is a plane parallel to the light-exiting surface 1015*a*. The y-axis direction is the longitudinal direction of the light incident surface 1015*c*. The light-reflecting surface 1803*a* is a convex-shaped cylindrical light-reflecting surface which faces the light incident surface 1015*c*. However, the shape of the light-reflecting mirror 1803 may be another member, if it is an optical member for directing a traveling direction of the second light ray L82 toward the cylindrical mirror 1802.

While the surface light source device 1800 is turned on, a light ray is emitted from each of the first light source 1018 and the second light source 1801. A first light ray L81 emitted from the first light source 1018 travels in a direction toward the light incident surface 1015*c* of the surface light-emitting light-guiding plate 1015 (the substantially positive x-axis direction). The second light ray L82 emitted from the second light source 1801 enters through the light incident end 1810*a* of the light-guiding member for light-source use 1810. The second light ray L82 is repeatedly totally reflected at the interface between the light-guiding member for light-source use 1710 and the air layer, and propagates as it remains to be confined in the light-guiding member for light-source use 1710. At the time, an angular intensity distribution of the second light ray L72 is maintained. Accordingly, an angular intensity distribution of the second light ray L82 at an emission through the light-emitting end 1810*b* is equal to an angular intensity distribution of the second light ray L82 at the time of emission from the second light source 1801. Full angles at half maximum of their angular intensity distributions are the same angles. The full angle at half maximum of the respective angular intensity distribution is 5 degrees, for example. The second light ray L82 emitted through the light-emitting end 1810*b* of the light-guiding member for light-source use 1810 is reflected at the light-reflecting surface 1803*a* of the light-reflecting mirror 1803. At the time, the full angle at half maximum of an angular intensity distribution of the second light ray L82 increases. The second light ray L82 travels to the light-reflecting surface 1802*a* of the cylindrical mirror 1802 and its traveling direction is changed by the cylindrical mirror 1802 to a direction toward the light incident surface 1015*c* of the surface light-emitting light-guiding plate 1015 (the substantially positive x-axis direction). At the time of reflection at the light-reflecting surface 1802*a*, the full angle at half maximum of an angular intensity distribution of the second light ray L82 increases.

After entering through the light incident surface 1015*c* of the surface light-emitting light-guiding plate 1015, the first light ray L81 and the second light ray L82 propagate through a mixing region 1015*e* provided near the light incident surface 1015*c* of the surface light-emitting light-guiding plate 1015, thereby being mixed with each other to become white-color light (a mixed light ray L83). Then, after reflection at a microscopic optical element 1016, reflection at the light-reflecting sheet 1017 and the like, the mixed light ray L83 is emitted through the light-exiting surface 1015*a* of the surface light-emitting light-guiding plate 1015 toward the liquid crystal panel 1011 as planar illumination light L84.

As described above, according to the surface light source device 1800 illustrated in FIG. 34, a traveling direction of the second light ray L82 is changed by the optical-path changing member to a direction toward the light incident surface 1015*c* of the surface light-emitting light-guiding plate 1015. Therefore, in comparison with a conventional structure where two kinds of the light sources arranged in a thickness direction of the surface light-emitting light-guiding plate are disposed to face the light incident surface of the surface light-emitting light-guiding plate, thickness of the surface light-emitting light-guiding plate 1015 can be reduced.

Moreover, according to the surface light source device 1800 illustrated in FIG. 34, by using the light-reflecting mirror 1803 and the cylindrical mirror 1802, the angular intensity distribution of the second light ray L82 is increased so as to be closer to the angular intensity distribution of the first light ray L81. This suppresses a difference between an in-plane luminance distribution generated by plane-shaped illumination light which is emitted through the light-exiting surface 1015*a* after the first light ray L81 passes through the surface light-emitting light-guiding plate 1015 and an in-plane luminance distribution generated by plane-shaped illumination light which is emitted through the light-exiting surface 1015*a* after the second light ray L82 likewise passes through the surface light-emitting light-guiding plate 1015. Therefore, color unevenness in the surface light source device 1800 decreases.

Moreover, because the thickness of the surface light-emitting light-guiding plate 1015 is reduced, the liquid crystal display apparatus 3008 that includes the surface light source device 1800 can be thinned. Moreover, because the liquid crystal display apparatus 3008 that includes the surface light source device 1800 can reduce color unevenness in the surface light source device 1800, color unevenness on the display surface 1011*a* of the liquid crystal panel 1011 can be reduced and image quality improvement can be achieved.

(9) Ninth Embodiment

(9-1) Structure of Ninth Embodiment

Figure 35:
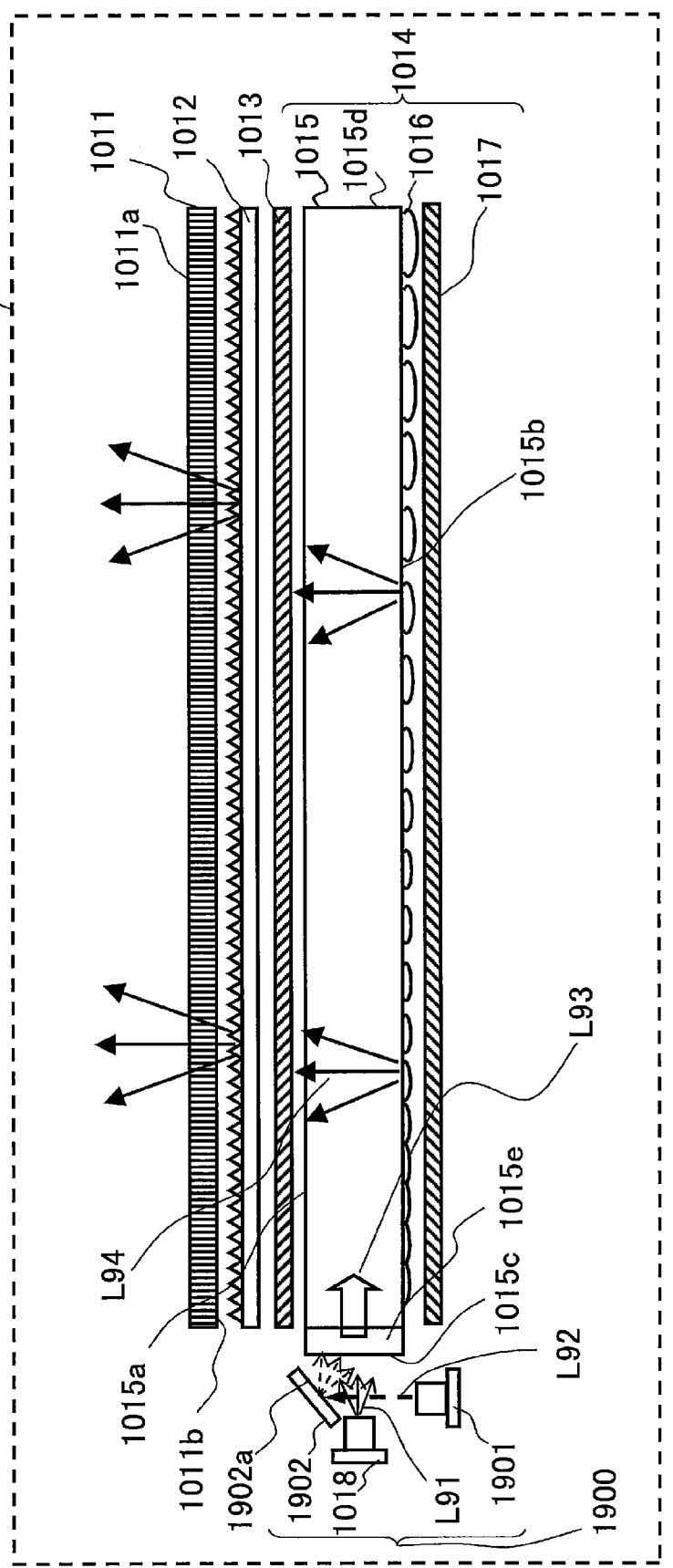
FIG. 35 is a cross-sectional view schematically illustrating an example of structure of a liquid crystal display apparatus (including a surface light source device) according to a ninth embodiment.

FIG. 35 is a cross-sectional view schematically illustrating structure of a liquid crystal display apparatus 3009 (including a surface light source device 1900) in a ninth embodiment. The surface light source device 1900 includes a surface light-emitting light-guiding plate 1015, a light-reflecting sheet 1017, a diffusion-reflection member 1902, a first light source 1018 and a second light source 1901. A surface light source device 2000 includes the surface light-emitting light-guiding plate 1015, the light-reflecting sheet 1017, a light-reflecting member 2002, the first light source 1018 and a second light source 2001. A surface light source device 2100 includes the surface light-emitting light-guiding plate 1015, the light-reflecting sheet 1017, a light-reflecting member 2102, the first light source 1018 and a second light source 2101. A surface light source device 2200 includes the surface light-emitting light-guiding plate 1015, the light-reflecting sheet 1017, a light-reflecting member 2202, the first light source 1018 and a second light source 2201. A surface light source device 2300 includes the surface light-emitting light-guiding plate 1015, a light-guiding member 2310, a cylindrical mirror 2302, the first light source 1018 and a second light source 2301. A surface light source device 2400 includes the surface light-emitting light-guiding plate 1015, the light-guiding member 2410, a cylindrical mirror 2402, the first light source 1018 and a second light source 2401. Reference characters in FIG. 35 that are the same as those in FIG. 18 of the sixth embodiment indicate the same or corresponding elements and a detailed explanation is omitted. The liquid crystal display apparatus 3009 and the surface light source device 1900 in the ninth embodiment differ from the liquid crystal display apparatus 3001 and the surface light source device 1100 in the sixth embodiment, in respect of an arrangement position of the first light source 1018, an arrangement position of the second light source 1901 and an arrangement position of the diffusion-reflection member 1902. In the liquid crystal display apparatus 3001 and the surface light source device 1100 in the sixth embodiment, the components are disposed in the positive z-axis direction in an order of the second light source 1101, the diffusion-reflection member 1102 and the first light source 1018. On the other hand, in the liquid crystal display apparatus 3009 and the surface light source device 1900 in the ninth embodiment, the components are disposed in an order of the second light source 1901, the first light source 1018 and the diffusion-reflection member 1902 in a positive z-axis direction. Except for the order of the arrangement of the components mentioned above, the liquid crystal display apparatus 3009 and the surface light source device 1900 in the ninth embodiment are the same as the liquid crystal display apparatus 3001 and the surface light source device 1100 in the sixth embodiment.

The first light source 1018 emits a first light ray L91 (e.g., bluish-green-color). The second light source 1901 has the same structure as the second light source 1101 in the sixth embodiment and emits a second light ray L92 (e.g., red-color). The first light ray L91 travels from the first light source 1018 to a light incident surface 1015*c* in a substantially positive x-axis direction. The second light ray L92 travels from the second light source 1901 in a substantially positive z-axis direction. Then, the second light ray L92 is reflected by the diffusing-reflecting member 1902 and its traveling direction is changed to the substantially positive x-axis direction. The diffusing-reflecting member 1902 has the same structure as the diffusing-reflecting member 1102 in the sixth embodiment. Both of the first light ray L91 and the second light ray L92 enter through the light incident surface 1015*c* of the surface light-emitting light-guiding plate 1015. The first light ray L91 and the second light ray L92 are mixed in a mixing region 1015*e* near the light incident surface 1015*c* in the surface light-emitting light-guiding plate 1015 to form a white-color mixed light ray L93.

In the ninth embodiment, as illustrated in FIG. 35, the diffusion-reflection member 1902 is disposed in the positive z-axis direction from the first light source 1018. The second light source 1901 is disposed to face a light-reflecting surface 1902*a* of the diffusion-reflection member 1902. Furthermore, the diffusing light-reflecting surface 1902*a* of the diffusion-reflection member 1902 is disposed to face the light incident surface 1015*c* of the surface light-emitting light-guiding plate 1015.

(9-2) Operations of Ninth Embodiment

While the surface light source device 1900 is turned on, a light ray is emitted from each of the first light source 1018 and the second light source 1901.

The first light ray L91 that is emitted from the first light source 1018 and has a wide angular intensity distribution directly enters through the light incident surface 1015*c* of the surface light-emitting light-guiding plate 1015.

The second light ray L92 emitted from the second light source 1901 in the substantially positive z-axis direction enters through the light-reflecting surface 1902*a* of the diffusion-reflection member 1902. The second light ray L92 emitted from the second light source 1901 has a narrow angular intensity distribution, a full angle at half maximum of which is 5 degrees. Moreover, the second light ray L92 has a certain size in the zx-plane, i.e., has a light-flux diameter having a certain degree of thickness in the x-axis direction in FIG. 35. The diffusing light-reflecting surface 1902*a* of the diffusion-reflection member 1902 is irradiated with the second light ray L92 and as a result, a full angle at half maximum of the angular intensity distribution of the second light ray L92 increases. A traveling direction of the second light ray L92 is changed to a direction toward the light incident surface 1015*c* of the surface light-emitting light-guiding plate 1015 (the substantially positive x-axis direction).

The first light ray L91 (e.g., bluish-green-color) and the second light ray L92 (e.g., red-color) enter through the light incident surface 1015*c* of the surface light-emitting light-guiding plate 1015 and propagate through the mixing region 1015*e*, thereby being mixed with each other to form the white-color light (mixed light ray) L93. The mixing region 1015*e* is provided near the light incident surface 1015*c* of the surface light-emitting light-guiding plate 1015. Then, after reflection at a microscopic optical element 1016, reflection at the light-reflecting sheet 1017 and the like, the mixed light ray L93 is emitted through a light-exiting surface 1015*a* of the surface light-emitting light-guiding plate 1015 toward a liquid crystal panel 1011 as planar illumination light L94. In the seventh embodiment, light rays in each color (i.e., the first light ray L91 and the second light ray L92) with the similar angular intensity distributions propagate inside the surface light-emitting light-guiding plate 1015. Thus, the illumination light L94 emitted from the surface light-emitting light-guiding plate 1015 becomes substantially uniformed white-color planar light without color unevenness in a plane parallel to the xy-plane. In addition, a control unit 1021 controls a light-source drive unit 1023 to adjust a ratio between luminance of the first light ray L91 and luminance of the second light ray L92 and thus luminance and color on the light-exiting surface 1015a can be adjusted.

(9-3) Effects of Ninth Embodiment

As described above, the surface light source device 1900 in the ninth embodiment includes the first light source 1018, the second light source 1901 and the diffusion-reflection member 1902. The first light source 1018 is disposed in a position to face the light incident surface (side surface) 1015c of the surface light-emitting light-guiding plate 1015. The second light source 1901 is disposed in a position on a side of a rear surface 1015b from the light incident surface 1015c of the surface light-emitting light-guiding plate 1015. The diffusion-reflection member 1902 has a function as an optical-path changing member to guide the second light ray L92 to the light incident surface 1015c. Thus, the surface light source device 1900 in the ninth embodiment uses the diffusion-reflection member 1902 to change a traveling direction of the second light ray L12 to a direction toward the light incident surface 1015c of the surface light-emitting light-guiding plate 1015. The diffusion-reflection member 1102 has a function as the optical-path changing member. Therefore, in comparison with a conventional structure where two kinds of the light sources arranged in a thickness direction of the surface light-emitting light-guiding plate are disposed to face the light incident surface of the surface light-emitting light-guiding plate, thickness of the surface light-emitting light-guiding plate 1015 can be reduced.

Moreover, in the surface light source device 1900 in the ninth embodiment, the diffusion-reflection member 1902 is disposed on a side of the front surface 1015a from the first light source 1018. By this arrangement, it is not necessary to dispose the whole of the diffusion-reflection member 1902 within a length of the light incident surface 1015c of the surface light-emitting light-guiding plate 1015 in the z-axis direction (a thickness direction of the surface light-emitting light-guiding plate 1015). A thickness part of the diffusion-reflection member 1902 may be disposed on a side of the front surface from the light-exiting surface 1015a (the positive z-axis direction), and the thickness of the surface light-emitting light-guiding plate 1015 can be reduced in comparison with the sixth to eighth embodiments.

Moreover, the surface light source device 1900 in the ninth embodiment includes the diffusion-reflection member 1902. The diffusion-reflection member 1902 has a function as the optical-path changing member. Moreover, the diffusion-reflection member 1902 changes a traveling direction and an angular intensity distribution of the second light ray L92 so as to make an angular intensity distribution of the second light ray L92 immediately before entering the light incident surface 1015c of the surface light-emitting light-guiding plate 1015 closer to an angular intensity distribution of the first light ray L91 immediately before entering the light incident surface 1015c. Thus, the surface light source device 1900 in the ninth embodiment uses the diffusion-reflection member 1902 to increase an angular intensity distribution of the second light ray L92 so as to be closer to an angular intensity distribution of the first light ray L91. This suppresses a difference between an in-plane luminance distribution of planar illumination light which is emitted through the light-exiting surface 1015a after the first light ray L91 passes through the surface light-emitting light-guiding plate 1015 and an in-plane luminance distribution of planar illumination light which is likewise emitted through the light-exiting surface 1015a after the second light ray L92 passes through the surface light-emitting light-guiding plate 1015. This reduces color unevenness in the surface light source device 1900.

Furthermore, the liquid crystal display apparatus 3009 that includes the surface light source device 1900 in the ninth embodiment can be thinned because the thickness of the surface light-emitting light-guiding plate 1015 is reduced. Moreover, the liquid crystal display apparatus 3009 that includes the surface light source device 1900 in the ninth embodiment can reduce color unevenness in the surface light source device 1900. Therefore, the liquid crystal display apparatus 3009 can reduce color unevenness on the display surface 1011a of the liquid crystal panel 1011 and achieve image quality improvement.

According to the ninth embodiment, the control unit 1021 controls the light-source drive unit 1023 to adjust luminance of the second light ray L92 and luminance of the first light ray L91. The control unit 1021 adjusts a light emission amount from each of the light sources on the basis of a video signal. This enables the liquid crystal display apparatus 3009 to reduce power consumption.

Moreover, by using at least one kind of laser light-emitting elements for the light source in the liquid crystal display apparatus, it is possible to provide an image with an extended color reproduction region, in bright colors and without color unevenness.

Furthermore, the first light source 1018 is disposed at the side surface of the surface light-emitting light-guiding plate 1015 and the second light source 1901 is disposed on a side of the rear surface 1015b of the surface light-emitting light-guiding plate 1015 and therefore, a local temperature rise at the periphery due to heat emitted by the respective light sources can be relieved. This can suppress a decrease in light emission efficiency of the light sources due to the ambient temperature rise.

In the above explanation, the liquid crystal display apparatus 3009 and the surface light source device 1900 in the ninth embodiment are configured so that light rays emitted from the two light sources disposed in different positions enter through a short-side end surface (the light incident surface 1015c) of the surface light-emitting light-guiding plate 1015. However, by appropriately changing a position of the first light source 1018 and a position of the second light source 1901, a position of the diffusion-reflection member 1902, an arrangement of the microscopic optical elements 1016, a shape of the microscopic optical element 1016 and the like, it is possible to use a long-side end surface of the surface light-emitting light-guiding plate 1015 as the light incident surface.

Moreover, in the liquid crystal display apparatus 3009 and the surface light source device 1900 in the ninth embodiment, the first light source 1018 and the second light source 1901 are separate components. Thus, the light-source drive unit 1023 can individually control outputs from the first light source 1018 and the second light source 1901 on the basis of an image signal. This enables the liquid crystal display apparatus 3009 and the surface light source device 1900 to reduce power consumption. Moreover, the liquid crystal display apparatus 3009 and the surface light source device 1900 can reduce stray light and improve contrast. The stray light means light that follows an optical path other than a normal optical path in optical equipment and light harmful to a desired use.

(9-4) Another Example of Ninth Embodiment

Figure 36:
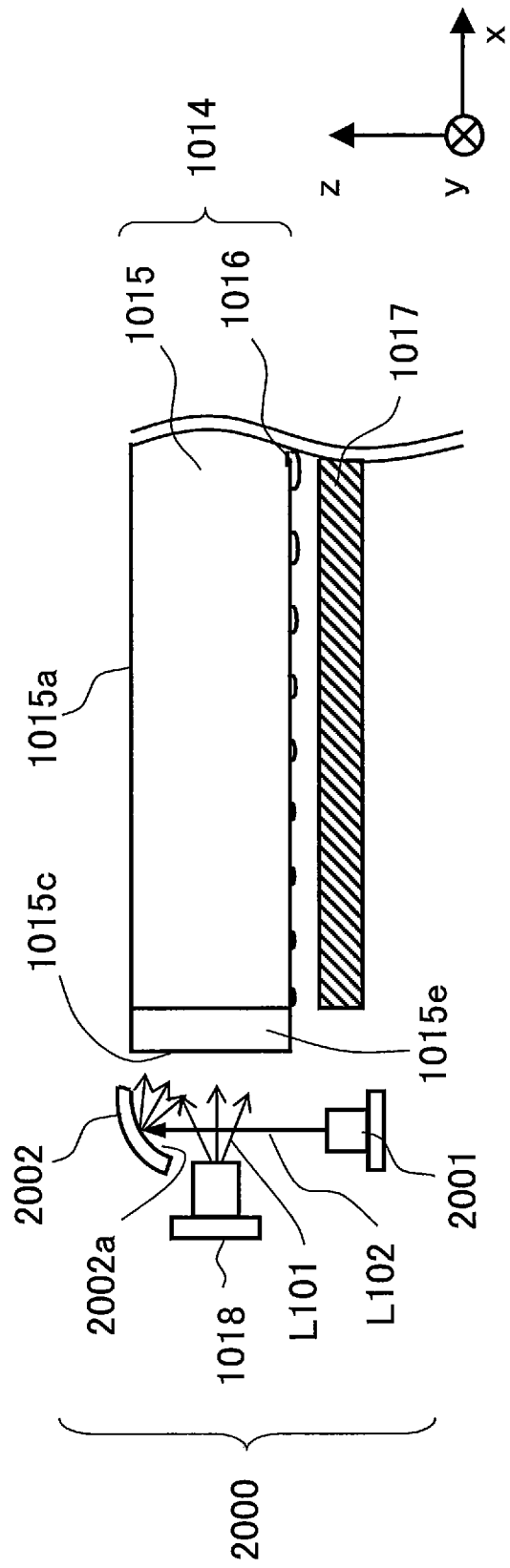
FIG. 36 is a cross-sectional view schematically illustrating another example of a light-reflecting member of the surface light source device in the liquid crystal display apparatus according to the ninth embodiment.

FIG. 36 is a cross-sectional view schematically illustrating another example of the light-reflecting member 2002 in the surface light source device 2000 in the liquid crystal display apparatus in the ninth embodiment. Reference characters in FIG. 36 that are the same as those in FIG. 35 indicate the same or corresponding elements. The surface light source device 2000 illustrated in FIG. 36 differs from the surface light source device 1900 illustrated in FIG. 35 in the following points. A first difference is that the second light source 2001 is included as a substitute for the second light source 1901 illustrated in FIG. 35. A second difference is that the cylindrical mirror 2002 is included as a substitute for the diffusion-reflection member 1902. However, the second light source 2001 is similar to the second light source 1901, although their reference characters are different. Except for the two differences, the surface light source device 2000 illustrated in FIG. 36 is the same as the surface light source device 1900 illustrated in FIG. 35. In FIG. 36, a first light ray L101 is a light ray emitted from the first light source 1018. The first light ray L101 is a light ray of the same kind as the first light ray L91. A second light ray L102 is a light ray emitted from the second light source 2001. The second light ray L102 is a light ray of the same kind as the second light ray L92. The cylindrical mirror 2002 has the same structure as the cylindrical mirror 1202 in the seventh embodiment. According to the example of FIG. 36, similar effects to those in the case in FIG. 35 can be obtained.

Figure 37:
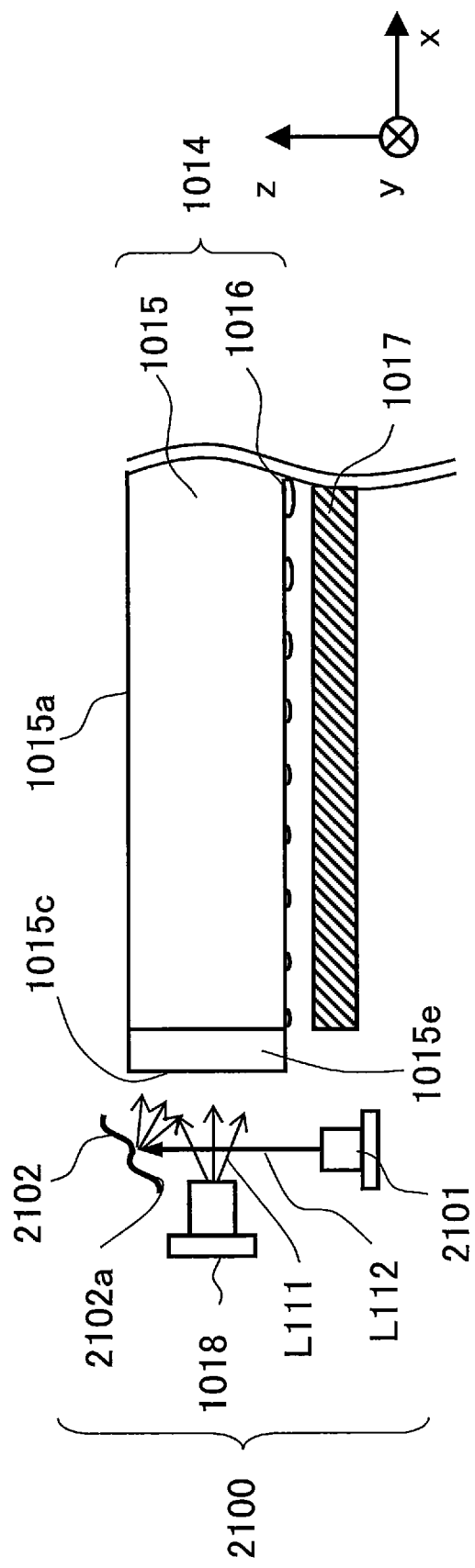
FIG. 37 is a cross-sectional view schematically illustrating another example of the light-reflecting member of the surface light source device in the liquid crystal display apparatus according to the ninth embodiment.

FIG. 37 is a cross-sectional view schematically illustrating another example of the light-reflecting member 2102 in the surface light source device 2100 in the liquid crystal display apparatus in the ninth embodiment. Reference characters in FIG. 37 that are the same as those in FIG. 35 indicate the same or corresponding elements. The surface light source device 2100 illustrated in FIG. 37 differs from the surface light source device 1900 illustrated in FIG. 35 in the following points. A first difference is that the second light source 2101 is included as a substitute for the second light source 1901 illustrated in FIG. 35. A second difference is that the light-reflecting mirror 2102 with a cross-sectional wave shape (having a light-reflecting surface on which convex-shaped parts and concave-shaped parts are alternately continued) is included as a substitute for the diffusion-reflection member 1902 illustrated in FIG. 35. Except for the two differences, the surface light source device 2100 illustrated in FIG. 37 is the same as the surface light source device 1900 illustrated in FIG. 35.

In FIG. 37, a first light ray L111 is a light ray emitted from the first light source 1018. The first light ray L111 is a light ray of the same kind of the first light ray L91. A second light ray L112 is a light ray emitted from the second light source 2101. The second light ray L112 is a light ray of the same kind of the second light ray L92. The light-reflecting mirror 2102 has the same structure as the light-reflecting mirror 1302 in the seventh embodiment. According to the example in FIG. 37, similar effects to those in the case in FIG. 35 can be obtained.

Figure 38:
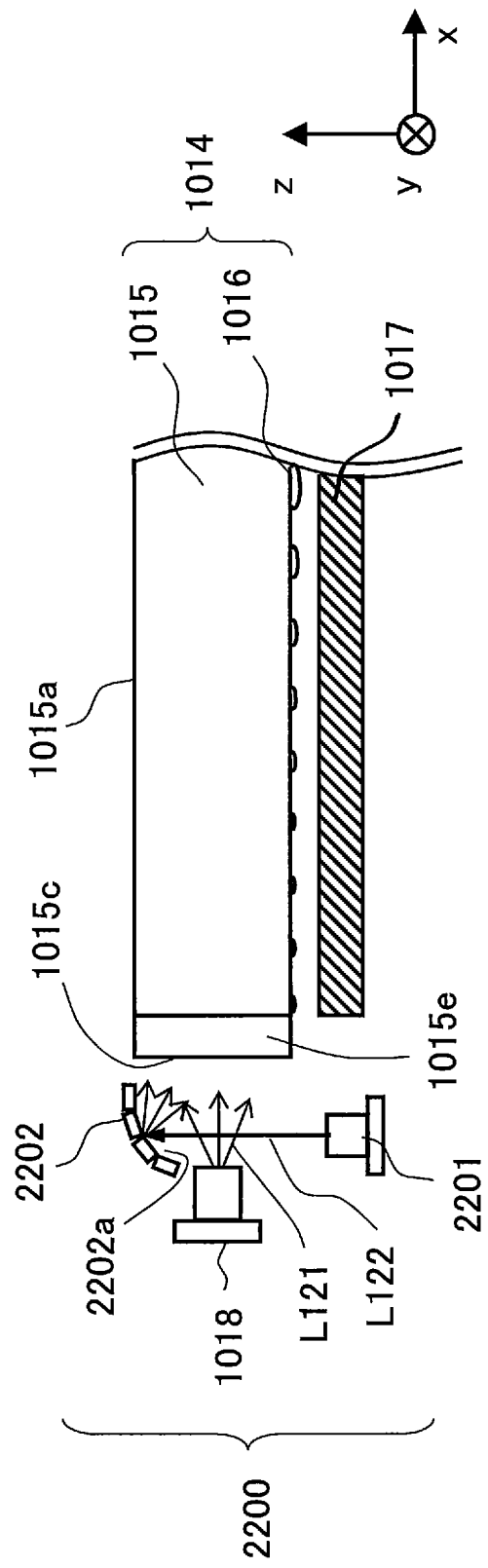
FIG. 38 is a cross-sectional view schematically illustrating another example of the light-reflecting member of the surface light source device in the liquid crystal display apparatus according to the ninth embodiment.

FIG. 38 is a cross-sectional view schematically illustrating another example of the light-reflecting member 2202 in the surface light source device 2200 in the liquid crystal display apparatus in the ninth embodiment. Reference characters in FIG. 38 that are the same as those in FIG. 35 indicate the same or corresponding elements. The surface light source device 2200 illustrated in FIG. 38 differs from the surface light source device 1900 illustrated in FIG. 35 in the following points. A first difference is that the second light source 2201 is included as a substitute for the second light source 1901 illustrated in FIG. 35. A second difference is that the light-reflecting mirror 2202 having a light-reflecting surface on which cross-sectional polygonal shapes are continued is included as a substitute for the diffusion-reflection member 1902 illustrated in FIG. 35. Except for the two differences, the surface light source device 2200 illustrated in FIG. 38 is the same as the surface light source device 1900 illustrated in FIG. 35. In FIG. 38, a first light ray L121 is a light ray emitted from the first light source 1018. The first light ray L121 is a light ray of the same kind of the first light ray L91. A second light ray L122 is a light ray emitted from the second light source 2201. The second light ray L122 is a light ray of the same kind of the second light ray L92. The light-reflecting mirror 2202 has the same structure as the light-reflecting mirror 1402 in the seventh embodiment. According to the example in FIG. 38, similar effects to those in the case in FIG. 35 can be obtained.

(9-5) Another Example of Ninth Embodiment

Figure 39:
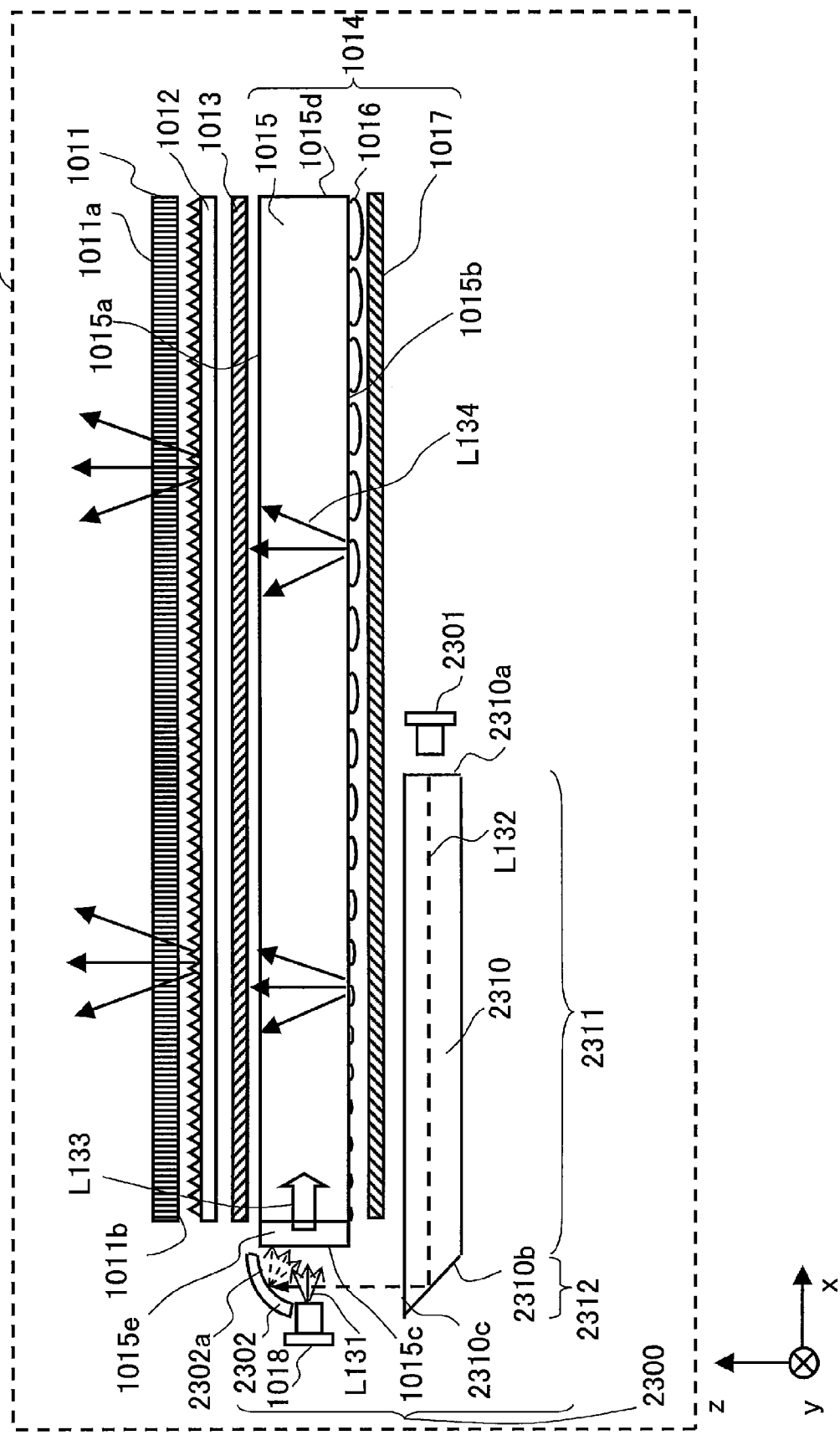
FIG. 39 is a cross-sectional view schematically illustrating another example of structure of the liquid crystal display apparatus (including the surface light source device) according to the ninth embodiment.
Figure 40:
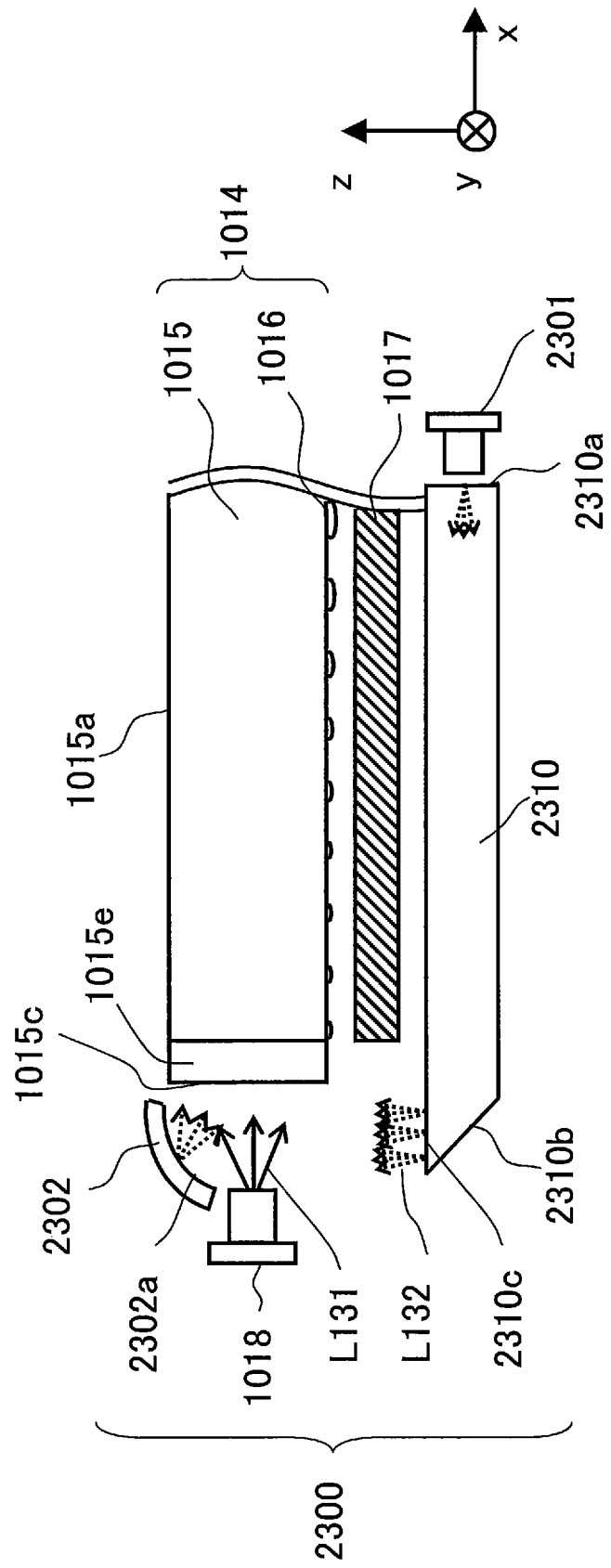
FIG. 40 is a diagram illustrating structure of a surface light-emitting light-guiding plate of the surface light source device illustrated in FIG. 39 near a light incident surface.

FIG. 39 is a cross-sectional view schematically illustrating structure of a liquid crystal display apparatus 3013 (including the surface light source device 2300) in the ninth embodiment. FIG. 40 is a diagram illustrating structure near the light incident surface 1015c of the surface light-emitting light-guiding plate 1015 in the surface light source device (backlight unit) 2300 illustrated in FIG. 39. Reference characters in FIG. 39 and FIG. 40 that are the same as those in FIG. 30 indicate the same or corresponding elements. The liquid crystal display apparatus 3013 and the surface light source device 2300 in the ninth embodiment differ from the liquid crystal display apparatus 3006 and the surface light source device 1600 in the eighth embodiment, in respect of an order of an arrangement of the first light source 1018 and the cylindrical mirror 2302 in the positive z-axis direction. In the eighth embodiment, the cylindrical mirrors 1602, 1702 and 1802 and the first light source 1018 are arranged in the positive z-axis direction in an order of the cylindrical mirrors 1602, 1702 and 1802 and the first light source 1018. The cylindrical mirrors 1602, 1702 and 1802 and the first light source 1018 are disposed in positions to face the light incident surface 1015c of the surface light-emitting light-guiding plate 1015. The cylindrical mirror 1602 has a function as the light-reflecting member. In the ninth embodiment, the cylindrical mirror 2302 and the first light source 1018 are arranged in the positive z-axis direction in an order of the first light source 1018 and the cylindrical mirror 2302. A shape of a light-reflecting surface 2302a of the cylindrical mirror 2302 in FIG. 39 is similar to the shape of the light-reflecting surface 1602a of the cylindrical mirror 1602 in FIG. 30. Except for the differences, the liquid crystal display apparatus 3013 and the surface light source device 2300 are the same as the liquid crystal display apparatus 3006 and the surface light source device 1600 in the eighth embodiment.

The second light source 2301 has a configuration, a shape and a function similar to the configuration, the shape and the function of the second light source 1601 in the eighth embodiment. A light-guiding member for light-source use 2310 has a configuration, a shape and a function similar to the configuration, the shape and the function of the light-guiding member 1610 for light-source use in the eighth embodiment. The second light source 2301 is disposed to face a light incident end 2310a of the light-guiding member for light-source use 2310.

The light-reflecting surface 2302a of the cylindrical mirror 2302 has a shape and a function similar to the shape and the function of the light-reflecting surface 1202a of the cylindrical mirror 1202 illustrated in FIG. 24. A second light ray L132 emitted through a light-exiting surface 2310c of the light-guiding member for light-source use 2310 travels to the light-reflecting surface 2302a of the cylindrical mirror 2302. The second light ray L32 is reflected at the light-reflecting surface 2302a and its traveling direction is directed to the light incident surface 1015c of the surface light-emitting light-guiding plate 1015 (directed in a substantially positive x-axis direction). A full angle at half maximum of an angular intensity distribution of the second light ray L132 reflected at the light-reflecting surface 2302a of the cylindrical mirror 2302 increases. This makes an angular intensity distribution of the second light ray L132 closer to an angular intensity distribution of a first light ray L131.

The first light source 1018 is disposed within a range of a thickness of the surface light-emitting light-guiding plate 1015. The thickness of the surface light-emitting light-guiding plate 1015 denotes a length of the light incident surface (side surface) 1015c in the z-axis direction. An x-axis position of the first light source 1018 is set so as not to obstruct an optical path of the second light ray L132. The optical path of the second light ray L132 denotes an optical path of the second light ray L132 from the light-exiting surface 2310c of the light-guiding member for light-source use 2310 to the light-reflecting surface 2302a of the cylindrical mirror 2302. The first light ray L131 emitted from the first light source 1018 travels toward the light incident surface 1015c of the surface light-emitting light-guiding plate 1015 (in the substantially positive x-axis direction). Then, the first light ray L131 enters the surface light-emitting light-guiding plate 1015 through the light incident surface 1015c of the surface light-emitting light-guiding plate 1015.

While the surface light source device 2300 is turned on, a light ray is emitted from each of the first light source 1018 and the second light source 2301. The first light ray L131 emitted from the first light source 1018 travels in a direction toward the light incident surface 1015c of the surface light-emitting light-guiding plate 1015 (the substantially positive x-axis direction). The second light ray L132 emitted from the second light source 2301 enters the light-guiding member for light-source use 2310 through the light incident end 2310a of the light-guiding member for light-source use 2310. The second light ray L132 is repeatedly totally reflected at an interface between the light-guiding member for light-source use 2310 and an air layer and propagates as it remains to be confined in the light-guiding member for light-source use 2310. At the time, an angular intensity distribution of the second light ray L132 is maintained. Accordingly, an angular intensity distribution of the second light ray L132 at an emission through the light-exiting surface 2310c is equal to an angular intensity distribution of the second light ray L132 at the time of emission from the second light source 2301. Full angles at half maximum of their angular intensity distributions are the same angle. For example, the full angle at half maximum of the respective angular intensity distributions is 5 degrees. The second light ray L132 emitted through the light-exiting surface 2310c of the light-guiding member for light-source use 2310 travels to the light-reflecting surface 2302a of the cylindrical mirror 2302. A traveling direction of the second light ray L132 is changed by the cylindrical mirror 2302 to a direction toward the light incident surface 1015c of the surface light-emitting light-guiding plate 1015 (the substantially positive x-axis direction). Moreover, by reflection at the light-reflecting surface 2302a, a full angle at half maximum of the angular intensity distribution of the second light ray L132 increases.

After entering through the light incident surface 1015c of the surface light-emitting light-guiding plate 1015, the first light ray L131 and the second light ray L132 propagate through a mixing region 1015e, thereby being mixed to become white-color light (a mixed light ray L133). The mixing region 1015e is provided near the light incident surface 1015c of the surface light-emitting light-guiding plate 1015. Then, after reflection at a microscopic optical element 1016, reflection at a light-reflecting sheet 1017 or the like, the mixed light ray L133 is emitted through the light-exiting surface 1015a of the surface light-emitting light-guiding plate 1015 toward the liquid crystal panel 1011 as planar illumination light L134. In addition, a control unit 1021 controls a light-source drive unit 1023 to adjust a ratio between luminance of the first light ray L131 and luminance of the second light ray L132, and thus luminance and color on the light-exiting surface 1015a can be adjusted.

According to the example in FIG. 39, similar effects to those in the case in FIG. 35 can be obtained. Moreover, according to the surface light source device 2300 in FIG. 39, because the light-guiding member for light-source use 2310 is included, it is possible to dispose the first light source 1018 and the second light source 2301 apart from each other. As the first light source 1018 and the second light source 2301, LED elements or laser light-emitting elements are used. An LED element and a laser light-emitting element usually have electricity-light conversion efficiency of 10 to 50% and energy which is not converted into light becomes heat. If the first light source 1018 and the second light source 2301 are disposed close to each other, these heat sources concentrate in a small region. Accordingly, heat radiation capability decreases and ambient temperature of the first light source 1018 and the second light source 2301 rises. Generally, as the ambient temperature rises, light emission efficiency of these light sources decreases. In order to prevent the decrease in light emission efficiency, it is necessary to improve the heat radiation capability. In the liquid crystal display apparatus 3013, the first light source 1018 and the second light source 2301 are disposed apart from each other. Thus, the heat sources are separated and heat radiation capability is improved. In addition, especially in a laser light-emitting element, light emission efficiency greatly decreases and a spectrum shift amount is large when temperature changes. By arranging laser light-emitting elements apart from another heat source in one place, it is also possible to provide a cooling system or the like efficiently.

As described above, even in a case where a plurality of different kinds of light sources are included, it is possible for the liquid crystal display apparatus 3013 in FIG. 39 to increase the number of light sources, while an increase in a thickness of the liquid crystal display apparatus 3013 is suppressed. Therefore, the liquid crystal display apparatus 3013 capable of achieving both high luminance and thin structure can be achieved. Moreover, because the surface light-emitting light-guiding plate for making light from the plurality of kinds of light sources the planar light source is shared, increases in weight and cost can be suppressed.

Moreover, even in a case where different kinds of light sources having different angular intensity distributions from each other are used, it is possible to make an angular intensity distribution of one of the light sources having a narrower angular intensity distribution identical to an angular intensity distribution of the other light source. Therefore, a difference between in-plane luminance distributions of planar light sources generated by the respective light sources can be suppressed. The planar light source denotes a light source that emits light through the whole of its arbitrary plane and the planar light source here denotes light emitted through the whole of the light-exiting surface 1015*a*. The in-plane luminance distribution means a distribution that indicates luminance level with respect to positions which are two-dimensionally expressed, in an arbitrary plane. In a case where these light sources have different spectrums, it is possible to suppress color unevenness. In a case where at least one kind of a light source with high monochromaticity is used to generate white-color light, in particular, a plurality of light sources having different angular intensity distributions are used in order to enlarge a color reproduction range. A laser light-emitting element with extremely outstanding monochromaticity also has high directivity. Therefore, the present embodiment is effective as structure for enlarging a color reproduction range.

Figure 41:
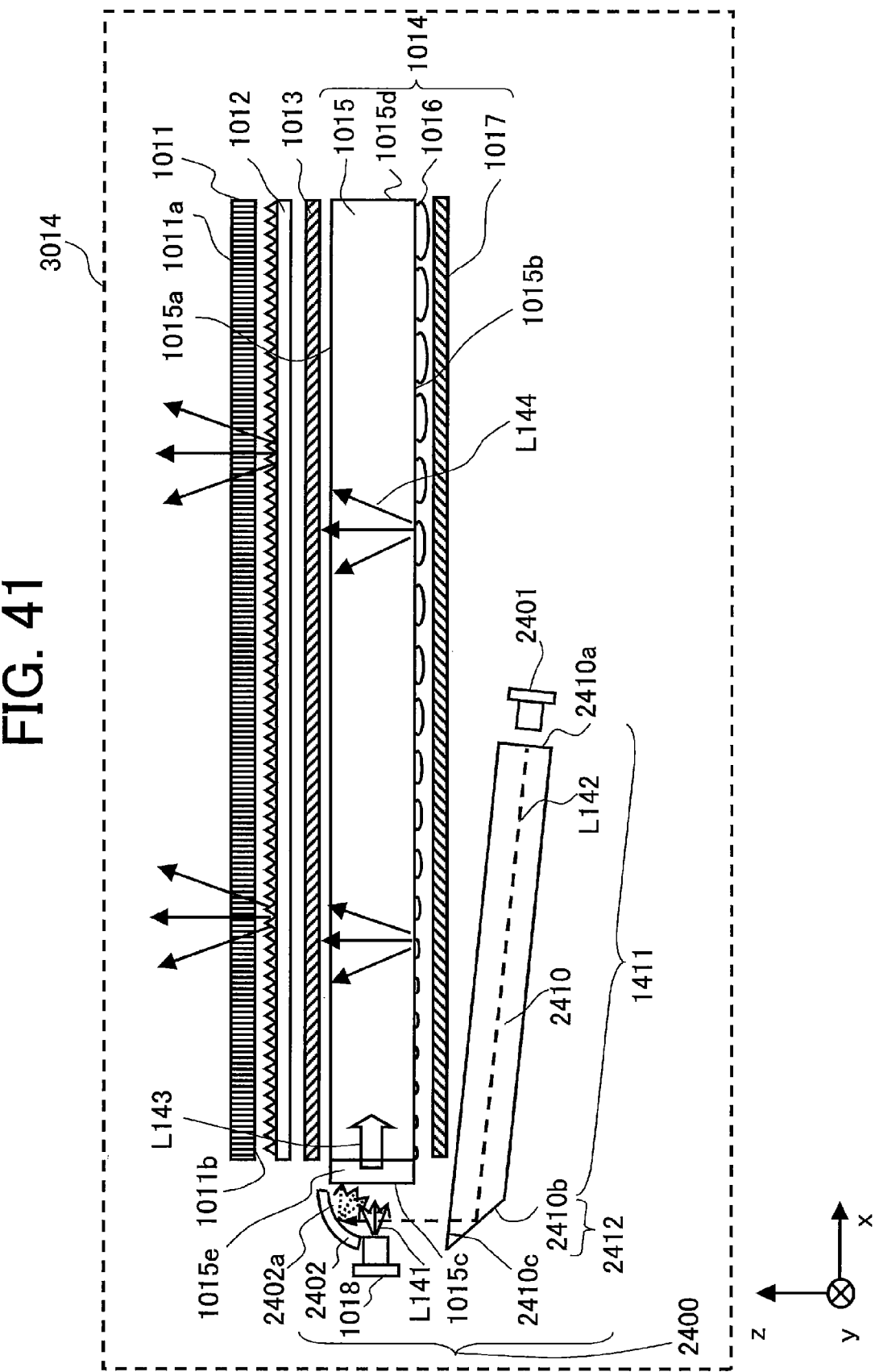
FIG. 41 is a cross-sectional view schematically illustrating another example of structure of the liquid crystal display apparatus (including the surface light source device) according to the ninth embodiment.

FIG. 41 is a cross-sectional view schematically illustrating structure of another example of a liquid crystal display apparatus 3014 (including the surface light source device 2400) in FIG. 39. Reference characters in FIG. 41 that are the same as those in FIG. 39 indicate the same or corresponding elements. The liquid crystal display apparatus 3014 and the surface light source device 2400 in FIG. 41 differ from the liquid crystal display apparatus 3013 and the surface light source device 2300 in FIG. 39 in the following points. A first difference is a position of the second light source 2401. A second difference is a shape and an arrangement of a light-guiding member for light-source use 2410. The light-guiding member for light-source use 2410 has a function as an optical-path changing member. A shape of a light-reflecting surface 2402*a* of the cylindrical mirror 2402 in FIG. 41 is similar to the shape of the light-reflecting surface 2302*a* of the cylindrical mirror 2302 in FIG. 39. Except for the two differences, the liquid crystal display apparatus 3014 and the surface light source device 2400 illustrated in FIG. 41 are the same as the liquid crystal display apparatus 3013 and the surface light source device 2300 illustrated in FIG. 39.

In the surface light source device 2400 illustrated in FIG. 41, the light-guiding member for light-source use 2410 is the same in configuration and shape as the light-guiding member for light-source use 1710 in the surface light source device 1700 illustrated in FIG. 32. The light-guiding member for light-source use 2410 is inclined with reference to the xy-plane. In other words, a light incident end 2410*a* is disposed further apart from a light-reflecting sheet 1017. The second light source 2401 is disposed on a side of a back surface of the light-reflecting sheet 1017 (a negative z-axis direction). The second light source 2401 is disposed to face the light incident end 2410*a* of light-guiding member for light-source use 2410. In FIG. 41, a first light ray L141 is a light ray emitted from the first light source 1018. The first light ray L141 is a light ray of the same kind of the first light ray L91. A second light ray L142 is a light ray emitted from the second light source 2401. The second light ray L142 is a light ray of the same kind of the second light ray L92. The cylindrical mirror 2402 has the same structure as the cylindrical mirror 1602 in the eighth embodiment. According to the example in FIG. 41, similar effects to those in the case in FIG. 39 can be obtained.

(10) Tenth Embodiment

A surface light source device 2500 in a tenth embodiment is a surface light source device that deals with local dimming. The local dimming is a lighting-control technology of controlling a plurality of light-emitting elements individually. The local dimming makes it possible to control so as not to emit light from a light source in an area corresponding to a black part in an image on a screen and so as to emit light from a light source in an area corresponding to a bright part in the image. Through such a control, even in a case of an image where an overall screen is dark, for example, by dimming a backlight for a specified area which is especially dark on the screen, contrast ratio can be improved.

Figure 42:
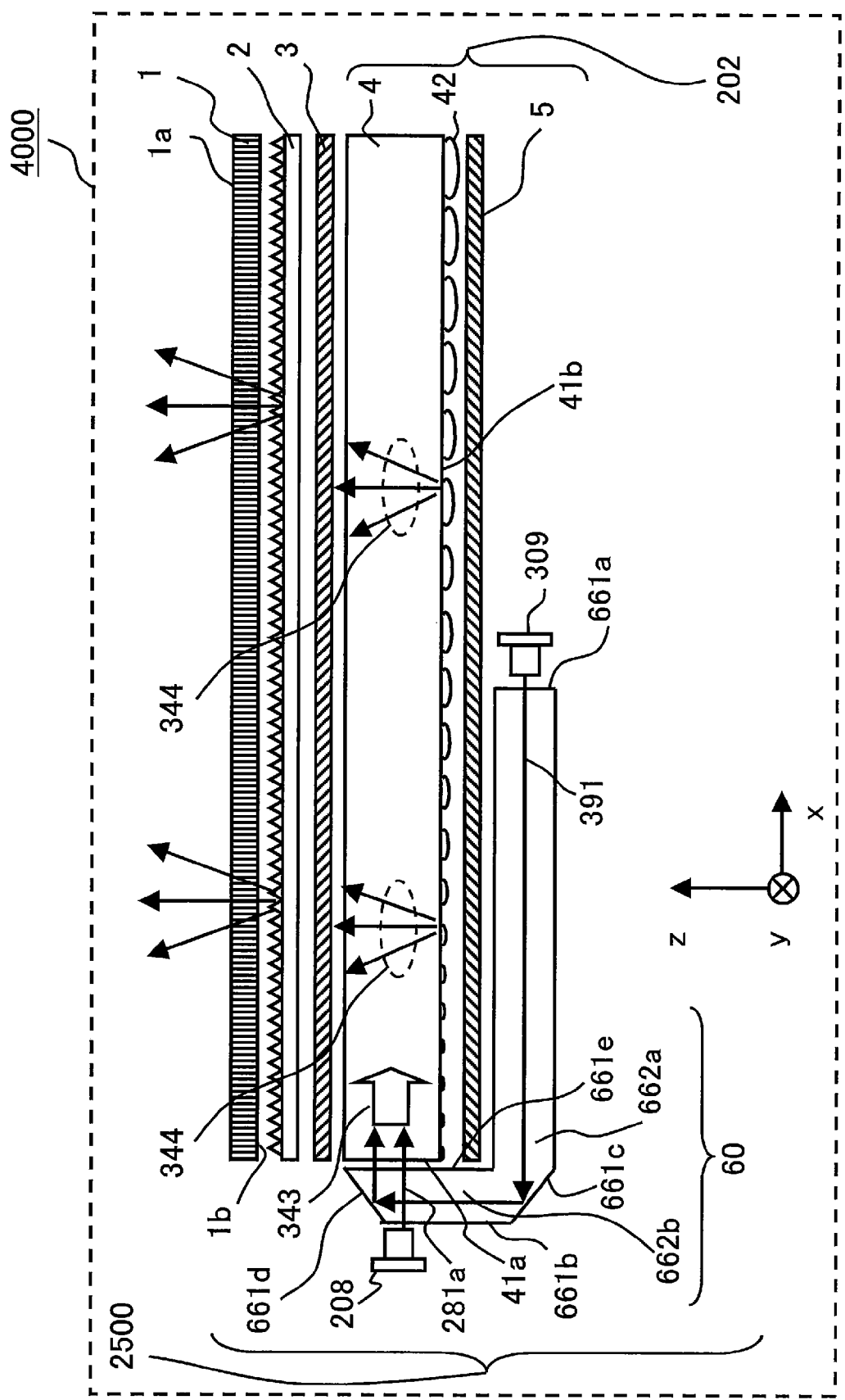
FIG. 42 is a cross-sectional view schematically illustrating an example of structure of a liquid crystal display apparatus (including a surface light source device) according to a tenth embodiment of the present invention.
Figure 43:
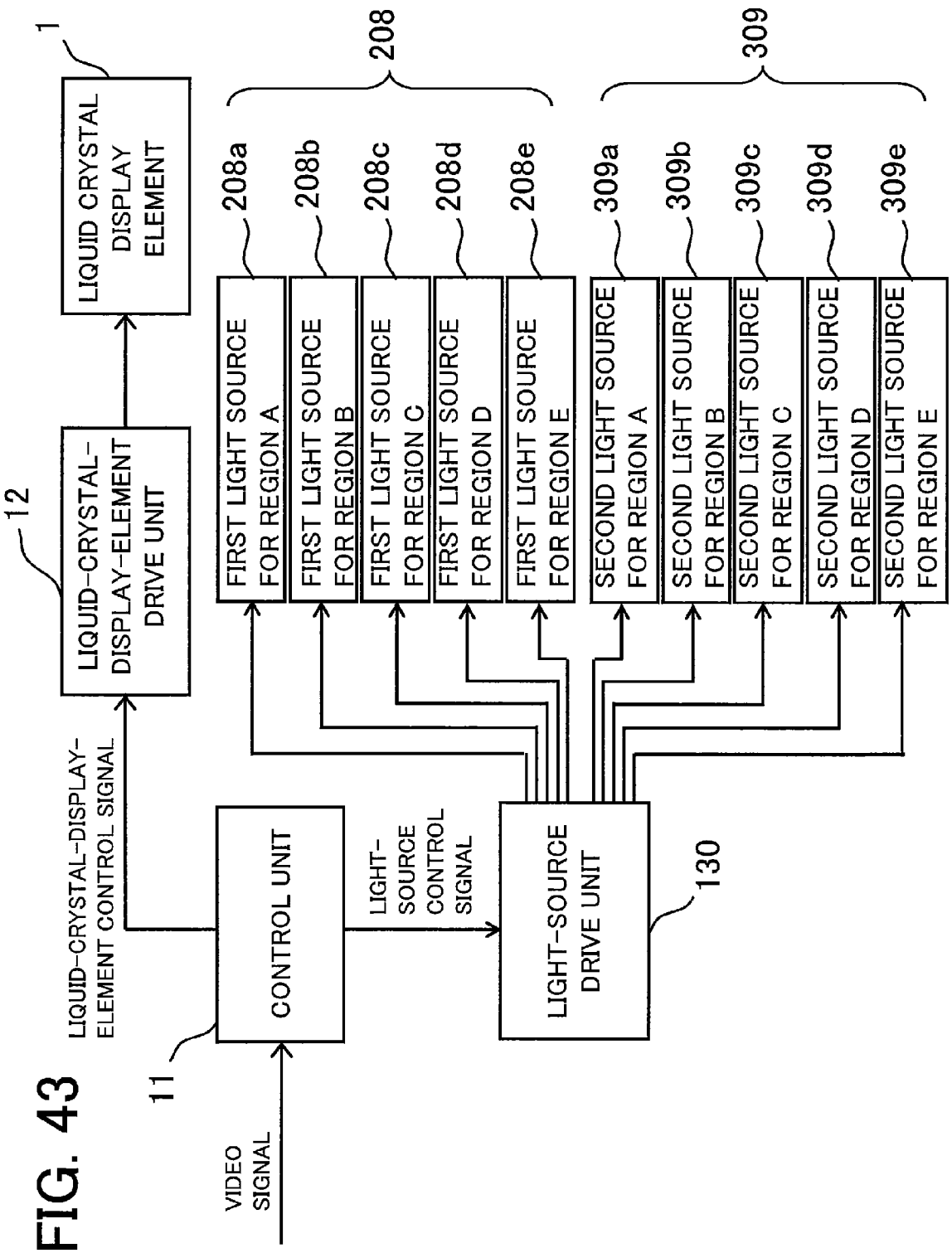
FIG. 43 is a block diagram schematically illustrating a configuration of a control system of the liquid crystal display apparatus according to the tenth embodiment.

FIG. 42 is a conceptual view schematically illustrating an example of structure of a liquid crystal display apparatus 4000 (including the surface light source device 2500) in the tenth embodiment. FIG. 43 is a block diagram illustrating a configuration of a control system of the liquid crystal display apparatus 4000 in the tenth embodiment. Reference characters in FIG. 42 and FIG. 43 that are the same as those in FIG. 10 of the third embodiment indicate the same or corresponding elements.

The liquid crystal display apparatus 4000 is a transmission-type display apparatus. The light-guiding member 6 in the third embodiment is formed as a single body, but a light-guiding member 60 in the tenth embodiment is formed of an arbitrary number of light-guiding elements. The light-source drive unit 13 in the third embodiment drives and controls a plurality of light-emitting elements which belong to the first light source all together. The light-source drive unit 13 also drives and controls a plurality of light-emitting elements which belong to the second light source all together. However, a light-source drive unit 130 in the tenth embodiment drives and controls a plurality of light source elements included in a first light source which are divided into an arbitrary number of groups. The light-source drive unit 130 also drives and controls a plurality of light source elements included in a second light source which are divided into an arbitrary number of groups.

As described above, the liquid crystal display apparatus 4000 differs from that in the third embodiment in the following two points. The first difference is that the light-guiding member 60 is formed of an arbitrary number of light-guiding elements. The second difference is that a plurality of light source elements included in a light source are divided into an arbitrary number of groups to be driven and controlled. Except for the first and second differences, it is the same as the third embodiment.

The tenth embodiment also differs from the first and second embodiments in the following point, in addition to the first and second differences. The third difference is that a light source 309 is a light source formed of laser light-emitting elements. Except for the first, second and third differences, the tenth embodiment is the same as the first and second embodiments.

In addition, in the tenth embodiment, the structures in FIG. 6 and FIG. 7 other than the structure in FIG. 1 in the first embodiment can be also taken. The arbitrary number of light-guiding elements that form the light-guiding member 60 in the tenth embodiment can be achieved by dividing the light-guiding member 6 in FIG. 1, the first light-guiding member 106 and the second light-guiding member 107 in FIG. 6, the light-guiding member 106 in FIG. 7, the light-guiding member 6 in FIG. 8, the light-guiding member 6 in FIG. 10, or the light-guiding member 406 in FIG. 12, into the arbitrary number.

Figure 44:
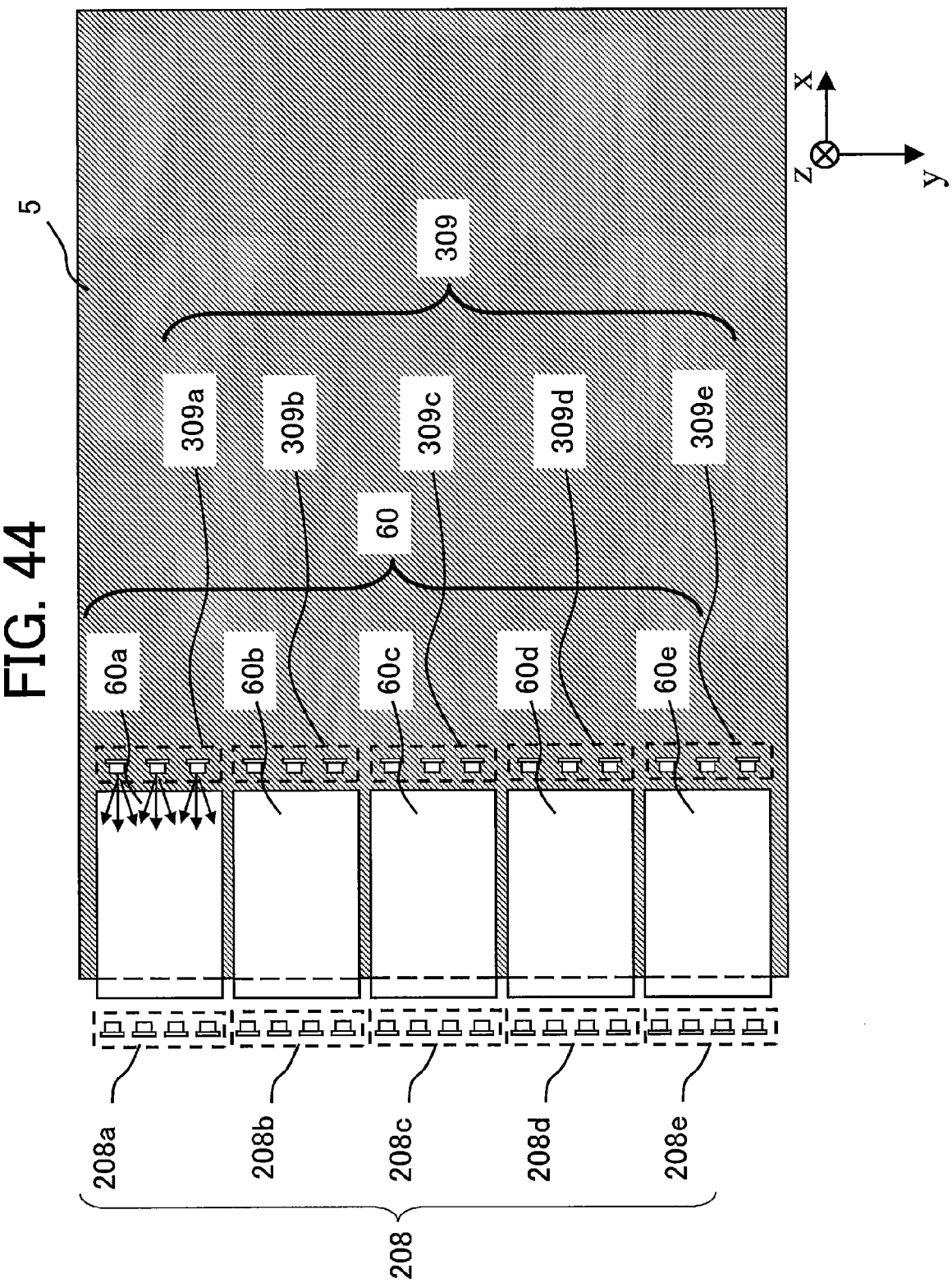
FIG. 44 is a conceptual view of the liquid crystal display apparatus according to the tenth embodiment when viewed in a negative z-axis direction.

FIG. 44 is a conceptual view of the liquid crystal display apparatus 4000 in the tenth embodiment when viewed in a negative z-axis direction. The light-guiding member 60 is formed of five light-guiding elements 60*a*, 60*b*, 60*c*, 60*d* and 60*e*. Provided that the light-guiding member 6 in the third embodiment is divided in the Y-axis direction into five equal parts, the light-guiding elements 60a, 60b, 60c, 60d and 60e are substantially the same in shape as each divided part. In other words, the light-guiding elements 60a, 60b, 60c, 60d and 60e have the same shape as each other. The light-guiding elements 60a, 60b, 60c, 60d and 60e are arranged in the y-axis direction at regular intervals. Moreover, the light-guiding elements 60a, 60b, 60c, 60d and 60e are the same in position in the x-axis direction and the z-axis direction as each other.

The light-guiding elements 60a, 60b, 60c, 60d and 60e are plate-shaped members of 2 mm in thickness, for example. A full length in the Y-axis direction of the light-guiding member 6 which is formed of the light-guiding elements 60a, 60b, 60c, 60d and 60e is equal to or shorter than that of the surface light-emitting light-guiding plate 4. The light-guiding elements 60a, 60b, 60c, 60d and 60e are made of a transparent material such as an acrylic resin (e.g., PMMA) or other materials, for example.

A first light source 208 is a light source device in which a plurality of LED elements are one-dimensionally arranged in the y-axis direction. The plurality of LED elements included in the first light source 208 are divided into groups, each having the same number of the elements in the y-axis direction. The number of groups is an arbitrary number. In FIG. 44, the number of the LED elements included in one group is four.

Figure 45:
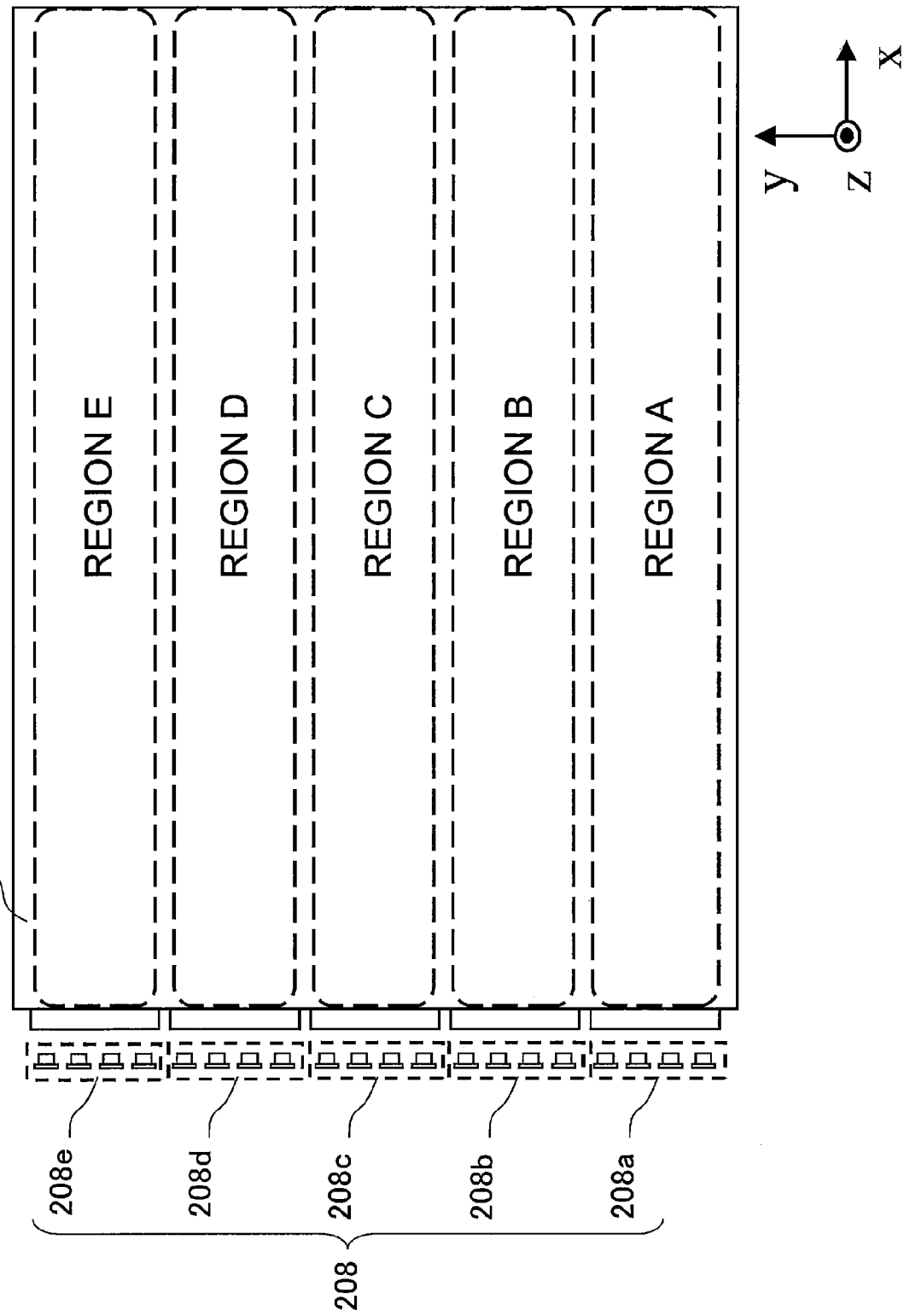
FIG. 45 is a conceptual view of the liquid crystal display apparatus according to the tenth embodiment when viewed in a positive z-axis direction.

FIG. 45 is a conceptual view of the liquid crystal display apparatus 4000 in the tenth embodiment when viewed in a positive z-axis direction. A display surface 1a of a liquid crystal panel is divided into regions A, B, C, D and E. The regions A, B, C, D and E are determined so as to correspond to positions where the light-guiding elements 60a, 60b, 60c, 60d and 60e are disposed. A group in the first light source for illuminating the region A is a first light source 208a. A group in the first light source for illuminating the region B is a first light source 208b. A group in the first light source for illuminating the region C is a first light source 208c. A group in the first light source for illuminating the region D is a first light source 208d. A group in the first light source for illuminating the region E is a first light source 208e. As illustrated in FIG. 43, the five groups of the LED elements forming the first light source 208 are individually driven and controlled on a group basis.

The second light source 309 is a light source device in which a plurality of laser light-emitting elements are one-dimensionally arranged in the y-axis direction. The plurality of laser light-emitting elements included in the second light source 309 are divided into groups, each having the same number of the elements in the y-axis direction. The number of the groups is an arbitrary number. In FIG. 44, the number of the laser light-emitting elements included in one group is three. A group in the second light source for illuminating the region A is a second light source 309a. A group in the second light source for illuminating the region B is a second light source 309b. A group in the second light source for illuminating the region C is a second light source 309c. A group in the second light source for illuminating the region D is a second light source 309d. A group in the second light source for illuminating the region E is a second light source 309e. As illustrated in FIG. 43, the five groups of the laser light-emitting elements forming the second light source 309 are individually driven and controlled on a group basis.

Light emitted from the second light source 309a for the region A enters the light-guiding element 60a. The second light source 309a for the region A is a light source included in the second light source 309. Likewise, light emitted from the second light source 309b for the region B enters the light-guiding element 60b. Light emitted from the second light source 309c for the region C enters the light-guiding element 60c. Light emitted from the second light source 309d for the region D enters the light-guiding element 60d. Light emitted from the second light source 309e for the region E enters the light-guiding element 60e. In other words, the number of the light-guiding elements 60 is equal to the number of the groups of the LED elements forming the first light source 208. Moreover, the number of the light-guiding elements 60 is equal to the number of the groups of the laser light-emitting elements forming the second light source 309.

The first light source 208 uses the LED elements. The LED element in the first light source 208 emits a bluish-green-color first light ray 281. Bluish-green-color light is a mixture of blue-color light and green-color light. The second light source 309 uses the laser light-emitting elements. The laser light-emitting element in the second light source 309 emits a red-color second light ray 391. A wavelength width of laser light is narrow, i.e., laser light has high color purity. For this reason, by using a red-color-laser light-emitting element, the color purity of red-color is improved. In other words, a color reproduction range of a displayed color broadens.

FIG. 45 is a conceptual view of the liquid crystal display apparatus 4000 in the tenth embodiment when viewed in the positive z-axis direction. As illustrated in FIG. 45, the liquid crystal display element 1 is divided into the regions A to E. The number of the regions corresponds to the number of the light-guiding elements 60a, 60b, 60c, 60d and 60e. The number of the regions also corresponds to the number of the groups of the LED elements 208a, 208b, 208c, 208d and 208e forming the first light source 208. The number of the regions also corresponds to the number of the groups of the laser light-emitting elements 309a, 309b, 309c, 309d and 309e forming the second light source 309. In the liquid crystal display apparatus 4000 in the tenth embodiment, the groups of the LED elements 208a, 208b, 208c, 208d and 208e forming the first light source 208 are individually driven and controlled on a group basis. Likewise, the groups of the laser light-emitting elements 309a, 309b, 309c, 309d and 309e forming the second light source 309 are individually driven and controlled on a group basis. Therefore, area control for controlling luminance in each region on a screen can be performed. The area control denotes local dimming.

The area control makes it possible to reduce luminance of the groups of the LED elements 208a, 208b, 208c, 208d and 208e in a region corresponding to a dark part on a screen, as well as to reduce luminance of the groups of the laser light-emitting elements 309a, 309b, 309c, 309d and 309e in the region corresponding to the dark part on the screen. Thus, it is possible for the liquid crystal display apparatus 4000 to improve contrast on the screen. It is also possible for the liquid crystal display apparatus 4000 to reduce power consumption. Moreover, the area control makes it possible to turn off a group of the LED elements corresponding to a region and to turn off a group of the laser light-emitting element corresponding to the region, at an image switching time. The image switching time denotes a blanking period, i.e., a time period for shifting from an end of a scan line on a TV screen to a next scan line. During the blanking period, no image is displayed. Turning off the group of the LED elements corresponding to the region and the group of the laser light-emitting elements enables the liquid crystal display apparatus 4000 to reduce an influence of an afterimage.

How each light ray travels will be explained by referring to FIG. 42. By referring to FIG. 42, the region A will be explained. A second light ray 391a for the region A enters the light-guiding element 60a through an end surface 661a. The second light ray 391a for the region A propagates in a negative x-axis direction inside the light-guiding element 60*a*. Then, the second light ray 391*a* is reflected at an end surface 661*c* and its travel direction is changed to the positive z-axis direction. Then, the second light ray 391*a* is reflected at an end surface 661*d* and its travel direction is changed to a positive x-axis direction. The second light source 309*a* for the region A is included in the second light source 309. The second light ray 391*a* is emitted from the second light source 309*a* for the region A. A first light ray 281*a* for the region A emitted from the first light source 208*a* for the region A travels in the positive x-axis direction. Then, the first light ray 281*a* for the region A enters a light guide unit 662*b* of the light-guiding element 60*a*. The first light ray 281*a* for the region A is mixed with the second light ray 391*a* in the light guide unit 662*b* of the light-guiding element 60*a*. Then, the first light ray 281*a* for the region A enters the surface light-emitting light-guiding plate 4. The first light ray 281*a* for the region A and the second light ray 391*a* for the region A are mixed to become a light ray 343*a*.

The first light ray 281*a* for the region A and the second light ray 391*a* for the region A enter the surface light-emitting light-guiding plate 4 from a part of a light incident surface 41*a* corresponding to the region A and propagate in the positive x-axis direction. The light incident surface 41*a* is an end surface of the surface light-emitting light-guiding plate 4. The light ray 343*a* is changed into illumination light 344 by a microscopic optical element 42. Then, the illumination light 344 is emitted toward a back surface 1*b* of the liquid crystal panel 1. At the time, the illumination light 344 is light with which the region A is mainly illuminated.

Likewise, a second light ray 391*b* for the region B enters the light-guiding element 60*b* through the end surface 661*a*. The second light ray 391*b* for the region B propagates in the negative x-axis direction inside the light-guiding element 60*b*. Then, the second light ray 391*b* is reflected at the end surface 661*c* and its travel direction is changed to the positive z-axis direction. Then, the second light ray 391*b* is reflected at the end surface 661*d* and its travel direction is changed to the positive x-axis direction. The second light source 309*b* for the region B is included in the second light source 309. The second light ray 391*b* is emitted from the second light source 309*b* for the region B. The second light ray 391*b* for the region B, together with a first light ray 281*b* for the region B, enters the surface light-emitting light-guiding plate 4 from a part of the end surface 41*a* corresponding to the region B to become illumination light with which the region B is mainly illuminated. The first light ray 281*b* for the region B is a light ray emitted from the first light source 208*b* for the region B.

Likewise, a second light ray 391*c* for the region C enters the light-guiding element 60*c* through the end surface 661*a*. The second light ray 391*c* for the region C propagates in the negative x-axis direction inside the light-guiding element 60*c*. Then, the second light ray 391*c* is reflected at the end surface 661*c* and its travel direction is changed to the positive z-axis direction. Then, the second light ray 391*c* is reflected at the end surface 661*d* and its travel direction is changed to the positive x-axis direction. The second light source 309*c* for the region C is included in the second light source 309. The second light ray 391*c* is emitted from the second light source 309*c* for the region B. The second light ray 391*c* for the region C, together with a first light ray 281*c* for the region C, enters the surface light-emitting light-guiding plate 4 from a part of the end surface 41*a* corresponding to the region C to become illumination light with which the region C is mainly illuminated. The first light ray 281*c* for the region C is a light ray emitted from the first light source 208*c* for the region C.

Likewise, a second light ray 391*d* for the region D enters the light-guiding element 60*d* through the end surface 661*a*. The second light ray 391*d* for the region D propagates in the negative x-axis direction inside the light-guiding element 60*d*. Then, the second light ray 391*d* is reflected at the end surface 661*c* and its travel direction is changed to the positive z-axis direction. Then, the second light ray 391*d* is reflected at the end surface 661*d* and its travel direction is changed to the positive x-axis direction. The second light source 309*d* for the region D is included in the second light source 309. The second light ray 391*d* is emitted from the second light source 309*d* for the region B. The second light ray 391*d* for the region D, together with a first light ray 281*d* for the region D, enters the surface light-emitting light-guiding plate 4 from a part of the end surface 41*a* corresponding to the region D to become illumination light with which the region D is mainly illuminated. The first light ray 281*d* for the region D is a light ray emitted from the first light source 208*d* for the region D.

Likewise, a second light ray 391*e* for the region E enters the light-guiding element 60*e* through the end surface 661*a*. The second light ray 391*e* for the region E propagates in the negative x-axis direction inside the light-guiding element 60*e*. Then, the second light ray 391*e* is reflected at the end surface 661*c* and its travel direction is changed to the positive z-axis direction. Then, the second light ray 391*e* is reflected at the end surface 661*d* and its travel direction is changed to the positive x-axis direction. The second light source 309*e* for the region E is included in the second light source 309. The second light ray 391*e* is emitted from the second light source 309*e* for the region E. The second light ray 391*e* for the region E, together with a first light ray 281*e* for the region E, enters the surface light-emitting light-guiding plate 4 from a part of the end surface 41*a* corresponding to the region E to become illumination light with which the region E is mainly illuminated. The first light ray 281*e* for the region E is a light ray emitted from the first light source 208*e* for the region E.

As illustrated in FIG. 43, according to the tenth embodiment, by controlling the light-source drive unit 130, the control unit 11 is capable of adjusting luminance of each of the groups of the LED elements 208*a*, 208*b*, 208*c*, 208*d* and 208*e* forming the first light source 208 and adjusting luminance of each of the groups of the laser light-emitting elements 309*a*, 309*b*, 309*c*, 309*d* and 309*e* forming the second light source 309. In other words, the liquid crystal display apparatus 4000 is capable of adjusting a ratio between luminance of the first light source 208 and luminance of the second light source 309. The liquid crystal display apparatus 4000 is also capable of adjusting each luminance in the regions A, B, C, D and E. The control unit 11 adjusts each light emission amount of the light sources 208 and 309 and adjusts each light emission amount of the groups 208*a*, 208*b*, 208*c*, 208*d*, 208*e*, 309*a*, 309*b*, 309*c*, 309*d* and 309*e*, on the basis of a video signal. Thus, for example, in a case of an image in which the region A is dark, a light emission amount of the second light source 309*a* for the region A as well as a light emission amount of the first light source 208*a* for the region A can be reduced. As another example, in a case of an image in which the region B is reddish, a light emission amount of the first light source 208*b* for the region B can be reduced. The reddish image denotes an image tinged with red-color, i.e., a red-color-tone image. Thus, by adjusting a light emission amount of the light source in each region according to an image, power consumption in the liquid crystal display apparatus 4000 can be reduced. Moreover, by adjusting a light emission amount of the light source in each region according to an image, in-screen contrast in the liquid crystal display apparatus 4000 can be improved.

According to the tenth embodiment, by dividing the light-guiding member 60 into the light-guiding elements 60a, 60b, 60c, 60d and 60e, a control of luminance in each region can be more finely performed. The light-guiding elements and the groups of the laser light-emitting elements are disposed so that the light-guiding elements 60a, 60b, 60c, 60d and 60e correspond to the groups of the laser light-emitting elements 309a, 309b, 309c, 309d and 309e respectively. The second light rays 391a, 391b, 391c, 391d and 391e emitted from the respective groups of the laser light-emitting elements 309a, 309b, 309c, 309d and 309e enter the corresponding light-guiding elements 60a, 60b, 60c, 60d and 60e. The second light ray 391 propagates in the negative x-axis direction while totally reflected at an interface between the light-guiding element 60 and an air layer. Accordingly, the second light rays 391a, 391b, 391c, 391d and 391e are overlapped with light from another adjacent laser light-emitting element in the same group, while traveling inside the corresponding light-guiding element 60a, 60b, 60c, 60d or 60e. The laser light-emitting element in the same group denotes any of the three laser elements which correspond to the same light-guiding element 60, as illustrated in FIG. 44. The second light rays 391a, 391b, 391c, 391d and 391e are light rays emitted from the groups of the laser light-emitting elements 309a, 309b, 309c, 309d and 309e respectively. These laser light rays are overlapped themselves to become line-shaped light having uniformed luminance distributions of the light-guiding elements in the Y-axis direction. In other words, the second light rays 391a, 391b, 391c, 391d and 391e emitted from the respective groups of the laser light-emitting elements 309a, 309b, 309c, 309d and 309e become line-shaped light, while propagating the corresponding light-guiding elements 60a, 60b, 60c, 60d and 60e. Here, the line-shaped light denotes light having a length substantially equal to a length of the light-guiding element 60 in the Y-axis direction and with uniformed luminance distribution.

According to the tenth embodiment, the light-guiding member 60 is divided into the light-guiding elements 60a, 60b, 60c, 60d and 60e, and the second light source 309 is formed by the groups of the laser light-emitting elements 309a, 309b, 309c, 309d and 309e corresponding to the respective regions. This makes the second light rays 391a, 391b, 391c, 391d and 391e emitted from the respective groups of the laser light-emitting elements 309a, 309b, 309c, 309d and 309e enter the surface light-emitting light-guiding plate 4 as line-shaped light with uniformed luminance distribution from the respective regions. Thus, while the groups of the laser light-emitting elements 309a, 309b, 309c, 309d and 309e are turned on in the respective regions, highly accurate area control can be performed without leakage of light into another adjacent region, i.e., the region A, B, C, D or E.

In the tenth embodiment, the same effect as in the third embodiment can be obtained. Moreover, in the tenth embodiment, an arbitrary number of the light-guiding element 60, an arbitrary number of the groups of the LED elements and an arbitrary number of the groups of the laser light-emitting elements are used. With regard to the arbitrary number of the groups of the LED elements, each light emission amount of the groups can be adjusted. Likewise, with regard to the arbitrary number of the groups of the laser light-emitting elements, each light emission amount of the groups can be adjusted. In order to illuminate an arbitrary region in the liquid crystal display apparatus 4000, the groups of the LED elements are disposed in positions corresponding to the respective light-guiding elements 60. Moreover, in order to illuminate the arbitrary region in the liquid crystal display apparatus 4000, the groups of the laser light-emitting elements are disposed in positions corresponding to the respective light-guiding elements 60. Thus, the liquid crystal display apparatus 4000 is capable of adjusting luminance in each region according to an image. This makes it possible to achieve improvement of contrast. Besides, power consumption reduction can be achieved. Moreover, the liquid crystal display apparatus 4000 is configured so that the second light source 309 is disposed on the rear surface of the liquid crystal display element 1 to make light enter the surface light-emitting light-guiding plate 4 through the light-guiding member 60. In the liquid crystal display apparatus 4000, by dividing the light-guiding member 60 into the arbitrary number of the light-guiding elements 60a, 60b, 60c, 60d and 60e, area control can be achieved without leakage of light into another adjacent region. Thus, the liquid crystal display apparatus 4000 in the tenth embodiment is effective as structure for controlling lighting in each individual area.

In the tenth embodiment, the number of the light-guiding elements 60a, 60b, 60c, 60d and 60e forming the light-guiding member 60 is five. However, the present invention is not limited to this. The number of the light-guiding elements is determined according to the number of areas for individually lighting. The number of the light-guiding elements is the number of the division of the light-guiding member 60.

In the tenth embodiment, the second light source 309 uses red-color-laser light-emitting elements. However, the present invention is not limited to this. For example, red-color-laser light-emitting elements having a different wavelength peak can be used. Laser light-emitting elements that emits blue-color or green-color light can be also used. In addition, it is necessary that light from the first light source 208 should be mixed with light from the second light source 309 to become white-color light. In other words, the light from the first light source 208 is a complementary color of the light from the second light source 309.

(11) Eleventh Embodiment

Figure 46:
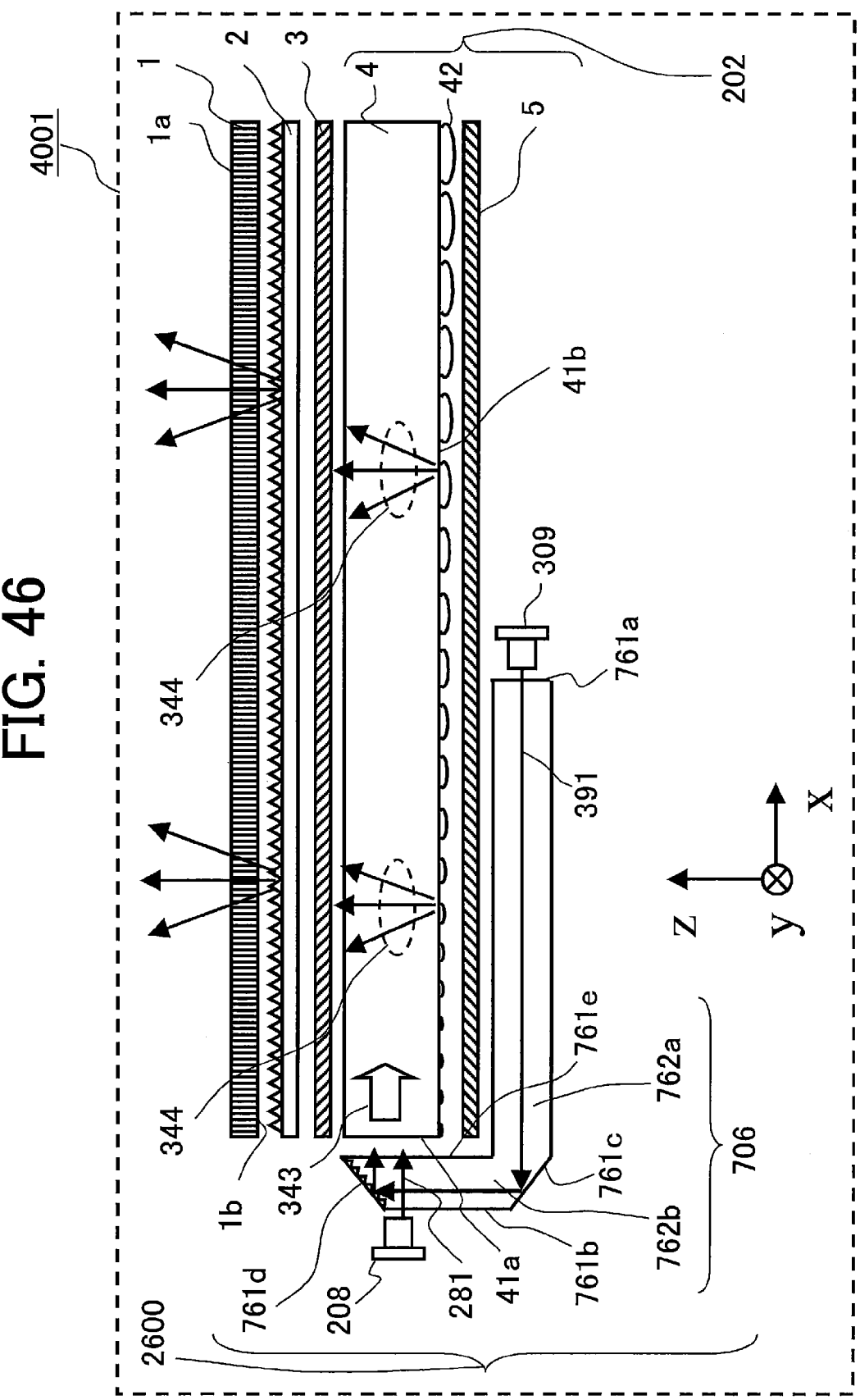
FIG. 46 is a cross-sectional view schematically illustrating an example of structure of a liquid crystal display apparatus (including a surface light source device) according to an eleventh embodiment of the present invention.

FIG. 46 is a cross-sectional view schematically illustrating structure of an example of a liquid crystal display apparatus 4001 (including a surface light source device 2600) in an eleventh embodiment. Reference characters in FIG. 46 that are the same as those in FIG. 42 (the tenth embodiment) indicate the same or corresponding elements. The liquid crystal display apparatus 4001 is a transmission-type display apparatus.

A light-guiding member 706 in the eleventh embodiment is formed of an arbitrary number of light-guiding elements 706a, 706b, 706c, 706d and 706e which are the same in shape as each other, like the light-guiding member 60 in the tenth embodiment. An end surface of the light-guiding elements 706a, 706b, 706c, 706d and 706e forming the light-guiding member 706 is formed as a diffusion-reflecting surface. In the light-guiding element 706 illustrated in FIG. 46, an end surface 761d is formed as the diffusion-reflecting surface, for example. The liquid crystal display apparatus 4001 is the same as that of the tenth embodiment except for a difference that an end surface of the light-guiding elements 706a, 706b, 706c, 706d and 706e is the diffusion-reflecting surface.

Moreover, the eleventh embodiment differs from the fifth embodiment in a point whether or not the light-guiding member 506 is divided into light-guiding elements. The light-guiding member 506 in the fifth embodiment is formed as a single body. On the other hand, the light-guiding member 706 in the eleventh embodiment is formed of the divided light-guiding elements 706a, 706b, 706c, 706d and 706e.

In addition, as described in the fifth embodiment, in the eleventh embodiment, the structures in FIG. 6 and FIG. 7 other than the structure in FIG. 1 in the first embodiment can be also taken. Moreover, in the eleventh embodiment, the structure in FIG. 12 in the fourth embodiment can be also taken. The diffusion-reflecting surface which is provided on the end surface 761d in the eleventh embodiment can be provided on the end surface 61d in FIG. 1, on the end surface 171c in FIG. 6, on the end surface 141d in FIG. 7, on the end surface 61d in FIG. 8, on the end surface 61d in FIG. 10, or on the end surface 461d in FIG. 12.

Moreover, the arbitrary number of the light-guiding elements forming the light-guiding member 706 in the eleventh embodiment can be achieved by dividing the light-guiding member 6 in the arbitrary number in the embodiment illustrated in FIG. 1, by dividing the first light-guiding member 106 and the second light-guiding member 107 in the arbitrary number in the embodiment illustrated in FIG. 6, the light-guiding member 106 in the arbitrary number in the embodiment illustrated in FIG. 7, by dividing the light-guiding member 6 in the arbitrary number in the embodiment illustrated in FIG. 8, by dividing the light-guiding member 6 in the arbitrary number in the embodiment illustrated in FIG. 10, or by dividing the light-guiding member 406 in the arbitrary number in the embodiment illustrated in FIG. 12.

Figure 47:
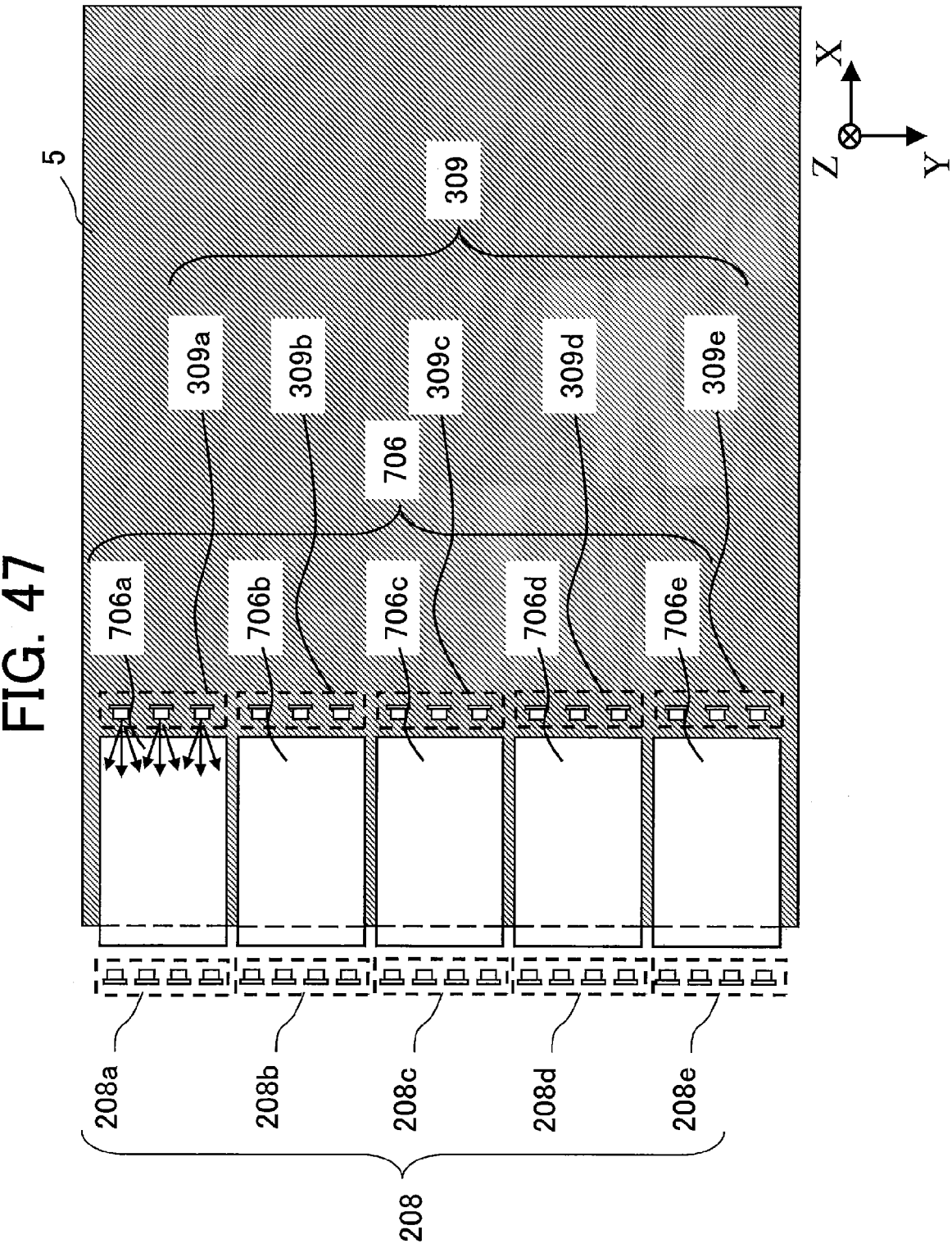
FIG. 47 is a conceptual view of the liquid crystal display apparatus according to the eleventh embodiment when viewed in a negative z-axis direction.

FIG. 47 is a conceptual view of the liquid crystal display apparatus 4001 in the eleventh embodiment when viewed in a negative z-axis direction. The light-guiding member 706 is formed of the five light-guiding elements 706a, 706b, 706c, 706d and 706e. Provided that the light-guiding member 506 in the fifth embodiment is divided in the y-axis direction into five equal parts, the light-guiding elements 706a, 706b, 706c, 706d and 706e are substantially the same in shape as each divided parts. In other words, the light-guiding elements 706a, 706b, 706c, 706d and 706e have the same shape as each other. The light-guiding elements 706a, 706b, 706c, 706d and 706e are arranged in the y-axis direction at regular intervals. Moreover, the light-guiding elements 706a, 706b, 706c, 706d and 706e are the same in position in the x-axis direction and the z-axis direction as each other.

The light-guiding elements 706a, 706b, 706c, 706d and 706e are plate-shaped members of 2 mm in thickness, for example. A full length of the light-guiding member 706 in the y-axis direction is equal to or shorter than that of the surface light-emitting light-guiding plate 4. The light-guiding member 706 is formed of the light-guiding elements 706a, 706b, 706c, 706d and 706e. The light-guiding elements 706a, 706b, 706c, 706d and 706e are made of a transparent material such as an acrylic resin (e.g., PMMA) or other materials, for example.

A first light source 208 includes a plurality of LED elements which are one-dimensionally arranged in the y-axis direction. The LED elements in the first light source 208 are divided into an arbitrary number of groups, each including the same number of the elements in the y-axis direction. In the eleventh embodiment, like in the tenth embodiment, the first light source 208 are divided into five groups: a first light source 208a for a region A, a first light source 208b for a region B, a first light source 208c for a region C, a first light source 208d for a region D and a first light source 208e for a region E. The five groups of the LED elements forming the first light source 208 are individually driven and controlled.

A second light source 309 includes a plurality of laser light-emitting elements which are one-dimensionally arranged in the y-axis direction. The laser light-emitting elements in the second light source 309 are divided into an arbitrary number of groups, each including the same number of the elements in the y-axis direction. In the eleventh embodiment, like in the tenth embodiment, the second light source 309 are divided into five groups: a second light source 309a for the region A, a second light source 309b for the region B, a second light source 309c for the region C, a second light source 309d for the region D and a second light source 309e for the region E. The five groups of the laser light-emitting elements forming the second light source 309 are individually driven and controlled.

The second light source 309 includes the second light source 309a, the second light source 309b, the second light source 309c, the second light source 309d and the second light source 309e. A second light ray 391a emitted from the second light source 309a for the region A enters the light-guiding element 706a through a light incident surface 761a. Likewise, a second light ray 391b emitted from the second light source 309b for the region B enters the light-guiding element 706b through the light incident surface 761a. A second light ray 391c emitted from the second light source 309c for the region C enters the light-guiding element 706c through the light incident surface 761a. A second light ray 391d emitted from the second light source 309d for the region D enters the light-guiding element 706d through the light incident surface 761a. A second light ray 391e emitted from the second light source 309e for the region E enters the light-guiding element 706e through the light incident surface 761a.

In other words, the number of the light-guiding elements 706a, 706b, 706c, 706d and 706e is equal to the number of the groups of the LED elements 208a, 208b, 208c, 208d and 208e forming the first light source 208. Moreover, the number of the light-guiding elements 706a, 706b, 706c, 706d and 706e is equal to the number of the groups of the laser light-emitting elements 309a, 309b, 309c, 309d and 309e forming the second light source 309.

The LED element in the first light source 208 emits a bluish-green-color first light ray 281. Bluish-green-color light is a mixture of blue-color light and green-color light. The laser light-emitting element in the second light source 309 emits a red-color second light ray 391. A wavelength width of laser light is narrow, i.e., laser light has high color purity. For this reason, by using a red-color-laser light-emitting element, the color purity of red-color is improved. In other words, a color reproduction range of a displayed color broadens.

FIG. 46 is a conceptual view schematically illustrating an example of structure of the liquid crystal display apparatus 4001 (including the surface light source device 2600) in the tenth eleventh embodiment. How each light ray travels will be explained by referring to FIG. 46. The first light ray 281 emitted from the first light source 208 has a wide angular intensity distribution. The first light source 208a for the region A emits a first light ray 281a having a wide angular intensity distribution. The first light source 208a for the region A is included in the first light source 208. The first light ray 281a emitted from the first light source 208a for the region A travels in a positive x-axis direction. Then, the first light ray 281a enters a light guide unit 762b of the light-guiding element 706a.

The second light source 309a for the region A included in the second light source 309 emits the second light ray 391a. The second light source 309a for the region A is included in the second light source 309. The second light ray 391a enters the light-guiding element 706a through the light incident surface 761a. The second light ray 391a is repeatedly totally reflected at an interface between the light-guiding element 706a and an air layer and travels in a negative x-axis direction in the light-guiding element 706a. The second light ray 391a is reflected at an end surface 761c and travels in a positive z-axis direction. At the time, an angular intensity distribution of the second light ray 391a is maintained. Accordingly, an angular intensity distribution of the second light ray 391a when arriving at the diffusion-reflecting surface 761d equals to an angular intensity distribution of the second light ray 391a at a time of emission from the second light source 309a. A full angle at half maximum of the angular intensity distribution of the second light ray 391a when arriving at the diffusion-reflecting surface 761d equals to a full angle at half maximum of the angular intensity distribution of the second light ray 391a at the time of emission from the second light source 309a. The full angle at half maximum of the angular intensity distribution is 5 degrees, for example. The second light ray 391a is reflected at the diffusion-reflecting surface 761d and its traveling direction is changed to a direction toward a light incident surface 41a of the surface light-emitting light-guiding plate 4 (a substantially positive x-axis direction). When reflected at the diffusion-reflecting surface 761d, the second light ray 391a is diffused. This makes a full angle at half maximum of the angular intensity distribution of the second light ray 391a larger.

Likewise, light emitted from the second light source 309b for the region B propagates through the light-guiding element 706b and as a result, a full angle at half maximum of the angular intensity distribution can be increased. Likewise, light emitted from the second light source 309c for the region C propagates through the light-guiding element 706c and as a result, a full angle at half maximum of the angular intensity distribution can be increased. Light emitted from the second light source 309d for the region D propagates through the light-guiding element 706d and as a result, a full angle at half maximum of the angular intensity distribution can be increased. Light emitted from the second light source 309e for the region E propagates through the light-guiding element 706e and as a result, a full angle at half maximum of the angular intensity distribution can be increased.

The first light source 208 and the second light source 309 are different kinds of light sources. An angular intensity distribution of the first light source 208 differs from an angular intensity distribution of the second light source 309. The first light source 208 uses LED elements. The second light source 309 uses laser light-emitting elements. Even in such a case, it is possible for the light-guiding member 706 to make an angular intensity distribution of a light source having a narrow angular intensity distribution identical to an angular intensity distribution of a light source having a wide angular intensity distribution. Thus, it is possible for the light-guiding member 706 to suppress a difference between an in-plane luminance distribution of the surface light-emitting light-guiding plate 4 generated by the first light ray 281 and an in-plane luminance distribution of the surface light-emitting light-guiding plate 4 generated by the second light ray 391. The first light ray 281 is a light ray emitted from the first light source 208. The second light ray 391 is a light ray emitted from the second light source 309. This enables the liquid crystal display apparatus 4001 to reduce color unevenness, even in a case where the first light source 208 has a spectrum different from that of the second light source 309.

The first light ray 281a propagates inside the light-guiding element 706a, enters the surface light-emitting light-guiding plate 4 through a part of the light incident surface 41a corresponding to the region A, and propagates in the positive x-axis direction inside the surface light-emitting light-guiding plate 4. The second light ray 391a propagates inside the light-guiding element 706a, enters the surface light-emitting light-guiding plate 4 through the part of the light incident surface 41a corresponding to the region A, and propagates in the positive x-axis direction inside the surface light-emitting light-guiding plate 4. The first light ray 281a and the second light ray 391a are changed into illumination light 344 by a microscopic optical element 42. The illumination light 344 is emitted toward a back surface 1b of a liquid crystal panel 1. At the time, the illumination light 344 is light with which the region A is mainly illuminated.

Likewise, a first light ray 281b propagates inside the light-guiding element 706b, enters the surface light-emitting light-guiding plate 4 through a part of the light incident surface 41a corresponding to the region B, and propagates in the positive x-axis direction inside the surface light-emitting light-guiding plate 4. The second light ray 391b propagates inside the light-guiding element 706b, enters the surface light-emitting light-guiding plate 4 through the part of the light incident surface 41a corresponding to the region B, and propagates in the positive x-axis direction inside the surface light-emitting light-guiding plate 4. The first light ray 281b and the second light ray 391b are changed into the illumination light 344 by the microscopic optical element 42. The illumination light 344 is emitted toward the back surface 1b of the liquid crystal panel 1. At the time, the illumination light 344 is light with which the region B is mainly illuminated.

A first light ray 281c propagates inside the light-guiding element 706c, enters the surface light-emitting light-guiding plate 4 through a part of the light incident surface 41a corresponding to the region C, and propagates in the positive x-axis direction inside the surface light-emitting light-guiding plate 4. The second light ray 391c propagates inside the light-guiding element 706c, enters the surface light-emitting light-guiding plate 4 through the part of the light incident surface 41a corresponding to the region C, and propagates in the positive x-axis direction inside the surface light-emitting light-guiding plate 4. The first light ray 281c and the second light ray 391c are changed into the illumination light 344 by the microscopic optical element 42. The illumination light 344 is emitted toward the back surface 1b of the liquid crystal panel 1. At the time, the illumination light 344 is light with which the region C is mainly illuminated.

A first light ray 281d propagates inside the light-guiding element 706d, enters the surface light-emitting light-guiding plate 4 through a part of the light incident surface 41a corresponding to the region D, and propagates in the positive x-axis direction inside the surface light-emitting light-guiding plate 4. The second light ray 391d propagates inside the light-guiding element 706d, enters the surface light-emitting light-guiding plate 4 through the part of the light incident surface 41a corresponding to the region D, and propagates in the positive x-axis direction inside the surface light-emitting light-guiding plate 4. The first light ray 281d and the second light ray 391d are changed into the illumination light 344 by the microscopic optical element 42. The illumination light 344 is emitted toward the back surface 1b of the liquid crystal panel 1. At the time, the illumination light 344 is light with which the region D is mainly illuminated.

A first light ray 281e propagates inside the light-guiding element 706e, enters the surface light-emitting light-guiding plate 4 through a part of the light incident surface 41a corresponding to the region E, and propagates in the positive x-axis direction inside the surface light-emitting light-guiding plate 4. The second light ray 391e propagates inside the light-guiding element 706e, enters the surface light-emitting light-guiding plate 4 through the part of the light incident surface 41a corresponding to the region E, and propagates in the positive x-axis direction inside the surface light-emitting light-guiding plate 4. The first light ray 281e and the second light ray 391e are changed into the illumination light 344 by the microscopic optical element 42. The illumination light 344 is emitted toward the back surface 1b of the liquid crystal panel 1. At the time, the illumination light 344 is light with which the region E is mainly illuminated.

In the eleventh embodiment, the arbitrary number of the light-guiding elements 706a, 706b, 706c, 706d and 706e are used. In the eleventh embodiment, the arbitrary number of the groups of the LED elements 208a, 208b, 208c, 208d and 208e are used. In the eleventh embodiment, the arbitrary number of the groups of the laser light-emitting elements 309a, 309b, 309c, 309d and 309e are used. Regarding the groups of the LED elements 208a, 208b, 208c, 208d and 208e, a light emission amount of each group can be adjusted. Regarding the groups of the laser light-emitting elements 309a, 309b, 309c, 309d and 309e, a light emission amount of each group can be adjusted.

The light-guiding elements 706a, 706b, 706c, 706d and 706e are disposed in positions corresponding to regions in the liquid crystal display apparatus 4001 The groups of the LED elements 208a, 208b, 208c, 208d and 208e illuminate the corresponding regions in the liquid crystal display apparatus 4001. The groups of the laser light-emitting elements 309a, 309b, 309c, 309d and 309e illuminate the corresponding regions in the liquid crystal display apparatus 4001. Thus, the liquid crystal display apparatus 4001 is capable of adjusting luminance in each region according to an image. This enables the liquid crystal display apparatus 4001 to improve contrast. Moreover, the liquid crystal display apparatus 4001 can reduce power consumption.

Moreover, when it is configured to dispose the second light source 309 on a side of a rear surface of the surface light-emitting light-guiding plate 4 so that light enters the surface light-emitting light-guiding plate 4 through the light-guiding member 706, the liquid crystal display apparatus 4001 includes the light-guiding member 706 divided into the arbitrary number of the light-guiding elements 706a, 706b, 706c, 706d and 706e and therefore, light is hard to leak into another adjacent region and accurate area-lighting control can be achieved.

In the eleventh embodiment, effects similar to those in the tenth embodiment can be obtained. In the eleventh embodiment, different kinds of light sources having different angular intensity distributions from each other are used. Even in such a case, it is possible for the light-guiding member 706 to make an angular intensity distribution of the light source having a narrow angular intensity distribution identical to an angular intensity distribution of the light source having a wide angular intensity distribution. Therefore, the liquid crystal display apparatus 4001 can suppress color unevenness.

Ordinarily, by using at least one kind of a light source with high monochromaticity to generate white-color light, a color reproduction range can be enlarged. A laser light-emitting element is generally considered to be the light source with high monochromaticity. In addition, a laser light-emitting element has high directivity. For this reason, in a case where a color reproduction range is enlarged, the liquid crystal display apparatus uses different kinds of light sources having different angular intensity distributions. Therefore, the eleventh embodiment is effective as structure for enlarging a color reproduction range.

An object of the eleventh embodiment is to make angular intensity distributions of different kinds of light sources having different angular intensity distributions from each other identical to each other. So, in the eleventh embodiment, a similar effect can be achieved by providing the diffusion structure provided on the end surface 761d of the light-guiding element 706 on another surface, i.e., the reflecting surface 761c in an optical path of the second light ray 391a.

However, an angular intensity distribution of the second light ray 391a is enlarged by the diffusion structure. Thus, by providing the diffusion structure near the light incident surface 41a of the surface light-emitting light-guiding plate 4, a decrease in a light amount of light from the second light source 309 that enters the surface light-emitting light-guiding plate 4 can be suppressed. The reason is as follows: if the diffusion structure is provided near the light incident surface 761a of the light-guiding member 706, light scatters and light rays which do not satisfy the total reflection condition increase, and accordingly a light amount of light propagating in the light-guiding member 706 decreases. In this view also, it is preferable to provide the diffusion structure near an end surface 761e of the light-guiding member 706, i.e., it is preferable to provide the diffusion structure near the light incident surface 41a of the surface light-emitting light-guiding plate 4.

Figure 48:
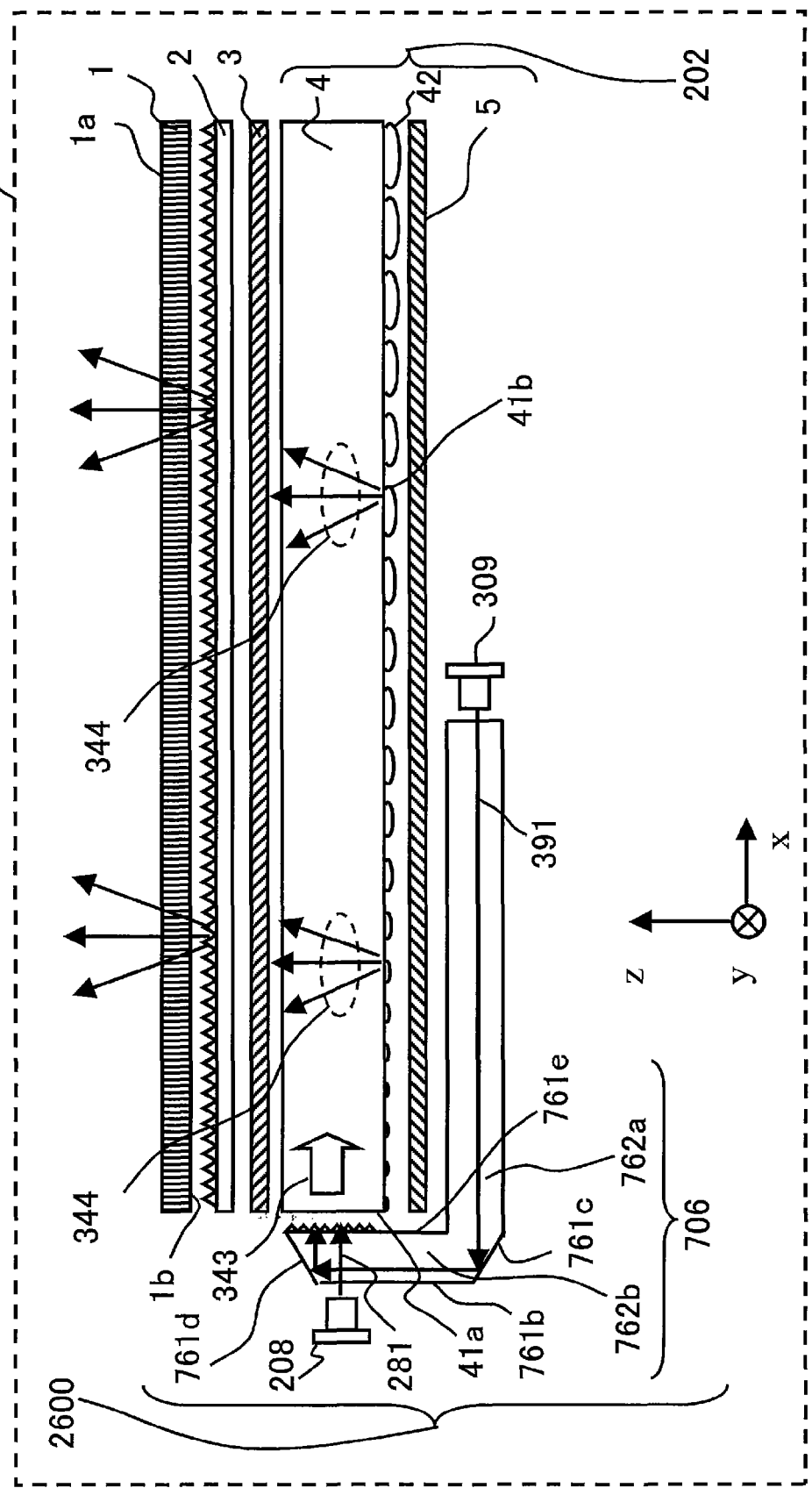
FIG. 48 is a cross-sectional view schematically illustrating another example of diffusing structure in the eleventh embodiment.
Figure 49:
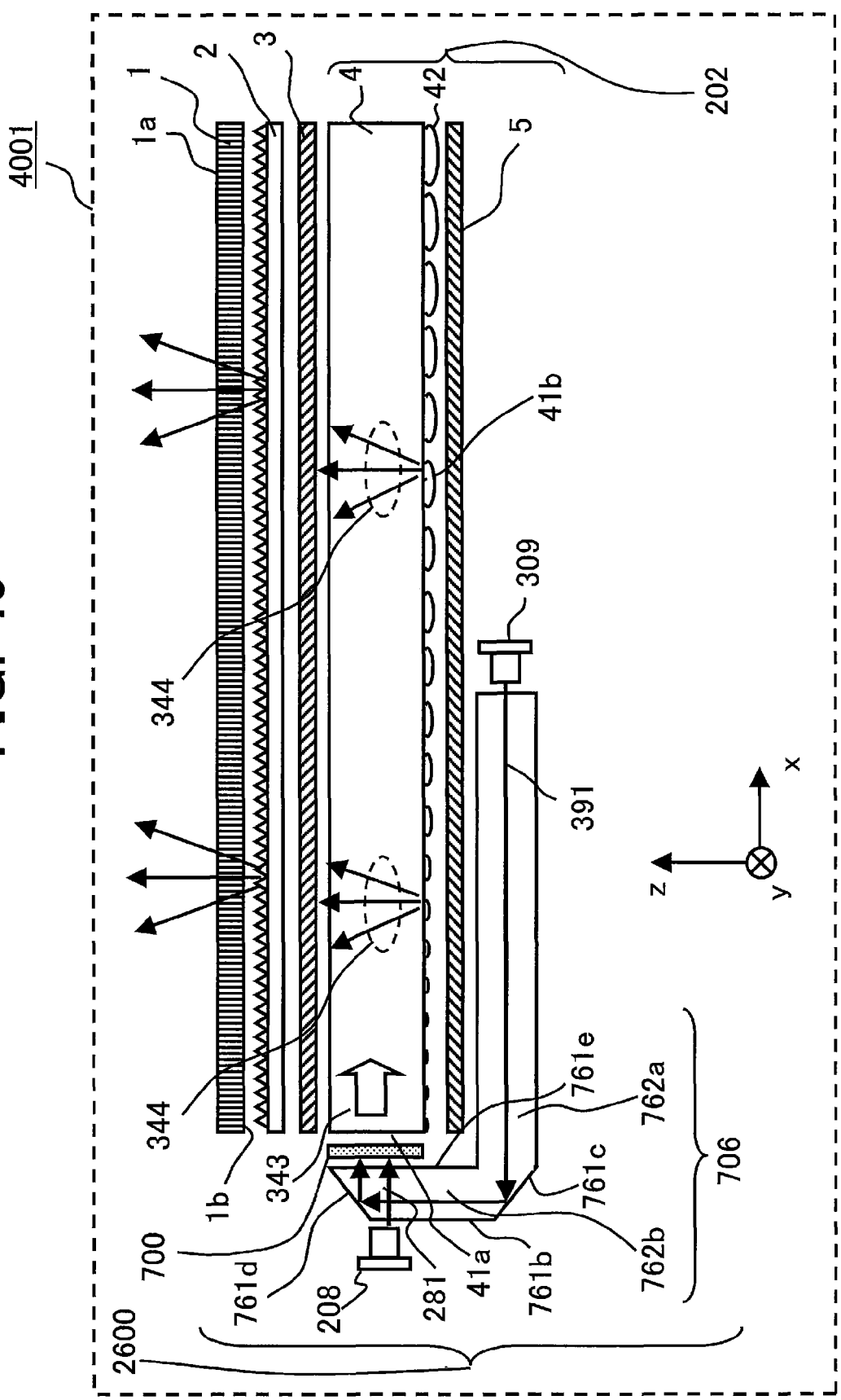
FIG. 49 is a cross-sectional view schematically illustrating further another example of the diffusing structure in the eleventh embodiment.

For example, as illustrated in FIG. 48, the diffusion structure may be provided on the end surface 761e and in a region where the second light ray 391a is emitted through the light-guiding element 706a. Alternatively, for example, as illustrated in FIG. 49, a diffusion element 700 may be provided between the light-guiding elements 706a, 706b, 706c, 706d and 706e and the surface light-emitting light-guiding plate 4. The light-guiding member 706 may have the diffusion element 700 on a surface of the emission surface. Alternatively, the light-guiding member 706 may have the diffusion element 700 inside the light-guiding member 706 and near the emission surface. Alternatively, the surface light-emitting light-guiding plate 4 may have the diffusion element 700 on a surface of the light incident surface 41a. Alternatively, the surface of the light incident surface 41a may be the diffusing surface. Alternatively, the surface light-emitting light-guiding plate 4 may have the diffusion element 700 inside the surface light-emitting light-guiding plate 4 and near the light incident surface 41a.

In the embodiment illustrated in FIG. 48 and FIG. 49 or an embodiment indicated to be equivalent to these, the diffusion element 700 or the diffusion structure diffuses the first light ray 281 as well as the second light ray 391. However, because the first light ray 281 originally has a wide angular intensity distribution, a change in the angular intensity distribution of the first light ray 281 is smaller in comparison with the second light ray 391. Thus, by providing the diffusion element 700 or the like between the light-guiding elements 706a, 706b, 706c, 706d and 706e and the surface light-emitting light-guiding plate 4, effects similar to those in a case where the diffusion structure is provided on the reflecting surface 761d can be obtained.

The diffusion structure is formed on the surface of the end surface 761e. The diffusion structure is formed on the surface of the light incident surface 41a. The diffusion structure is formed on a surface of the diffusion element 700. For example, the diffusion structure may be structure where a plurality of small concave lenses are formed. Alternatively, the diffusion structure may be structure where a plurality of small convex lenses are formed. Alternatively, the diffusion structure may be structure where a plurality of small pyramid shapes are formed. Alternatively, it may be structure where small and random recess-projection shapes are formed by blasting. Alternatively, particles having a diffractive index different from that of a surrounding material may be attached by coating. Alternatively, the diffusion element 700 may be an element which includes particles having a diffractive index different from that of a surrounding material in its inside.

Furthermore, the light-guiding elements 706a, 706b, 706c, 706d and 706e have the same shape as each other. So, the same diffusion structure is used in each of the light-guiding elements 706a, 706b, 706c, 706d and 706e.

In the eleventh embodiment, the number of the light-guiding elements forming the light-guiding member 706 is five. However, the present invention is not limited to this. The number of the light-guiding elements 706a, 706b, 706c, 706d and 706e is determined according to the number of necessary areas for lighting individual areas. The number of the light-guiding elements 706a, 706b, 706c, 706d and 706e is the number of the division of the light-guiding member 706.

In the eleventh embodiment, red-color-laser light-emitting elements are used for the second light source 309. However, the present invention is not limited to this. For example, red-color-laser light-emitting elements having a different wavelength peak can be used. Laser light-emitting elements that emit blue-color or green-color light can be also used. In addition, it is necessary that light from the first light source 208 should be mixed with light from the second light source 309 to become white-color light. In other words, the light from the first light source 208 is a complementary color of the light from the second light source 309.

In each of the embodiments described above, the invention is described as the backlight device in the liquid crystal display apparatus. The mixed light ray is a white-color light ray for this reason, however, it is not an exclusion of a light ray of any color other than white-color. It is possible to generate a light ray of any color other than white-color according to a use of the device.

In the description of the embodiments, expressions including words such as 'substantially' and 'approximately', as in 'approximately 45 degrees', 'substantially positive x-axis direction', 'substantially equal angle', 'substantially the same in area' and 'substantially even white-color planar light' have been used. These expressions indicate that a range including the manufacturing tolerance and variations in assembly are covered. So, even if a word like 'substantially' is not included in the description of claims, the range including the manufacturing tolerance and variations in assembly should be covered. If a word like 'substantially' is included in the description of claims, it means that the range including the manufacturing tolerance and variations in assembly are covered.

EXPLANATION OF REFERENCE CHARACTERS 1 liquid crystal display element (liquid crystal panel); 1a display surface of liquid crystal panel; 1b rear surface (back surface) of liquid crystal panel; 2 first optical sheet; 3 second optical sheet; 4, 400 surface light-emitting light-guiding plate (light-guiding-diffusing plate); 5 light-reflecting sheet; 6, 106, 107, 108, 406, 408, 506 light-guiding member (optical-path changing member); 8, 208 first light source; 9, 209, 309 second light source; 11 control unit; 12 liquid-crystal-panel drive unit; 13 light-source drive unit; 41a, 41c, 141a, 141d end surface; 41b, 141b rear surface; 42 microscopic optical element; 43, 243, 343 light ray; 44, 244, 344 illumination light; 61a, 61b, 61c, 61d, 61e, 161a, 161b, 161c, 171a, 171b, 171c, 171d, 461a, 461b, 461c, 461d, 561a, 561b, 561c, 561e end surface; 62a, 462a, 562a first light-guiding part; 62b, 462b, 562b second light-guiding part; 81, 281 first light ray; 91, 291, 391 second light ray; 100, 101, 102, 103, 104 liquid crystal display apparatus; 145 end part; 181, 182, 183, 481, 482 reflecting member; 181a, 182a, 183a, 481a, 481b, 481c, 482a reflecting surface; 200, 201, 202, 203, 204 surface light source device (backlight unit); 561d diffusing-reflecting surface of light-guiding member; 1011 liquid crystal display element (liquid crystal panel); 1011a display surface of liquid crystal panel; 1011b rear surface (back surface) of liquid crystal panel; 1012 first optical sheet; 1013 second optical sheet; 1015 surface light-emitting light-guiding plate (light-guiding-diffusing plate); 1015a front surface of surface light-emitting light-guiding plate (light-exiting surface); 1015b rear surface of surface light-emitting light-guiding plate; 1015c side surface of surface light-emitting light-guiding plate (light incident surface); 1015d side surface of surface light-emitting light-guiding plate (end surface on a side opposite to light incident surface); 1015e mixing region of surface light-emitting light-guiding plate; 1015f region of surface light-emitting light-guiding plate other than mixing region; 1016, 1016a microscopic optical element; 1017 light-reflecting sheet; 1018 first light source; 1100, 1110, 1200, 1300, 1400, 1500, 1600, 1700, 1800, 1900, 2000, 2100, 2200, 2300, 2400, 2500, 2600 surface light source device (backlight unit); 1101, 1111, 1201, 1301, 1401, 1501, 1601, 1701, 1801, 1901, 2001, 2101, 2201, 2301, 2401 second light source; 1102, 1112, 1902 diffusing-reflecting member (optical-path changing member); 1202, 1302, 1402, 1502, 1503, 1602, 1702, 2002, 2102, 2202, 2302, 2402 light-reflecting mirror (optical-path changing member); 1610, 1710, 1810, 2310, 2410 light-source-side light-guiding member (another optical-path changing member); 3001, 3011, 3002, 3006, 3007, 3008, 3009, 3013, 3014 liquid crystal display apparatus; L11, L21, L31, L41, L51, L61, L71, L81, L91, L101, L111, L121, L131, L141 first light ray; L12, L22, L32, L42, L52, L62, L72, L82, L92, L102, L112, L122, L132, L142 second light ray; L13, L23, L63, L73, L83, L93, L133, L143 mixed light ray; L14, L24, L64, L74, L84, L94, L134, L144 illumination light; 600 diffusing element; 60, 706 light-guiding member (optical-path changing member); 661a, 661b, 661c, 661d, 661e, 761a, 761b, 761c, 761d, 761e end surface; 662a, 762a first light-guiding part; 662b, 762b second light-guiding part; 130 light-source drive unit; 60a, 60b, 60c, 60d, 60e, 706a, 706b, 706c, 706d, 706e light-guiding element; 700, 1120 diffusing element.

What is claimed is:
1. A surface light source device comprising:
a surface light-emitting light-guiding unit including a light incident surface provided in a side surface and a front surface, light that enters through the light incident surface being guided in the surface light-emitting light-guiding unit to exit through the front surface;
an LED light source for emitting an LED light ray, the LED light source being disposed at an outside position on a side of a direction of the light incident surface of the surface light-emitting light-guiding unit;
a plurality of laser light sources for emitting laser light rays, the laser light sources being disposed at an outside position on a side of a direction of a rear surface of the surface light-emitting light-guiding unit; and
a laser-light-ray guiding unit arranged on a side of a rear surface of the surface light-emitting light-guiding unit, the laser-light-ray guiding unit including a light incident end surface and a light bending part, the laser-light-ray guiding unit guiding the laser light rays emitted from the laser light sources so that the laser light rays enter through the light incident end surface, travel in a direction opposite to a direction in which the LED light source emits the LED light ray, and thereafter are reflected by the light bending part to enter through the light incident surface of the surface light-emitting light-guiding unit.

2. The surface light source device according to claim 1, wherein the laser-light-ray guiding unit is configured to have a length from the light incident end surface to the light bending part that is longer than an optical length,
   wherein when the laser light rays inside the laser-light-ray guiding unit traveled through the optical length while diverging at a divergence angle, adjacent laser light rays out of the laser light rays inside the laser-light-ray guiding unit overlap with each other, thereby forming line-shaped light.

3. The surface light source device according to claim 1, further comprising:
   a diffusing element for diffusing light, the diffusing element being provided on the light incident surface of the surface light-emitting light-guiding unit.

4. The surface light source device according to claim 1, wherein the laser-light-ray guiding unit includes:
   a light-exiting surface through which the laser light ray exits; and
   a diffusing structure disposed on the light-exiting surface.

5. The surface light source device according to claim 1, wherein the laser-light-ray guiding unit includes a light-exiting surface through which the laser light ray exits, the surface light source device further comprising a diffusing element for diffusing light, the diffusing element being disposed on the light-exiting surface.

6. The surface light source device according to claim 1, further comprising a diffusing structure for diffusing light, the diffusing structure being disposed on the light incident surface of the surface light-emitting light-guiding unit.

7. The surface light source device according to claim 1, wherein the laser-light-ray guiding unit includes a diffusing structure configured to make an angular intensity distribution of the laser light ray closer to an angular intensity distribution of the LED light ray.

8. The surface light source device according to claim 1, wherein the laser-light-ray guiding unit includes a reflecting surface for changing a traveling direction of the laser light ray.

9. The surface light source device according to claim 1, wherein the laser-light-ray guiding unit is divided into a plurality of parts by a plane that is parallel to an optical axis of the laser light ray and perpendicular to the front surface of the surface light-emitting light-guiding unit.

10. A liquid crystal display apparatus comprising the surface light source device of claim 1.

* * * * *